(12) United States Patent
Hamlin

(10) Patent No.: US 11,016,930 B2
(45) Date of Patent: May 25, 2021

(54) DIGITAL PROCESSING CONNECTIVITY

(71) Applicant: Derrick John Hamlin, Rochester (GB)

(72) Inventor: Derrick John Hamlin, Rochester (GB)

(73) Assignee: Derrick John Hamlin, Rochester (GB)

( * ) Notice: Subject to any disclaimer, the term of this patent is extended or adjusted under 35 U.S.C. 154(b) by 0 days.

(21) Appl. No.: 16/613,754

(22) PCT Filed: May 17, 2018

(86) PCT No.: PCT/EP2018/063007
§ 371 (c)(1),
(2) Date: Nov. 14, 2019

(87) PCT Pub. No.: WO2018/211042
PCT Pub. Date: Nov. 22, 2018

(65) Prior Publication Data
US 2020/0301876 A1 Sep. 24, 2020

(30) Foreign Application Priority Data

May 17, 2017 (GB) ...................................... 1707970
Apr. 5, 2018 (GB) ...................................... 1805652

(51) Int. Cl.
*G06F 15/173* (2006.01)
*G06F 15/82* (2006.01)
*G06F 8/30* (2018.01)

(52) U.S. Cl.
CPC .............. *G06F 15/82* (2013.01); *G06F 8/312* (2013.01); *G06F 15/17312* (2013.01);
(Continued)

(58) Field of Classification Search
CPC .............. G06F 15/82; G06F 15/17312; G06F 15/17318; G06F 15/17362;
(Continued)

(56) References Cited

U.S. PATENT DOCUMENTS 5,434,972 A * 7/1995 Hamlin ................ G06F 9/4494
709/238
6,145,072 A * 11/2000 Shams ............. G06F 15/17343
710/2

(Continued)

FOREIGN PATENT DOCUMENTS

EP 0541683 A1 5/1993

OTHER PUBLICATIONS

International Search Report and Written Opinion prepared by the European Property Office as International Searching Authority for PCT International Patent Application No. PCT/EP2018/063007, dated Aug. 31, 2018, 18 pages.

(Continued)

*Primary Examiner* — Anh Q Tran
(74) *Attorney, Agent, or Firm* — Adsero IP

(57) ABSTRACT

A connectivity has a first network (25) of signal-links interconnecting a large plurality of address-bearing, computing cells (20 and 22). Some of the links are selectable according to addresses hierarchically ordered along a recursive curve. Most of the address-designated links that form the network are switchably operable between cells such that a first selectable set of cells along one segment of the recursive curve form signal-routes to a second selectable set of cells, along a second segment. For receipt of instructions and for synchronisation, some segments have a switchable signal-path from one controlling cell of that segment. A second network (23) has signal-links interconnecting a plurality of processing cells (19 and 21) some of which control the loading of data into cells of the first network. The computing and processing cells have pairwise matching of addresses and are pairwise coterminous, which ensures that control of the connectivity by second network (23) is (Continued)

directed to localisably-selectable segments of first network (25).

43 Claims, 60 Drawing Sheets

(52) U.S. Cl.
CPC .. *G06F 15/17318* (2013.01); *G06F 15/17325* (2013.01); *G06F 15/17362* (2013.01); *G06F 15/17375* (2013.01); *G06F 15/17381* (2013.01); *G06F 15/17387* (2013.01)

(58) Field of Classification Search
CPC ......... G06F 15/17375; G06F 17/17381; G06F 15/17387; G06G 15/17325
See application file for complete search history.

(56) References Cited

U.S. PATENT DOCUMENTS

| 8,103,866 B2 * | 1/2012 | Butts | G06F 15/16 |
| | | | 713/100 |
| 2009/0259713 A1 | 10/2009 | Blumrich | |
| 2012/0254879 A1 | 10/2012 | Chung | |

OTHER PUBLICATIONS

UKIPO combined search and examination report dated Jul. 27, 2018.

Proceedings of the SPIE—The International Society for Optical Engineering, vol. 3005, Lie et al, Versatile processor arrays based on segmented optical buses, pp. 280-290, Feb. 12-14, 1997.

Proceedings of the Fifth IEEE/ACM International Symposium on Networks-on-Chip (NoCS), Ebrahimi et al, Exploring partitioning methods for 3D Networks-on-Chip utilizing adaptive routing model, May 1-4, 2011.

13$^{th}$ IEEE Symposium on Design and Diagnostics of Electronic Circuits and Systems, Ebrahimi et al, Partitioning Methods for Unicast/Multicast Traffic in 3D NoC Architecture, Apr. 14-16, 2010.

Journal of Supercomputing, vol. 17, No. 5, Kiani et al, Mapping multiple applications onto 3D NoC-based MPSoCs supporting wireless links, Oct. 27, 2016.

Journal of Systems Architecture, vol. 58, Trivino et al, Network-on-Chip, virtualization in chip-multiprocessor systems, Mar. 2012.

\* cited by examiner

Gray Cartesian Coordinates dimension byte =>

| | n | | | 2 | 1 |
|---|---|---|---|---|---|
| Order bits | nGm, nGm-1,..., nG2, nG1 | n-1Gm, n-1Gm-1,..., n-1G2, n-1G1 | ... | 2Gm, 2Gm-1,..., 2G2, 2G1 | 1Gm, 1Gm-1,..., 1G2, 1G1 |

↗ 179

H-Curve Linear Coordinate along Curve  ↙ 180 rho 'byte' no. =>

| | m | m-1 | | 2 | 1 |
|---|---|---|---|---|---|
| rho 'byte' bits | mHn, mHn-1,..., mH3, mH2, mH1 | m-1Hn, m-1Hn-1,..., m-1H3, m-1H2, m-1H1 | ... | 2Hn, 2Hn-1,..., 2H3, 2H2, 2H1 | 1Hn, 1Hn-1,..., 1H3, 1H2, 1H1 |

Note, Butz uses 'rho' as designator for the Binary-Coded Decimal linear distance along the n-Dimensional Hilbert curve.
Here, 'rho' donates the Gray-coded linear distance along the H-curve.
The rho 'byte' does not in general correspond with a dimensional coordinate but is distributed across multiple dimensions.

```
kHj = jGk    Dimension-Index, j = 1 to n;   Bit-Number, k = 1 to m
```
↖ 181
↖ 182

Example :
5-Dimensional Gray Cartesian Coordinate:
 101g  011g  110g  001g  111g

Corresponding H-'Rho' Value along the curve: ← 183
 10101  01101  11011g
 i.e., a total connectivity of 32 segments of (32 segments of 32 cells each)

Equivalent 2-D Gray Cartesian Coordinate (i.e., a five-dimensional network unfolded into two dimensions):
 (0) 10101 11g   10001111g
                      ↖ 184
 ↖ 185

Figure 21

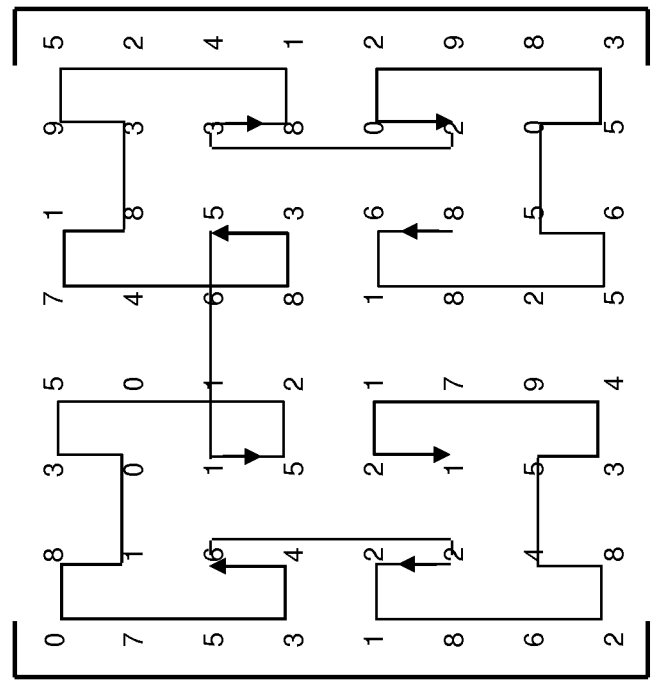
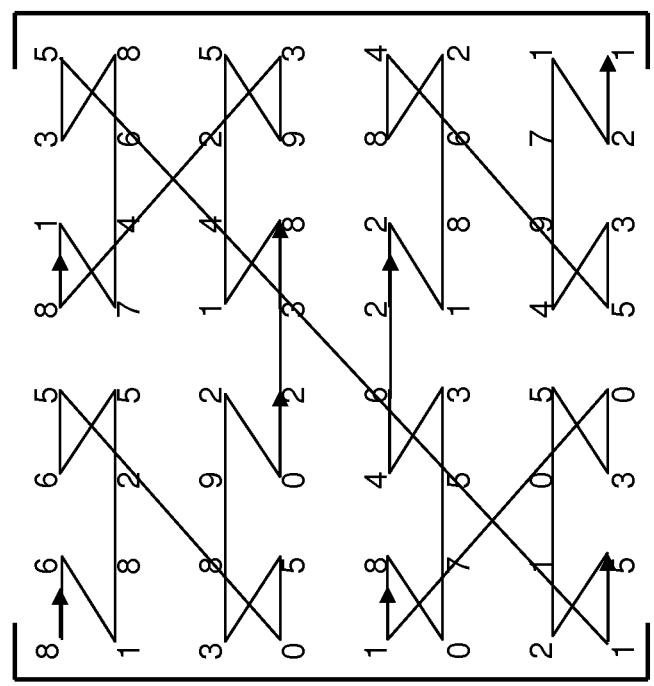
Figure 35

DIGITAL PROCESSING CONNECTIVITY

CROSS REFERENCE TO RELATED APPLICATIONS

This application is a '371 Application of PCT/EP2018/063007, filed May 17, 2018, by Derrick John Hamlin and titled, "Digital Processing Connectivity," which claims priority to GB 1805652.3 filed Apr. 5, 2018 and GB 1707970.8 filed May 17, 2017, the entire teachings of which are incorporated herein by reference in their entirety, for all purposes.

TECHNICAL FIELD OF THE INVENTION

The invention relates to apparatus for performing parallel processing of instructions and data by a plurality of concurrently-operating digital-computing engines and interconnecting signalling networks.

BACKGROUND TO THE INVENTION

In the performance of multiple user-applications by a composite computing system, such as the IBM Blue Gene range of High Performance Computers and many other similar massively-parallel data-processing architectures within the state of the art, each of a multiplicity of digital-computing engines operates with a degree of independence from one another in order simultaneously to carry out numerous sub-tasks of the user-applications. If the applications and sub-tasks were themselves wholly independent from one another, the digital computing engines could operate concurrently on many such tasks, all completing within substantially the same deadline, as indeed occurs on the worldwide-distributed myriad of unitary personal computers. Evidently, by running these same numerous tasks sequentially, a single such processing element may complete a single chosen task with the same deadline response as before but all of the other tasks must then each necessarily await, in some order of precedence, their respective time-shares of the single-processor's work-load before their own completion.

This simple observation has been the force driving demands for exponentially increased unitary-computer operating speeds. Exceptionally complex manufacturing technologies have been developed progressively to enhance the raw speed (or throughput) of the single, unitary computing engine (such as the Intel range of microprocessor). However, according to computer manufacturers, it now seems (as at 2007) that no significant further improvements in unitary-computer operating speed are possible without an unpredictable breakthrough in fundamental engineering physics.

It has long been suggested that the need for time-sharing may, perhaps, be dramatically reduced by interconnecting a group of digital-computers that are largely free to operate concurrently, as reportedly suggested by Feynman as early as 1943. However, more than raw speed (or data-throughput) is required in the effective application of such concurrently-operating computers. The organization, scheduling, and control of tasks in order to return results reliably and within acceptable project time frames, has ever been the dominating challenge of computer science. Even when processed sequentially on a single computer, the organization, scheduling, and control of task-interactions has been an intellectual challenge of high order, as evinced by the large number of computer projects that have failed due to software design errors, either initially or totally. As pointed out in the earlier reference to the ubiquitous personal computer, there are many valuable, independent, world-wide tasks that have little or no need for intercommunicating digital computing engines, but many other processing applications, of particular importance in commerce, economics, engineering, and science, involve the performance of tasks that demand close inter-communication. Were a large number of digital computing engines to be interconnected so as to execute many tasks simultaneously, the organization, scheduling, and control of such concurrent tasks together present a far greater challenge than that posed by historical, serial computer programming; to date, this problem has not been adequately solved, except in the limited context of rudimentary inter-communications between carefully partitioned tasks.

It is an important conjecture under the proposal of this Patent Application, that this burden of computer programming for an application using concurrent operation of multiple digital computing engines would be simplified if, say, millions, or hundreds of millions even, of primitive digital computing engines were to be employed for the tasks. This is in distinction to the use, for the computing function, of much fewer but far more powerful individual digital computing engines that call for complex task-synchronization, data-sharing and rendezvous protocols as employed in coarse-grained computers. The organisation of manifold primitive digital computing engines with their associated interconnecting networks is called herein a 'connectivity' and may be regarded, loosely, as analogous to a large network of cerebral neurons, individually sluggish in reaction but collectively capable of rapid, profoundly complex responses due to the rich connectivity of the sum of all the individually-firing cells. According to the use of primitive digital-computing engines (rather than powerful general-purpose unitary processors, such as personal computers) the proposed data-processing configuration, to be elaborated hereinafter, falls into the sub-category of fine-grained massively parallel computing, where the overall connectivity patterns of communicating data-transmission routes predominantly determine the embodied form of the invention and its competence. Many connectivities have been proposed for massively parallel processing, including the Hillis and Intel Hypercubes, that have enjoyed some commercial success, but it is not evident that any thus far offer simultaneously to multiple independent users the concurrent manipulation of diverse-sized tasks and arrays, without prior mapping of the tasks and arrays onto selected digital computing engines by the concerted action of all the users together. One proposed architecture (Hamlin, U.S. Pat. No. 5,434,972) provides automatic distribution and control of multiple tasks concurrently, from multiple interfaces.

Since the detailed mechanism of cerebral activity remains mysterious, analogous connectivities as prescribed under the present invention must, necessarily, employ a fundamentally different interconnection of the data-processing components and also employ fundamentally different task-switching paradigms. The selected connectivity pattern and associated programming paradigms, it is presumed, should together define a holistic unity of the functioning of the computing machine for controlling a multiplicity of independent user access-ports, and for distributing and executing a like multiplicity of user software-tasks and data-arrays.

It is, moreover, of the greatest importance, that the resulting logical rules, by which a High Performance Computing machine is defined, should minimize the intellectual challenge of organizing the concurrency of its operation, particularly as regards avoidance of logical-conflict between the resident applications and their parts. The complex interaction between these strategic design-drivers implies a level of novelty of high degree in the logical structure of the connectivity, and certainly excludes a direct design-evolution from unitary or even coarse-grain parallel computing practice.

Due to the great promise of massively parallel processing, there have been numerous proposals, the subject of Patent Applications and other disclosures, in this field of technology. So, for example, U.S. Pat. No. 5,434,972 (the disclosure of which, for reasons that will become apparent hereinafter, is to be deemed to constitute an integral part of the present Patent Application, and should, therefore, be read in conjunction with the disclosure of this Application) contains references to various examples of prior art proposals and implementations of which the most relevant, perhaps, to the present invention are documented in U.S. Pat. Nos. 4,598,400 and 4,814,973 issued to W. D. Hillis which describe a binary-hypercubic network of processing entities, and, especially, the study, also, by Tony Chan and Yousef Saad, entitled "Multi-grid Algorithms and the Hypercube Multiprocessor", published, in 1985, in the document identified under designation Yale/DCS/TR368. The binary hypercube graph of linkages (the graph edges) forming communication paths between digital computing engines (the graph nodes) for array processing, in a typical example, provides one possible platform and has been developed by Hillis both as a large array of digital-computing engines with a host executive processor, and with a proposal for perhaps combining this array with a 'thick-tree' input network.

Hillis' network was conceived in order to interconnect thousands of digital computing engines with short electrical distance between the most widely spaced processors. As examples of binary hypercubes, 3 dimensions comprises $2^3$ nodal entities while a binary hypercube of 15 dimensions comprises $2^{15}$ nodal entities and this latter form provides 15 interconnecting links to each processor. Evidently for dimensions greater than 3, spatial dimensions become notional so, as communicating networks, they must be implemented in the 3 spatial dimensions although, in practice, most of the connectivity interconnections and processor nodes effectively collapse structurally into a two-dimensional grid of processors. It is to be noted that Hillis usefully attached cyclic-coded, Gray-Coded addresses to his processing entities, rather than integers, for the purpose of identification of their relative electrical locations within his network.

So the Hillis and Intel machines incorporate large numbers of processors, and generously interconnect both physically-close neighbouring processors and also widely separated processors. This offers flexibility in simultaneously interconnecting certain varieties of concurrent array-processing tasks and particularly appears to match the forms of a number of important matrix-like manipulations. The first disadvantage of these hypercubes lay in the practical upper limit of a few tens of thousands of processors due to the large numbers of interfaces demanded by higher-dimensional hypercube networks. In an n-dimensional binary-hypercube, each processor must incorporate interfacing to n intercommunicating lines. As advanced hereunder, significant applications call for many millions of processors so, in the Hillis patent disclosures, in order to increase the number of available processors, further blocks of digital computing engines might have been employed to replace each hypercube nodal digital computing engines, but these additional groupings would then not match the regular interconnections of the hypercube topology, and would, inevitably, give rise to a more opaque, hybrid structure, with all of its attendant programming difficulties. A topological reduction in the basic binary hypercube (i.e., order-2) architecture has also been suggested whereby the hypercube is extended to order-k such that larger numbers of digital computing engines might be incorporated with fewer interconnections than required in fully-interconnected binary hypercube architectures of the same size. This is referred to as a k-ary n-cube for an n-dimensional structure with k linearly-interconnected processors per dimension, $k^n$ processors in all. In this case, wrap-around links advantageously complete the uniformity of the network interconnections, forming a k-ary n-torus.

A second disadvantage of the Hillis hypercube lay in its restrictions on matching, to the network, the shape and organisation of common logical tasks such as un-balanced decision-trees, concurrent 'garbage-collection', and the logical configuration and scheduling of the array processing operations themselves. The replication of irregular data-structures is also problematic, as is control of concurrent input and output provision, all requiring highly specialized programming techniques to map the tasks onto the network of processors. This led to the proposal for a 'thick-tree' host processor as an executive controller for the hypercube in order to schedule data for the hypercube entities (Leiserson) but information is available on neither the feasibility nor success of its implementation. Indeed, "The Network Architecture of the Connection Machine CM-5", Leiserson et. al. implies that the hypercube form of connectivity had been abandoned. The IBM Blue Gene range also uses a tree structure to schedule inputs to its array of processors and a 5-dimensional mesh has been proposed to extend the utility of the originally-implemented mesh. The use of a host processor to schedule and feed an array processor is well known elsewhere also, as in the early example of the ICL DAP array processor (U.S. Pat. No. 3,979,728) and recognized the importance of efficient pre-scheduling of tasks before executing the array processing operations in such automatic computing applications. The DAP, however, was a single-task array-processor.

For all this, it remains self-evident that large numbers of digital computing engines necessarily demand large numbers of interconnecting paths if transactions are to be carried out concurrently across the machine. An ideal solution for such computing would incorporate an "all-to-all" interconnection pattern (otherwise termed a "complete graph"). In general, $n\times(n-1)/2$ bi-directional links would be required for an n-node network. $10^6$ processors would therefore require $\sim10^{12}$ links and each node would require $10^6$ access ports. Although highly desirable for flexibility of programming options, this is presumed to be impracticable, so extreme compromise on numbers of links is assumed to be mandatory in the choice of a practical mechanisation. Yet necessarily more restrained networking paths must still somehow satisfy highly concurrent applications while offering a simple parallel-programming principle for software designers.

If utility and reliability of programming are to be retained into the future within massively-parallel connectivities, automatic resource-recycling (global garbage-collection) also seems to be essential and only U.S. Pat. No. 5,434,972 offers programmer-independent concurrent garbage-collection throughout the architecture while harmonising the network-topology itself with a practical form of multiprocessing application-software.

Much of the theoretical research in the area of parallel-computing networks is motivated by the desire to generalize a single network topology to match all conceivable software applications so that the resulting machine might pose no restrictions on the aims of the software designer while still resulting in improved, minimum-achievable solution-time for any particular software application. Additionally, minimum number of accessible processing nodes has been emphasised as an inevitable commercial compromise. Both commercial and theoretical massively-parallel computing machines therefore encourage computed software-threads to spill over into highly capable uni-processor nodes that, in isolation, offer virtually unlimited software freedom for the software designer. A conflict of operational concept is then experienced between coding the macro-programming scale of the machine and the micro-programming scale of the individual nodes (and their interfaces). Recognising that commercially-available, serial nodes then limit the overall concurrency of operation of the machine, much of the associated theoretical research has been dedicated to further increasing the power of the individual nodes with locally-parallel processor clusters (such as graphics processing units) and then to resolving the awkward mismatch between the global parallelism of the macro-networking and the micro-networking parallelism at the nodes. By contrast, the commercial massively-parallel machines have evolved directly from personal-computing nodes, due to their hardware-dependability and programmer familiarity. Their interconnection and input/output networks have evolved heuristically rather than with theoretic-rigour. The much earlier fine-grained, software-matched machines such as the prototype Mago or Hamlin have been eschewed, at least because the application-space of their topologies is limited to executive-style software and is inefficient for large blocks of arithmetic processing. An efficient, 'all-things-to-all-men' massively-parallel machine, analogous to the generality of the Turing/von Neumann uniprocessor, has not yet been reported either. In effect, what is desired is a parallel-processing version of the serially-sequenced Universal Turing Machine, recognising that various threads of code in a parallel version may, by nature, be serial in operation. The Church Lambda Calculus has long been recognised as equivalent in rigour to the Turing formulation and offers an approach to parallel operation as typified by the functional style of programming.

Nevertheless, associated with any choice of the interconnecting method for large numbers of processors, within the architecture there is still an unavoidably large number of discrete data paths between the processing entities. Recent specialist fabrication technologies offer greater three-dimensional flexibility in this regard. For example, "Deposition Processes for Competitive Through Silicon Via Interposer for 3D", Uzoh et al., IWLPC, November 2012 describes 'through-silicon vias' that would enable substantial increase in pin-out densities from silicon chips to their matching substrates and promises one means for contributing to the dense connectivity here contemplated for fine-grained massively parallel machines. A further approach to improving the practical extent of connectivity is extolled by Assefa et al, "Reinventing germanium avalanche photodetector for nanophotonic on-chip optical interconnects", Nature vol 464|4 Mar. 2010. This claims bit rates of 40 Gb/s within digital I.C.s and would reduce the number of interconnects thereby by at least an order of magnitude through shared serialization of data-messages between multiple pairs of otherwise concurrently operating digital computing engines. This has application to shared data-buses. Many proposals and developments have been published in these technology areas. An example of multi-tapped bus architecture is the Ethernet standard that uses a bus-vacancy sensor at each user access-point to predict availability for a new message-insertion. Each message is tagged with destination coding and in this way can be intercepted by the intended destination.

In terms of truly general-purpose computing paradigms, the foremost lack of harmony is between the spatially-local arithmetic convolutions of Cartesian data-arrays (such as in matrix multiplication) and the highly unpredictable, but spatially-free, hierarchical, tree-branching, executive processing structures. The tension arises from the difference in shape between the two essential logical paradigms that compute their respective software structures. In uniprocessor sequential-processing, array-processing operations require 'for-loops' and executive processing (i.e., 'decisions') require tree-structured 'if-then-elses'. For efficient concurrency of operation, each should be mapped onto a network of digital computing engines that closely matches its own shape. A hierarchical tree-pattern of executive software can be mapped onto parts of a Cartesian array of processors (that, of course, best matches the shape of matrices) but the mapping is very inefficient for practical, irregular, executive-control structures—as indeed experienced adversely in hypercube architectures. No commercial computer design has been announced that optimally harmonises the two paradigms in a concurrent-processing connectivity.

The said Hamlin patent contemplates, inter alia, a data processing connectivity which comprises a multiple-tree connectivity of data processing cells but differs substantially both from the Mago type and from a 'thick-tree' implementation, such as that espoused by Leiserson for the Hillis architecture. The Hamlin pattern follows a hierarchical, regular tree-topology processing structure laid out in a Cartesian planar form, following the principle first published by Mead and Conway (Addison-Wesley, 1979) but it is not connected as an efficient array processor.

All digital computers incorporate large quantities of memory-locations for instruction sequences and data, and these locations each have an unambiguous address-designation. The instructions are related to one-another by associated address-fields that act as pointers across the memory, which is normally stylized as a 'column' of locations with integer addresses. The central processing unit of the computing engine interfaces with a variety of ports, in addition to the memory locations, and those also are identified by addresses accessible to the central processing unit. The central processing unit has the ability to interpret and compute user instructions—each identified by a unique code—in 'micro-coded' logic circuits that also select and control the switched routes to the various addresses (usually organized by means of a compiler for high-level languages such as 'C' and Lisp). The micro-coding has similar attributes to a small software application except that it is embodied in the hardwired switching of the central processing unit. It defines the instructions and their formats that are made available to all users, but it is deliberately inflexible and not normally alterable by the users. Massively-parallel machines have a large plurality of uniprocessor digital computing engines that signal amongst themselves, and with users, with specialized micro-coded instructions that access and control yet further addressing schemes dedicated to uniquely identifying network ports associated with the sources and targets of signals. The instruction and addressing messages for those network-port addressing schemes are similar to, but to be distinguished from, those of the memory locations in each single uniprocessor digital computing engine.

The arrangement of signaling-addresses that represents a Hilbert space-filling recursive curve between data processors in a multi-dimensional array has been discussed by Lawder ("Calculation of Mappings between one and n-Dimensional Values Using the Hilbert Space-Filling Curve"; Res. Rpt. JL1/00, Birkbeck College, 2000) who incorporates the sequential ordering of data-base addresses according to a Hilbert-curve algorithm derived by Butz in "Space Filling Curves and Mathematical Programming", Information and Control, Vol. 12, 1968. This has the desirable effect of organizing the recursive spatial-locality of data in arrays. Other (so-called) 'space-filling curves' are discussed by Lebesgue (a 'Z'-Curve) and Moore (a variation on the Hilbert Curve) which are also recursive in spatial-structure. The formal definitions of a number of recursive curves are given in M. Bader, "Space-Filling Curves", Springer-Verlag 2013.

Butz used the equivalence of Gray-Codes and integers to simplify parts of his algorithm, and Hillis identified Gray-codes for his hypercube processor-node addressing, in both cases because the digitally-coded addresses of immediately neighbouring nodes in n-Dimensional Cartesian coordinates are linked by toggling a single bit. Arithmetic with Gray-Codes has been explained by Lucal ("Arithmetic Operations for Digital Computers Using a Modified Reflected Binary Code", IEEE, December 1959) and is only marginally more involved than conventional binary arithmetic; "The Gray Code", Doran, CDMTCS-304, March 2007 provides a further explanation.

SUMMARY OF THE INVENTION

According to a first principal aspect of the invention there is provided a data-processing connectivity having:
 a plurality of address-bearing digital computing cells interconnected by a first communication network of signalling paths in which:
 each digital computing cell is connected for switchably-selectable, bidirectional data-communication to a multiplicity of signal-adjacent neighbour digital computing engines through a like multiplicity of signalling paths;
 at least one set of path-selecting codes of said plurality, prescribed according to a recursive algorithm and mapped bijectively into the said plurality of cells, each code, possibly excepting a terminal one, being adapted to directing its corresponding cell to select a said path to its succeeding neighbour-cell along a chain of code-selected paths for uni-directional signal-transmission, which chain passes once only through each of said cells, recursively delimiting hierarchically-nested segments along its length and describing a correspondingly-delimited connectivity clustered along each of its said nested segments; and
 each of several said connectivities has autonomously-operating communication and processing means operable to perform concurrent array-processing on an array of digital-codes from a corresponding user.

According to a second principal aspect of the invention there is provided a data-processing connectivity having several said sub-connectivities each with a controlling digital processing cell, called a 'pivot', with a scope of control corresponding with the location and size of its prescribed sub-connectivity, each pivot having signal communication with a corresponding user, and the pivot and its corresponding segment of cells together have means to transfer data from the said user to the cells of the correspondingly-prescribed sub-connectivity.

According to a third principal aspect of the invention there is provided a data-processing connectivity having a second network of bi-directional signalling-paths and signal-directing nodes that enable interconnection between pairs of said plurality of cells such that a first cell has means to communicate with a second cell by way of a sequence of selectable said nodes that corresponds in order with the destination-address of the said second cell, the resulting sequence of said paths being progressively ordered from said first cell through adjoining nodes, and each node has means to latch itself and its adjoined signal-path open for bi-directional transmission of data between cells, the network being configured to enable a plurality of such routes therethrough to co-exist.

According to a further aspect of the invention there is provided a hierarchy of such pivots such that pivots with broad scope have discretionary control over pivots with narrower scope along with the respective cells under their control.

According to a another aspect of the invention, the said concurrent array-processing operations include means to move each member of an array of data from a first sub-connectivity, step-wise in synchronism through the network of said signalling-paths, respectively to be stored as a like array in a said second sub-connectivity of cells.

According to a yet further aspect of the invention: several cells, with means for intercommunicating as a computing-community, enable storage and computation of a digitally-coded functional-expression from a user, each cell having logical and arithmetic processing circuitry at least for computing a sequence of instructions according to rules for reducing functional-expressions; the said sequence enables evaluation both of the computable function of the said functional-expression and of the calling-addresses of further ones of cells within the computing-community; and each of said further ones computes a further functional-expression, returning a result in the form of a function-argument to be applied in the reduction of said digitally-coded functional-expression.

The foregoing and other features of the invention are hereinafter described with reference to the claims of the claims schedule which are deemed to have been here set out, mutatis mutandis.

BRIEF DESCRIPTION OF THE DRAWINGS

Embodiments of the Invention are hereinafter described with reference to the accompanying diagrams in which:

FIG. 21 is a listing of a conversion algorithm that derives H-Curve linear coordinates from k-ary n-cube Cartesian digital computing engine addressing coordinates in Gray-Code form;

FIG. 35 is a diagram showing the tracing of a 'row-major' matrix of elements, through a Reflected-Z Curve, to an H-Curve order of processors;

DETAILED DESCRIPTION OF PREFERRED EMBODIMENTS WITH REFERENCE TO THE DRAWINGS OF SALIENT FEATURES OF CERTAIN DIGITAL PROCESSING CONNECTIVITIES AND OF THEIR USE ALL IN ACCORDANCE WITH THE INVENTION

Figure 1:
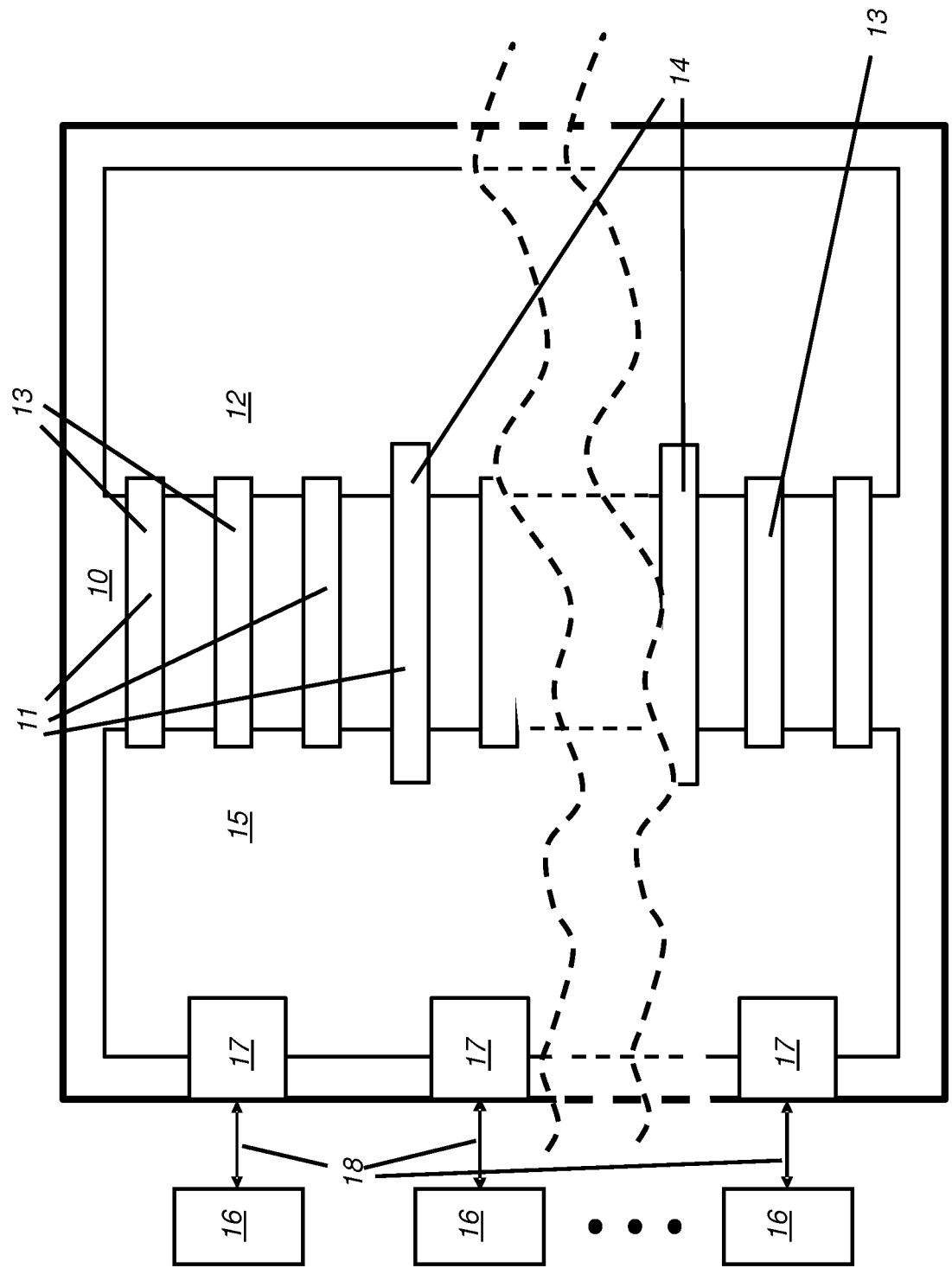
FIG. 1 is a block-diagram schematically representing an embodiment of the invention and showing a digital-processing apparatus, with interfaces to user terminals, and comprising a large plurality of digital computing engines.

FIG. 1 illustrates a digital data-processing apparatus 10, in block-schematic form, embodying the invention. The apparatus 10 is called herein the 'Connectivity'. A 'connectivity', for the purpose of description of this invention, is to be interpreted as a large plurality of concurrently-operating cellular circuits, interconnected each through corresponding interfaces to pre-ordained arrangements of switchable signal-transmission paths, together with a multiplicity of compliant messages transmitted concurrently through a like multiplicity of switchably-opened transmission paths between at least pairs of said cellular circuits, the paths being selectable in response to signalling-sequences within said cellular circuits. The Connectivity 10 thus has at least a large plurality of cellular circuits in the form of address-designated Digital Computing Engines 11 interconnected by means of a first sub-connectivity 12 herein called the 'Recursive Connectivity' adapted inter alia for concurrently-transmitting arrays of data-elements between clusters of digital computing engines. Most of the digital computing engines 11 are 'standard' digital computing engines 13. Some, called herein 'pivotal' digital computing engines have additional structure and circuits. Recursive Connectivity 12 has a large multiplicity of concurrently-operating signalling means arranged inter alia to execute the routeing of digital message-streams, including instructions, addresses and data, between pairs of digital computing engines. The digital computing engines also have interconnection within a second sub-connectivity 15 of a substantially different arrangement of signal-transmission paths and switching nodes, herein called the 'Administrative Connectivity' adapted for automatic, concurrent distribution and control of multiple processing applications across switchably-selectable ones of the digital computing engines, from a multiplicity of user interfaces 16.

Administrative connectivity 15 has means responsive severally to a plurality of user-access interfaces 17 with means for storing and processing said digital message-streams therein. Each of the ports 17 has signal-switching and processing means adapted to receive, store and transmit externally-generated user-applications received from a user over a bidirectional data signalling route 18, and to transmit processed streams of data back to the user.

In this specification, the descriptions 'independent' and 'concurrent', when applied to simultaneously-operable devices, are to be interpreted as 'seldom suffering time-delaying contention for signalling routes'. 'Bidirectional signalling paths' and 'bidirectional signalling routes' are to be interpreted as 'means enabling transmission of signals between two circuits in both directions, but not necessarily simultaneously'.

The digital computing engines 11 are interconnected in the recursive connectivity 12 by communication networks of data transmission routes adapted for predominantly array-processing operations in response variously to instructions and data from administrative-processing tasks generated within the administrative connectivity, and from user-ports 17.

Each digital computing engine has means to store and to manipulate logical- and arithmetic-data, to access data-store addresses, and to manipulate locational-addresses of the said digital computing engines themselves for selectable transmission of messages between digital computing engines as directed by each user's application-program. Each digital computing engine has circuit-functions typical of digital computing practice with switchably-selectable, signal-communicating interfacing ports and at least one central-processing unit with instruction-decoder and memory. The instruction decoder has means to interpret any one of a set of microcodes, commonly known as 'primitives', and includes circuitry adapted to directing the central processing units within each digital computing engine in corresponding ones of arithmetic-, logical-, storage- and signalling-operations in accordance with said microcodes. As is common in digital processing practice, the said store-means has internal, preordained storage addresses that the central processing unit accesses according to user programs. In addition, all digital computing engines have preordained, unique locational addresses that, according to the demands of user-programs and, together with the switching circuits of the Connectivity, enable each digital computing engine to call and to direct messages to any other digital computing engine.

Figure 2:
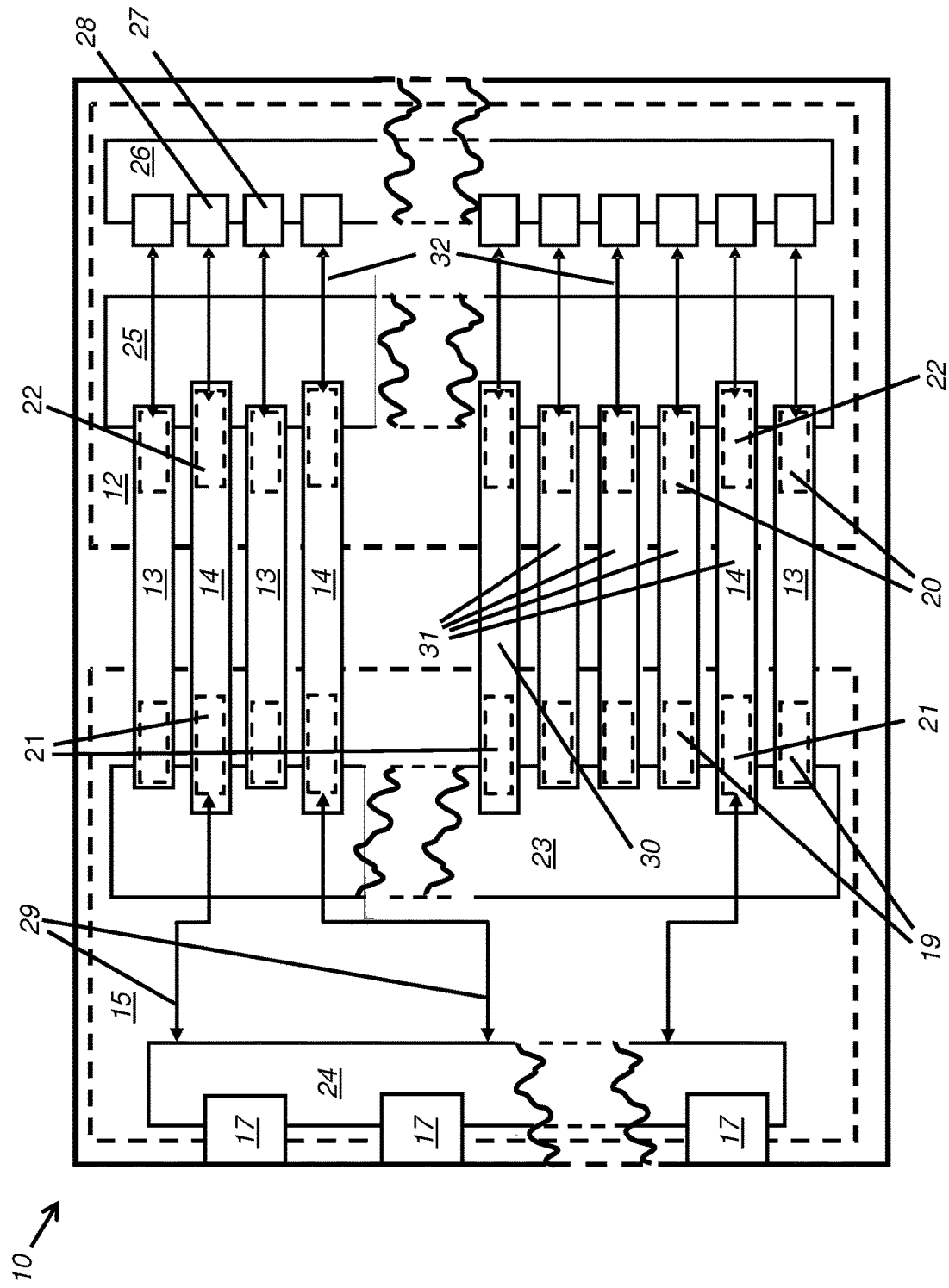
FIG. 2 is a block-diagram schematic showing, in greater detail an embodiment of the invention that represents the digital computing engines as intercommunicating by means of a multiplicity of signal-transmitting networks.

In greater detail, FIG. 2 shows the administrative connectivity 15 to include connection with the large plurality of digital computing engines 11. Each digital computing engine has a plurality of interfacing-ports and each has means: for responding to acquisition by other digital computing engines; for receiving messages and locational-addresses from other digital computing engines; for performing arithmetical and logical operations both on the messages and on the locational-addresses; and for acquiring and communicating with other digital computing engines by addressing-means across the recursive connectivity and across the administrative connectivity. Each pivotal digital computing engine is distinguished as a standard digital computing engine with at least additional means enabled to transmit controlling-instructions each to a group of digital computing engines, means enabled to respond to acquisition by at least one port 17, means enabled to receive and process a user's data-stream, and means enabled to transmit data-streams back to a user through selectable data-transmission routes of administrative connectivity 15. In this specification, 'link' is used to represent a single conductor of a signal between a logic driver and receiver; 'path' is used to represent at least one link capable of carrying a digital message between two circuits; and 'route' is used to represent a completed interconnection between a transmitting signal-source and its intended signal receiver through a connected sequence of paths opened for signalling.

In view of the predominant use of administrative connectivity 15 for logical control of the Connectivity and its user-accesses, and the predominant use of recursive connectivity 12 for the manipulation of data-arrays, it is advantageous for the purpose of description that, in one preferred embodiment of the invention, each digital computing engine includes two part-circuits, illustrated typically as pairs 19 and 20, and pairs 21 and 22. The first part-circuits 19 and 21 are adapted to interfacing with the administrative connectivity, with one set of said primitives; the second part-circuits 20 and 22, complementing and communicating with the first, having a second set of said primitives and interfacing with the recursive connectivity. Each digital computing engine part-circuit 19 associated with administrative connectivity 15 is hereinafter referred to as a 'standard' processing cell, and each digital computing engine part-circuit 21 associated with administrative connectivity 15 has a more complex structure and circuit and is hereinafter referred to as a 'special' processing cell. These are interconnected amongst themselves by means of a functionally appropriate administrative connectivity 23 and also with user ports 17 by means of connectivity 24, called herein the 'terminal connectivity', of form to be elaborated in due course. Sub-Connectivity 23, including its interfacing with the processing cells, is called hereinafter the 'Declarative Connectivity' because it desirably includes features adapted to declarative-style software structures, such as functional-programming codes. Terminal-Connectivity 24, including its interfacing with users and with the digital computing engines has means to select and to direct each user-application, comprising at least a stream of messages, to a digital computing engine with characteristics suited to said application.

Each standard digital computing engine has a part-circuit 20 associated with recursive connectivity 12 and hereinafter referred to as a standard 'computing cell'. Likewise, each pivot digital computing engine has a part-circuit 22 associated with recursive connectivity 12 and hereinafter referred to as a 'pivot' computing cell. These have additional interconnections amongst themselves through a functionally appropriate connectivity 25, of a form to be elaborated in due course. 25, including its interfacing with the computing cells through processing and interfacing circuits 20 and 22, is called hereinafter the 'segmental connectivity' because the processing primitives and interfaces of 20 and 22 and its communication links have means adapted to interconnect and control nested, addressable segments of digital computing engines, otherwise herein called 'clusters'.

The segmental connectivity 25 is a network of switchably-selectable, bi-directional, signalling-paths, each respectively linking a pair of said computing cells, into which network each cell has a multiplicity of interfacing circuits enabling the interchange of digital-codes with a like multiplicity of said cells through a like multiplicity of said paths, the said multiplicity of cells being hereinafter referred to as 'neighbours' of said each cell.

A set of path-selecting address-codes, of the same large plurality as the cells connected to the segmental connectivity, is stored bijectively in the said plurality of cells, the address-codes, thereby enabling their corresponding cells each to signal a succeeding neighbour along a prescribed, recursively-folded signalling-chain of selectable said signalling-paths, the signalling-chain following a monotonic sequence of cell addresses, passing once only through each of said plurality of cells and recursively delimiting, within its folds, hierarchically-nested sub-connectivities, each sub-connectivity clustered along a correspondingly delimited segment of said chain. The monotonic ordering of the cells along segments of the chain thus enables the cells to transmit code-signals serially, in bucket-brigade fashion, along the segments in response to a common cell-instruction. This has application to the loading of serial data-streams into cell-clusters from a user-interface and it is to be noted that several user-interfaces, operating concurrently, may load in this manner several respective clusters composing a larger cluster of cells. A further set of path-selecting address-codes in the cells permit transmission in the opposite direction.

Recursive Connectivity 12 includes a further connectivity 26, called hereinafter the 'broadcast connectivity', that has interconnections 32 in the digital computing engines, through interfaces 27 and 28, between all computing cells 20 and 22 of a form adapted to distributing messages from each pivot digital computing engine to an associated said cluster and for commanding and coordinating the processing within said cluster.

At least some clusters, then, have processing and communication means for performing concurrent array-processing operations on their correspondingly-stored digital-codes by virtue, in part, of the said multiplicities of paths in the segmental connectivity 25. Operations in an array processing cluster are co-ordinated by sequences of common instructions from the pivot. It is an advantage for some applications that at least some of said pivots be member-cells of their corresponding segments.

Along with the intercommunicating paths between the cells, the clusters of cells therefore operate under the control of their pivot according to instructions for array processing and each such cluster is enabled to act as an array processor independently of other clusters. By virtue of the nested form of the segments within the segmental connectivity, coordinated groups of small clusters, forming among themselves sub-connectivities, may also operate in response to a common instruction and form a larger array processor as just indicated. In each case, the prescribed array processor is under the command of a pivot of appropriate scope dedicated to that array. The authority of each pivot is therefore defined by the position and size of the array of cells under its control, and equivalently by the position and size of the nested segment forming that cluster of cells. The pivot accordingly has within its memory an appropriate parameter called herein the 'scope' of the pivot. In one preferred implementation, it is advantageous for uniformity of addressing, that the pivot be a member-cell of the cluster, and the subsequent descriptions assume that arrangement. By 'scope' is meant the size of a coordinated cluster of computing cells large enough to encompass an instructed array-processing task within a user-application. In one preferred embodiment of the Connectivity, by virtue of the recursive clustering and addressing of segments, each controlling pivot has an address that necessarily declares its scope as part of the digital encoding of the address. This has importance in search for sub-connectivities of a desired size.

In a first preferred embodiment of the invention, a plurality of bi-directional communication paths 29 permits the interchange of instructions and data between selectable routes through terminal connectivity 24 and a like plurality of the special processing cells 21. The administrative connectivity thus has means at least to receive and to direct instructions from a user terminal 16, by way of a respective one of said plurality of interfaces 17, for switchably-selecting a route to a respective one of pivot digital computing engines 21 with processing authority according to the user's instructions and therefore adequate for the user's needs. The special cell circuits 21 have direct linkage with their associated pivot circuits 22 so, once connections have been made, several users have direct access each to a pivot with a predetermined scope and authority. Terminal Connectivity 24 has multiplexing means enabling a user to gain controlling access to one of a selection of such pivots with a user-chosen scope.

Each pivot digital computing engine 14 also has means to interchange instructions and data between the administrative connectivity 15 and recursive connectivity 12 by which inter alia, through a plurality of ports from its pivotal computing cell into the connectivities of recursive connectivity 12, each pivot digital computing engine transmits instructions to be performed on data-arrays and software routines distributed amongst clusters of digital computing engines.

As previously stated, the majority of the digital computing engines are standard digital computing engines 13 while the pivot digital computing engines 14 have a more complex organisation appropriate for interfacing with user applications and for coordinating groups of standard digital computing engines. For the purpose of describing a first preferred embodiment of the Connectivity with a broad range of applications, it is convenient to describe the pivot digital computing engines 21 as each having connection with user ports 17 through its controlling special processing cell that, inter alia, communicates in turn, when required, with its associated pivotal computing cell 22. For applications requiring only array-processing, a second preferred embodiment omits the declarative connectivity 23 and associated processing circuits 19 and 21. User-access is then by means of communication paths 29 directly to circuits 22 of 14 with additional adaption for processing user input and output messages. The remainder of this specification describes the more capable first-said preferred embodiment.

Each of said respective ones of pivot digital computing engines has means for parsing and interpreting the digital message stream from a user application and for ultimately returning the result of computations back to its respective originating port 17 when needed. The large plurality of digital computing engines permits a multiplicity of user-applications each enabled to access an individual pivot digital computing engine 14 and thereby an associated switchably-selectable pattern of other digital computing engines through the declarative connectivity 23. The declarative connectivity has means for directing digital message-streams between such selectable community of digital computing engines that are switchable into connection-patterns among themselves and reflect the pattern of the application software itself, as will be further elaborated in due course. Furthermore, said directing means through the declarative connectivity provide users with indirect communication with pivot digital computing engines, such as digital computing engine 30, that do not directly connect to terminal connectivity 24 by a path 29.

In a manner complementing the administrative connectivity's means for hosting a plurality of user applications, the recursive connectivity 12 has means for distributing a multiplicity of user data-arrays between clusters of digital computing engines, such as 31, and for transmitting processing instructions to the computing cells within such clusters, by means of connectivities 25 and 26. As is common in digital computing practice, user-applications to be evaluated within the Connectivity 10 have the form of streams of coded messages. As to be explained in due course, whilst directing said streams each to its own switchably-selectable pattern of processing cells interconnected through the declarative connectivity, the administrative connectivity 15 also has means selectively to inhibit interaction between such streams received independently at a multiplicity of ports 17. The Connectivity thus has means at least to control the distribution of message-streams from each acquired user interface 17 to a set of processing cells, dedicated for a time to a single application, both for applying instructions for elaborate administrative processing operations in the declarative connectivity and for coordinating and applying instructions appropriate for diverse array-processing tasks in the said clusters of the segmental connectivity.

For the purpose of computing general-purpose user applications, the declarative connectivity includes further signalling-paths between the digital computing engines that enable an interconnection-route between pairs of cells such that a first cell has means to communicate with a second cell by way of a switched-sequence of nodal-circuits that follows a route corresponding in order with the destination-address of the second cell. Several such paths can be ordered concurrently between pairs of cells and latched open for bi-directional transmission of data between cells. Typically, a coded-stream of application software from a user-terminal progressively instructs sequences of cells to intercommunicate across the declarative connectivity as an ordered community of cells. The community of cells exists temporarily to compute partial results, passing them in software-ordained sequence back to the user. On completion of its contribution to the commanded computation, each cell has means to clear its memory of user-data and register itself as unemployed and free for acquisition by a further user application.

The said coded-stream of application software from a user-terminal generally comprises structured programming codings that do not have a regular array-pattern, so the progressively-formed intercommunications of each acquired community desirably follow non-cartesian patterns of routes that are inappropriate for the array-processing segmental connectivity. One preferred implementation therefore incorporates distribution of the structured programming codings by means of a node-labelled tree of said nodal-circuits and paths wherein a said bi-directional data-transmission route progresses upwards in the tree to an appropriate node and then selectively-switches binary-labelled nodes progressively on the way down the tree to a target-cell. In a Connectivity of a large plurality of cells, several such routes can co-exist and offer concurrent communication.

It is an advantage that the addressing of cells through the tree of nodes has the same form as the addressing of the same cells in the segmental connectivity. This is ideally satisfied by aligning a recursive form of the nested-segments, in the segmental connectivity, along a signalling-chain conforming to a monotonic sequence of cell addresses and passing once only through each of the large plurality of cells. In such a manner, a declarative tree-connectivity, which has a different but nonetheless recursive form, is arranged to match, address for address, the array-processing pattern of cells. This establishes a harmonisation of signalling between cells across the two connectivities. The processing cells in each said switchably-selected pattern through the declarative connectivity 23 have means thus to communicate amongst themselves by selecting routes such that the interconnected pattern corresponds with structured-programming software-expressions, typically of a functional-programming form. Functional expressions, such as in the Lisp language, offer one suitable style of structured-programming for the user's application coding-streams. Each processing cell of the said pattern of processing cells has means to receive at least one said expression of a user's software, to parse and interpret the expression and in due time to signal the value of the expression to a further one of the processing cells in the said pattern of switchably-interconnected processing cells. Each processing cell therefore includes components of a functional-programming interpreter typically as employed in Lisp implementations.

Each user-interface 17 and each digital computing engine 11 has a unique address, and terminal connectivity 24 has a plurality of switchable intercommunication paths (not shown in FIG. 2) from user ports 17, via bi-directional paths 29, to corresponding switchably-selected ones of the special processing cells 21. Each port 17 has digital-processing circuits with message-decoder and storage and has at least a searching-state, operating in response to a user's application message-stream received from terminal 16. By means of the operation of the interface in its searching-state, a searching-signal is sent into terminal connectivity 24 to forged a route to an unemployed special cell through selected ones of intercommunication paths by means of a sequence of switchable nodes in terminal connectivity 24, called hereinafter 'diverters'. For this and other purposes, each processing cell has means to direct a free-state signal into the administrative connectivity that identifies that processing cell as unemployed by any current application. This state is called herein a cell 'free-state' (FS). In response to a free-state signal sent into terminal connectivity 24 from an unemployed special processing cell, the searching-signal in operation switchably-selects circuitry within a sequence of said diverters to acquire, through terminal connectivity 24, an unemployed special processing cell of scope appropriate for the user's message, as will be elaborated in due course, and thereby acquires and stores the address of the acquired special processing cell (and therefore its associated pivot also).

On completion of the searching operation, the acquired special processing cell removes its free-state signal from the declarative connectivity, thereby inhibiting a second acquisition of that processing cell by the processing cell of another, independent user application. Port 17 parses and interprets the user-message, by means of its said message-decoder, and also has a calling-state that, in operation, is enabled using a stored address to re-acquire the special processing cell for the purpose of transmitting subsequent messages through terminal connectivity 24 to said special processing cell. Accordingly, each processing cell has a switchable sequence of operating states including means to annul user digital-codes within its memory and to enter an unemployed, free-state and, when not in a free-state, enabled at least to enter an operating calling-state adapted to acquire a signalling-route to, and to exchange digital-codes with, a further processing cell.

Typically, the said messages have functional expressions for computation and each special processing cell similarly has calling means to switchably-select a route through declarative connectivity 23 to another processing cell according to an expression containing an addressing-code, and means also to direct a route back to a user-port 17 according to the address of the user-port contained in an expression, and stored in the said processing cell. Each switchable said selected route through 23 and 24 is latched open during the transmission of a respective user message-stream, which message-stream respectively has expressions that instruct its acquired special processing cell 21 to distribute component parts of its message progressively through said selectable pattern of standard processing cells 19 by way of declarative connectivity 23 as to be described hereinafter. Once a message-transaction is complete, a holding-signal from the initiating circuit (such as a port 17) releases the diverters and switching-nodes along the selected forged route in 24, which nodes then revert to a waiting-state, ready for access as part of a different route initiated perhaps by another user, if any. The progressive distribution-process through the pattern of processing cells operates in accordance with microcoded primitive instructions in each processing cell 21 and 19 which are responsive: to coding of said messages; to their component functional expressions; and to stored processing cell and port addresses.

The declarative connectivity 23 has a network of switchable data-transmission routes, several said routes from time-to-time respectively interconnecting a plurality of first processing cells with corresponding ones of second processing cells in the Connectivity and in which each route is formed through at least one switching node under the direction of a calling-signal sent into declarative connectivity 23 by a said first processing cell, the calling-signal being sequenced according to the address of second processing cell that is stored as part of an expression in the first processing cell. In response to the calling-signal, each node in 23 has switch-means to direct the calling-signal through a partial-route to a further node, and so on to the second processing cell. Declarative Connectivity 23 is analogous to a telephone exchange whereby message-routes are sharable between large numbers of terminals and permits temporary one-to-one transactions between pairs of terminals, at least some pairs being operable concurrently. An example of such a network is found in "Network for Determining Route through Nodes by Directing Searching-Signal arriving at one Port of Node to another Port Receiving Free-Path Signal", U.S. Pat. No. 5,434,972 (called herein, 'Hamlin') which should be read in conjunction with this specification. That patent describes: the acquisition of unemployed processing cells and conditions for their return to unemployed free-state; their typical functional operations within a computation; their searching-means for acquiring and tasking further processing cells; and their addressing-means such as that employed for acquiring and copying into themselves a remote fragment of code.

The processing cells, in response variously to ports 17, to terminal connectivity 24 and to declarative connectivity 23, thus have means configurable to direct a said user-message with a programmed, structured message-pattern into a correspondingly appropriate address-pattern of switchably-selected processing cells, the local part of said address-pattern relevant to each processing cell being stored in the memory of that processing cell. According to the progress of computation, further signals related to the user-application may be generated, from time-to-time, by the processing cells along the routed-pattern of processing cells as will be described by way of example in due course. Each processing cell within a digital computing engine incorporates a data-segmenting circuit adapted to identifying the expression-parts of a user-message for transmitting to further processing cells the administrative, decision-making parts of message-structures of the functional-programming kind.

Each pivot digital computing engine has, in addition, a further data-segmenting circuit within its computing cell adapted to identifying component-parts of messages related to processing of arrays in the computing cells, and each such pivot computing cell 22 of a pivot digital computing engine has means for distributing the appropriate array-processing component-parts, as commanded by its adjoining special processing cell circuit, to a group of neighbouring standard computing cells.

Once a route is open to an unemployed processing cell (as a result of a search for a processing cell in a free-state), the calling processing cell transmits a component-part of its own message to said unemployed processing cell, which stores the component-part in its own memory and interprets said component-part, thereby sharing part of the processing of the segmented user-message. The special processing cells 21 have additional primitives with means to decode certain instruction-codes of the said component-parts related to data structures, such as strings and matrices, and means to command its adjoined pivotal computing cell, such as 22, for an array-processing instruction to be transmitted concurrently and in common to an associated group of computing cells over broadcast connectivity 26. The pivot computing cell itself decodes each array-processing instruction, as appropriate to the requirements of said component-part, and sends a broadcast-message of local instructions that calls microcoded primitives stored in the associated group of computing cells. The primitives are thus selectable to apply sequences of computational operations to data-elements stored in a cluster of computing cells such as 31.

Each port 17 and each special processing cell 21 has memory circuits for storing component-parts of a message data-structure while said data-structure is being shared with and operated upon by said switchable pattern of processing cells selected for processing those component-parts. Although message components are spread across the Connectivity, as hereinbefore noted, the plurality of interfaces 17, the interconnection terminal connectivity 24, and the special processing cells have means for responding to a plurality of users without logical conflict between data-structures and between users, as will be explained in due course with respect to the diverters. This current specification is intended to apply to connectivities with a large number of components that may therefore potentially operate independently and concurrently, except where individual user-messages demand time-serial intercommunication between processing cells selected for that message. However, within the administrative connectivity, the networking routes in particular may occasionally be time-shared, but without pathological contention. Similarly, the computing cells of the recursive connectivity are occasionally multi-tasked between data-arrays in a manner to be elaborated shortly with respect to the broadcast connectivity. Where intercommunicating paths and processors are time-shared due to limited quantities of embodied resources, the extent of time-delaying interference depends on the number of processors and interconnections in the administrative connectivity, and on the density of programming instructions distributed by users across the administrative connectivity. However, the switching nodes and routes within the administrative connectivity are arranged and switchably-configured to inhibit any switching of messages that might otherwise meet head-to-head at signalling and processing nodes, a suitable embodiment being described in Hamlin.

As directed variously by instructions that form part of a user's message, each said component of the user-message data-structure has address-fields attached to it in transmission that permit the processing cells to coordinate inter-communication with one-another, and also to adjoin related components when these are in widely-separated parts of the Connectivity 10. Ultimately, at the end of a computation, the said address-fields point, in sequence, back through the chain of processing cells and ultimately to the initiating user port 17 where the result of the computation is deposited. For this purpose, a special processing cell 21, when loaded with the first interpretable data-structure, acquires unemployed (free-state) standard processing cells 19 elsewhere in the Connectivity, in response to standard processing cell free-state flags, and transmits through declarative connectivity 23 said instructions contained within the said data-structure to said acquired processing cells. By this means, software data-structures effect their own distribution across the Connectivity and exploit concurrent processing amongst patterns of processing cells.

The recursive connectivity 12 has interconnections through segmental connectivity 25 between a large plurality of computing cells (20 and 22). The computing cells are configured, in conjunction with the interconnecting segmental connectivity 25, to process operations such as data sorting and matrix manipulation, suitable embodiments of which will be described in due course with respect to recursive curves. Each pivot 22 of the recursive connectivity has a controlling role within a well-defined cluster of digital computing engines (such as 31), of which group said pivot is a member. For control of certain transmission operations on selected array data-elements, it is an advantage that at least some of the standard processing cells 19 also have switchable communication each with a corresponding one of standard computing cells 20 in the recursive connectivity.

One preferred embodiment of the segmental connectivity 25 is a k-ary m-torus with bi-directional interconnecting paths defined by the general hypertorus pattern of connectivity where the typical computing cell, designated computing cell (i1, i2, ... in), in a k-ary m-dimensional hypertorus has connections to computing cell (i1+1, i2, ... in), computing cell (i1−1, i2, ... in), computing cell (i1, i2+1, ... in), computing cell (i1, i2−1, ... in), ... computing cell (i1, i2, ... in+1), computing cell (i1, i2, ... in−1), where each index ip is integer-modulo(k) to account for the wrap-around signal-paths of the torus. A particular embodiment of the hypertorus where k=2 is a binary hypercube, and every path then forms a wrap-around torus-signal-path.

Figure 3:
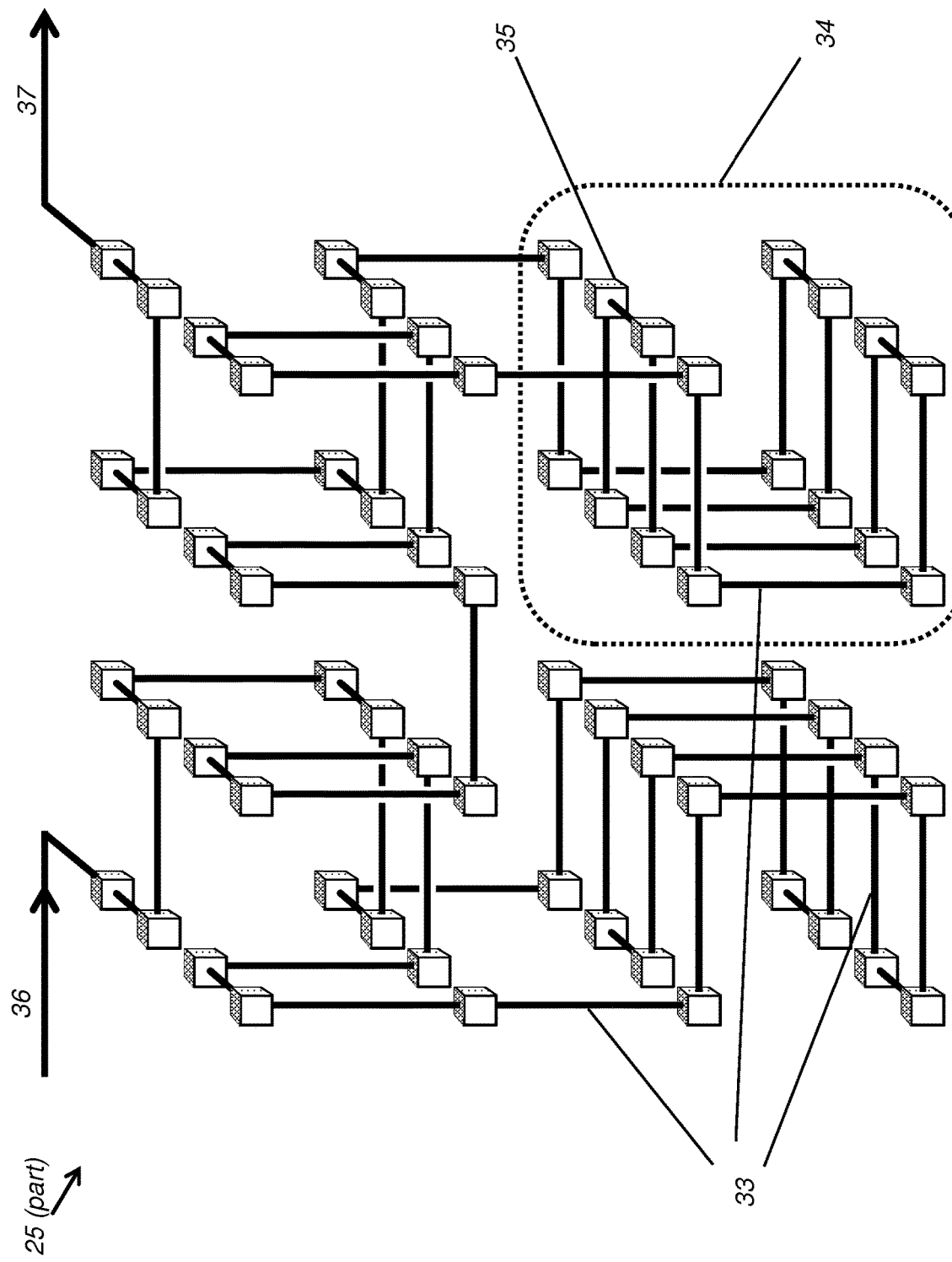
FIG. 3 is a schematic illustration of a signalling-route, embodied in an embodiment of FIG. 2, that follows a recursive curve through digital computing engines approximating to a Hilbert Space-Filling Curve.

FIG. 3 illustrates in limited extent an example implementation in part of segmental connectivity 25 with its associated computing cell circuits 20, in schematic form, as a small arrangement of computing cells laid out as a three-dimensional array, where the computing cell (i1, i2, i3) paths (mostly, too numerous to illustrate with clarity) correspond with the preceding definition of torus connections. Using some of these paths, FIG. 3 shows a segment of one preferred form of a recursive curve 33 that passes through a selected set of interconnections between pairs of computing cells in segmental connectivity 25.

It illustrates an example of a recursive curve approximating to the form of the infinite mathematical figment known as the Hilbert Space-Filling Curve. The practical, finite form is called a 'Hilbert Space-Curve' herein. By space-curve in this specification is meant a chain of communication links, typified in concept therefore by the line of a space-filling curve and passing once only through every cell in the connectivity. Recursive curve sequences, such as Hilbert- Curves and Morton-Curves, have importance in this invention in regimenting data structures into hierarchical, segmented structures that can be made to conform to the principles of hierarchically-structured programming. It is convenient for some processing operations that the recursive curve organise the computing cells into linear sequences along segments of the curve and therefore into uniform clusters such as 34, each addressable as a unique block of processing elements and under the immediate control of its own pivot computing cell (such as 35). For cluster processing-operations, a special processing cell of the administrative connectivity typically transmits to its associated pivot both operating-instructions and data-streams for onward serial distribution of a data-array to the appropriate segment of computing cells, such as 34, over which a pivot such as 35 has the designated control within its segment of the recursive curve sequence. An algorithm, in terms of computing cell addresses, defines the locus of the recursive curve (as will be elaborated in due course), and each computing cell has stored local pointers for its two, prior- and post-neighbours in the locus, thereby giving the recursive curve a monotonically-directed sense, forward and in reverse, through all computing cells in the recursive connectivity. The curve in this example enters the illustrated cluster of 64 computing cells through path 36 from another cluster of the Connectivity. It leaves to a further cluster via path 37.

Figure 4:
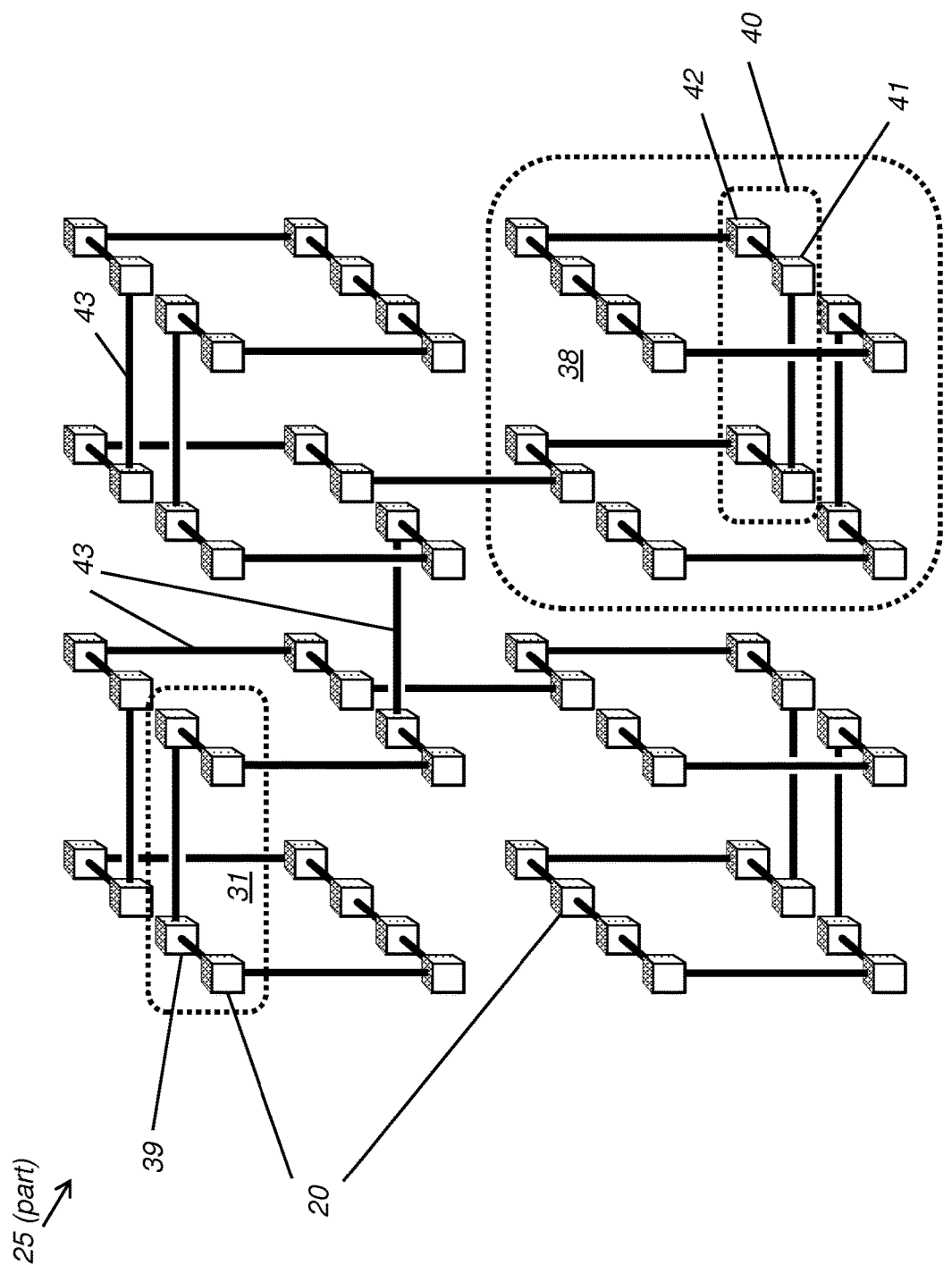
FIG. 4 is a schematic illustration of a signalling-route that shows a second form of recursive curve through digital computing engines.

FIG. 4 illustrates in limited extent a second example implementation in part of a further recursive curve through segmental connectivity 25 laid out as a three-dimensional array as in FIG. 3. Clusters of computing cells, conceptualized in diminutive forms such as 31 and 38, are interconnected for parallel-processing, each with a commanding pivot, and a typical arrangement of the embodiment incorporates a plurality of such clusters, each comprising a well-defined array of computing cells situated along the locus of a recursive curve. In a preferred implementation, in one example use, a user passes digital messages to the pivot (and thereby to its associated cluster) array-processing data and commands for manipulation of matrices. In a further example use, the user passes to the pivot a concurrently-operating program pre-compiled to be distributed as sub-routines and parameter-interfaces through the cluster, each subroutine being loaded into a pre-determined computing cell within the cluster, in order to run self-contained, concurrently-processed elemental computations, such as for application to the solution of multidimensional partial differential equations.

The recursive connectivity has a second interconnecting broadcast connectivity 26 (not shown in FIGS. 3 and 4), with interfacing elements 27 and 28 to computing cells such as 20 and 22, that has means for distributing operating-instructions and data-streams from a pivot 39 to its allocated segment of computing cells 31, and for collecting flag-signals, from those computing cells in the said allocated segment, that annunciate completion of their array-processing operations. Each pivot computing cell has means to collect the annunciating flags, which together act as a completion-signal for each operation initiated by the pivot. According to an instruction passed by the administrative connectivity to the said pivot, the pivot has means operable to broadcast over broadcast connectivity 26 an array-processing function-reference to be interpreted by said each individual computing cell of the said segment, and to initiate a sequence of referenced functions in each of said computing cells.

As just explained, segmental connectivity 25 also has a plurality of signal-paths available to each computing cell enabling communication to a corresponding plurality of neighbours (called herein, 'signal-adjacent neighbours'). This enables the interchange of data between many pairs of computing cells simultaneously. For example, within an array-processing segment of computing cells in operation following initiation by a pivot, two clusters of computing cells, are enabled to interchange their data-elements on receiving the code for a single 'exchange' instruction (called 'SWAP' herein). Completion of the operation ('SWAP' in this case) is registered by the pivot when all pairs of computing cells in the two blocks have exchanged values and set their annunciation flags through the connections of broadcast connectivity 26—including the pivot itself. A minor modification of the SWAP procedure passes data-elements in one direction only in order to generate a copy-procedure (called 'COPY' herein).

The segmental connectivity 25 has one-to-many, dedicated bi-directional interconnections from each computing cell to signal-adjacent neighbouring computing cells, though not necessarily geographically-neighbouring computing cells, such that at least some groups of computing cells are switchably enabled to transmit data simultaneously to both spatially-local and spatially-remote computing cells. The embodiment of bi-directional signal-adjacent neighbour interconnections includes the options of wired, optical and wireless communication paths. At least some paired computing cells may share data-transmission routes through switchable connections to a time-shared databus. The recursive connectivity 12 comprises, by these means and by virtue of the recursive curve, a large plurality of pre-ordained segments, each of which has a fixed number of computing cells under the control of its own pivot computing cell. Each pivot in the recursive connectivity has a uniquely defined address with binary pattern that distinguishes firstly the scope of its array-processing abilities, secondly the accessible number of computing cells in its segment and thirdly, the relative locations in the recursive connectivity of the constituent computing cells in its segment. This has significance in the declaration of strings and arrays which can be assigned processing resources by finding a special processing cell (and hence its paired pivotal computing cell) with own-address pattern similarly matching the size, location and array-dimension of an applied data-structure. The applied data-structure is then also guaranteed to be compatible with a second cluster elsewhere in the Connectivity, with an associated second controlling pivot of matching address-pattern.

In this way, pivots controlling segments such as 31, 38 and 40 define a plurality of diversely-scoped and independently-operating arrays of processors. By virtue of the recursive nature of the segments, some pivots control segments that compose more-extensively-scoped clusters of computing cells, and their pivots therefore bear a hierarchical relationship to lower-scoped pivots in the recursive connectivity—as exemplified by the relationship between 38 and 40. At least some selected such segments of computing cells, through their controlling pivots as hereinbefore explained, are made accessible to users as dedicated array-processors within pre-determined ranges of size.

From the foregoing it may be gathered that, broadly-stated, and in accordance with the invention, the data-processing Connectivity 10 comprises a plurality of digital computing engines 11 each with data-processing means; and at least a first network of switchably-selectable signalling-paths by which each said digital computing engine has connection through at least a multiplicity of signal-transmission ports into a multiplicity of said signalling-paths to a like-multiplicity of said digital computing engines, herein referred to as signal-adjacent neighbours; and each digital computing engine of said plurality of digital computing engines bears a unique address ordered, in a monotonic sequence of addresses, along a recursive space-curve 43 through all such addressed digital computing engines and through corresponding ones of a like plurality of said signalling-paths, selectively-switchable in accordance with the said sequence, the digital computing engines and corresponding signalling-paths together being responsible, inter alia and at least in part, for the space-curve having a specific form in conformity with a prescribed algorithm characteristic of said recursive space-curve. The space-curve describes recursively-nested segments of computer cells that form corresponding nested sub-connectivities that, with the said multiplicities of signalling-paths enable independent array-processing operations to be performed within each sub-connectivity, and each has circuitry to a user for input of a associated array of data elements. That is, each said connectivities has autonomously-operating communication and processing means operable to perform concurrent array-processing on an array of digital-codes from a corresponding user. The pivot and its corresponding segment of cells together also have means to transfer digital-codes in sequential-order along said chain from the user interface to the cells of the correspondingly-prescribed sub-connectivity.

The Connectivity 10 also has bidirectional communication means between at least some of the said plurality of pivotal digital computing engines and at least one corresponding user-input interface circuit.

The recursive connectivity of the Connectivity incorporates the said broadcast connectivity of signalling-means, which includes a multiplicity of signal-distribution nodes, and in which each of certain prescribed ones of said pivots such as 39, along the space-curve has switchable connection through said broadcast connectivity to the computing cells residing along a correspondingly-prescribed segment such as 31 of the space-curve of which the pivot, inter alia, is the controlling member in each operation to be performed by at least some of the computing cells within said corresponding segment. It is a feature of the invention, to be elaborated in due course, that each user-accessible segment has a unique pivot. For example, the pivot for segment 38 would be (say) 41, whereas the pivot for segment 40 might be 42, the latter corresponding in position and address-pattern with similar pivot 39 of segment 31.

In the Connectivity, each pivot is therefore one of the controlling members in transactions to be performed by digital computing engine circuits residing along a prescribed segment of said locus with links such as 43 and the scope of each segment is arranged within a nested hierarchy of such segmental scopes by virtue of the position of each segment along the said locus of the recursive curve, and each respective said signal-transmission path is selectable by a signal representative of a defining parameter indicative of the scope of said prescribed segment.

The administrative connectivity of the Connectivity includes a multiplicity of user input and output interface circuits 17 and an I/O multiplexing connectivity 24 of switchably-selectable signalling-paths and switching diverter-nodes, by way of which the several said user-input interface circuits are selectively and concurrently operable for communication over routes to individual ones of said pivots 14 via associated ones of special processing cells, and said special processing cells transmit a free-state signal into the terminal connectivity when in the said digital computing engine free-state.

More than one message, each in the form of sectional software codings may thus be loaded simultaneously through several ports 17 into distributed-parts of the Connectivity for evaluation, at least some operating without mutual interference. Switchably-selected ones of the digital computing engines in the distributed parts receive, and operate on, respective sections of the user's software coding, where the selection is initiated according to the sectional-components of the messages forming the user's code for each message. Throughout the subsequent descriptions, it will be appreciated that programming and data manipulation tasks within each digital computing engine, and accessing of the multiple input and output ports dedicated to its own, local responsibility, may be embodied as any of a wide range of state-of-the-art digital computer architectures, such as a PIC microcontroller, Xilinx kcpsm3, those based on the ARMv-7, and the Intel range of processors. These computers have means to receive input data-streams through multiple input-ports in the form of messages, including sequences of instructions and data for storage in their local memory-units, and circuits for operating in accordance with such messages. A code-named sequence of hardwired logical operations, herein called a 'microcode', controls each primitive internal processing operation within such computers. Typically, there is a wide range of such instructions to control arithmetic, logical, storage and input/output operations, each with specialized data-manipulation abilities. In the digital computing engines, some of these operations are initiated by instructions with designators, accessible to the user's software coding, while others exercise local specialist hardware control, such as interfacing and messaging between digital computing engines, the latter then forming constituent parts of the more complex, user-accessible microcoded sequences of instructions. Those instruction codes accessible to users are commonly called the machine's 'instruction-set'.

The said input user message-streams initiate in the Connectivity the externally-applied user-programmed computing tasks and, ultimately, the internally-operating microcodes in the digital computing engines acquired for that task. The Connectivity in one preferred embodiment of the invention incorporates at least two clock-pulse generators: the first, called herein the 'minor clock', being the processor-control clock as is universally employed for synchronising switching-logic in digital computing; the second is a longer-period, messaging clock, called herein the 'major clock'. The major clock Is locked to the minor clock and, inter alia, may by appropriate connections synchronise even-parity addressed computing cells to transmit on one-half cycle (if required to do so) and odd-parity addressed computing cells to transmit on the other half-cycle. When the even-parity computing cells are in transmit mode, the odd-parity neighbours are in receive mode and vice versa. By virtue of one preferred binary arrangement of the digital computing engine addresses and the form of segmental connectivity of connections, computing cell circuits with even-parity addresses in the recursive connectivity, for many types of application, then communicate directly with computing cell circuits with odd-parity addresses, and computing cell circuits with odd-parity addresses in the recursive connectivity similarly communicate directly with computing cell circuits with even-parity addresses.

As is common in digital computing practice then, each digital computing engine has an instruction-set, each instruction being scheduled by an arrangement of microcodes and adapted to the specialist local computing-operations demanded of that digital computing engine. When activated by electrical power and clocks, each digital computing engine operates autonomously of all other digital computing engines in the Connectivity; that is, its own logical routines that activate sequences of its own instruction-set codes respond only to incoming messages through its input-ports, arbitrating between those messages and, if appropriate to its current tasks, ignoring the demands of those messages when appropriate. Likewise, it has no overriding authority over any other digital computing engine but accordingly must await the readiness and actions of other digital computing engines to provide a response to its requests for operation. Messages transmitted into each digital computing engine are requests for action or data, which in some otherwise correctly-operating conditions may not receive a response. Each digital computing engine has switch-means, configured autonomously of all other digital computing engines, to select its own input ports into its processing circuitry and means to select and schedule its microcodes, each in response to messages received through a multiplicity of said input ports; it has switch-means, configured autonomously of all other digital computing engines, to select its own output ports from its processing circuitry and to select microcodes with means adapted to configure and to schedule messages for transmission from said output ports. The digital computing engine has means to extract its own allocated message-part of a user's software-application, decode it as a sequence of primitive logical and arithmetic instructions, and perform each of its demanded specialist tasks according to said message-part. Without losing stored data, each digital computing engine has means to switch itself to power stand-by when no requests for operation are received during a set time-period, and to wake-up in response to input-interface activity.

Figure 5:
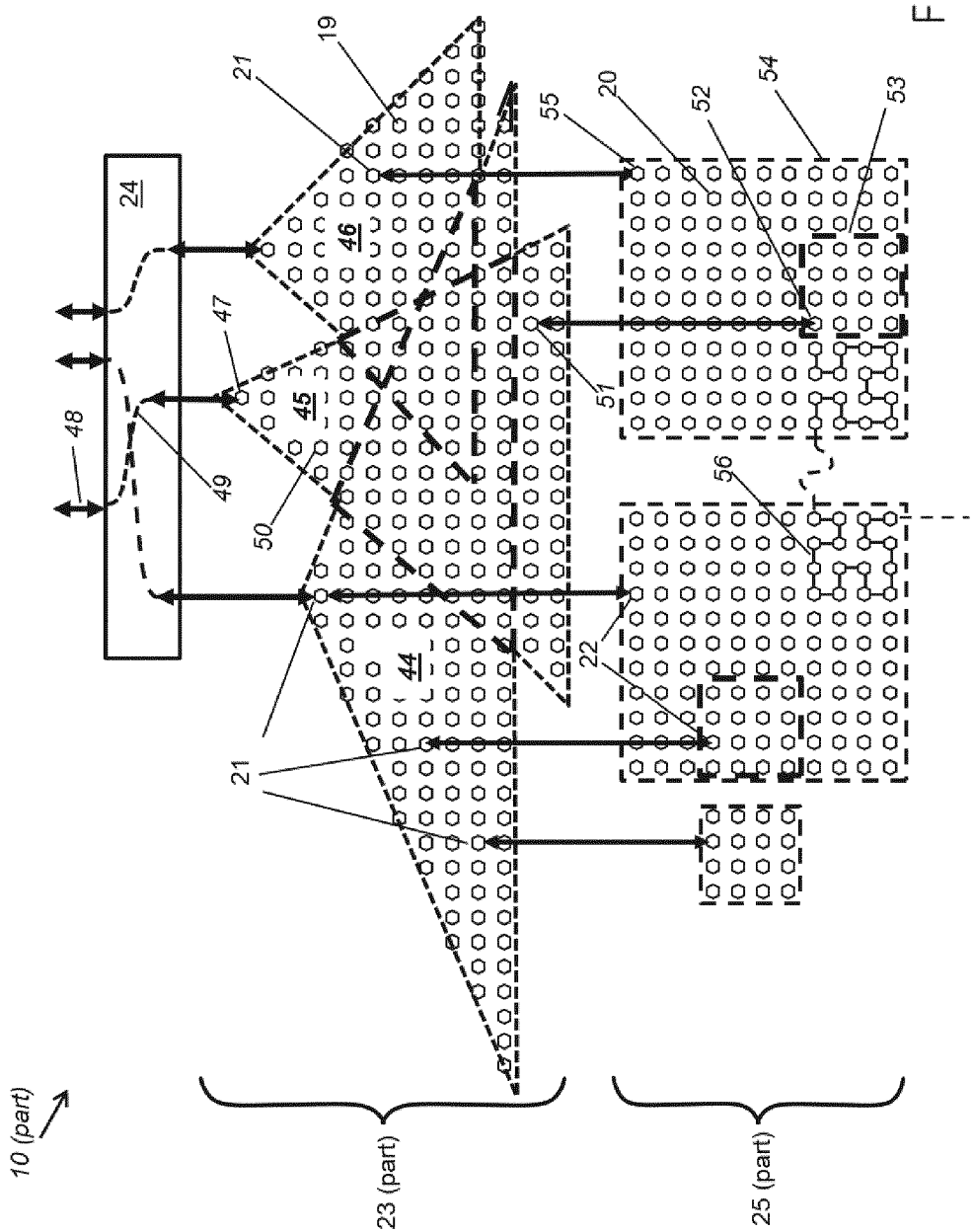
FIG. 5 is a schematic diagram conceptually representing three typical software applications, from three users, distributed across, and sharing, segments of digital computing engines in an embodiment of FIG. 2.
Figure 6:
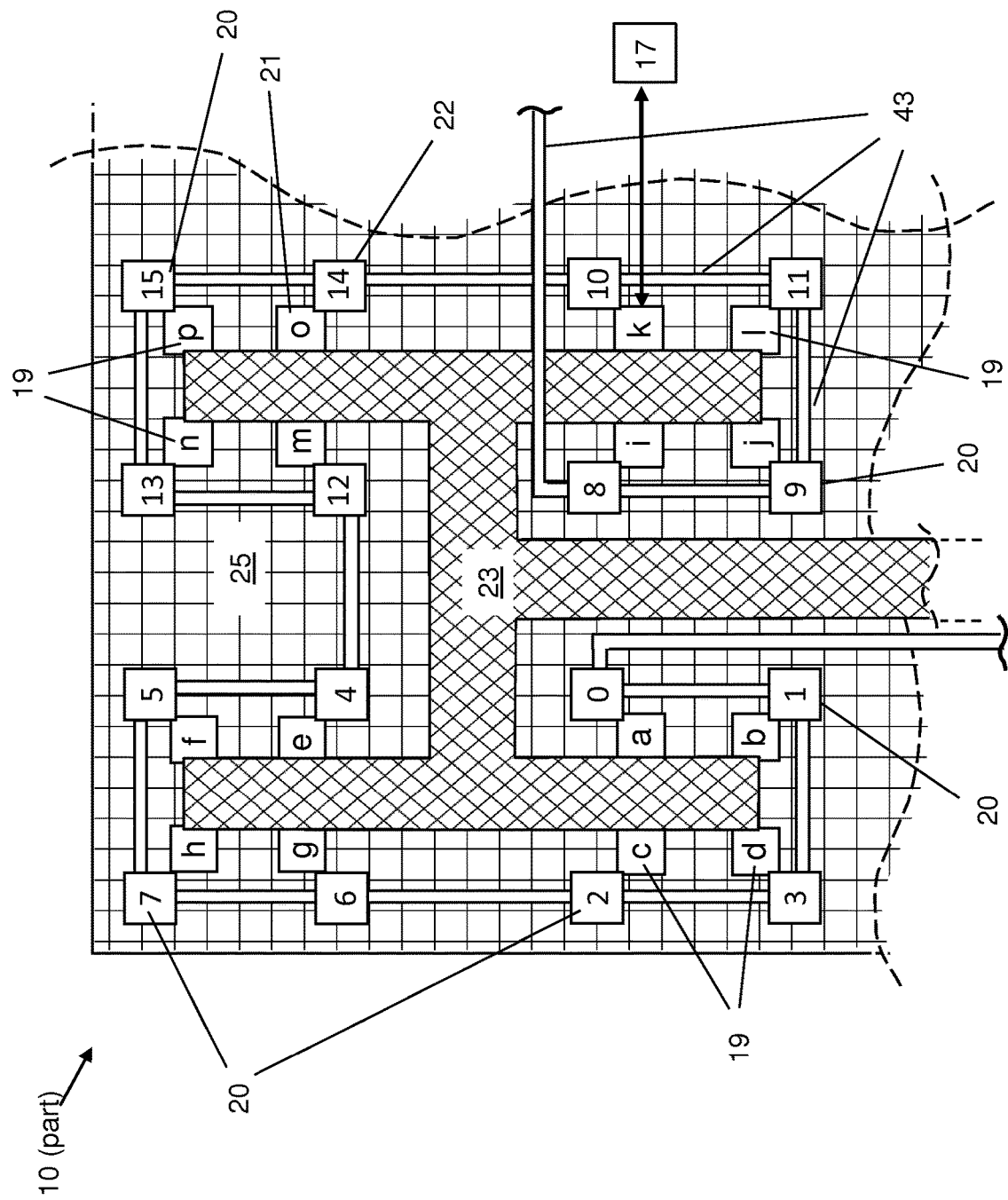
FIG. 6 is a schematic diagram of part of an embodiment of the invention showing digital computing engine circuits interconnected by means of two different but complementary signalling-networks, and recursive-curve links forming part of one of the networks.

FIG. 5 is a schematic representation of the distribution of user applications across the Connectivity in order to show, in simple terms, access to three independently-owned user applications co-resident in the Connectivity. Each of the three triangles 44, 45 and 46 is intended to represent a sparse, software-organised, structured-programming tree of nested user instructions, each tree being spread across—and actively loading instructions into—a sparse community of processing cells. Each of the three installed applications is notionally and crudely represented here by triangles to represent the spreading-out of signalling-branches, in accordance with user software messages, to many processing cells across the Connectivity. Each tree starts at a special processing cell, such as 47, notionally at the apex of each triangle. It is to be understood that, typically, only a sparse few of the processing cells within each of the illustrated 'triangles of processors' would be acquired by each independent application, the remaining interstitial processing cells being available for other applications, if needed. So, for example, where the three triangular regions overlap, some processing cells would be acquired and employed by application 44, some by application 45 and some by application 46, with the selections in each being loosely scattered across each region. The detailed means for the processing cell acquisition and tasking operations in one preferred embodiment are features of Hamlin and are described therein. The effect of user software expressions on communities of processing cells is illustrated by way of example in due course. The branches of user instructions and data are thus spread across the declarative connectivity 23 of processing cells by the acquisition of unemployed processing cells, the branches of a multiplicity of such diverse applications interweaving between one-another. It is important to observe that each processing cell is allocated to only one user application during this process but, on completion of its responsibility it releases itself back to its free-state by a method such as that described in Hamlin. The multiple user applications do not therefore share the individual administrative connectivity processing cells in common.

A user-application message-stream into a route 18 such as 48 is interpreted by its associated interface 17 (not shown) which employs the free-state searching means to pass a searching-signal and message through multiplexing terminal connectivity 24, via a bi-directional search-path such as 49, to one of the said special processing cells, such as 47 of application 45. A switched signal-transmission path 49 through 24 passes the user-application message-stream to 47 over a path 29. This selected one special processing cell 47 stores the received user message-stream, interprets the first message and acquires supernumerary standard processing cells 13, such as 50, in a branching, tree-like pattern that is progressively scattered across the declarative connectivity 23 of the administrative connectivity, by means of the temporarily-acquired data-communication paths afforded by 23. The branching signals of the structured application-software will often interweave partial-routes across the Connectivity by means of the declarative connectivity switching nodes, such that a multiplicity of user applications interpose the variously-acquired processing cells as illustrated schematically in FIG. 5, although, as just stated, only one user-application has access to any one acquired processing cell, until that application relinquishes the processing cell back into its free-state. Every processing cell in such a branching-tree has associated memory for storage of the addresses that relate that processing cell to its immediately-calling parent processing cell and to its own children processing cells acquired in the interconnecting of the message tree, and also has sufficient memory for storing user software expressions for evaluation. By virtue of the memorised interlinking addresses in each processing cell, communicating paths between the active processing cells of the application can be temporarily broken and subsequently reacquired, for example in order to pass computational results progressively back to the originating user terminal. On termination of a component subtask of an application, its employed processing cells have means to release themselves to an unemployed-state, ready for acquisition by other applications. That is, they become 'free-state' and forget their stored parent and child addresses, as explained in Hamlin.

FIG. 5 also shows that some typical application instructions involve manipulation of diverse-sized arrays, and that the recursive connectivity is arranged in the form of a preferably-large plurality of computing cells interconnected by segmental connectivity 25, which then together facilitate the loading, manipulation and processing, from time-to-time, of a multiplicity of such arrays. As part of the action of the administrative connectivity on a user's message-stream, its user-interfaces 17 and standard processing cells 13 are each enabled to interpret an array-processing instruction, as part of their instruction-set and to acquire a special processing cell, such as 51, with adequate scope for the demanded array-processing task. A directing-signal indicative of the size of array is contained in the said instruction and has the form of a lower-order-bit pattern of the address of each pivot digital computing engine with that required scope. The scope of the pivot of the digital computing engine is identical with that of its associated special processing cell and the special processing cell 47 is therefore selected by means of the terminal connectivity 24 interface 17 to ensure that the pivot has control over a segment of computing cells with scope large enough to host the intended array. In the case of processing cell 51, pivot 52 has control over the group of computing cells 53, with a scope-value of 2M. The special processing cell 51 responds with built-in microcode that passes a related array-processing command to its corresponding recursive connectivity pivot 52. Recursive Connectivity pivot 52 has means to instruct the fixed segment of computing cells 53 each to receive over broadcast connectivity 26 an individual data-element of a user array and subsequently to carry out operations on that individual element, the data-elements being transmitted consecutively as an indexed serial stream through the pivot from the user-interfacing 48. The first segment 53, in this illustrative example, comprises computing cells that are usable in common with a second, larger encompassing segment 54 with its own pivot 55, even though that second segment may itself be occupied by data from a second, independent application. The shared occupancy of computing cells by multiple array-elements is arranged by multitasking within each computing cell, each with data-storage for two array elements (in this example case), as is common in data-processing, and with unambiguous authority of the second, larger array by means of its dedicated, higher authority pivotal computing cell. A still larger encompassing array may likewise overlay its elemental sub-arrays on these two smaller arrays, and so on, although it is to be understood that processing activity of a computing cell with respect to each array element may possibly delay processing of a larger array, and vice versa. It is to be observed that this arrangement, in use, is different from that of a processing cell which is dedicated to one application for the duration of the needs of that application. It is a feature of the invention that, while the pivotal computing cells with the same level of authority (that is, scope) have different absolute addresses, all have the same pattern of least significant bits in their addresses, to a bit-level corresponding with their authority, and that part of each address is distinct from the least significant parts of pivotal-addresses of every other level of authority. This is shortly to be proved for one example case. A special processing cell, already acquired for an recursive connectivity task, may be instructed by the currently-owning user of that special processing cell to load further, identifiable arrays of the same scope, via pivot such as 52 and hence their associated array-elements into said fixed segment of computing cells 53. However, only software under the control of the said currently-owning user has reference to the address of the said acquired special processing cell, thereby prohibiting access by other user software to both that processing cell and its pivot until the processing cell sets its own Free-State flag into the declarative connectivity. At that point, under its responsibility to its special processing cell, the associated pivot in its role as a controlling pivot is likewise switched to a free-state.

The administrative connectivity 15 thus has means for distributing a multiplicity of data-arrays between clusters of computing cells via a multiplicity of diversely-scoped pivots, and the recursive connectivity 12 has means for transmitting array-processing instructions and data-elements from these pivots to their computing cells within such appropriately-scoped clusters. Each pivot passes each data-element of a received user-array, in sequence, to each of the computing cells under its control by means of the broadcast and synchronisation network of broadcast connectivity 26 (not shown in FIG. 5 but to be elaborated in due course with regard to FIG. 29).

Two further typical segments of computing cells 56 are shown in FIG. 5 which form two segments of a spatially-recursive curve—in this illustrated case, the two-dimensional Hilbert Curve. As before mentioned, the recursive path of the curve is defined for each computing cell by storage of the addresses of its prior and post signal-adjacent neighbours. The binary sequence of such addresses is advantageously represented in Gray-Code form. The scope of an accessible segment of computing cells is thus equivalent to the length of the sequence of computing cell in the segment of the recursive curve.

As already explained, the said switchable routes from 17 permit transmission of user message-streams, each from a user terminal 16 (FIG. 1), to corresponding ones of the special processing cells 21, which said messages respectively instruct standard processing cells 19 to spread component message-parts of their streams progressively through further parent and child standard processing cells 19 across the declarative connectivity. The said progressive spreading-process operates in accordance with logical and interfacing primitives in processing cells 19 and 21 which are responsive to coding of said messages. The terminal connectivity 24 thus has means configurable to direct a said message-stream from any one of the user terminals 16 to an appropriate special processing cell 21 depending firstly on the availability (free-state) of said appropriate special processing cell and secondly on the authority of the recursive connectivity pivot to which that special processing cell is connected, assuming that an array-processing task is intended. All digital computing engines in the Connectivity are therefore selectable in response to the structured software patterns of the user applications deployed from time-to-time into the switchably-selected processing cells, as will be described in due course with respect to the terminal connectivity of the administrative connectivity.

Each user interface 17 and each processing cell has a unique address. Each special processing cell 21 incorporates a data-segmenting circuit for identifying the component-parts of a user-message and has means for spreading its component-parts to neighbouring standard processing cells. These processing cells it acquires by means of a searching-signal into the networking of declarative connectivity 23 for the purpose of finding unemployed, free-state processing cells and thereby for sharing the processing of the segmented user's message. In addition, each special processing cell 21 has means to decode certain instruction-codes of the said component-parts related to data structures such as strings and matrices and to direct such array-processing instructions to its pivot of the recursive connectivity. The pivot computing cells of the recursive connectivity, as appropriate to the requirements of said component-parts, have themselves means to decode the array-processing instructions and to initiate microcoded instructions, stored in the computing cells, which are specific to controlling array operations in the switchably-selectable clusters of computing cells such as 54 of FIG. 5.

Although message components are spread across the Connectivity by these operations, the plurality of interfaces 17, the interconnection networks, and the special processing cells have means for directing the messages to avoid logical conflict between users and between unrelated data-structures, as will be elaborated in due course with regard to the terminal connectivity.

As already indicated and to be described in due course with regard to the broadcast connectivity, the recursive connectivity has features that multi-task the computing cells occasionally with elements from multiple data-arrays using a form of priority interrupt. Evidently, where intercommunicating paths and processors are time-shared due to limited quantities of implemented resources, opportunities for simultaneous connectivity and concurrency may then accordingly be restricted.

Each interface 17 has means enabled to set logical switches that select a communication path and transmit a user's message, instruction-by-instruction, through the terminal connectivity 24 and, through a selected path 29, to a special processing cell 21. As directed variously by instructions that form part of the user's message, each said component of the user-message data-structure has address-fields attached to it in transmission that permit the processing cells to coordinate inter-communication with one-another, and also to re-connect to associated message-components when these are distributed widely to other parts of the Connectivity.

As a further schematic illustration of the connectivities shown in FIGS. 1 to 5, FIG. 6 shows part of the Connectivity having segmental connectivity 25 of address-selectable signalling paths interconnecting a large plurality of address-bearing computing cells, 20 and 22, adapted to array-processing. Some of the paths 43 are selectable according to computing cell addresses hierarchically ordered in accordance with a recursive curve sequence, a small segment being illustrated by the sequence of computing cells addressed $\{6, 7, 5, 4, 12, 13, 15, 14\}_g$, where '$_g$' declares the address-symbols as Gray-Codes, to be explained in due course. Most of the address-selectable paths that form the segmental connectivity 25 are switchably operable between computing cells such that a selectable first set of said computing cells, typically $\{12, 13, 15, 14\}_g$, being one segment of the recursive curve, concurrently select a multiplicity of signalling-paths through segmental connectivity 25 to a second selectable set of said computing cells, typically $\{0, 1, 3, 2\}_g$, being a second, congruent segment of the recursive curve.

By 'congruent' is meant that the corresponding choices of locus of addresses bear the same positional patterns in the sending cluster as in the receiving cluster, where the two clusters may variously represent, as demanded by the user's application, string, matrix, cubic or hypercubic data-structures. The resulting choice of congruent sequences within segments of computing cells ensures that the addresses, the shape of segments and orientation of segments are then consistent in structure for concurrent processing of all the data items in the processing clusters.

For receipt of message-streams and for synchronisation, each said computing cell in a selectable segment also has a switchable signalling-path from one pivotal computing cell for that segment through the network of the broadcast connectivity (not shown).

The declarative connectivity 23 has signalling-paths interconnecting a plurality of address-bearing processing cells 19 and 21, such as $\{g, h, f, e, m, n, p, o\}_g$, adapted to administrative-processing. Some of said processing cells, such as special processing cell 21 ('o'), has means to loads message-streams directly into its paired pivotal computing cell of the segmental connectivity 25, such as pivotal computing cell 22 ('14'). By virtue of pairwise matching of computing cell addresses with processing cell addresses, a selectable segment of the segmental connectivity therefore receives a correspondingly localisable message-stream from declarative connectivity 23.

Due to the distinction between administrative and array functions, the network of declarative connectivity 23 associated with the processing cell circuits has a different form from the segmental connectivity 25 networks interconnecting the computing cell circuits. However, it has already been explained that for each processing cell within a digital computing engine there corresponds a computing cell, as its neighbour, with signal-interfacing between the two. By virtue, then, of the form of the recursive curve sequence 43 (as shown in typical form 56 in FIG. 5) and the form of the sequence of addresses therealong, in one preferred embodiment each special processing cell of the administrative connectivity has an address assigned to it that is identical numerically to the address of its associated pivotal computing cell of the recursive connectivity and therefore has an embedded address-pattern representative, like each pivot itself, of the scope of computing cell segment under its immediate command. Although the irregular branching trees forming typical administrative control algorithms are fundamentally different in topology from the typical Cartesian arrangement of data-arrays, the recursive-curve sequence of locational addresses adapts the predominantly Cartesian arrangement of array structures to the predominantly tree-branching arrangement of administrative-style computer programs. In sequential-processing languages, this is analogous to nested 'for-loops' selectively-controlled by decisions made by structured 'if-then-else's'.

In one preferred embodiment of the Connectivity 10, therefore, control of the Connectivity according to the demands of user applications is by means of the administrative connectivity 15 through a multiplicity of concurrently-operable ports 17. Each user application comprises a message-stream that is loaded and distributed amongst selectable circuits of the Connectivity and forms a computable user-task. The Connectivity has means to distribute a multiplicity of such tasks across the plurality of digital computing engines. Each port 17, together with the terminal connectivity, has means to pass a user message-stream serially from one user terminal to at least one special processing cell, such as 'k' of FIG. 5, which has been selected by the administrative connectivity, terminal connectivity 24, according to task-loading across the Connectivity. Each port 17 also has time-shared access means for multiple users accessing the port similarly without logical-conflict of messages (other than delays due to time-sharing) as is common in computer processing. By means of the searching-path selection, the locational-address of the said at least one selected special processing cell is made known to the port 17 in order to provide further accesses by the owning-user's message-stream. Each special processing cell then has means to acquire unemployed standard processing cells for the coordinated distribution and evaluation of said user-messages. These coordinated standard processing cells (for the one user's message-stream) operate independently of those processing cells coordinated and employed for the messages from other users.

In this way, the declarative connectivity 23, with the said at least one special processing cell 21 such as 'k', has means to acquire and initiate the coordination of a pattern of interconnectable, free-state standard processing cells 19 that are then collectively dedicated as a task to the logical manipulation of the user's computer program; that is, his stream of messages. By said means, the declarative connectivity organizes the acquired processing cells so as to match the fine-grained function-argument structure of administrative-style software, of which the Lisp language provides a convenient example, and also matches the needs of concurrent control of the large plurality of array processing computing cells in the recursive connectivity with sequences of primitive instructions. For example, in operations on Lisp-Like structures, the acquired processing cells of the declarative connectivity have means to pass messages between themselves and means to combine computed evaluations of functions in order to carry out reduction of Lambda Calculus expressions, one example of which is shortly to be listed and explained. Examples of the means for achieving this interaction between processing cells are disclosed in Hamlin and further examples of the Connectivity when applied to such expressions are given towards the end of this specification.

Each processing cell has interfaces into the declarative connectivity 23 and, when loaded with a code that does not correspond solely to a primitive operation with immediate argument-value (that is, a so-called 'Atomic' value), inter alia derives address-pointers associated with the said code for access to circuits elsewhere in the declarative connectivity that store read-only lexicons which incorporate the definition of said code, every such lexicon possessing a unique address describing its location within the intercommunicating networks. Each processing cell also has logical and interfacing means to select portions of a user-message for onward transmission to further processing cells, unless the message-coding is a primitive ('atomic') operation that terminates a branch of the message-tree. When loaded with a code from the user's message-stream that reduces to an atom, the hosting processing cell evaluates the pre-defined, primitive operation, passes the result of evaluation back to its acquiring parent processing cell, and resets itself to free-state. Once further processing cells have been similarly tasked, they operate on their acquired software-formatted messages in an analogous manner but with autonomy of operation, independently of any global control mechanism. In this way, software in a suitably structured form effectively distributes itself across the Connectivity and employs largely concurrently-operating resources for its evaluation.

Further discussion of the network of declarative connectivity 23 and its use as described in this present specification assumes the detailed descriptions contained in Hamlin. That specification, which covers the operation of one preferred embodiment the processing cells 19 and 21 and of said network, should be read in conjunction with this current specification. For this purpose, in the present specification we distinguish by an 'H'-prefix the original figure- and reference-numbers published in Hamlin. As hereinbefore observed, that patent, which deals with predominantly logical processing, necessarily embodies a different type of connectivity from that of n-dimensional Cartesian network structures such as that described with respect to FIGS. 3 and 4.

Figure 7:
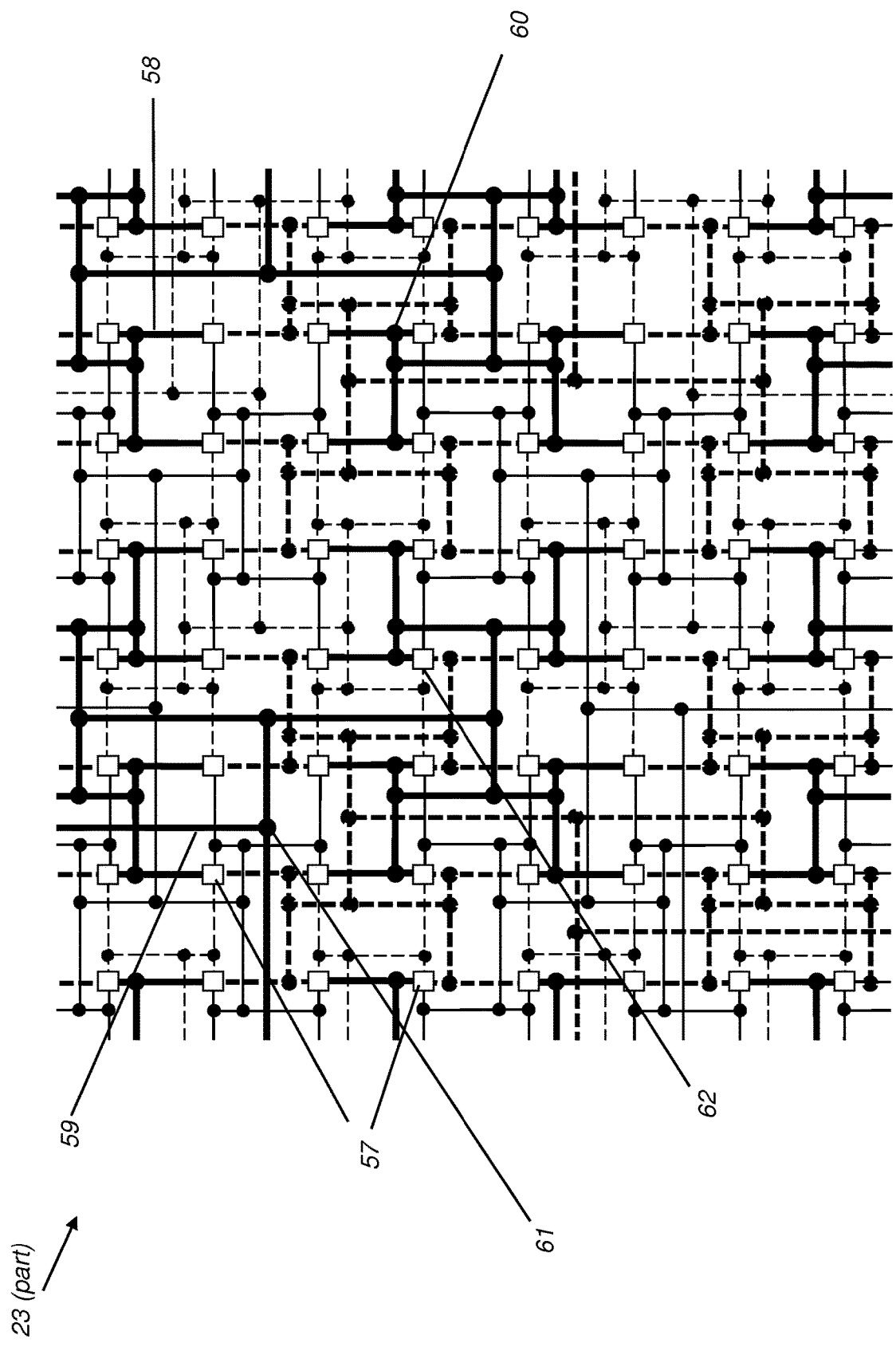
FIG. 7 is a schematic diagram of digital computing engines interconnected by part of one of the complementing networks.

FIG. 7 is a part of FIG. H23 of Hamlin, redrawn here for greater clarity, in which processing cells such as 57 are set out preferably in the form of a toroidally-connected grid but the bi-directional interconnecting signal-paths between the processing cells are in the form of hierarchically-switched, binary-labelled, tree-arranged signal-paths. The diagram shows that the processing cells are interconnected by at least one binary-tree network with routeing paths such as 58 and 59 through tri-splitting switching nodes such as 60 and 61, as shown by way of example in the case of the heavy-lined network-paths.

In FIG. 7, it is to be understood that each path, such as 59, comprises a group of links that permits transmission of messages in both directions without pathological conflict. That is, a sequence of messages passing variously through said paths never meet head-to-head, as would thereby cause locked-up switching within the connectivity. In support of this independence of message-paths, a node, such as 61, similarly has means, inter alia, to route an adjoining path without head-to-head contention between messages. However, the bifurcation that occurs at each such node requires discrimination between some message transactions by means of time-sharing the node-switching, although such time-sharing is characterized by only 'head-to-tail' delays between messages, never 'head-to-head' deadlocks. By this means, signals may be passed between any two processing cells in the declarative connectivity, occasionally by sharing interconnection switching. The choice of this connectivity-pattern reflects the purpose of the former invention as a hierarchical, administrative-style, software-processing computer using tree-connectivities between processors, whereas the segmental connectivity 25 Cartesian interconnections relate to recursive manipulation of Cartesian blocks of data-structures as found, for example, in matrix arithmetic and digital differential analysis.

Figure 10:
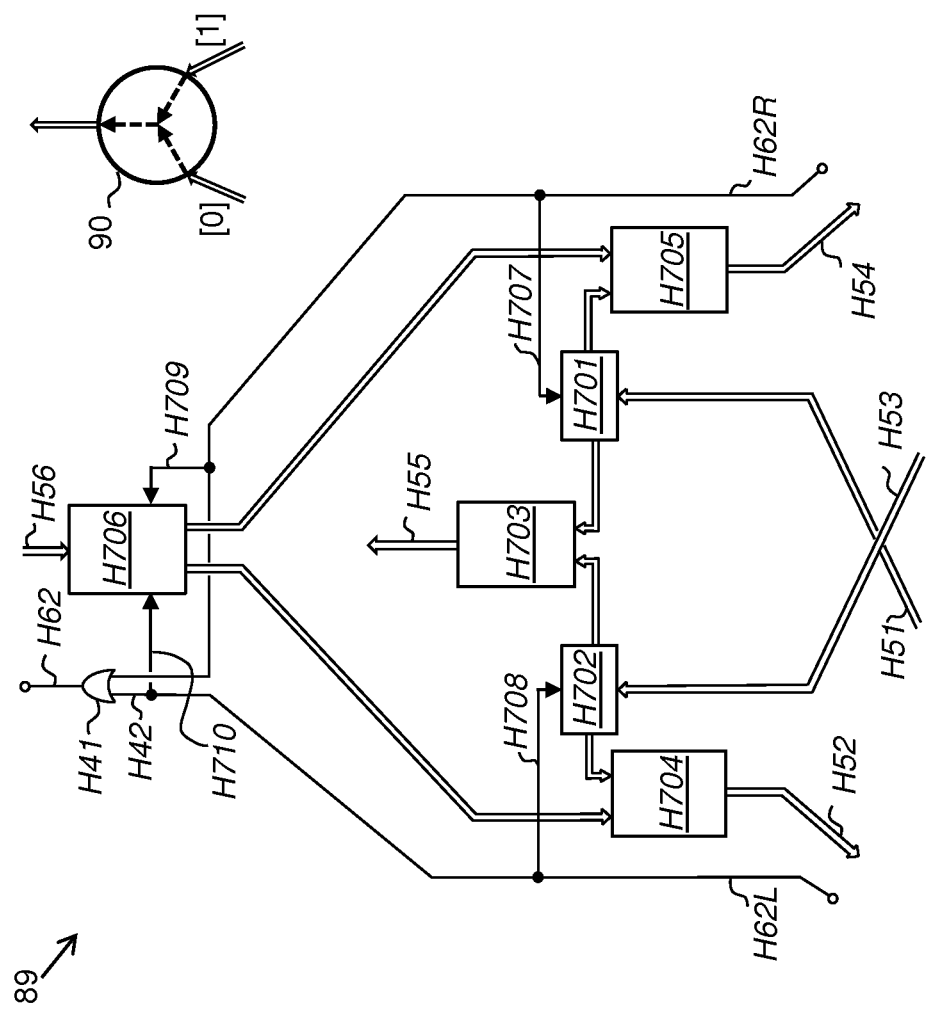
FIG. 10 is a block-diagram schematic of an elemental part of a typical switching node in FIG. 8.

Each binary signal-directing node such as 60 is a tri-splitting switch of the same form employed by the terminal connectivity and to be elaborated shortly with regard to FIG. 10. It forms a junction between three of said bi-directional signalling-paths, thereby offering six uni-directional paths through the node, an upper path being directed towards the root of the tree (out of FIG. 7) and left and right lateral paths each directed towards the subtended leaf-paths at the subtended cells. In addition, free-state signals from the cells flow through the two lateral paths, on dedicated lines, on their way towards the upper path and permit a search signal through the tree from a cell elsewhere in the Connectivity to meet one of the free-state signals thereby switchably-directing said search-signal towards an unemployed cell. The bi-directional, tri-splitting node permits two calling signals concurrently to pass through the node in addition to a searching signal.

The part-network of declarative connectivity 23 in FIG. 7 has multiple-networking means such that a processing cell 62, for example, tends to seek, acquire and task further free-state processing cells towards the four boundaries of the figure (assuming four such networks in the example of FIG. 7). In this way, the higher hierarchical levels of a software application can force distribution, by choice of the form of pointer-addresses, widely across the whole extent of the Connectivity, assuming that the processing cell utilises all four networks for its distribution, and thereby avoid over-tight clumping of nodes employed at lower software-hierarchical levels. This tends to leave more closely-located processing cells for use at the lowest levels of the software-hierarchy.

FIG. 7 shows as an example four said labelled-trees, each connecting, bijectively at its leaf-level, a said plurality of subtended leaf-paths to the like-plurality of cells, any subtended calling-cell being thereby switchably connectable, for concurrent signalling, to four further target-cells if desired. For example, one of the further target-cells may be chosen to be a pivot cell with a defined scope. Each of the four trees in the diagram is shown shifted laterally, and rotated through a right-angle, with respect to the others. Optionally, more networks of this type may be implemented in the declarative connectivity. A parent cell in a searching state sends searching signals independently through several of the said networks in order to acquire thereby children cells, typically for expanding functional expressions for evaluation. The nature of the displacements of the trees with respect to one-another tends desirably to distribute routes to children broadly across the Connectivity, though cells also have means optionally to control the span of a search.

Hamlin describes the special switching-modes that ordain this distribution process. In addition, hierarchically-directed search-modes available to the processing cells, and to the network-nodes of 23, arrange the switchable routes across the Connectivity into a morphing hardware-pattern that electrically accords with the typically-irregular software tree-branches of administrative-style software, where the 'root' of the user software-application is hosted by the user-acquired initiating special processing cell—the one initially interconnected to the user's access-port 17, as illustrated for example by processing cell 47 of FIG. 5. The effect is that the processing cells tend to scatter the software-structures across the network of declarative connectivity 23 as though in a naturally-branching tree. Then, a further user application is free, largely concurrently, to forge its own switchable routes to further acquired processing cells such that its processing cells may freely interleave with those of the first application, but without mutual interference except for occasional queuing for access to network-paths, where the shared message-queuing in that case is head-to-tail and not head-to-head, as already stated. Evaluation of each application takes place by progressively loading and evaluating the code at each acquired processing cell, as the said application spreads itself across the Connectivity. Following termination of a message-branch of the distributed software-tree (that is, at a functionally-atomic processing cell evaluation), the evaluation progressively returns the accumulating results of the computations back through the branches, in hierarchical order, until the completed computations from all the interconnected-branches are returned by the topmost special processing cell to its associated port 17 for that application, and out to the user terminal 16. In the meantime, self-satisfied processing cells set their 'free-state' flags to indicate to the Connectivity that they have been freed for employment by further tasks.

The process of clearing digital computing engines for subsequent acquisition for new applications, by means of their Free-State' flag, is analogous to 'Garbage-Collection' in functional programming, and to manual 'Memory-Reclamation' in imperative software design. The fundamental difference is that those analogous actions are globally managed by a master coordinating process whereas, in Hamlin, the garbage-collection takes place autonomously at the site of each processing cell when the requisite individual processing cell operation has been completed.

As an exception to this process, special processing cells that have tasked pivotal computing cells for array-processing during the evaluation of an application pause this garbage-collection process until the originating application clears its special processing cell free-state flags directly by command at the point of application-completion.

Figure 8:
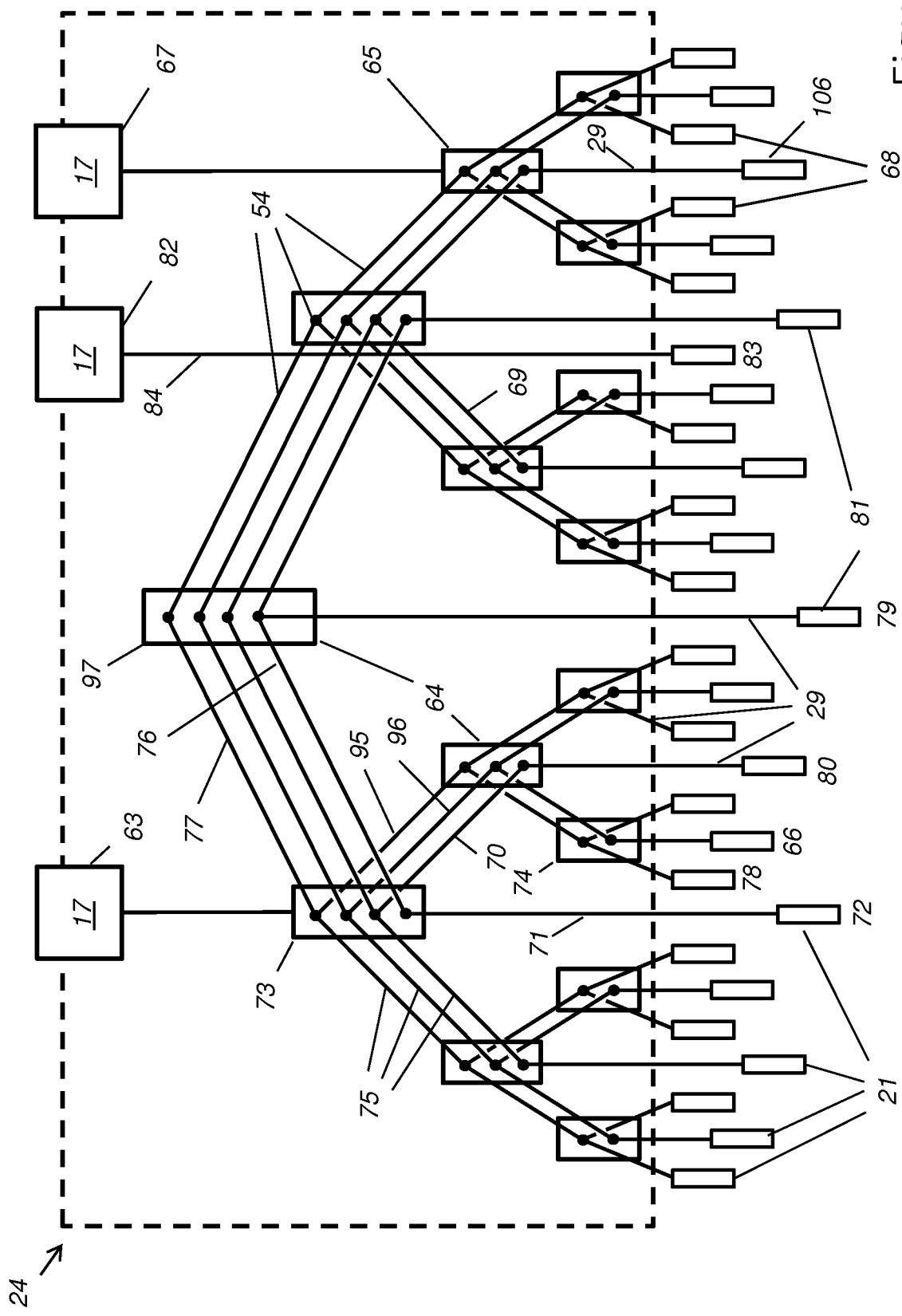
FIG. 8 is a schematic diagram of network paths and switching nodes representing switchable signalling routes between users and digital computing engines.

Each user port 17 has processing means for scheduling a sequence of diverter-nodes and paths through the network of terminal connectivity 24 by which, on receiving the initiation of a user-message stream from 16, port 17 opens a serial signalling route through said diverter-nodes to an available and appropriate pivot digital computing engine by way of its special processing cell, as will shortly be described with respect to FIG. 8. Onward distribution of the user-message, expression-by-expression, to targeted patterns of standard processing cells then follows, initially under the control of the acquired special processing cell, as hereinbefore explained. The administrative connectivity thus has means to interpret the coded message-stream of each application:

1) by a processing decoder located at the interface 17 that demarcates the stream of messages in the user's program with respect to delimiter-codes,
2) by interpreting each message and passing component-expressions to appropriate special processing cells, that in the case of array-processing applications are acquired through terminal connectivity 24 according to the scope of arrays demanded by the coding of the expressions;
3) by a decoder located in each special processing cell 21 which interprets said expressions and initiates searches for free-state processing cells according to defined-terms within the sub-structure of the expressions.

Where an expression incorporates further nested expressions, function-names and parameter names, the processing and network-controlling microcodes pass on those defined-terms to further acquired standard children processing cells 19. The standard processing cells, on acquisition of such expressions, functions and parameter-names, themselves as parent processing cells continue the processing and distribution of the further nested sub-structures required to compute the user's program, both to further children processing cells 19 and (in the case of array-processing defined-terms) to special processing cells and their associated pivots 22, as appropriate for each function.

The structure of the software application from each user is expected to accord with a functional-programming style of nested expressions as shown typically in the following example-code for the transpose of a matrix, called 'MTRANS' (say), which will, in due course, be discussed in more detail with regard to hardware operation:

---

;; No specific language nor keywords are
implied. The user enters the first three
bracketed expression-structures manually as
normally performed with respect to interpreted
languages :
$1^{st}$ user-Input expression:-
(define 'MTRANS '($\lambda$ ($\psi$) ($mtrans $\psi$ ))
 'MCOPY '($\lambda$ ($\theta$) ($mcopy $\theta$ )) )
;; $MTRANS and $MCOPY (in upper-case)
are names to be looked up in a structure of
definitions of such names (called 'symbols'),
the structure being called herein a 'lexicon'.

---

Many lexicons may be distributed around the Connectivity. 'define' is a primitive that instructs the user interface 17 to order and to distribute, to an interlinked structure of acquired free processing cells, a list of such symbols with their attached definition-structures. '$mtrans' and '$mcopy' (in lower-case) in these examples are presumed to be interpretable as machine primitives known to each pivot digital computing engine. The primitives represent calls that are directly interpreted by the arithmetic-logic unit of an acquired processing cell of the administrative connectivity and also by the associated pivot-computing cell of the recursive connectivity, when appropriate. $\psi$ is a dummy argument to 'mtrans' and symbolizes a register that will ultimately hold an address-pointer to a user expression, yet to be supplied. $\lambda$ is a primitive that instructs the user interface to store the name of the dummy argument such as $\psi$ (and further arguments, if any) used in the body of each function so defined. It also instructs each processing cell, required in the construction of the hardware to be utilized for the definition of each function's look-up structure, to be 'read-only'. That is, the structure is reserved as a lexical entry and all components have an attached 'quote' primitive designator making the content read-only until garbage-collected on completion of associated tasks. Dummy arguments are stored, by name, at the head cell of the associated lexical functional-definition and each becomes a local look-up reference-label for the substitution-value eventually supplied during processing of the user's software application.

This ensures that correct reference is made to subsequent calls on each argument-label within that local function.

$2^{nd}$ user-Input expression:-
(define 'Φ '#Φ
    'EXAMPLE '(λ (φ) ($MTRANS ($MCOPY $φ))) )
    ;; #Φ, in this array-processing example, is the
    computing cell (and processing cell) address of
    a pivot known to the user, somewhere in the
    Connectivity, that has authority over the group
    of computing cells holding a matrix called
    (arbitrarily) by the symbol-name $Φ. The
    lexical definition of Φ is, in this case, simply the
    integer-address #Φ. The definition of
    $EXAMPLE is the function $MTRANS, with an
    associated argument in the form of a sub-structure
    ($MCOPY $φ) that has yet to be
    evaluated.
$3^{rd}$ user-Input expression (The application program):-
($EXAMPLE $Φ )
    ;; This is the user's main program from which
    they expect an evaluated result. It will call for
    the matrix-transpose of a retained copy of the
    matrix Φ, which has been declared above to be
    associated with pivot-address #Φ. Unlike the
    previous lexicon assemblies, which are held as
    read-only structures, this time, the expression
    starts with symbolic names that are to be
    mechanically evaluated (in a processing cell)
    as follows:
($EXAMPLE #Φ )
    ;; The definition of argument Φ is found in the
    lexicon of functions where the user has
    declared its value to be the pivot address
    #Φ which is now applied to the definition of
    $EXAMPLE:
(λ (φ) ($MTRANS ($MCOPY $φ)))
    ;; Seek and copy this definition of $EXAMPLE
    from the containing lexicon. Attach φ (lower
    case) as the dummy argument name for
    'EXAMPLE (in the $EXAMPLE processing
    cell), forming a new, immediately-local lexicon
    (where φ is to defined as #Φ).
(λ (ψ) ($mtrans $ψ)) ($MCOPY $φ)
    ;; Look up the definition of $MTRANS which is
    not found in the new lexicon entry (associated
    with φ), nor the next above, but in the lexicon
    hierarchically above (that is associated with the
    user's second 'define' call). In this example it is
    a call to a symbol primitive $mtrans, identified
    initially as a lookup symbol that digital
    computing engines find to be one of their own
    primitives which does not need a further
    search. In its definition it has the dummy
    variable $ψ as the argument name to be
    replaced by the operation of 'mtrans' (in a new
    cell) forming a new lexicon-entry for $ψ with its
    applied formal definition ($MCOPY $φ) that
    now itself needs evaluation as a function:
(λ (θ) ($mcopy $θ )) #Φ
    ;; Look up the definition of $MCOPY and apply
    to dummy name $θ the value of $φ (which has
    recently become address #Φ). The primitive
    'mcopy' in a digital computing engine with the
    address-argument #Φ has logical organisation
    to acquire the pivot #Φ and to pass the
    equivalent primitive instruction to that pivot.
    The organisation of the instruction in the pivot
    acquires, through the terminal connectivity, a
    new array with pivot-address symbolised for
    this example by #Ψ, with scope consistent with
    #Φ. The pivot then organises its group of
    computing cells to carry out the copying of its
    elements into the similar, but unused, group of
    computing cells, Ψ.
(λ (ψ) ($mtrans $ψ )) #Ψ
    ;; The address #Ψ of the special processing
    cell of the new group of computing cells is
    passed back from the #Φ pivot as the derived
    value of the $MCOPY function, which then -continued becomes the definition of the dummy argument
$ψ in the definition of the original $MTRANS
expression. Since the primitive (mtrans $ψ )
now has the meaningful matrix argument #Ψ,
the primitive (mtrans #Ψ) passes an equivalent
'transpose' instruction across the declarative
connectivity to the pivot at address #Ψ.

Ψ

;; That pivot organises its computing cells to
perform a matrix transpose and generates the
result as its own pivotal address-pointer #Ψ for
transmission back to the initiating user-interface
17, through the chain of processing
cells that have been used to generate the
result.

The user now knows the location of his new matrix, #W. If they require the elements of the matrix themselves, an example method might apply a 'print' primitive operation to the pivot address #W such that the pivot collects the data-elements along its recursive curve segment in a series-sequence, passing them through its associated special processing cell and onwards to the user interface. This ends the example program code for the administrative command of the user example application.

With large numbers of digital computing engines, a plurality of users may carry out simultaneously many computations of this type.

Executable software programs, as typified by the above example, commonly include specialised commands for accessing arrays of data elements and for manipulation of such arrays. These commands typically include binary-coded designators for the size of each array and for its location. It is a feature of this current specification that each computing cell has an address that designates its own location within a multiplicity of nested segments of a recursive curve, such as 38 and 40 of FIG. 4. Each such fixed-size segment defines the computing cells along that segment as a regular array of elements, of which the content of some are binary data-fields and the remainder in the segment may be set to 'nil' (that is, 'undefined'). The terminal connectivity 24, a special processing cell 21, its associated pivot computing cell 22, and broadcast connectivity 26 together operate to select a segment of computing cells of the desired scope greater than the size of the user's array, and to distribute the user's array of binary data-fields to the segment, as an ordered serial stream. Each said data-field may include for example a digital representation of an integer adapted to arithmetic and logical operations.

The logical elements of switching nodes and the available signal-paths in terminal connectivity 24 also have means to adapt the searching route towards a special processing cell of the correct pivotal scope for accessing a computing cell array of a particular desired size as will be described in due course. Each processing cell has logical means to set a 'free-state' signalling flag for transmission into terminal connectivity 24 when the cell ceases to be employed by a user application. The processing cell resets its 'free-state' signalling flag when not available for access due to acquisition and ownership by a user application. The nodes of terminal connectivity 24 together have means to interrogate each such flag and to switch an input route towards an unemployed special processing cell, in a 'free-state', and the port 17 has means to count down the nodes to the special processing cell, applying directing signals to the route according to the designated size of a user's array. For the subsequent purpose of permitting requests for a further sequence of follow-on fragments of a user's message, and for returning computed data-streams back to the user's port, once the administrative connectivity has completed the evaluation of a user's message, the port 17 has augmenting means to attach to each onward-transmitted message an address-field containing its own port-address.

The administrative connectivity terminal connectivity 24 thus has means for accepting a multiplicity of simultaneous message-inputs from a plurality of user terminals 16 and for distributing the data content of those messages to selected ones of the administrative connectivity special processing cells 21 by multiplexer means to be described, such that no logical contention occurs between user-messages. The purpose of the input terminal connectivity 24, then, is to acquire administrative-processing and array-processing circuits within the Connectivity according to the multiplicity of user message-streams from the corresponding plurality of user terminals.

FIG. 8 illustrates schematically one preferred embodiment of the terminal connectivity 24 that has multiplexer means to distribute user-messages from an active input/output port 17 such as 63 to a selected one of the special processing cells 21, over binary 'thick-trees'.

Each user message-stream from the user includes functional expressions for evaluation together with associated primitive directives. The directive-codings control the input processing at user interface such as 63 by ordering a sequence of directed-search switching signals into terminal connectivity 24 that trigger a sequence of said diverter-nodes such as 64 and 65, both according to the existence of 'free-space' signals at those nodes and according to the desired scope of user arrays, if array-processing is demanded. The switching logic thus configures each demanded transmission-route in the terminal connectivity according to primitive directives and array-scope, through a sequence of diverters, towards an appropriate, free special processing cell such that the functional data-content of the user's expressions passes ultimately, for example, to the selected special processing cell 66 for functional interpretation, and thence to standard processing cells and also, if the message includes array-processing functions, to an appropriate one of the pivots in the recursive connectivity 12. In the case of data-arrays, the size of the array requested by a user-message is important to the selection of an appropriate pivot and terminal connectivity 24 has means to select an unemployed pivot with adequate scope for that array-size, as now to be described.

The arrangement of the terminal connectivity has switchable paths from a port interface 17 such as 67 to search-diverter nodes, such as 65, which are forms of multiplexer arrangement, to be described with respect to FIGS. 10 to 13, that have switch-means for responding to 'free-state' signals from unemployed special processing cells such as 68, each special processing cell being preferentially, but not necessarily, local to each of the respective said user terminals. The example of network in FIG. 8 is a binary-tree, the diverter-nodes of the tree each shown incorporating two sets of branches, to the left and to the right (typically 69 and 70), and the paths 29 of FIG. 2, such as 71 connected directly to a special processing cell such as 72. Some of terminals 17, such as 63, have direct connection to a corresponding diverter such as 73, but at least some of the diverter nodes such as 74 do not have that type of link. In this example, the diverters are collectively connected in a hierarchical, thick-tree network of routes with paths such as 75, 76 and 77, the lowest levels of the tree being connected to at least some of the lowest scoped special processing cells of the Connectivity, such as 78. Higher-scoped special processing cells such as 79 and 80 are accessed through diverter-nodes higher in the tree. The lower lines of the illustrated branches, typified by 76, provide free-space search for the larger-scoped user-accessible segments while the lower-scoped accessible segments are accessed by tree-paths typified by 77. Of the special processing cells, 81 identifies higher-sized array-accesses and 78 identifies the lowest sized arrays. It is an advantage for loading and reading arrays that some user accesses, such as 82 only have access to a small-scoped special processing cell such as 83 via a dedicated path 84, in which case, no diverters are involved.

Figure 9:
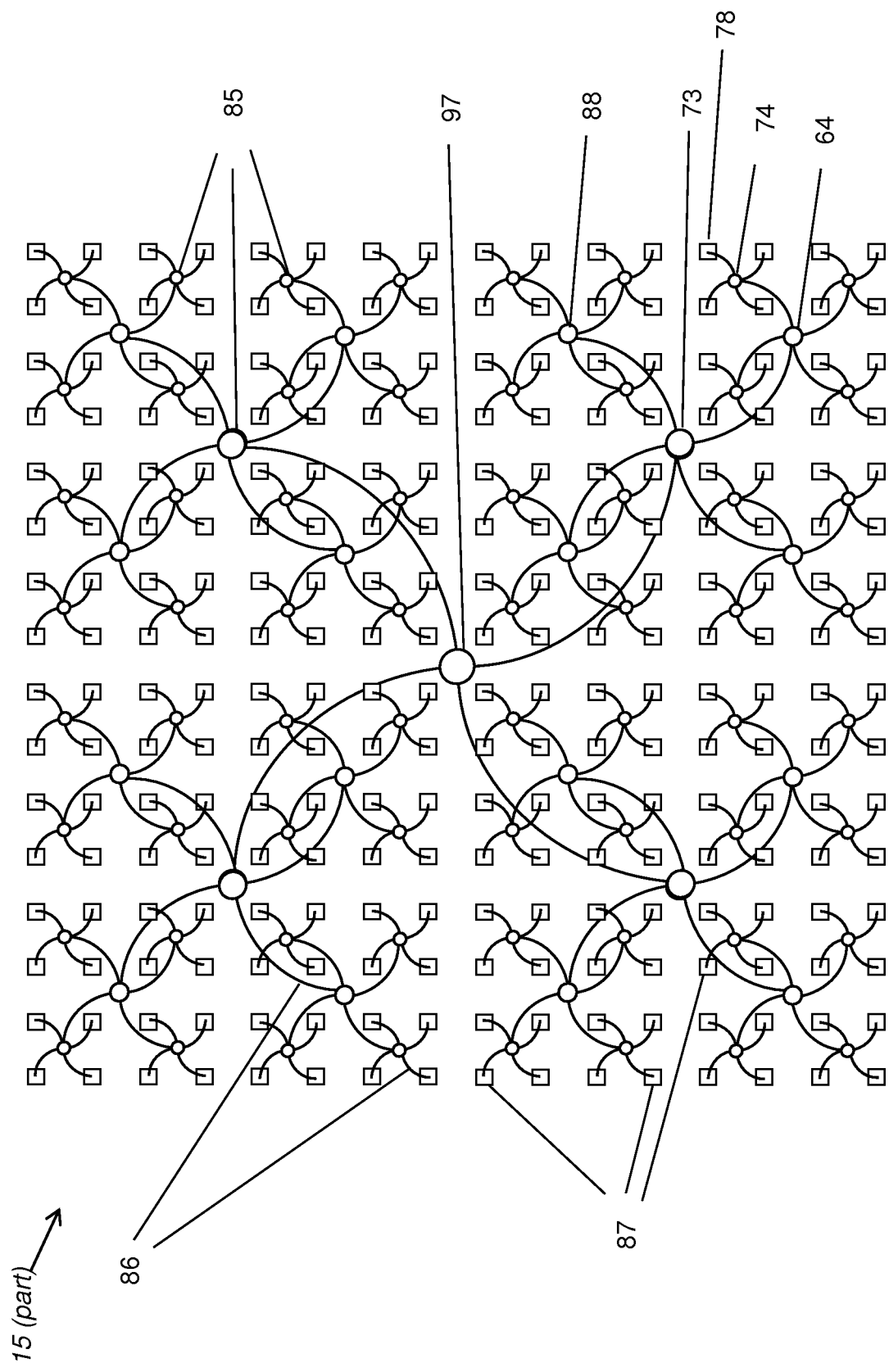
FIG. 9 is a further schematic diagram extending the network paths and switching nodes of FIG. 8 into a two-dimensional array.

One preferred embodiment, suitable for circuitry arrayed across the Connectivity in two dimensions, comprises two further sets of branches at every diverter in FIG. 8, one conceptually flowing out of the page and the other flowing into the page, so to speak, and forming a quad-tree. FIG. 9 shows this schematically as a quad-tree of diverter-nodes 85, along with their sets of connections 86, which correspond with paths such as 75 of FIG. 8. In implementation, the quad-tree is set out across the breadth of the Connectivity, and connected where physically convenient to selected special processing cells. The communicating quad-tree is thus arranged both to lead to special processing cells at the leaves 87, which control some of the smallest arrays that are directly accessible by the users, and to the diverter nodes, such as 88, that also connect directly to special processing cells, such as 81 of FIG. 8, controlling larger arrays through the diverters. The lines, such as 86, between said diverters in the terminal connectivity 24 form a 'thick-tree' of communicating paths and each tree-branch, shown in FIG. 9 as a single line, thus may comprises a multiplicity of available paths along each branch, the choice of which depends on the scope of array that the user application requires its sequence of diverters ultimately to select: that is, in order to forge an opened route to a special processing cell with adequate authority. A diverter node controlling three such paths is shown in more detail in FIG. 12 and will be described shortly. It will be appreciated that more opportunities are available for access to lower-scoped arrays than to the fewer, higher-scoped arrays and one preferred embodiment of the invention provides to the user-interfaces 17 direct-signal notification of large-array availability.

As taught in Hamlin, with respect to FIG. H38 and feature H62 of that specification, the special processing cells each have means to pass a 'free-state' signal to peripheral interfaces by means of dedicated links (to be discussed shortly). In one preferred embodiment of the terminal connectivity, six other links through interface H591 support addressing and data-signalling for bi-directional acquisition and communication from the special processing cells into the diverter nodes of terminal connectivity and thereby to an acquiring interface 17. As hereinbefore stated, in the said second, reduced embodiment of the Connectivity, the pivots themselves incorporate this interfacing means.

The diverters have means for detecting the free-state signal and thus claim other nodes and paths with a 'directed-search' signal steered towards an unemployed special processing cell such as 78. If the special processing cell 78 remains free, intermediate claimed nodes such as 73 and 74 together forge a path between the searching user interface (such as 63 in FIG. 8) and the unemployed special processing cell, which path permits messages to be passed to and from the special processing cell 78 (for example). If the processing cell becomes engaged by a different acquiring application before the search-path is complete, as explained with respect to the 'directed, remote free-space search' in Hamlin (Col 88.30ff), the directed-search path unwinds back to the next available free signal sensed within the terminal connectivity 24 from which the search recommences for a different available special processing cell of the same scope such as processing cell 66. If no local special processing cells are available, the directed-search path may proceed upwards through higher diverters before descending again to more distant processing cells. The logic for the directed-search is the same as that described with respect to FIG. H65 and uses the same elementary circuitry but, in this current specification, the hierarchy adds further logic and links for also matching the search to a user-desired array-scope, if the message-segment contains an instruction for array-processing operations. In that case, the diverter-nodes have a switch means that responds to the searching-signal according to an address-code for the scope of the array, large enough for the requested array during the search, and means to transfer the searching-signal to a different layer of the thick-tree, such as a switchable re-selection through 76, for larger arrays, and through 77 for smaller arrays. Said 'address-code', in this case, means the particular least-significant bit-pattern of address that matches the desired array-scope, not the location of a specifically-addressed special processing cell. The said switch-means thereby connects the searching-signal (and its subsequent user-message) to a free special processing cell that has a scope sufficient to control a segment of computing cells of adequate size for the user's desired array. The lower part of the address-pattern matches the pattern of address of an appropriately scoped pivot, that least-significant bit-pattern being the same for all accessible segments of that scope throughout the Connectivity.

FIG. 10 illustrates, in schematic block form, one preferred embodiment of one of the main sub-circuits of a diverter in one preferred embodiment of terminal connectivity 24. This sub-circuit has been derived directly from the network nodes described with regard to FIG. H65 and column 75, line 25 to column 80, line 28 of Hamlin. The identical circuit is therefore also suited to operation of the nodes of the declarative connectivity, as hereinbefore indicated.

Figure 11:
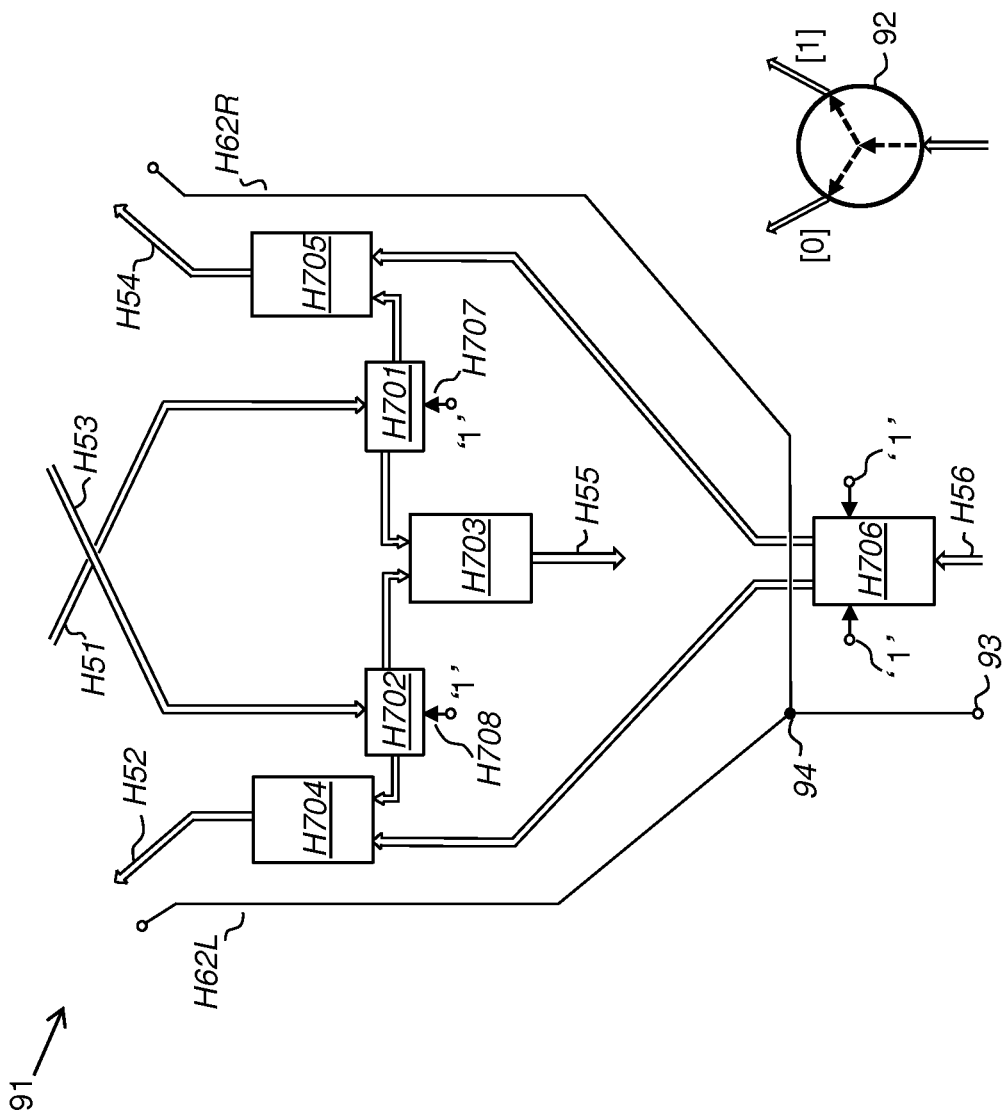
FIG. 11 is a block-diagram schematic of a second elemental part of a typical switching node in FIG. 8.

The multiple logical selection links into the circuit, such as H51 and H56, operate as described therein, along with their modes of operation according to logic-signal levels applied variously to the links. The circuit of FIG. 10, in one mode of operation, is employed for detecting free-state signals set by unemployed, special processing cells subtended by the tree of FIG. 8. FIG. 10 shows symbolically at 89 the routeing of the free-state signals in the direction of the arrows in order to indicate that the symbol stands for circuit 90, called herein 'type-A', and where a successful search-direction is against the arrows, downwards towards an unemployed special processing cell. The arrow-heads show sensed-direction of free-state flags, and always point upwards through the tree hierarchy, and the side-paths are allocated '0' and '1' designations to identify preferential switching routes, in operation. Subsequently to successfully linking to a free-state link, the circuit 89 of FIG. 10 latches-open the acquired signal-paths, one-by-one until the whole route is completed or until subsequently released by an over-riding 'set-to-free-state' signal from the signal source, when the source removes its latching Acquire-Line signal. When set, the free-state signal on link H62L permits the up-going, multi-link route H53 (from a diverter such as 65) to connect through cross-over circuit H702 to downward circuit H704. It is possible that downward path H56 is also seeking an unemployed special processing cell and also receives permission by link H710L to access circuit H704 via H706. H704 has selector means to permit only the first-accessing searcher-path to continue downwards, the second path being held open (for signalling) until H704 is released from the first acquiring transaction, on path H56 (say)—at which point, the signals on path H56 have been relinquished and H704 sets the signals from links H53 to proceed downwards. If, however, H702 is inhibited by the absence of a free-state signal on link H62L (and therefore H708), the search from links H53 continues to H703 and upwards via links H55, possibly after a delay due to prior acquisition by a search-signal from links H51, as hereinbefore described. The circuit 89 therefore forms a tri-splitting switcher of message-transactions and its schematic 90 is used in the subsequent circuit diagrams and descriptions. Circuit 89 permits a range of bi-directional acquisition modes and transactions to take place, each way, between the three signalling routes. As an example, in one operation, type-A circuits permit the following switching modes:

(a) during an initial search and acquisition of a special processing cell from upward path H51, without change of requested authority, a free-state signal at H62R dictates the path taken by the signalling route from links H51 down through H705 to H54, following at least temporarily, the free-state signal to its source;

(b) If, during an initial search and acquisition of a special processing cell from upward path H51, the free-state signal is lost, the search continues upwards—remaining on the '0' branches—until a further free-state signal has been detected, upon which, the search proceeds downwards again;

FIG. 11 shows schematically a further tri-splitting switch 91, which is the same as that in the circuit 90 of FIG. 10 except that its left and right paths are combined in the opposed direction to the upward flow of the free-state signal through the trees of FIG. 7, and it is not influenced in operation by free-state signals. FIG. 11 shows the symbolic form 92 of circuit 91, called herein 'type-B', where again the successful search-direction down to a free-state processing cell is against the direction of the arrows. The free-state signal from 93 now bifurcates to H62L and H62R at the wired connection at 94. However, in this circuit, the main switching logic itself of the circuit is not controlled directly by the free-state signal and the logic inputs to H701, H702 and H706 are set high so as not to inhibit either up-going route, in this case, the choice of path being set by the controlling terminal by means of a directed-search signal coded for desired pivot-scope. The directed-search signal progresses through the searching route as the signal acquires each tri-splitting circuit along the route.

Various modes that control path-acquisition logic and its signalling for circuits 89 and 91 are explained in detail in Hamlin. Those acquisition-modes include directed-addressing of a route where each tri-splitter-node returns an 'acknowledging-handshake' signal to the initiator of the message that enables a further director-signal to be sent to the next sequential circuit in the desired transmission-path in order to switch the desired scoping route. The route of the search-path is directed by setting appropriate signal-levels on the address- and acquire-lines from the source interface, in the same manner as described with respect to the directed remote free-space search described in Hamlin Column 88, line 28ff and FIG. H77A.

In FIG. 8 (as explained in Hamlin) each drawn line such as 95 represents a bidirectional path comprising one free-state signal-link and two paths of three controlling signal-links each that, once successfully completed over two corresponding routes, enable transmission of serial-data transactions in both directions concurrently. The two paths correspond with the two paths H51 and H52, and with H55 and H56, for example. In the terminal connectivity, the one group of three of the controlling links (such as represented by H56) together control the acquisition of paths in various operating modes for switching a selected route from a user port to a special processing cell, and the three others provide the reverse selectable path from a processing cell to a port. Each drawn-line in the diagram is therefore to be understood to include at least the Acquire, Address and Acknowledge signalling-links, all as described in Hamlin. Each arrow designates the direction of progress of the set-high free-state signal upwards through the paths of the quad-tree (as illustrated typically in FIG. 9) to the topmost, highest-authority node in the tree, typified by 97. Some diverters, such as 64, have bi-directional connection 29 with one special processing cell such as 80, except the lowermost diverters such as 74, which have connections to typically four special processing cells of the lowest scope (such as 78), when laid out in the quad-tree form, and a fifth special processing cell with scope one level higher, such as node 66. Node 97 may likewise have direct communication with the terminal connectivity's largest scoped special processing cell 79.

Figure 12:
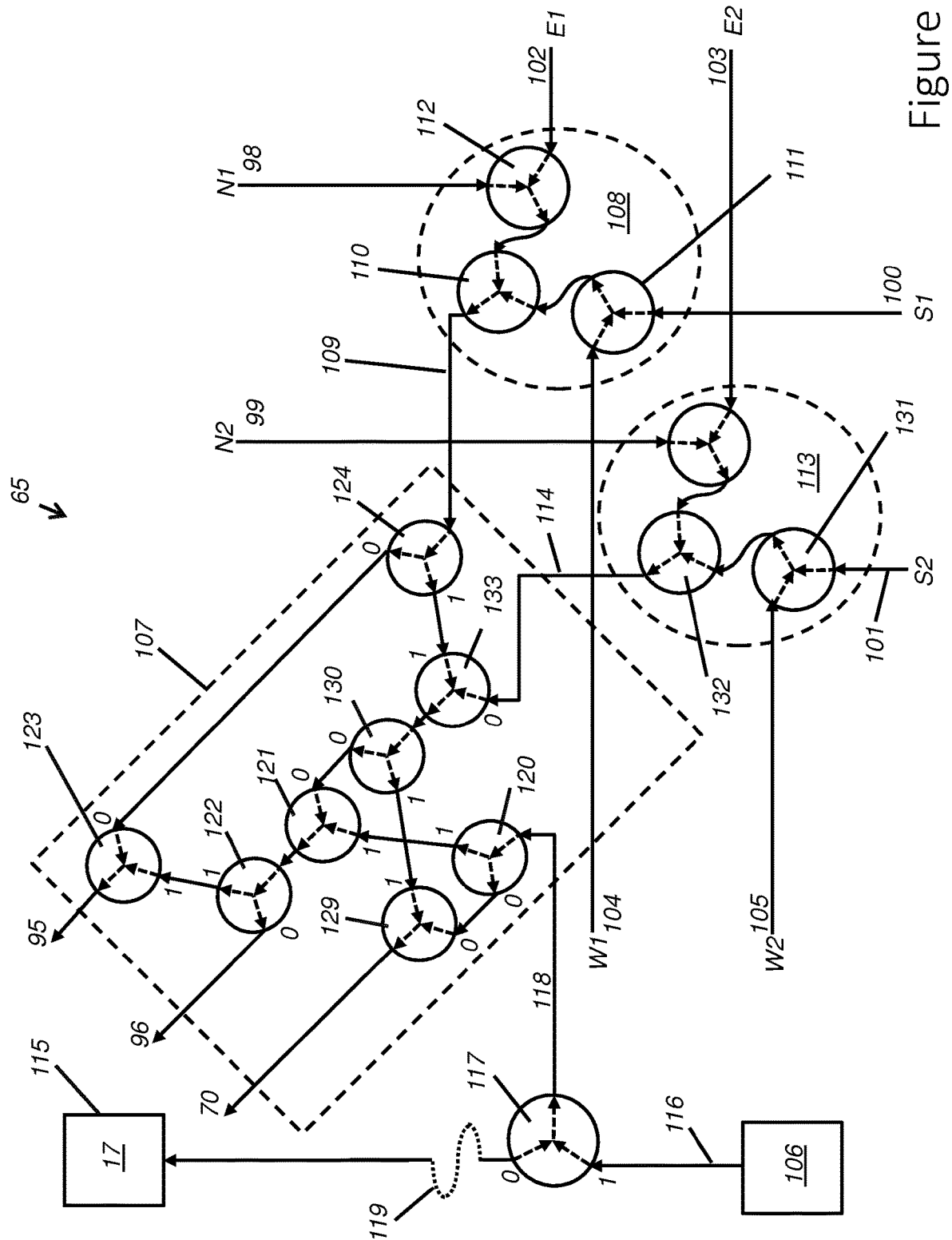
FIG. 12 is a schematic diagram of a typical second-level switching node in FIG. 8.

Circuits 89 and 91 are used in FIG. 12, which is a schematic diagram of an example embodiment of the quad-tree form of diverter 65. In that specific case, it has the form of a triple-layered node of the quad 'thick-tree', rather than in the form of one of the single-tree nodes that is illustrated by node 61 in the declarative connectivity 23 of FIG. 7. Each interconnecting signalling path between components illustrated in FIG. 12 comprises the seven signal links, as described for the acquisition and signalling in Hamlin. In the example of a second-level diverter-node 65, a plurality (d), d=2 of routes N1 98 and N2 99 enter, symbolically-speaking, from the 'North' and likewise S1 100 and S2 101 from the 'South, E1 102 and E2 103 from the 'East', and W1 104 and W2 105 from the 'West'. So, two routes each from the four cardinal directions (d=2) are shown in FIG. 12. Node 65 also communicates with special processing cell 106, which has third-highest scope. Each diverter node has d+1 paths passing downwards into the node and, in the example of node 65, these paths correspond with those labelled 95, 96 and 70 in FIG. 8. In the case of diverter 73 as shown in FIG. 9, diverter 97 communicates through these three paths and also has similar paths to three other d=2 diverters. Diverter 97 has d+2 further paths feeding it from above.

Once a complete route has been forged through the network and latched open for signalling, useful messages may be transmitted along that route which in due course may then be closed, perhaps temporarily, by removing the originating latching 'Acquire' signal and thereby freeing the constituent paths of the route for other users. The originating source of a searching route, in this case a port 17, retains the address-code of the acquired special processing cell for subsequent re-acquisition and message-transmission, and then uses the normal-acquire absolute-addressing mode described in Hamlin for follow-on transactions Likewise, the acquired special processing cell retains the address-code of the initiating-source 17 for route acquisition and message-passing in the opposite direction, when needed.

Diverters, of which circuit 65 is typical of the 'd=2' diverters, each connects to the four cardinal directions, downwards in the quad-tree, and also towards one of special processing cells 81, each with a pre-set scoping authority. For example, circuit 107 of FIG. 12 directs messages to higher authority special processing cells with a scope somewhat higher than processing cell 106 whereas, circuit 108 directs messages to lower authority special processing cells with a scope somewhat less than processing cell 106. In the case of circuit 108, a free-state signal, when set at 109 due to at least one of the four cardinal directions (N1, S1, E1, W1) permits a corresponding one of searching routes to be forged downwards through one of the 'free-state' cardinal directions out of 902; that is, if the search does not need to be sent to a pivot of higher scope. If a higher scope is intended by a searching source below 65, the 'non-directed free-space search' mode, controlled by the Acquire and Address links, switches 110 and directs the route upwards via route 109 in response to an address-link signal. The circuit 108 is arranged such that a type-A 111 arbitrates between routes 100 and 104, a second type-A 112 arbitrates between routes 98 and 102 and the third type-A 110 arbitrates between all four. The circuit 108 therefore offers switched search paths into and out-of any pair of its five terminals on condition of the availability of unemployed special processing cells and on condition of the search for any free segment of computing cells of desired scope. Circuit 113 bears these same logical features for paths N2, S2, E2 and W2 between quadrant-pairs, and for ascending path 114.

Circuit 108, as well as passing on searches at the same levels of authority, therefore permits the diverter to switch to progressively lower and to progressively higher levels of authority, as triggered by a successive bit-sequence applied by Acquisition-links and Address-links (such as H63L and H64L) to a selectable progression of tri-splitting switches. Each computing circuit within the port-interfaces 17 and the special processing cells has means to generate bit-sequences on the Acquisition-links and Address-links that direct a message-transaction route through the terminal connectivity, for input from a port 17 and for output from a special processing cell. Various combinations of pulses from the port, on the Acquisition and Address links trigger the type-A and type-B circuits along the route using line-settings, as described in Hamlin. The example diverter 65, for d=2, is configured to permit a search downwards from the highest scope at 70 to the lower scope at 96, and to the lowest scope at 95.

On the other hand, a user-signal sequence from 115 to select path 116, through type-B circuit 117, directs the ongoing route directly down to special processing cell 106 (if this processing cell is unemployed), which has the highest scope for this node level. If processing cell 106 is already owned by a user, there is no free-state signal at 117 from processing cell 106 and search for another free pivot of the same scope automatically follows a free-state search into path 118, and through node 65. The flying-lead symbol 119 in FIG. 12 indicates that, like diverter-node 74 of FIG. 8, a connection to a port 17 is not necessarily required but routes from elsewhere in the terminal connectivity may still acquire processing cell 106 through node 65.

As an example of the application of type-B switching operations, type-B circuits permit the following search modes:
 (a) during an initial search and acquisition of a special processing cell from now upward path H56 in FIG. 11, with change of requested scope, the Acquisition- and Address-Lines are used to direct the switch to a '1' branch before a free-state signal at H62R of a type-A switch can dictate the path taken by the signalling route towards the free-state signal on the constant-scope '0' branches, as before;
 (b) Once on the constant-scope path, if during an initial search and acquisition of a special processing cell from upward path H56, the free-state signal is lost after change of scope, the search continues upwards—remaining then on the '0' branches—until a further free-state signal has been detected at that new scope, upon which, the search proceeds downwards again towards a special processing cell and its pivotal computing cell, of that scope.

During such operations, the source counts Acknowledge pulses and compares them against stored tables of the standard modes of operation in order to track the progress of acquisitions, during the acquisition and re-acquisition processes.

As an example of implemented array-scopes, if it is determined that the user-accessible scopes of segmental connectivity segments be $2^{\wedge}10$, $2^{\wedge}14$, $2^{\wedge}18$, $2^{\wedge}22$, and $2^{\wedge}26$ computing cells (say), then the node 65 of this present description connects to the special processing cell 106 with the third-highest level of authority—that is, $2^{\wedge}18$ computing cells. Using a circuit similar to 65 but with only two ascending routes instead of three, a lowest-level node (d=1) such as 74 connects to one second-lowest scope special processing cell, commanding $2^{\wedge}14$ computing cells, and also to four lowest-level special processing cells, with direct access to $2^{\wedge}10$ computing cells. A binary thick-tree terminal connectivity 24, shown by way of example in FIG. 8, has four trees with four levels of diverter. The highest node 97 with d=4, has no further superior node-links but, if desired, might be connected for selectable direct access by a further port 17 (not shown) through an optional path like 119 of FIG. 12.

In order to describe the operation of circuit 107 of diverter 65 in a directed-search, by way of example, we assume that circuit 108 is receiving a free-state signal from only 'West' path 104, which is connected to a special processing cell of least authority scope. Special processing cells on paths 98, 100 and 102 are assumed to be already engaged. For an acquisition-coding signal from 115, seeking a minimal-array special processing cell, the signal-links in the highest authority route from 117, through path 118, activate the '1' branch of type-B circuit 120 to divert the route-switching to type-A 121, of mid-scope. Using the directed free-space search mode of that latter circuit, the Acquisition- and Address-Links have means to force the search to the next type-B 122, which is enabled by its '1' branch-selection to change the scope of the search again, to the lowest scope tree at A-type 123, as desired. At that point, the free-state signal from 104 via route 109, via A-types 111 and 110, and B-type 124, is permitted to direct the search downwards and this continues through 124, without deflection down the search-tree towards the available special processing cell. Finally, an acquired free-state processing cell below 104 transmits a long Acknowledge pulse in order to register completion of the chain, and also responds with its own address.

If a similarly-scoped prior acquisition signal has already reached 123 (say) from above, 123 holds the partial route from 117 in abeyance until the prior signalling is completed and un-latched. If the prior signal is a searching-signal, and the only available special processing cell (below 104) is then lost, 123 loses its free-state signal and the acquisition route switches upwards through route 95 to its superior higher-level diverter for further free-state routes of the same authority on the same lowest-scope terminal connectivity tree (in this example).

In this way, routes may be placed under the control of a port 17 in order to evolve and latch-open a messaging route towards any one conveniently-localised, unemployed special processing cell that has adequate scope for the user's array-processing requirements. The user interface circuit therefore has a multiplicity of operating states comprising at least a searching-state and when in a searching-state, the user interface circuit transmits a searching signal into the multiplexing network of diverters, each diverter being adapted to select a bidirectional partial-route in response both to the searching signal and to the presence of a free-state signal from a pivot in a free-state. The diverter also has means for selecting a partial-route, towards a pivot in free-state of prescribed scope, in accordance with both a searching-signal from the user interface circuit representing the user-designated scope, and a free-state signal from said pivot. In the event that the free-state pivot becomes otherwise acquired during the search, and switches out of its free-state, the diverter has additional means to redirect the search-signalling route to another free-state pivot of like scope. If no such free-state pivot is currently available, the user interface has switching-means to hold the searching-state in abeyance until another opportunity arises.

Figure 13:
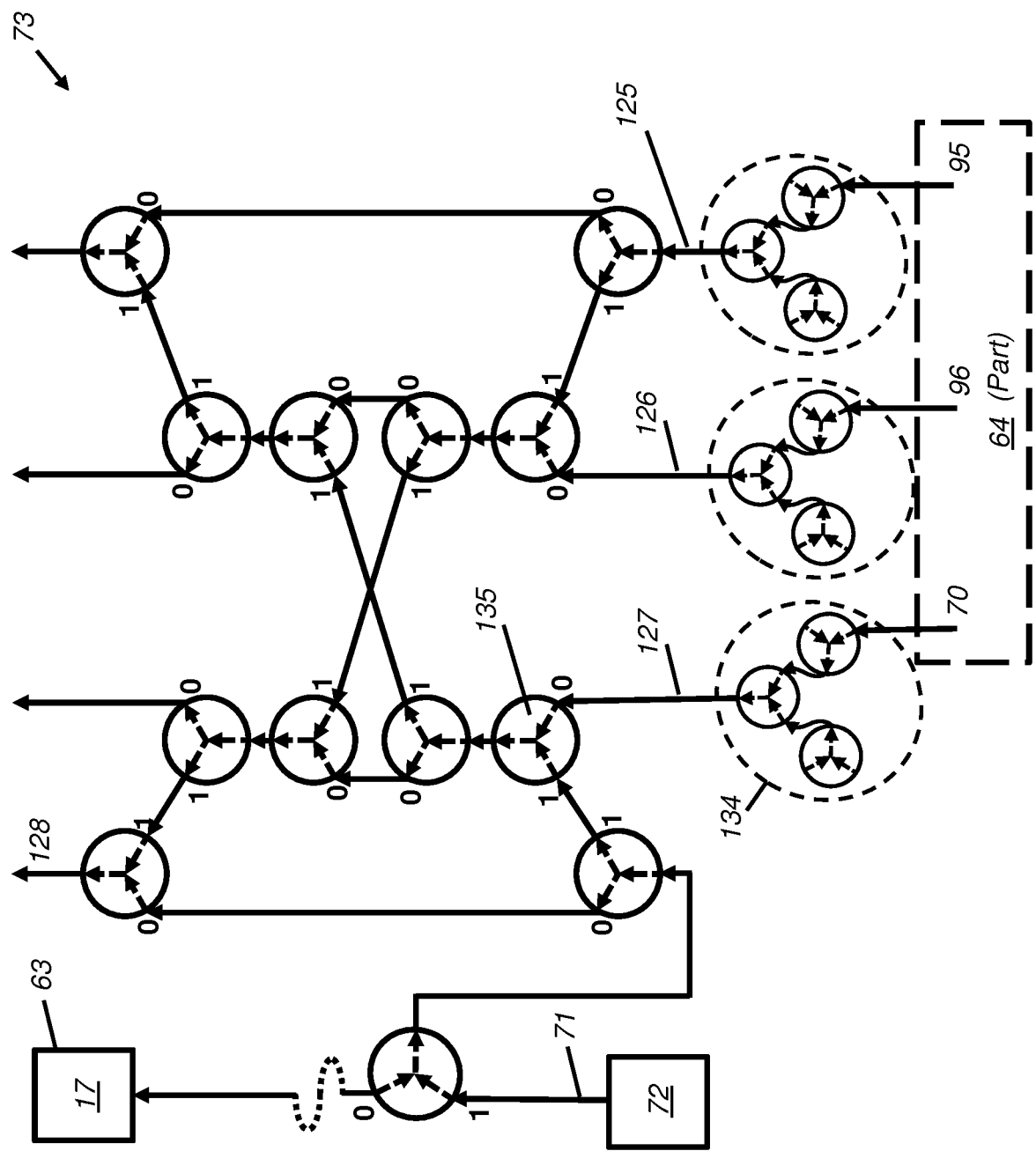
FIG. 13 is a schematic diagram of a typical third-level switching node in FIG. 8.

Once the user interface circuit has the address of a previously-acquired pivot it has means for transmitting a calling-signal into the multiplexing network, the calling-signal progressing through partial-routes by setting direction-switches through the sequence of diverters according to the address of the user-designated pivot. This then permits bi-directional communications between user and connectivity to be restored for subsequent transactions. In order to show how the terminal connectivity thick-tree interrelates the diverters, FIG. 13 shows a second example of a diverter circuit (typically 73 of FIG. 8), where d=3. In this case, the circuit-type 108 is replicated three times, and from 125, 126 and 127 three respective sets of quad-routes run downwards to each of the 'N''S', 'E' and 'W' directions in the same manner as illustrated in FIG. 12. One cardinal direction communicates downwards with a diverter exemplified by 65 (d=2), which is typical of the four diverters subtended by diverter 73, as illustrated in FIG. 9. The scope of special processing cell 72 in this case is at level four and this defines the constituent sub-tree of terminal connectivity 24 of which path 128 is a member, with scope $2^{\wedge}22$ computing cells in our example. The diverters have considerable logical complexity but it is to be noted that the total number of user access ports, and therefore the number of these nodes in the terminal connectivity, is orders of magnitude less than the total number of digital computing engines.

Similarly then, user port 115 in FIG. 12 has means to acquire medium-scoped special processing cell 80, with authority over $2^{\wedge}18$ computing cells (say), through type-B 117, if processing cell 106 is in free-state. In the absence of a free-state signal from 106, circuit 117 diverts the acquisition-path via route 118 to type-B 120 and transmits a short acknowledge pulse back to the user terminal. Otherwise, special processing cell 106 transmits a long acknowledge pulse to annunciate acquisition of, and communication with a suitable special processing cell of the required scope.

Assuming that this cell is not available, and the user terminal has therefore received a short acknowledge pulse from switch 117, the port-terminal acquisition logic has means to set the address link low in order to continue the search for a segment with the same scope through circuit 65, type-A switch 129, and on upwards via route 70. 129 could have a prior, temporary claim from below, from any one of the N, S, E and W directions—by way of switched type-B 130—if they also required a large cluster. In that case 115 must hold its link to 129 in abeyance as before.

Yet again, if search for a larger segment than the third level is requested by 115, a low address signal applied at switch 129 directs the search upwards through route 70 to the next higher diverter.

A directed acquire signal from route 101 to type-B switch 131 is accompanied by an addressing signal to direct the routing upwards from switch 132 to 114 and thence through type-A switch 133 upwards (rather than being diverted to the right) through the type-B switch 130 where the addressing signal diverts the route through 129 to 70, in this example. Path 70 feeds path 127 of FIG. 13, through the quad-splitting circuitry of 134, to type-A 135 where the search route first meets a free-state signal from the fourth-level scope special processing cell 72, assuming it is unused, and remains unacquired—for example, by port 63—during the normal free-space search for the final stages of acquisition.

Each user terminal has a logic-map of the switches making up the diverters and has a software routine that tracks progress of routing from Acknowledge pulses in order to send the appropriate address-directing directives into the terminal connectivity 24 as the Acknowledge pulses are received.

As hereinbefore indicated, the embodiment of the terminal connectivity 24 described above includes an additional multiplicity of user input-output port interfaces 17 with communication routes respectively to a like multiplicity of dedicated special processing cells that may be co-ordinated to load a set of sub-arrays. Components 82, 84 and 83 in FIG. 8 illustrate the arrangement, where a special processing cell 83 has the lowest authority, and this array is dedicated to a single port 82. This has application to the co-ordinated, concurrent loading and reading of a large array of data, for example, by simultaneously streaming a set of much smaller, component-arrays, from a large matrix of serial ports, into the cluster allocated to the large array. For declarative programming tasks without arrays, further user interfacing paths through terminal connectivity 24 may be incorporated to access special processing cells with no array-processing responsibilities and no direct authority over pivots.

The forgoing description of the terminal connectivity multiplexer switching circuits and the controlling message-stream permit a multiplicity of data-transmission paths 18, from a like multiplicity of user terminals, for concurrent distribution of applications and data into and out-of the Connectivity that correspond with disparate user-tasks. Each user-path accesses its own interfacing means 17 into terminal connectivity 24 which carries out the said distribution process in a manner logically independently of other user paths. Each said user-task, to be processed by the Connectivity, comprises in use a serial data-stream representing a structured-programming style such as conforming to a functional programming language. This preferred style of language is rigorously structured with clear delimiters between functional names and arguments. In the example case of Lisp as used for illustration in this specification, the delimiters are, by convention, binary-codes for open and closing brackets and space-bar. For this purpose, selection-logic in the interface-means within 17 interprets the delimiters in the input digital code stream as nested, but discrete functional expressions and records each expression destination in order to maintain ordered threads of code from expression to expression as declarative connectivity 23 shares them across the machine's special- and standard-processing cell circuits. As an optional feature, the interface 17 may also include computer processing components (not shown but common in the state of the art) that operate multi-tasking utilities. These interfacing computing components also have means for storing and subsequently retransmitting the data-stream segments, each to a respective special processing cell of the declarative connectivity that ultimately interprets code-functions and arguments, as will be described by example in due course. However, this option possibly has the well-known software-management risk of compromising user-separation, if used by multiple users.

The said interface 17 has means for directing a functional expression of the said serial data-stream, with its associated delimiters, to a special processing cell once interface 17 has forged a route across the terminal connectivity 24 to a corresponding one of special processing cells 21 by the network-switching means just described with respect to FIGS. 8 to 13. Since the interfacing processing of 17 has tracked the route to its acquired special processing cell, as hereinbefore explained, the addressing of the route is stored in the interface memory and the normal acquire and signalling process may be repeated to the same special processing cell for further subsequent actions. Additionally, if desired by the user, a second and subsequent search may be pursued dependent on the needs of the task, to a further special processing cell, the various resulting threads of code and their destinations being recorded for further access by the inputting interface.

At least some of the user-message streams incorporate directives for commanding a pivot 22 (via its associated special processing cell 21) to control the distribution of array-data over array-processing segmental connectivity 25, amongst selected sub-array groups of computing cells such as 38 of FIG. 4. The corresponding pivot, if required by the user coding, has means configured to distribute, to its respective array-group, data-array and instruction codes for processing operations to be carried out by the individual computing cells in a group.

A software-application, input as a formatted digital stream to the Connectivity, is pre-ordered as a spreading 'tree' of functional expressions, the operations being distributed to standard processing cells 19 across declarative connectivity 23 by the acquired special processing cell. The processing cells have processing and transmission means adapted to distribute a succession of these functional expressions, allocating them to a similarly-spreading pattern of standard processing cells, the links being passed on to further standard processing cells in a recursive form of software distribution through the administrative connectivity 23, as explained by way of example in Hamlin and subsequently herein with regard to FIGS. 43 and 44. Responsibility for each single functional expression in the distributed software branches then rests with a corresponding single processing cell which has means to interpret the functional-part of that expression and any arguments included in the expression. Free-State search logic, as previously described, selects a said standard processing cell from unemployed standard processing cells and this acquired cell then has authority to be a 'parent' cell in the next level of expression evaluation. The need by the processing cell, acting as parent, to expand its authority for completing its own expression is satisfied by said parent claiming further contributing 'child' processing cells by means of the search and addressing logic contributed by the declarative connectivity 23. In this recursive manner, the whole software application commands itself to be distributed across previously unemployed resources. A 'parent-child' relationship is stored in memory-location pointers within each processing cell so that parents and children may employ such pointers for ongoing transactions up and down the interlinked. spreading codes of the software tree-structure.

In a Connectivity with substantial resources, a multiplicity of user software applications may be interleaved independently amongst the resources. Since each processing cell has authority for only one expression within one task, the declarative connectivity 23 searching process autonomously devolves complex software responsibilities, ultimately down to an 'atomic' primitive level. At that irreducible, 'atomic' level, the standard processing cell has a self-contained ability to compute the local result without further contributions, according to its own repertoire of microcoded primitives, and that result it transmits back to its own parent standard-processing cell and through a chain of such processing cells, back to the originating special processing cell and hence back to the user-port 17.

Provided that they have previously been acquired and owned (temporarily) by the user-task, further special processing cells can be employed in said autonomous devolution. An example of this case is the requirement for acquisition, within said user-task, of array-processing operations requiring further arrays of different sizes.

As explained in Hamlin, the declarative connectivity provides access by all processing cells to free-state signalling networks into which every unemployed standard processing cell passes a free-state signal such that any processing cell, searching for functional support, is enabled to acquire multiple unemployed supernumerary standard processing cells, and to feed these acquired 'child' processing cells themselves successively with sequences of instructions. When a task has been terminated in a processing cell for any reason, that processing cell autonomously resets its 'free-state' flag in order to register its unemployed status to the Connectivity.

One preferred embodiment of the invention employs monitors of the said free-state flags at the nodes of the declarative connectivity trees, the monitors being connected to switches in the free-state lines that temporarily inhibit the flow of new-input applications into parts of the declarative connectivity. A criterion for the density of activity at which inhibition can conveniently be made adjustable would allow, for example, an access-limit at a locale to be set at an upper limit of perhaps 70% across set groups of digital computing engines. A further embodiment of the Connectivity incorporates segregated multi-tasking circuitry in the standard processing cells, but not in the special processing cells, so that several free-state flags, passed similarly into the declarative connectivity may invite several independent user-applications into the cells for time-sharing of the cell resources. Each standard cell then has storage means for isolating the parameters and processing of each application's access-rights.

A further feature of the invention enables decision-tree structured software also to be distributed across clusters of computing cells. An example is the arrangement of the structured programming language CMLISP within a hypercube, as shown by Hillis et al. However, it is a preferred implementation of the current invention that control of the Connectivity be by means of the Administrative Connectivity operating, for the recursive connectivity, as a 'host processor' which is adapted to feeding array-processing instructions to clusters of computing cells. A suitable connectivity in which said declarative connectivity includes a tree-structured parallel processing apparatus is described with features as stated in any one of claims 1 to 26, or as stated in any one of claims 40 to 73, of U.S. Pat. No. 5,434,972, preferably augmented by further array-processing primitive routines hard-coded into the special processing cells and computing cells. Each of these further array-processing primitives possesses a unique binary-coded name as is common in the art and each has associated argument numbers and symbols that categorize the size and form of arrays to be manipulated. The processing cells in an application call the primitives themselves within more complex software structures as illustrated by way of examples in due course, and certain special processing cells pass each call on an array-primitive to an associated free pivot of the required scope. The pivotal computing cells and standard computing cells have decoding logic that causes further, even more primitive array operations to be carried out. As hereinbefore explained, these latter primitives are directed to the computing cells for operations that lie within the authority of the pivot, which encompasses the scope of the array of interest.

Therefore, an advantage of a massively parallel declarative connectivity of the type shown in FIG. 7 is its ordering and correspondence with the numbers and address distribution of the computing cells 20 and 42 typically in the segmental connectivity of FIG. 4, for example.

The segmental connectivity will now be elaborated.

FIG. 2 shows that Connectivity 10 incorporates recursive connectivity apparatus 12 that includes segmental connectivity 25 and broadcast connectivity 26, and that interconnects the computing cells of the standard digital computing engines 13 and the pivot digital computing engines 14. As hereinbefore explained, each pivot digital computing engine has a special processing cell and a pivot computing cell, and the special processing cell transmits digitally-coded instructions from the administrative connectivity to its directly-connected, associated pivotal computing cell 22 each of which has means to control a segment of standard computing cells (such as the group 34 in FIG. 3) by means of communications through segmental connectivity 25 and broadcast connectivity 26. It is the purpose of that segment of computing cells, as a clustered sub-connectivity, to perform operations on arrays of programmable routines and data-elements resident in those computing cells. The standard computing cells thus together compose, along with one pivotal computing cell, at least one subsidiary array-processor, such as 34, of lower dimensionality and scope than that of segmental connectivity 25. In addition, broadcast connectivity 26 permits task-broadcasting from the pivot to its sub-connectivity of computing cells and also permits synchronisation of processing tasks in the recursive connectivity, as will be described in due course.

As hereinbefore indicated, the Connectivity embodies a large plurality of bi-directional signalling interconnections and one example of recursive connectivity 25 communication network is in the form of a regular n-dimensional binary-hypercube graph, which employs $2^n$ computing cells interconnected by $n \times 2^{(n-1)}$ such interconnections.

Figure 14:
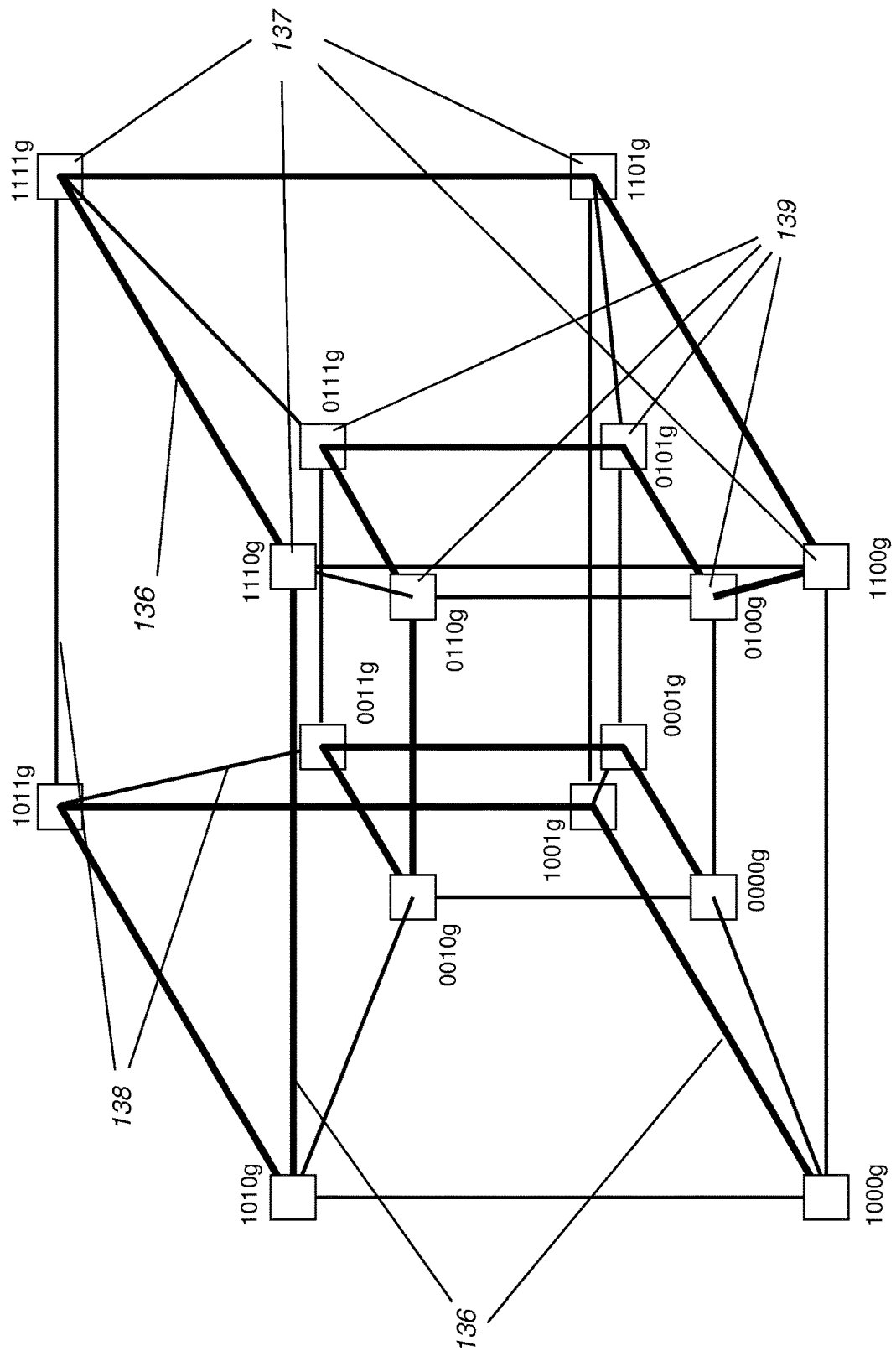
FIG. 14 is a schematic diagram of a notional four-dimensional hypercube of interconnections between digital computing engines and showing a recursive curve.

FIG. 14 shows a simple, four-dimensional example of this type of network and indicates in bold form one suitable recursive curve 136 running through the interconnections between the computing cells such as 137. In this specification, we use 'g' to denote Gray-Coded bit-formats that follow a cyclic sequential numbering system that is equivalent to, but different in coded pattern from the sequence of decimal integers and binary-coded integers. All these types of coding have a monotonic counting sense. The Gray-Code numbering system is the pre-eminent recursive identification scheme for recursive, hierarchically-nested structures and has been used by Hillis (The Connection Machine) and Hamlin. It will be seen that the said recursive curve in FIG. 14 commences at computing cell address 0000g and progresses to 0001g, 0011g and 0010g. Symbolically, these binary patterns are given their familiar designations '00', '01', '03', '02', although the equivalent decimal counting order would be [0, 1, 2, 3]. From there this curve crosses passes through group 139, 0110g, 0111g, 0101g, and 0100g; in decimal symbols: 6, 7, 5 and '4', whereas the equivalent conventional decimal counting order would be [4, 5, 6, 7]. The well-known reflected Gray-Code numbering system continues along the curve with the patterns: 1100g, 1101g, 1111g, 1110g, 1010g, 1011g, 1001g and 1000g, this last of which has equivalent decimal value 15 with conventional binary value 1111b. The completing links for the binary hypercube are illustrated as 138. The transformations between Gray-Code and binary may be carried out with simple, well-known bit-manipulating procedures. Moreover, the foundational operations of integer arithmetic can also be carried out in the Gray-Coded numbering system (refer to Lucal and Doran).

Figure 15:
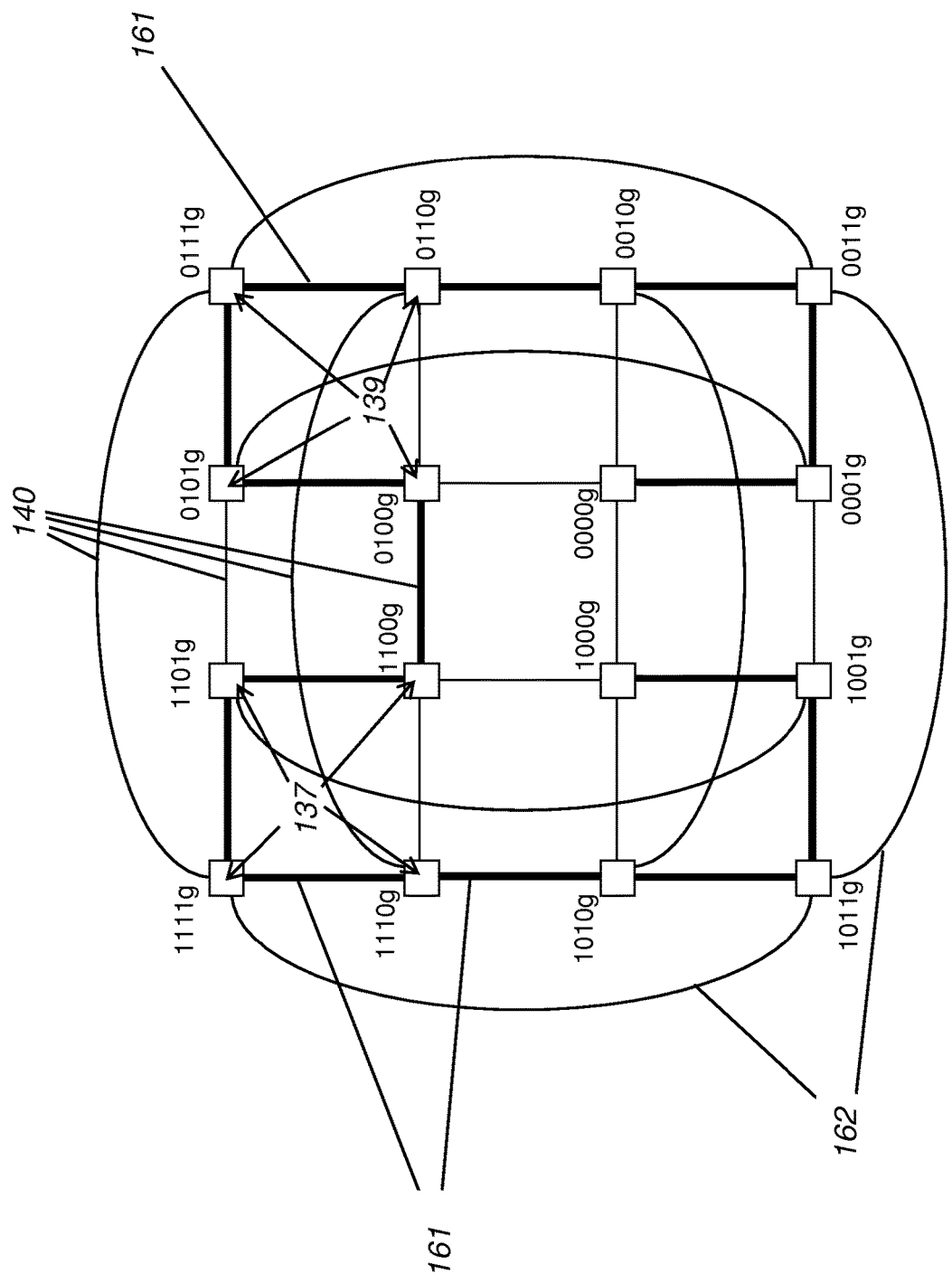
FIG. 15 is a schematic diagram of the same notional four-dimensional interconnections of FIG. 14, laid out as a two-dimensional network, and showing the same recursive curve as a 'H'-Curve.

The computing cells for the small (four-dimensional) binary-hypercube of FIG. 14 are also shown distributed in a planar form in FIG. 15 along with the interconnections for this particular recursive curve, called herein the 'H-Curve'. It is to be noted that this curve differs in form from the space-filling H-Order curve discussed by Bader (amongst others). The figure also shows some of the remaining interconnections that complete this small hypercube, such as 140. In this specification, the H-Curve has particular relevance to the organisation of matrices as to be elaborated in due course. As an example of the operations of value to matrix manipulation it will be seen, by reference to FIG. 14, that array-elements stored in segments 137 and 139 can be interchanged in two primitive operations (synchronised for example, by 'odd' and 'even' half-cycles of a clock-cycle) over the four, single signal-links 140 in FIG. 15—called herein a 'SWAP' operation. It is also to be observed in this form of network that each computing cell addressed with an odd-parity address only connects to computing cells with an even-parity address, and vice versa. The recursive curve through the hypercube of computing cells is defined by an algorithm stored within each computing cell that determines the addresses of each of two neighbouring computing cells along the curve from each said computing cell. By varying the form of the algorithm, the computing cells select different sets of paths to form a variety of such curves.

In addition, in response to an instruction passed in common to an array-processing cluster, each cell active on one half-clock-cycle in a sub-connectivity has means for selecting and signalling each of their neighbours in a prescribed sequential order. In a hypercubic network, the order typically traces each dimension of interconnections in turn and this has application, for example, to manipulation of matrices and to sorting arrays of elements.

Figure 16:
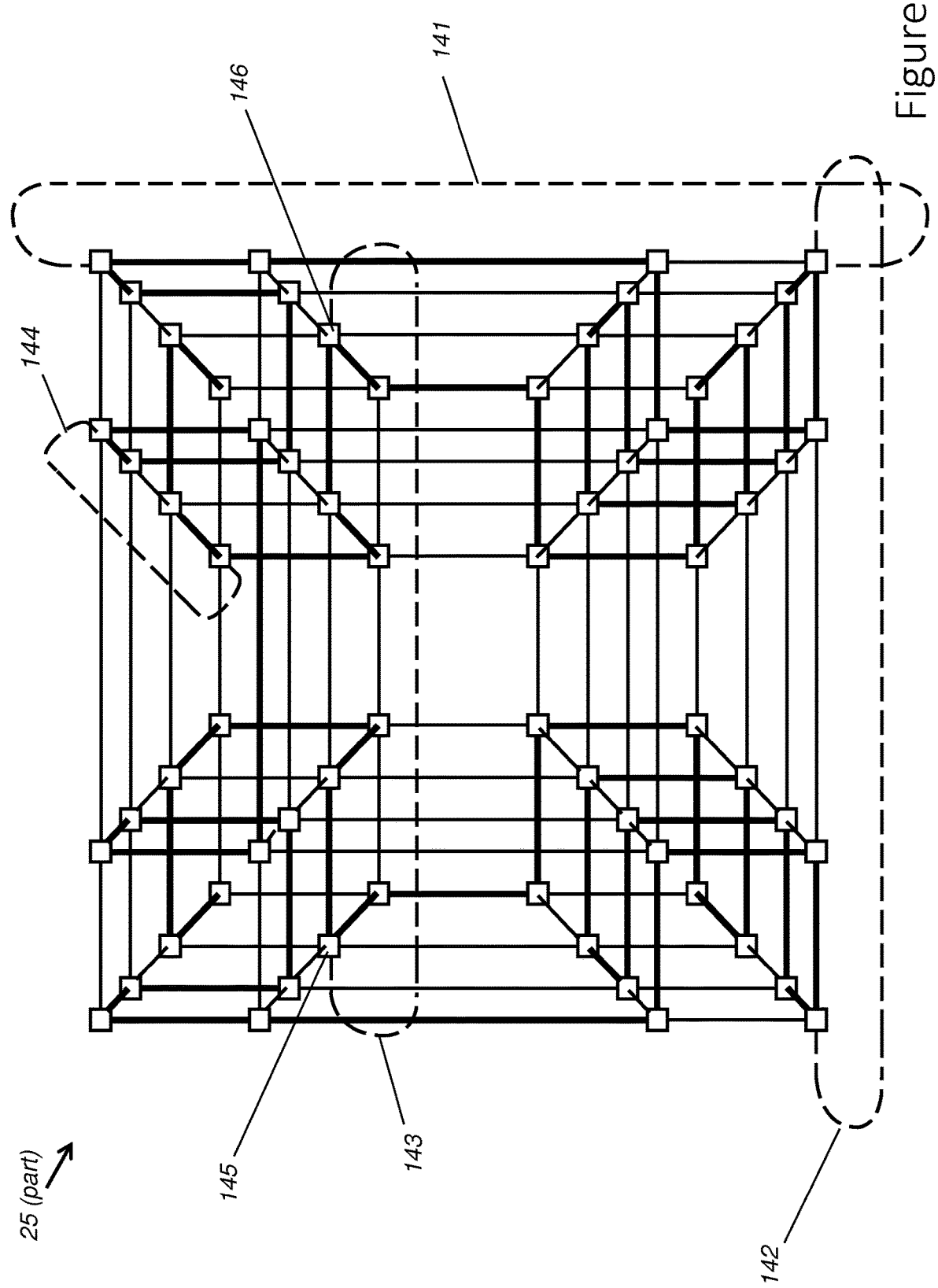
FIG. 16 is a schematic diagram of a k-ary, n-cube of interconnections, and recursive curve, where 'k' is 4 and 'n' is 3, along with typical wrap-round links to form a k-ary, n-torus.

A further example of segmental connectivity 25, in the form of a k-ary n-torus, is shown in FIG. 16. Here, k is the integer-number of computing cells along each dimension ('2' in the case of binary-hypercube) and 'n' is the number of dimensions. FIG. 16 therefore shows the bidirectional paths in a 4-ary 3-cube. This particular example is symbolised as a (4, 3) hyper-cube, which is understood to embed a recursive curve such as those illustrated earlier in FIGS. 3 and 4. In this representation, integer k is chosen to be a power of two in order to preserve the embedding of higher order recursive curves, so that the next higher 'k' is 8. Preferably, this topology is improved by wrapping routes around edge- and corner-computing cells, some of which are illustrated in FIG. 16 by dotted-lines, in order to embody a k-ary n-torus, for which the illustrated (4, 3) cube becomes a (4, 3) torus by the addition of all such wrap-around routes exemplified by 141, 142, 143 and 144. In general, a (k, n) torus incorporates k^n computing cells interconnected by nxk^n bidirectional signal routes. The mathematical forms of these interconnection patterns have been given herein in the earlier text related to FIG. 2. Each torus computing cell connects with 2n signal-adjacent neighbours. In this, it will be appreciated that large geometrical distances will generally separate some of these signal-adjacent neighbours, for example computing cells 145 and 146 via one of the signal paths 143, and this is regarded as an important feature of the Connectivity in distributing data widely across the machine. The additional wrap-round routes remove the edge effect of the cube and provide, for example, means to march the data-elements of an array, in one segment of computing cells, in 'bucket-brigade' order through the segmental connectivity for relocation to an alternative segment of computing cells, by a switch-means as typically espoused by Hillis.

The principles of practical realisation of notional n-dimensional networks of this type are well understood within the state of the art. It will be understood that strictly-formed Cartesian n-dimensional meshes with dimensions greater than three, typically in the form of k-ary n-cubes, are notional concepts yet such meshes can be readily represented in practice as a flattened network for implementation in multi-layered planar circuitry, whilst retaining their signal communicating topology. U.S. Pat. No. 4,598,400 (Hillis), inter alia, espouses binary hypercubes (that is, k=2) in 15 dimensions; i.e., symbolically as a (2, 15) torus.

Each processing element in the Connectivity, by virtue of the n-dimensional form of the recursive curve and hierarchical addressing, is enabled to compute its own network-location as easily along a one-dimensional string-array embedded in the curve, as within a two-dimensional array, a three-dimensional array and so on up to n-dimensions. By this means, each of the connectivity patterns for a given number of computing cells, such as those for example making up a three-dimensional connectivity can be represented equivalently as a two-dimensional sequence, a one-dimensional sequence or indeed an n-dimensional sequence by using a single, uniform monotonic sequence of addresses. This is an important feature of the invention because this common n-dimensional connectivity can be used for segmented linear data sequences (as in sorting operations), for nested planar arrays (as for matrix manipulations) and for applications such as multi-dimensional digital differential analysis. Moreover, by setting a 'dimension-parameter', 'p', representing the selected number of dimensions p of a user-array, a single data sequence distributed among the computing cells along a segment of the recursive curve of computing cells is thus software-switchable between the form of a linear sequence and the form of an equivalent p-dimensional block (as may be appropriate for modifying certain processing applications).

Figure 17:
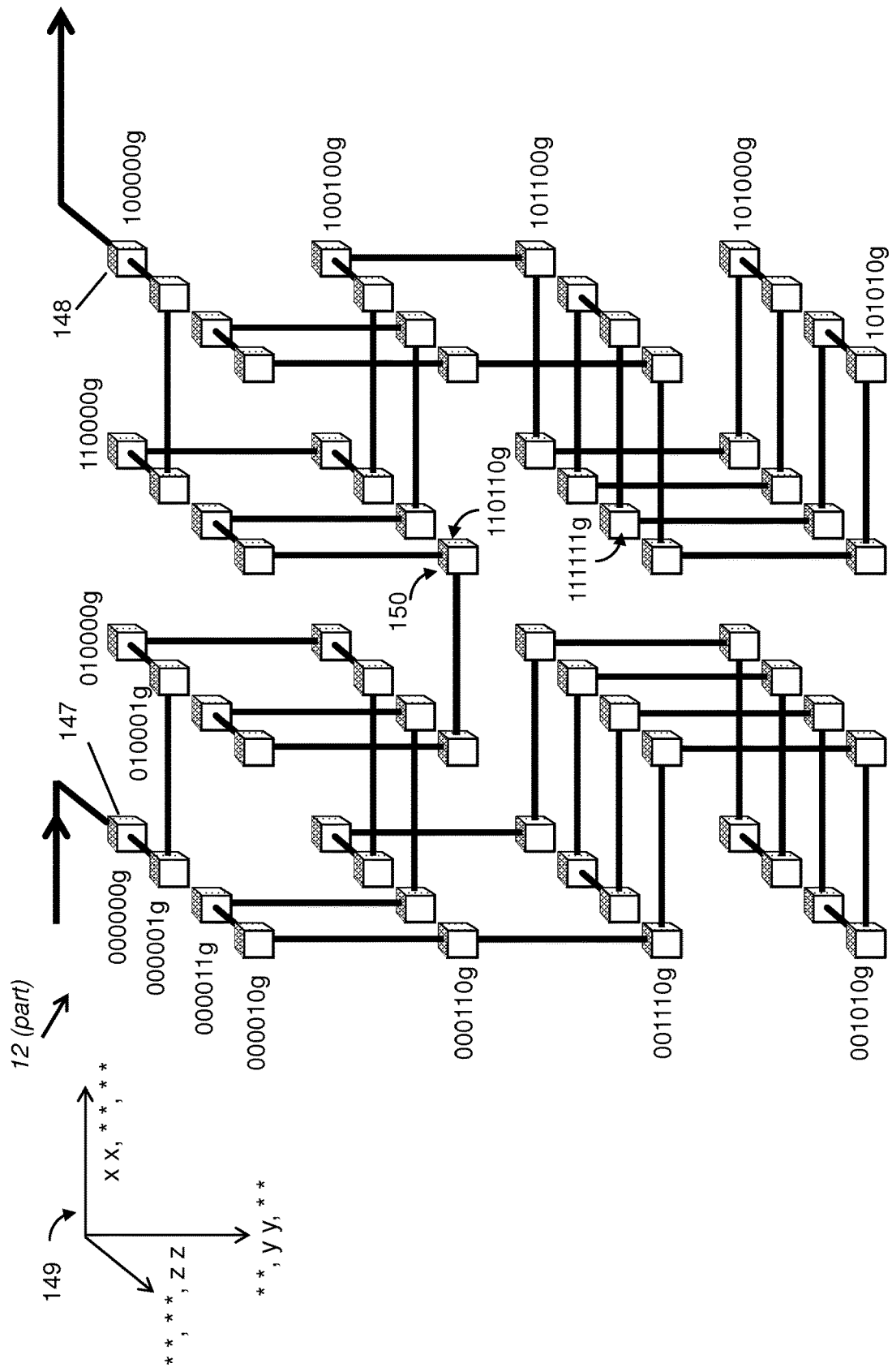
FIG. 17 is an elaboration of FIG. 3 showing one form of addressing of digital computing engines.

FIG. 3 illustrated one example of a multi-dimensional, (4, 3) Hilbert curve and FIG. 17 shows a typical addressing arrangement in Gray-Code form. The recursive Hilbert space-curve, in this example case, is traced through three dimensions of computing cells in the direction of the lowest address 000000g, 147 to the highest address, 148 100000g (for 64 computing cells). Various, representative three-dimensional reflected Gray-Code addresses are also shown which typify the locations of the computing cells along the three axes of this particular curve. One preferred arrangement of the bits in the Gray-Coding is shown symbolically as 149, where the z-axis is out of the page and the sequence of bits for each of the axes is as shown and each bit-sequence for each axis is itself a Gray-Code. The spatial-coordinate and address for computing cell 150 is thus (x, y, z)=(11g, 01g, 10g)=110110g, produced by concatenating the coordinate values from left to right and that scheme can be extended to the requisite number of hypercube dimensions.

For each computing cell there exists an integer-count along the curve, called 'rho' by Butz. In "Space Filling Curves and Mathematical Programming", Butz derives the n-dimensional value of rho by means of an algorithm in terms of n-dimensional coordinates; that is, three in the said (4, 3) example. Lawder (with trivial corrections to his text) provides the inverse derivation. Rho for the computing cell 150 is '32' in decimal, 100000b in binary, and 110000g in Gray, compared with its spatial address: 110110g. The Butz algorithm generates one version of the general (k, n) Hilbert curve which has application in data-searching and data-sorting. The algorithm is used to pre-compute the Gray-Code 'rho' for each computing cell, and for its relative addresses with respect to its two signal-adjacent neighbours along the curve, for loading into each of the computing cells in the recursive connectivity. Due to its complexity, the algorithm may be computed off-line for installation in the computing cell memories, perhaps at the time of manufacture. More curves of this nature can likewise be stored in the computing cell memories for selection and use in different applications.

Figure 18:
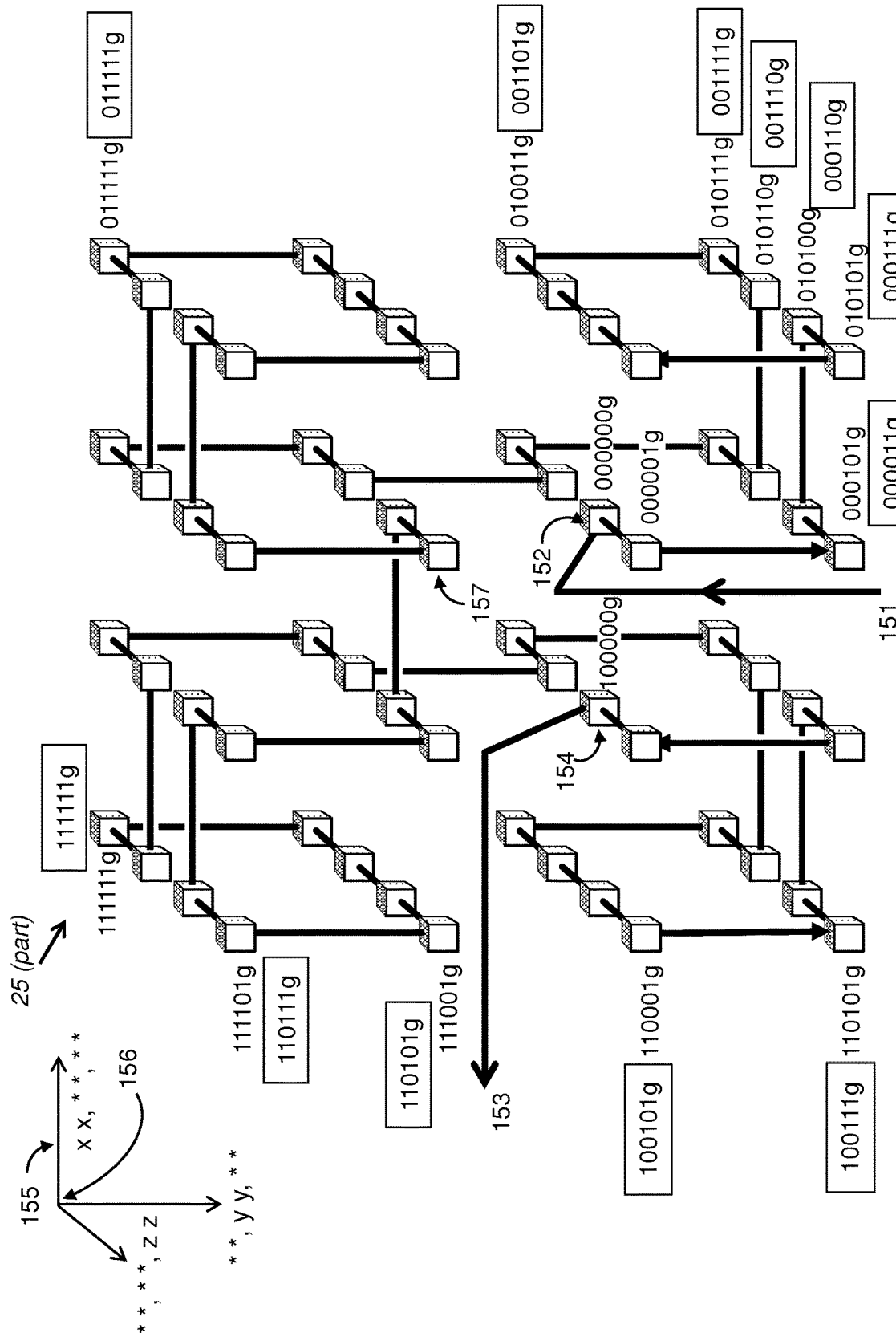
FIG. 18 is an elaboration of FIG. 4 showing a further form of addressing of digital computing engines.

FIG. 18 reproduces the form of H-Curve in FIG. 4. It represents a (4, 3) hypertorus entering at 151, passing through the digital computing engine 152 at address 000000g, which is at a physical location convenient both for matching the addresses for a selected one of the networks within the administrative connectivity and for easing scalability of address-numbering as the Connectivity is scaled up to embodiments with larger numbers of digital computing engines. The curve exits to further segments, via route 153, from computing cell 154 with 'rho' address along the curve 100000g (that is 111111b, or decimal 63). In this illustration, the 'rho' distances for a selection of computing cells along the curve are boxed. For this example, spatial addresses of computing cells are shown with the coordinates ordered according to the axes 155, with an origin 156 that is situated at computing cell 152, so the spatial-coordinate address (x, y, z) of 157 is (00g, 10g, 01g), with 'rho' address 010001g (that is, decimal 30).

The H-Curve 'rho', by contrast with the Butz form, has a trivial relationship to the spatial Cartesian coordinates. Its resulting spatial uniformity through its range of m-dimensional structures permits direct isometry in translation between congruent segments that, for example, makes matrix relationships enantiomorphic.

Figure 19:
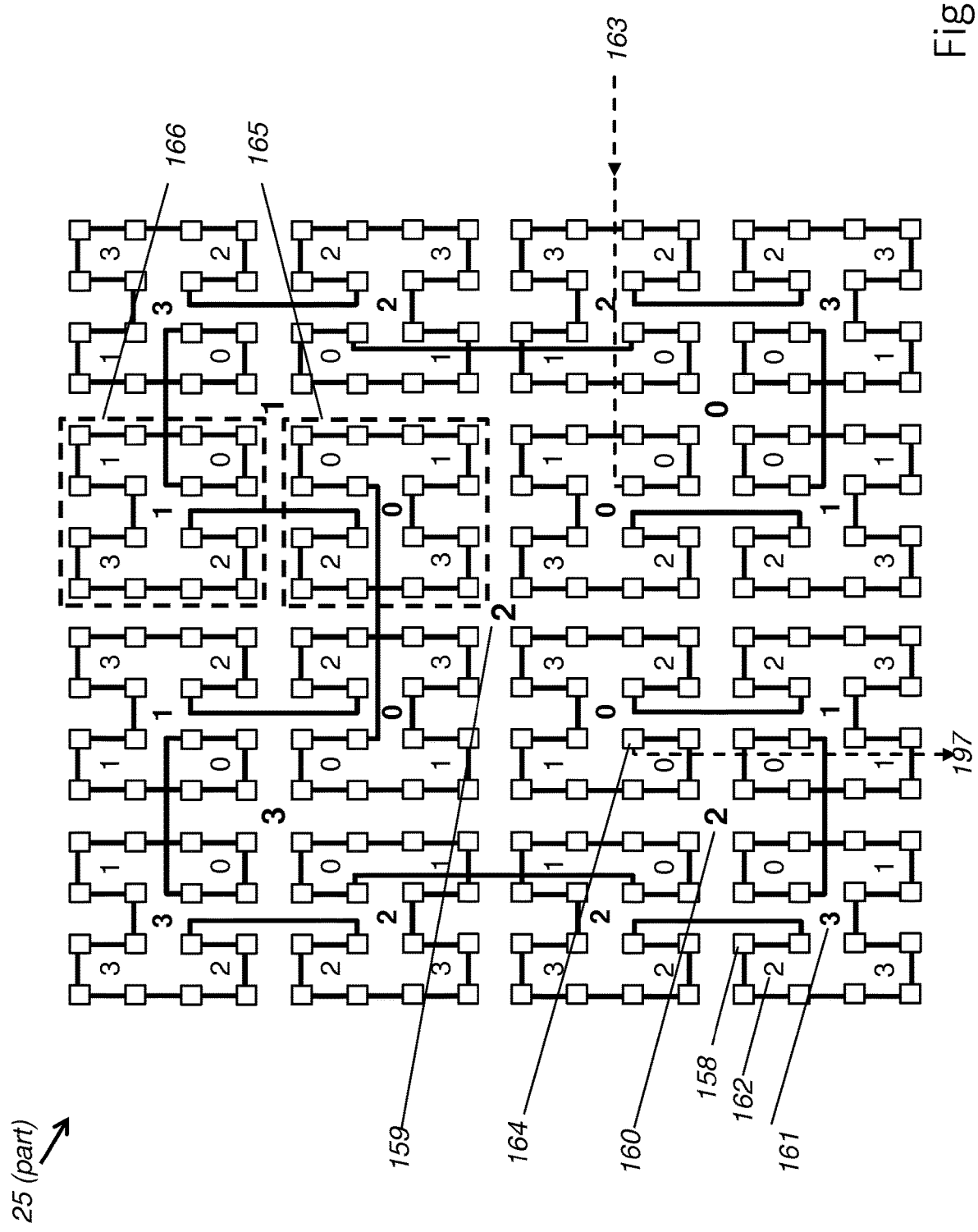
FIG. 19 is an extension of FIG. 15 to eight-dimensional recursive H-Curve showing a compact, hierarchical addressing scheme for the digital computing engines.

The recursive H-curve is illustrated for the three-dimensional case in FIG. 4 showing its simpler embodiment than that of the Hilbert curve in FIG. 3. The H-curve has particular application to parallel matrix manipulation as will be explained in due course in this specification. In each case, the m-dimensional curves are contained in squares, cubes and hypercubes and can be flattened out into a regular two-dimensional Cartesian pattern, for example as typified by FIG. 19, and typical of the layout of digital computing engines in an integrated circuit. FIG. 19 illustrates an eight-dimensional H-curve, of degree 2 (that is, as contained within a eight-dimensional binary hypercube), where the 'degree' is the number of CEs along each edge of a hypercube and of a torus. FIG. 19 is equally, therefore, an illustration of a four-dimensional curve of degree four (4, 4). FIG. 19 illustrates one preferred arrangement of computing cell-addressing where computing cell 158 has address formed from the top-level two binary-digits of this segment at 159 shown arbitrarily as the symbol '2' (i.e., 10g), the next level at 160, in that case exemplified by '2', the next at 161 by '3', the next at 162 by '2' and the lowest level at 158 by '1' (not marked). The address of the computing cell at 158 is therefore the symbolic sequence * * ... * (2) 2 3 2 1g, which equates to the full Gray-Code form of binary digits: * * ... * (1 0) 1 0 1 1 1 0 0 1g, the leading sequence '* * ... *', representing higher-dimensional address digits for a larger Connectivity. Entry 163 into the curve of the illustrated segment is via computing cell address ** ... *(10)00000000, and exit 164 is through computing cell 165 with address: ** ... *(10)10000000. For reasons of clarity, all connectivity signalling-paths, other than those required for the curve, are not shown in this figure but the rest of those for the segmental connectivity conform to the generalised algorithmic expression for hypertorus signalling-paths given hereinbefore. Some examples of these latter paths are shown in FIG. 20. computing cells in matching segments such as 165 and 166 of FIG. 19 intercommunicate as congruent forms of the H-Curve through said hypertorus signalling-paths.

Figure 20:
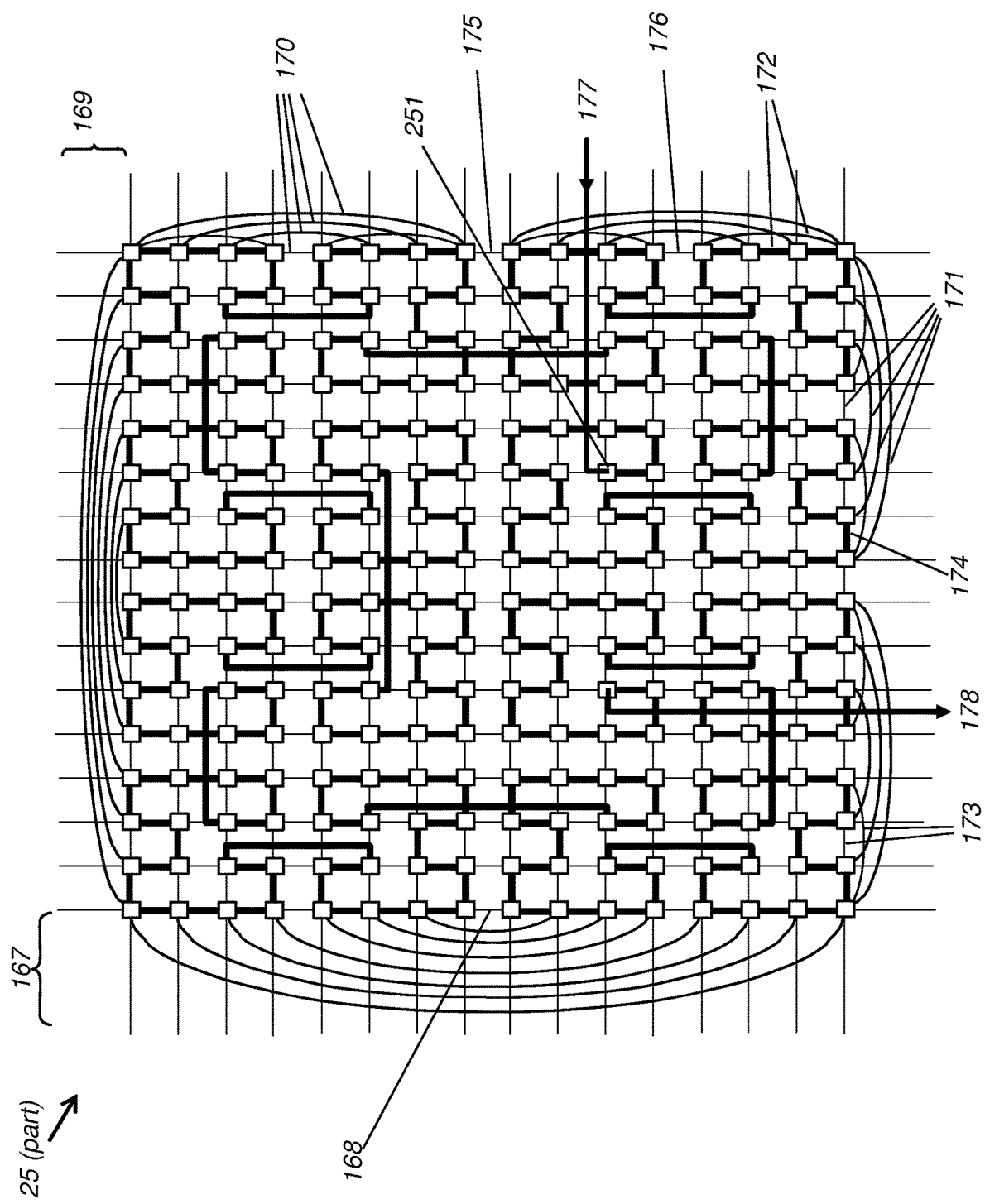
FIG. 20 is a second view of the network of FIG. 15 showing some hypercube connections.

FIG. 20 shows some of the latter said bi-directional interconnections in a full eight-dimensional binary hypercube—with 2^8 computing cells—where the illustrated links such as the group of curved links 167 (including 168) are intended to imply an identical pattern of links for all columns of computing cells, and group of curved links 169 similarly implies an identical pattern of links for all rows. By means of the eight typical column-links 167, the block of computing cells in the upper-half are enabled to SWAP data-elements with the lower-half; by means of the eight typical row-links 169, the block of computing cells in the right-half are enabled to SWAP data-elements with the left-half. This arrangement continues down to quadrants of computing cells, using column links typified by the four column-links 170 and four row-links typified by 171. This hierarchical operation is repeated through links 172 and 173, and finally at the lowest level: through single links such as 174, 175 an 176. In the case of the H-Curve, the curve through other segments enters via 177 and exits via 178. Within the segment, the curve utilises the aforesaid paths as appropriate to its algorithmic form.

FIG. 21 shows an algorithm for a recursive H-curve. It is advantageous that the n-dimensional coordinates along the top line 179 have Gray-Codings, rather than their equivalent binary integers, so that the transformation into H-Coordinates at 180 is easy to derive, as illustrated in the algorithmic transformation 181. The example sequence at 182 is the five-dimensional Cartesian coordinate value of a digital computing engine address in a (8, 5) torus. The same digital computing engine has the 'rho' value indicated at 183, and when flattened out into a two-dimensional Cartesian plane, the (x, y) Gray-Coordinate of the same digital computing engine is at 184. In this last value, a leading zero bit 185 is required to make up the x-coordinate.

The Connectivity therefore has means to select a locus such as in the form of a recursive H-curve sequence, being an n-dimensional recursive curve sequence conforming to the characteristic algorithm described with regard to FIG. 21, in which the coordinates of the nodes of the curve conform with recursively-coded addresses, such as Gray-coded addresses.

Figure 22:
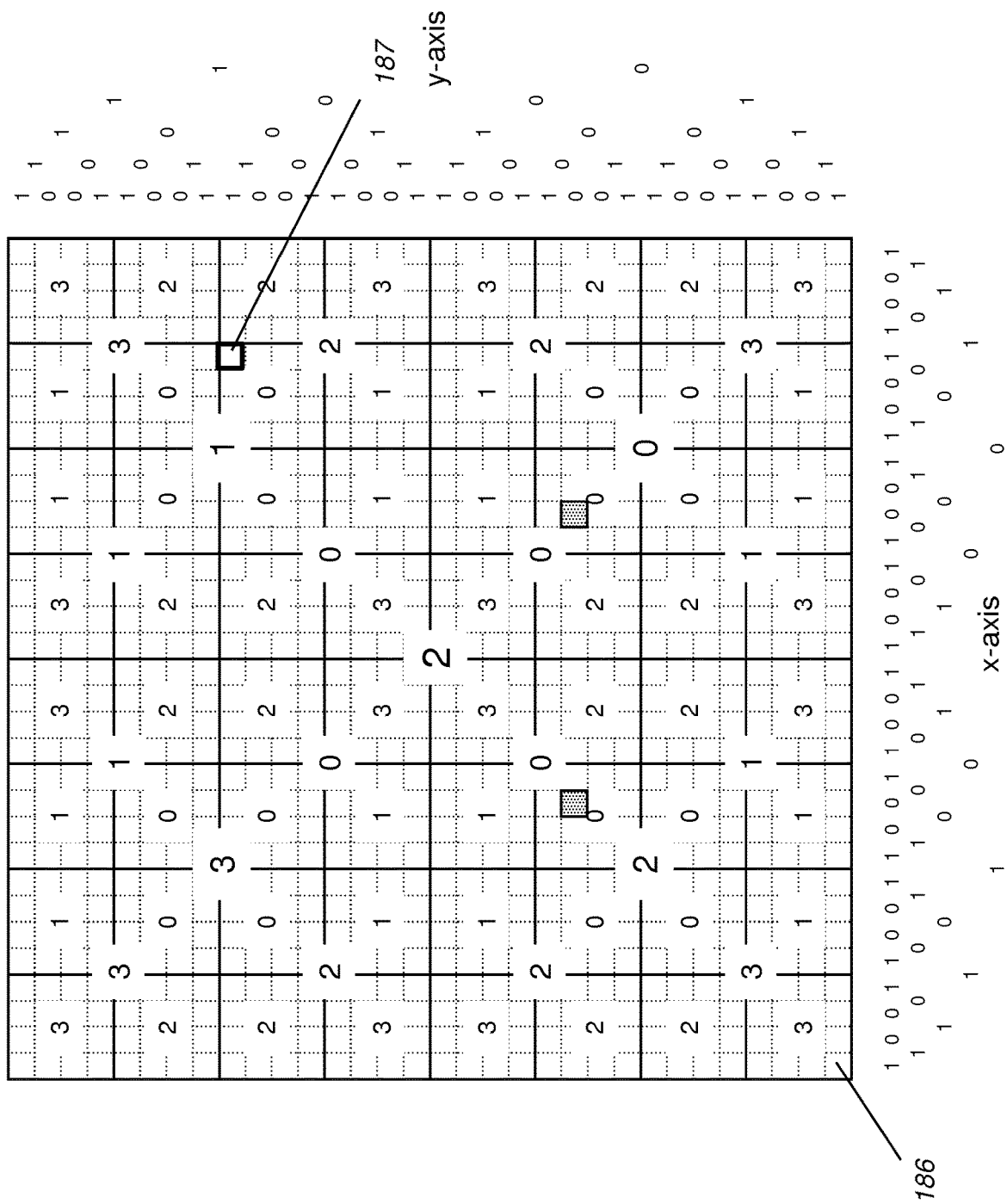
FIG. 22 is a diagram of the compact, hierarchical address-indexing scheme showing its relationship with two-axis Gray-Coded binary sequences.

The symbolic-numbering of elements shown in FIG. 19 is chosen to provide a consistent elemental relationship between transformed segments of arrays of computing cells in a binary hypercube using the Gray-Code sequence. The numbering is further elaborated with respect to FIG. 22 that lists nested Gray-Codes over a two-dimensional matrix and relates these to Gray-Coding of the two x and y axes of the plane. The y-axis, for example, should be read hierarchically from right-to-left, the right-most bit being the most significant bit. Thus, the topmost row has y-value (0)11111g; the lowest row has y-value (0)01111g. As before explained, the combined Gray-Code address of the bottom-left cell 186 is then (10)1011111111g, where the two-axis Gray-Codes are interleaved, the x-axis leading bit being immediately before the y-axis leading bit. The equivalent hierarchical symbolic-numbering is shown for four of the quadrant-levels, where the top-most quadrant is (arbitrarily) '2' using conventional decimal symbology, corresponding with 10g in Gray-Code form. The four quadrants of computing cells composing the full illustrated array are designated '0', at lower-right, '1' at upper-right, '3' at upper-left, and '2' at lower-left. That is, the monotonically Gray-Numbered sequence: 00g, 01g, 11g, and 10g. Following this pattern ultimately to the individual computing cell, cell 187, for example, is designated (2)12013g=**(10)0110000111g, where the brackets enclose the top-most quadrant address of the illustrated segment (arbitrary in this case).

Figure 23:
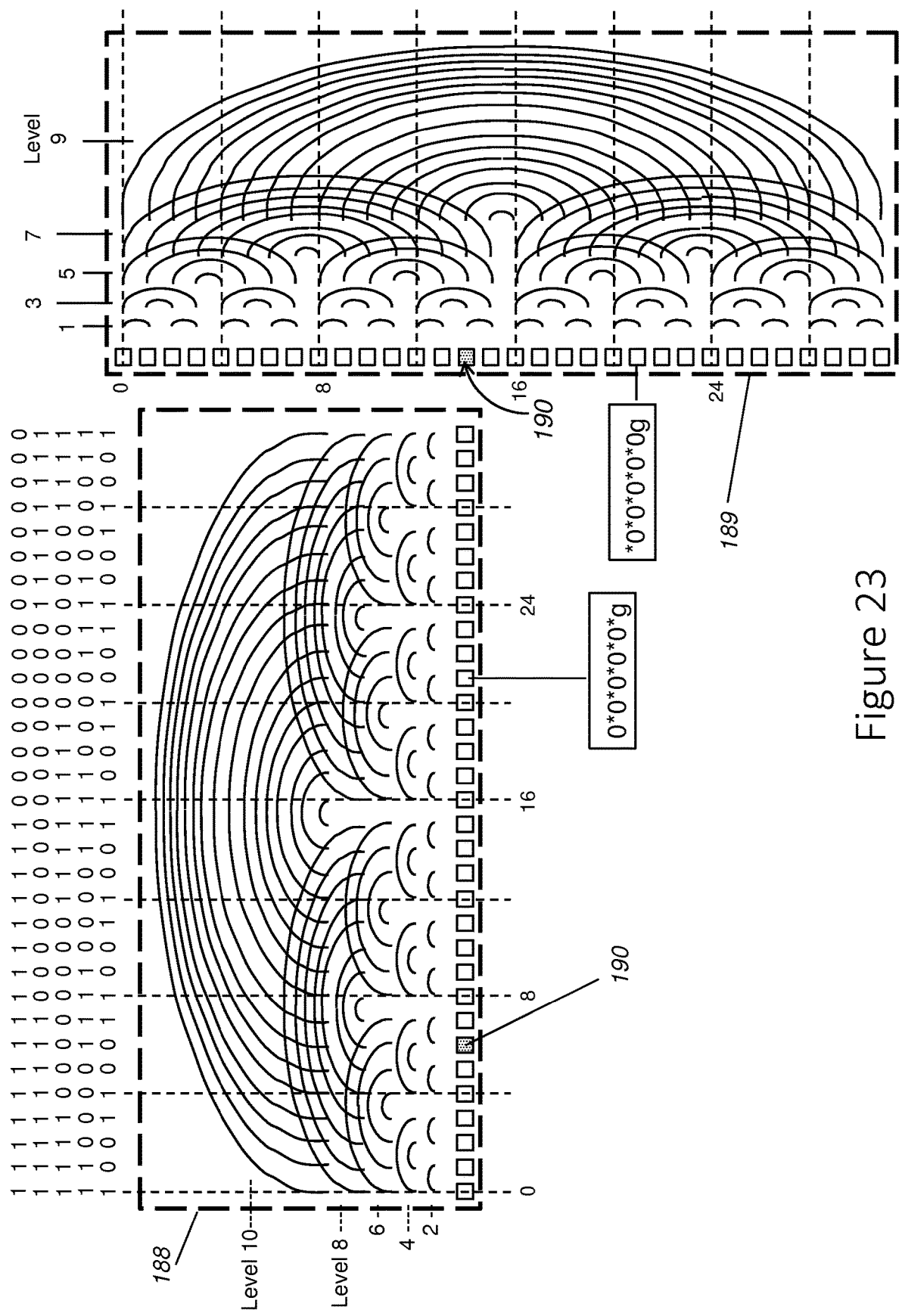
FIG. 23 is a diagram of hierarchical linkages between digital computing engines in a single row and in a single column of a ten-dimensional hypercube showing the relationship with a Gray-Coded binary sequence.

FIG. 23 is a further simplified illustration of a part of segmental connectivity 25 showing the row and column interconnections, 188 and 189, for a full 2^10 computing cell hypercube. By implication in the diagram, the interconnecting links are each connected to a pair of computing cells, in the manner indicated in FIG. 20. It shows a single representative row of computing cells and similarly a column of computing cells, computing cell 190 assumed to be in both the row and the column in this view. Also shown are the computing cell Gray-Codes for the row of computing cells, and an identical pattern applies to the column computing cells. The spatial address of the computing cell 190 would then be 1110011100g, the digits being interleaved between x- and y-axes. For an H-Curve, the origin at 0000000000g would be conveniently at x=21 and y=21 (decimal).

Figure 24:
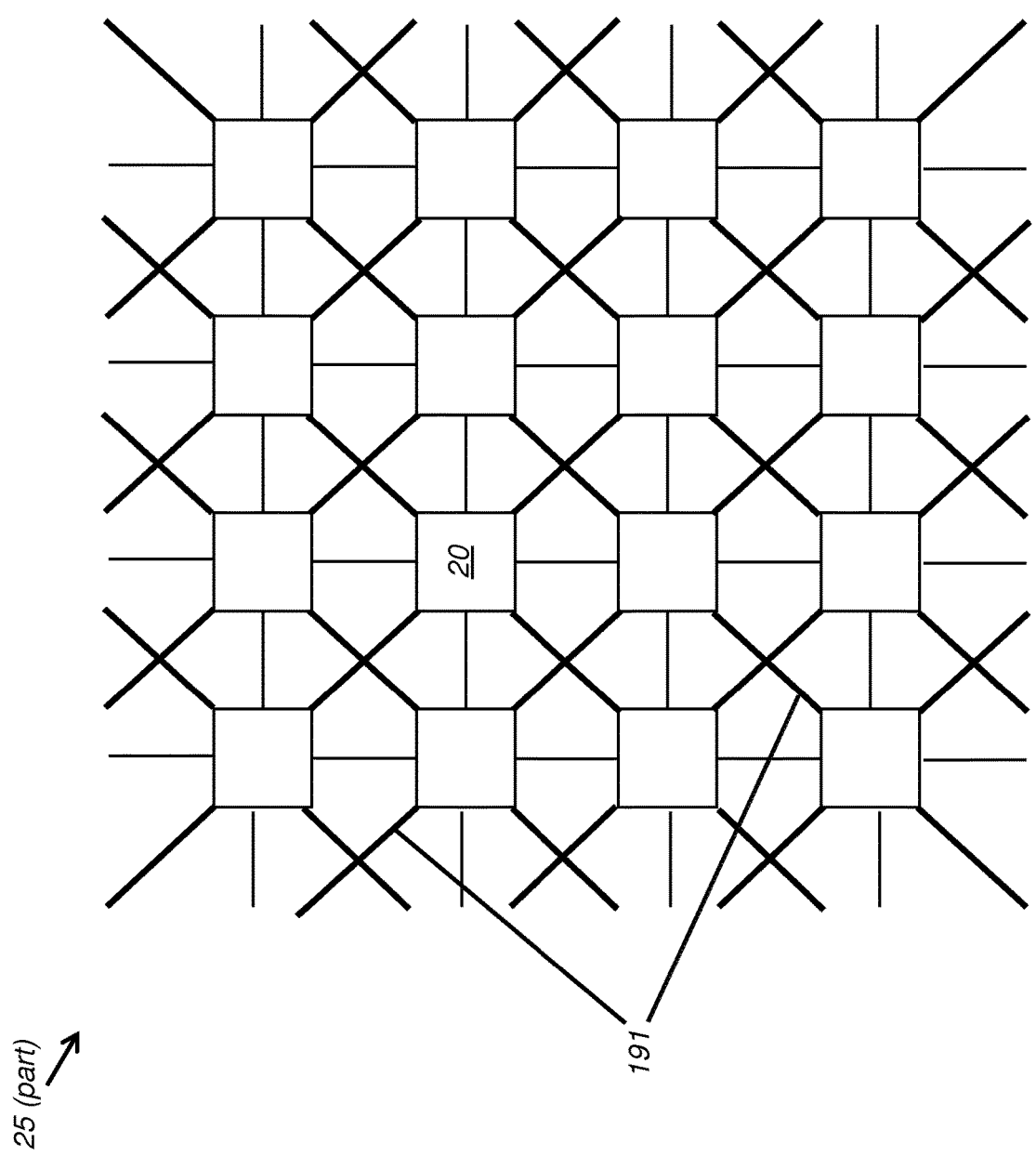
FIG. 24 is a schematic diagram of further linkages in a Cartesian connectivity.

A simpler form of the segmental connectivity as a two-dimensional Cartesian arrangement with four paths to each computing cell, was implemented, for example, in the ICL DAP. As additions, both to that simple arrangement and to the higher-dimensional forms described herein, further paths may be connected advantageously between pairs of computing cells, without compromising the recursive-curve signal-paths. These include paths such as the cross-linking diagonal connections illustrated by 191 in FIG. 24. This type of network has application, for example to systolic arrays and to artificial neural network connectivity.

The segmental connectivity 25 thus has one-to-many hard-wired, direct interconnections from each computing cell to signal-adjacent, though not necessarily geographically-neighbouring computing cells, such that clusters of computing cells are switchably and collectively enabled to transfer data simultaneously to both geographically-local and geographically-remote groups. The recursive connectivity 12 comprises, by these means and by virtue of the recursive curve, a large plurality of well-defined clusters and hierarchical sub-clusters of computing cells, each of which has a fixed number of cells under the control of its own pivotal computing cell. The address of each pivot in the Connectivity is uniquely defined, and distinguishes both the number of computing cells in its segment and the locations in the Connectivity of the constituent computing cells in that segment. This has significance in the declaration of strings and arrays which can be assigned processing resources by finding a special processing cell, and hence its associated pivotal computing cell, with an address-pattern compatible with the scope of the intended data-structure to be hosted by the segment.

In this way, segments such as 31 and 39 of FIG. 4 define regular clusters of computing cells that define a plurality of diversely-sized, and autonomously-operating arrays of processors with no requirement for a central executive host-processor. Each such cluster of computing cells, including its controlling pivot as hereinbefore explained, is accessible to a user for the duration of his application as a dedicated array-processor, within its own restrained scope of pre-defined dimension and size.

Figure 25:
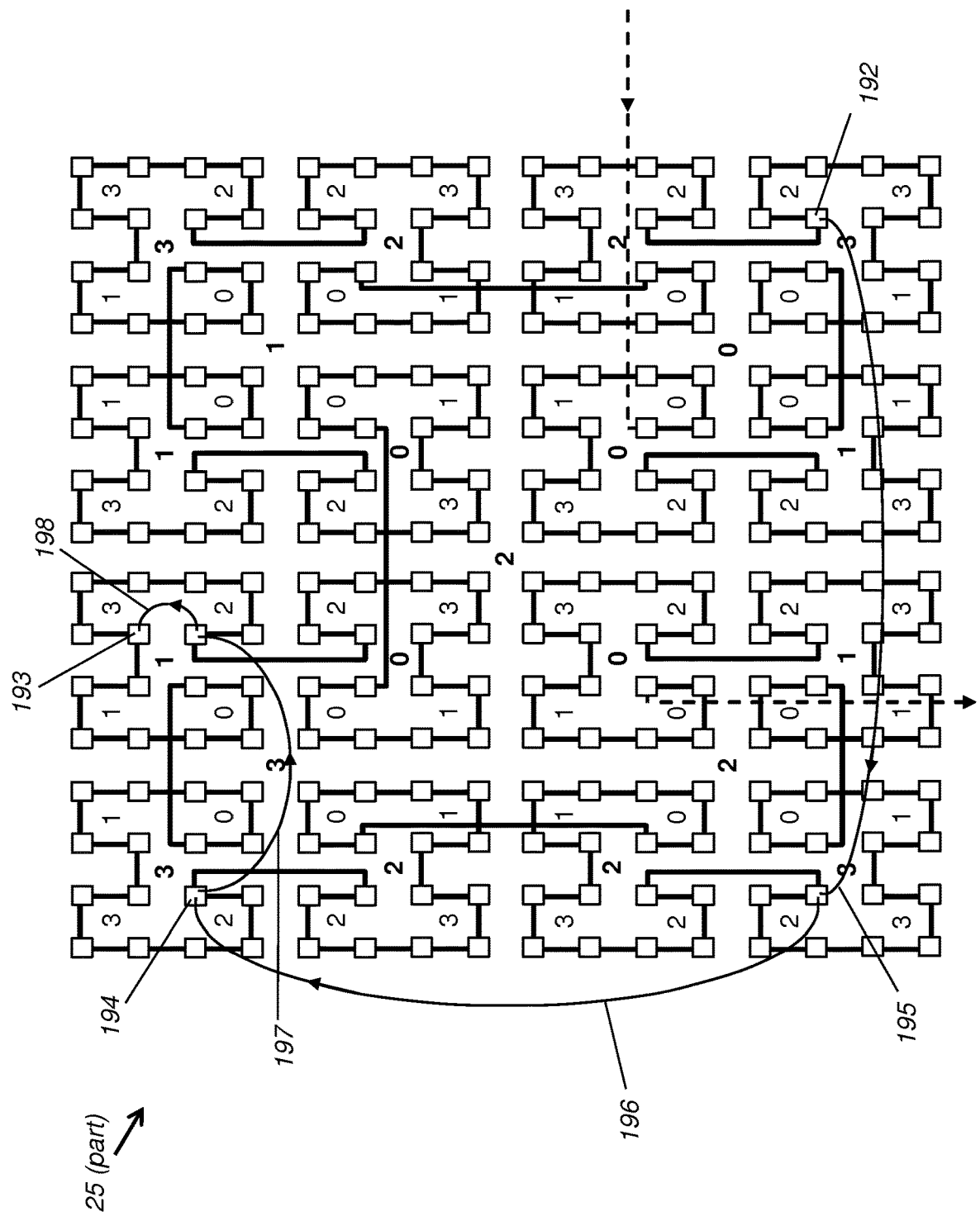
FIG. 25 is a reproduction of FIG. 19 with an example communication route between two digital computing engines formed by hypercube links between intermediate digital computing engines.

Each computing cell has a small plurality of input and output ports relative to the total number of computing cells in the Connectivity. Engineering principles realizable in the foreseeable future necessarily restrict the total number of physical links that can be implemented for a large Connectivity and therefore limit the number of signal-adjacent communicating neighbours directly-connected to each computing cell. Interconnection may be through any preferred digital medium, such as electro-optical, but electrical interfacing is always required at least in part and communication is therefore assumed for simplicity to be 'electrical' in this specification. In a communicating operation, each message-passing microcoded primitive in each computing cell effects data-communication between the computing cell and at least one of its signal-adjacent neighbours in a single transmission, and many operations on matrices require only connections between signal-adjacent neighbours, as to be described in due course. However, in one preferred embodiment, each computing cell also has interfacing means that enables it to recognize, interpret and then pass messages on to more distant targeted computing cells, providing in the process a chain of message-transmissions through the network, in the direction of the targeted destination. FIG. 25 shows the arrangement of FIG. 19 with a relationship formed between computing cells 192 and 193. Their addresses are '20322' and '23132'; that is, (10)00111010g and (10)11011110g, where all leading digits are identical for the two addresses. Evidently, direct communication could be made between the two computing cells with a single path, in which case, a message could be transmitted in a single time-iteration. Although some pairs of computing cells have indeed that sort of privileged path, as hereinbefore noted, that privilege cannot be extended to all pairs in a large Connectivity. Hypercube connections embody one compromise solution to this problem, and one set of paths for that case between the two illustrated computing cells takes four steps of message-passing, as shown. Thus, when communication of a message is instructed between non-signal-adjacent neighbour computing cells, any intermediate computing cells, such as 194 operate in sequence on the target-address such that a message is passed on and arrives ultimately at the targeted-destination computing cell. For this purpose, the Gray-Coded target-address with respect to the caller is by nature a fore-shortened relative-address (not a full-length absolute address) between the source and its target computing cell, with bit-pattern length exactly corresponding with the worst-case number of message-transmissions required enroute (as recognised by Hillis). The linkages in the chain between the two computing cells 192 and 193 are found by exclusive-or comparison of the Gray-Coded addresses, in this case the relative address 11100100g, all leading zeros now being ignored. Since the address-bits are interleaved between 'x' and 'y' axes (in the two-dimensional case) and the more significant bits correspond with larger segmental scopes, the first bit of the relative address corresponds with 'x' path 195 between highest-level quadrants, the second corresponds with 'y' path 196, also between highest-level quadrants. The next '1' bit in the relative address is again in the x-direction but between second-level quadrants, giving the communication-path 197; then the next 'y' and 'x' levels are ignored but a third-level quadrant communication 198 is required in the 'y' direction. Finally, the fourth level quadrant is ignored in both 'x' and 'y' directions so the communication ends, as required, at computing cell 193. Each bit in the relative address corresponds with a path through one dimension of a sub-hypercube through which a message is to be directed towards its destination. In transmission of a message enroute, across the hierarchy of segments, the message is only passed across a dimension at a '1' bit in the relative address; as the count of the segmental-scope increments downwards through the relative address, the segmental steps diminish in size, and where the relative address has a '0', the relative address is decremented without a message-transmission. Therefore, the relative address may be shortened by at least one bit at each stage accordingly, in each intermediate computing cell. However, it is usually advantageous to retain the relative address of the source also, so that a reverse communication may take place. This latter address is then incremented from nil, at each intermediate computing cell along the route and the total number of addressing bits therefore remains constant at the length of the relative address for the said pair of computing cells at each said intermediate computing cell in the route.

As indicated earlier, at least some paired computing cells may time-share data-transmission routes with other pairs, through switchable connections along a time-shared data-bus. This is advantageous in minimising the numbers of paths across the Connectivity in large implementations of the segmental connectivity. Although some restriction in concurrent operation is inevitable in that case due to the time-sharing of bus-traffic, it will be shown by examples that adverse impact on many important concurrently-operating applications of the Connectivity is reduced due the hierarchical scheduling of the component operations forming those applications.

Figure 26:
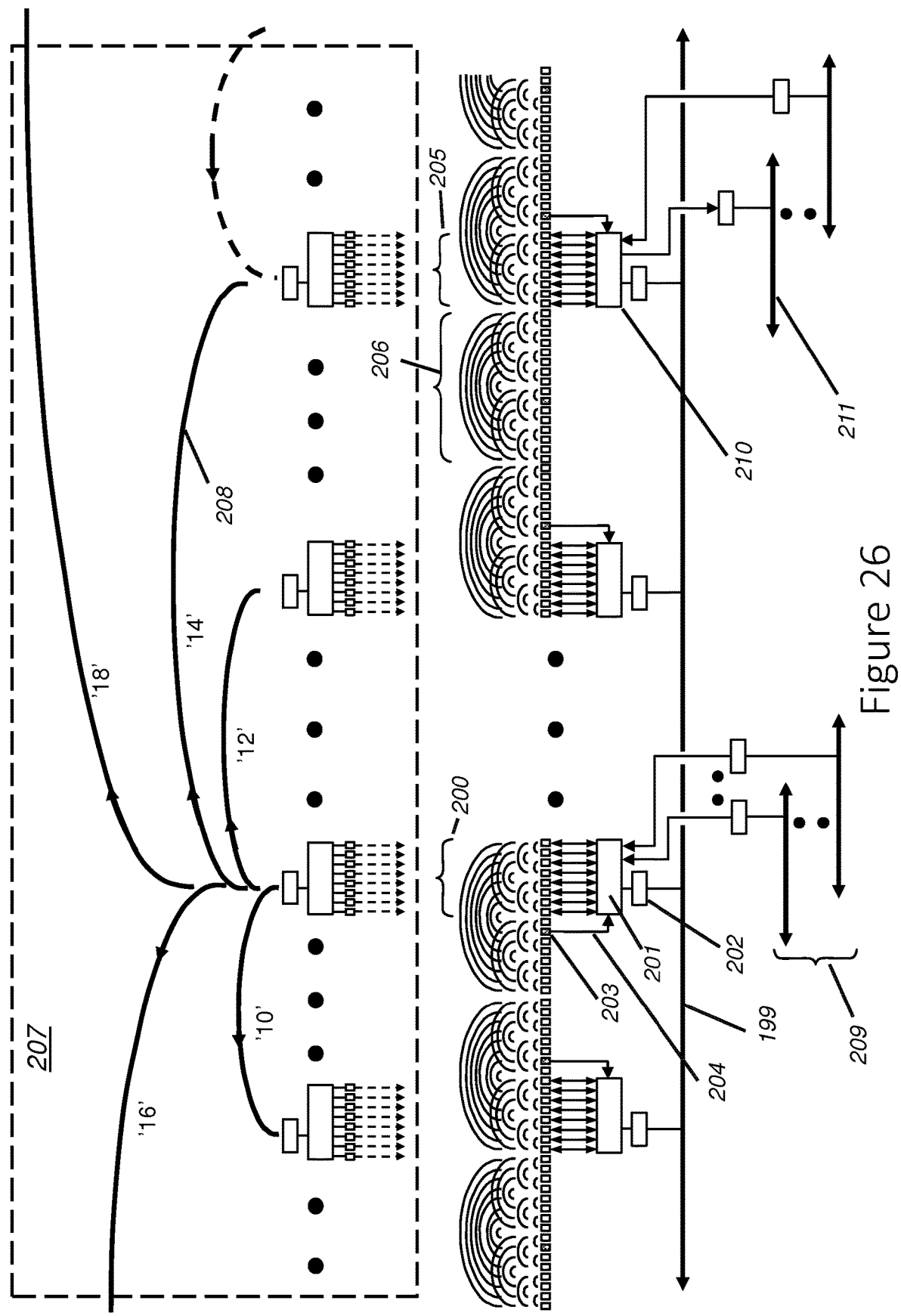
FIG. 26 is a schematic diagram of a hierarchical busing arrangement between clusters of digital computing engines.

FIG. 26 illustrates one preferred embodiment of a busing arrangement, in which each bus such as 199 has scheduled feeds from selected, equally-sized clusters of computing cells such as 200. Reference number 200 brackets a cluster of eight computing cells (in this example) that have transmission-access to the bus in a time-sequenced order through multiplexer 201 and onto the bus through line-coupler 202. Control, as usual in this specification, is by a pivot computing cell 203 which, in addition to its other duties, has means enabled to time-switch the multiplexer and to act as the bus-controller and access-scheduler through its link 204. When in control of a segment, the pivot, as its normal function within its segment, tasks a plurality of computing cells arranged in its own group 200, as one of a multiplicity of identically-sized clusters (such as 205), these pre-selected clusters being switchably connected in time-ordered sequence through the multiplexer 201 that supplies time-scheduled messages in turn through the pivot's own dedicated bus 199 to said multiplicity of identically-sized clusters. Each multiplexer such as 201 also has means enabled to operate as a demultiplexer and to accept similar patterns of time-scheduled messages from other similarly pivot-controlled dedicated buses, but its own pivot has means to schedule the multiplexer in its transmission and reception modes in accordance with instructions from its higher-scoped subtending pivots.

Short-distance wiring between signal-adjacent computing cells does not warrant busing of this sort and full concurrency can be maintained for transactions over those links. These dedicated pairwise interconnections are illustrated schematically by the hierarchical group of paths 206. Therefore, the busing-mode of operation is chosen for the longer signalling links of large connectivities, and processing time for those interconnections is thereby reduced by a factor of eight (in this example) due to time-sharing through the multiplexers. However, the trade-off between wiring density and processing-time may have value for some embodiments, such as those needing consolidation of signal-links out of chips and modules.

The relationship between transmitting and receiving bused pairs of groups is the same as the hierarchical relationship that exists between well separated single pairs of signal-adjacent computing cells. This latter relationship is typified by the dedicated paths, across the horizontal-row hierarchy, typified by those paths emanating from computing cell 190 in FIG. 23. The arrangement of electrical connectivities over the bus, as managed by the pivot, follows the principle that may be visualised as the hierarchy of links in the conceptual block 207, where each of the curved lines, such as 208 now represent the consolidated (but time-scheduled) message path for eight (in this example) pairs of computing cells, each path hosting eight message-paths that are shared in turn along bus 199. These consolidated message paths follow the same hierarchical routes typified by the paths illustrated in 188 of FIG. 23. So for the rows of a binary hypercube, FIG. 26 shows that dimensions #2, #4, #6, and #8, by way of example, are satisfied by direct paths between computing cell-pairs (typically 206), and dimensions #10, #12, #14, #16 and #18 are consolidated in shared-message streams. In many types of data-array manipulation, there is advantage in ordering the sequence of bus-sharing in hierarchical fashion, by means of control by the pivot in this way, and the pivot then switchably controls blocks, such as 205 through signalling 208, in a regular hierarchical order, and shares the bus in a time-ordered manner.

Each multiplexer such as 201 and 208 therefore has means to multiplex the signals from its own cluster of computing cells onto its dedicated bus and also has means to receive and demultiplex signals from a plurality of other buses such as 209. Each cluster of computing cells, such as 205, therefore also has its own multiplexer 210 and dedicated bus 211 for transmitting its messages, like the cluster 200, and also has demultiplexing that receives the appropriate sequence of eight messages from 200 but in this case it has a plurality of inputs from a like plurality of buses, one in this case being 199.

Time-sharing data-bus circuitry, then, replaces several said signalling-paths of the segmental connectivity, said circuitry being adapted to route in sequential order through a data-bus, a sequence of digital-codes from a group of computing cells, the digital-codes being switchably-ordered for transmission to respective cells in a further group, and the data-bus circuitry being responsible, inter alia, for respective paths in the aforesaid monotonically-sequenced signalling-chain.

The messages from the bus connections to each said group follow the same hierarchical order as just described so only one link from one bus is active into the de-multiplexer at any one time. The de-multiplexer therefore passes the received messages in order from each bus (of which there would be five for the row in this example, such as those shown conceptually feeding cluster 200 under the control of the group's pivot 203. A similar number of buses enter from the associated column of computing cells. The hierarchical software processes, that make this type of message-sharing practical in large-scale computing, are described by example in due course.

Figure 27:
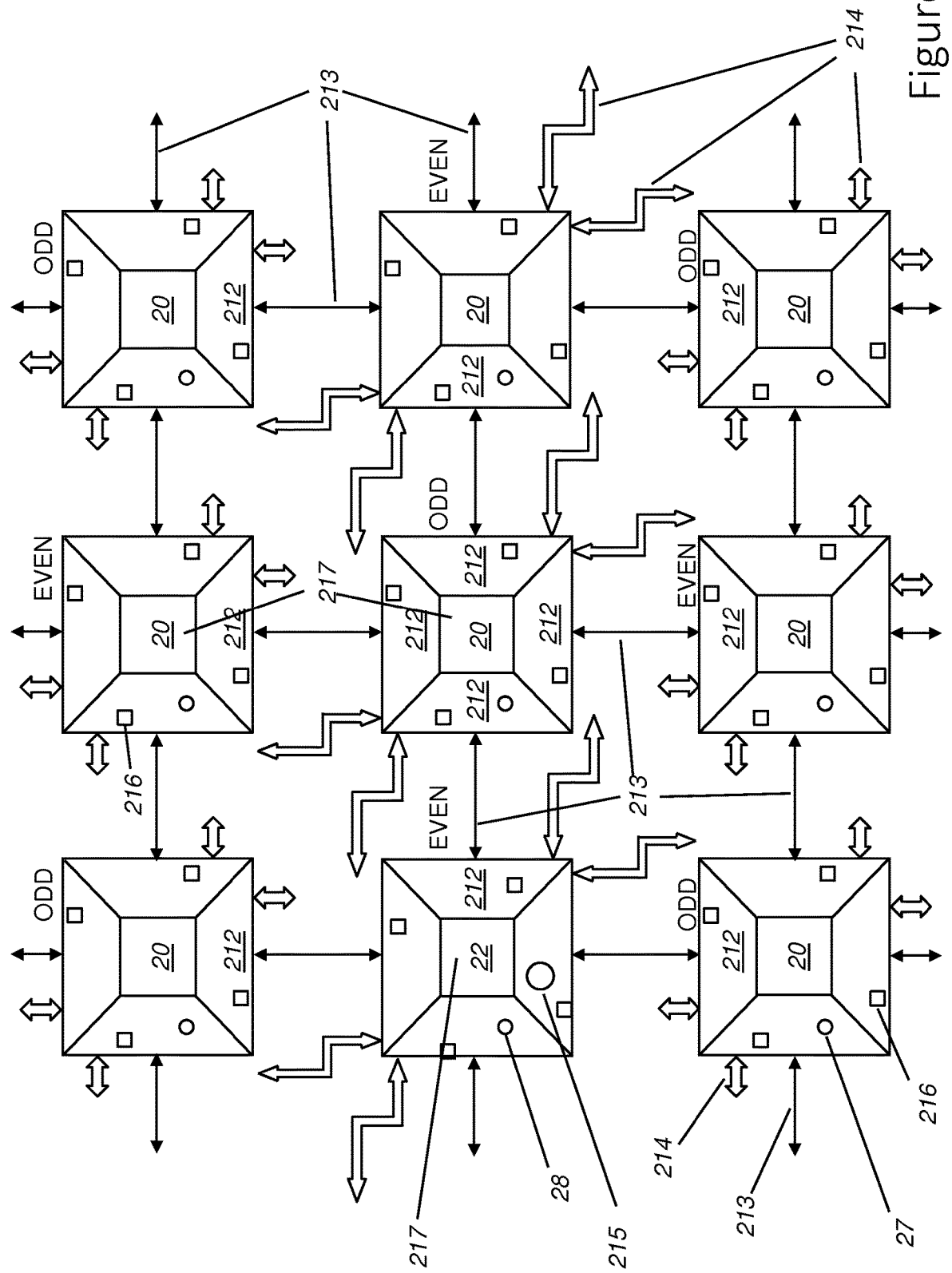
FIG. 27 is a schematic block-diagram of a Cartesian arrangement of digital computing engines in an embodiment of FIG. 2, with interconnecting links and interconnection interfaces.

The digital computing engines of FIG. 2 and their connections are considered in more detail in FIG. 27 which shows a group of nine digital computing engines, 20 and 22 and including as components within them interface circuits 212, intercommunicating with one-another within segmental connectivity 25 over bidirectional signal-links 213, in this case to geographically-adjacent, signal-adjacent neighbours. Each digital computing engine also has at least a further plurality of signal-links within segmental connectivity 25, as represented by the block-arrows such as 214, signal-links being directed variously to other local- and to more geographically-distant digital computing engines.

The digital computing engines have other communicating links from interface circuits 27 and 28 into broadcast connectivity 26, and interface circuits 215 to terminal connectivity 24 and 216 into the declarative connectivity 23. In some cases, links are directed through intermediate switching nodes (not shown), for example in the arrangements of declarative connectivity and broadcast connectivity, but others are point-to-point, dedicated links between pairs of computing cells, as typically in the segmental connectivity. More-detailed illustrations of examples of the interconnections, provided by connectivities 23 to 26 have been described hereinbefore.

In FIG. 27, the digital computing engines 20 and 22 are shown schematically, each having at least four networking interface circuits 212, each of the said at least four communicating in a cardinal direction from its digital computing engine, and at least one central processing unit 217 that has arithmetic and logical processing units, local memory with memory-management such as direct memory access, and access to a multiplicity of clock pulse-trains. It will be understood that said central processing units of 20 and 22 and their interfaces may be implemented as computers common in the state of the art. Each interface circuit 212, then, has a plurality of serial, bidirectional signalling ports that have means for interrelating messaging operations between pairs of computing cells, between pairs of processing cells and with user ports, and for time-scheduling these operations into and out of the CPU as is common in the state of the art. For this purpose, the ports include electronic line-drivers, and associated signal and data-stream writing and reading circuits, some configured as serial digital communication paths, and some as time-shared data buses. In addition, each interfacing port within interface 212 has at least local storage means for buffering incoming and outgoing signals such that its associated CPU is enabled, on demand, to load and access a signal-message in said local storage. Each digital computing engine has address-manipulation circuits, that direct signals to address-selectable other digital computing engines in conjunction with the digital computing engine ports in interfaces 212, and through any of connectivities 23 to 26.

The segmental connectivity provides direct one-to-one communication from each said computing cell, to switchably-connectable ones of its signal-adjacent neighbours. It is to be understood that this neighbour-addressing operation is distinct from the conventional accessing of memory locations used for program and data-manipulation within the CPUs.

The addresses of the digital computing engines are advantageously implemented in the segmental connectivity 25 such that odd-addressed digital computing engines are only connected to even-addressed neighbours and vice-versa. It is of value to the operation of the digital computing engines amongst themselves that this addressing and connecting arrangement is complemented by switch-means responsive to the two-phases of the major clock cycle. As hereinbefore explained, this demarcates communications unambiguously between all pairs of digital computing engines.

The network of segmental connectivity 25 between the computing cells, then, is operable to switchably manipulate variously-sized data-arrays, resident in matching segments of computing cells, in accordance with certain instructions when a user-program requires array processing. The said instructions are interpreted firstly in a special processing cell in one preferred embodiment, secondly in its associated pivot computing cell and then, perhaps, thirdly in subsidiary pivots and computing cells under the control of said associated pivot. Each pivot communicates with its computing cells by means of the broadcast and synchronisation network within broadcast connectivity 26 which is switchably enabled to pass signals concurrently from a pivot to all of the computing cells in its own segment. The signals are typically codes and data that represent primitive array operations, such as comparisons between pairs of data-elements, data-exchange between computing cells, and arithmetic operations, suited for example to matrix arithmetic. Connectivity 26 also permits the return of synchronisation messages from the pivot's segment of computing cells back to the pivot for each step in the sequence of processing by that segment. This ensures that proper completion of a result is registered in the pivot before it commands a further array operation across its segment. However, the response itself to a primitive array-command from the pivot takes place across the array-processing segmental connectivity 25, between those computing cells in the associated segment that are contributing to the array-processing operation. As already described, the segmental connectivity 25 has interconnections especially suited to that demanded response.

The recursive connectivity 12 (of FIG. 2) therefore has a second interconnecting broadcast connectivity 26 with interfacing elements 28 at pivotal computing cells and 27 at standard computing cells that together have means for distributing said data streams from each pivot to its segment of computing cells, and for collecting from those computing cells signals that announce completion of array-processing operations by each individual computing cell in the said segment. The pivot computing cell has means to collect the said annunciating signals, which together act as a completion-signal for each array-operation commanded by the pivot. According to an instruction passed by the declarative connectivity 23 to the said pivot, the pivot is operable to transmit over broadcast connectivity 26 an array-processing function-reference to be interpreted by said each of the computing cells of the said segment including the pivot itself, and to initiate the referenced function in each of said computing cells. As hereinbefore explained, segmental connectivity 25 also has a plurality of paths available to each computing cell enabling communication to a corresponding plurality of signal-adjacent neighbours. The segmental connectivity 25 then enables the interchange of data between many pairs of computing cells simultaneously. For example, within an array-processing segment in operation, two data-matrices resident in two equal-sized segments of computing cells, under the control of their common pivot, are enabled to interchange the data-elements on receiving the code for a single 'exchange' instruction as earlier described above for the 'SWAP' operation. Completion of the operation ('SWAP' in this particular case) is registered by each pivot once all pairs of computing cells in the two segments have exchanged values and set their annunciation flags, including completion by the two pivots themselves. Communicating broadcast connectivity 26 therefore has means for both a simultaneous broadcast message from a pivot and the routing for the multiple return annunciating signals back to the pivot, and in one preferred embodiment has the form of a hierarchical, tree of interconnections, as to be described shortly.

By these means, software-coded signals pass from user inputs, through application-selected routes between the administrative connectivity processing cells and, when required by the user software, to at least one pivot computing cell, and then between the array-processing computing cells amongst themselves by means of their interfaces with signal-switching routes of recursive connectivity 25. The operation of a selected segment of the segmental connectivity is typically in accordance with instructions from a user software program that is received, interpreted and distributed by the administrative connectivity. For use in array-processing operations, the said software-coded signals may have function-references and operands expressed as instruction codes that, when received and interpreted by a pivot, trigger corresponding computing cell addressing and functional logic within its associated segment. The computing cells of the segment are then enabled by their own microcodes, in operation, to execute corresponding stored routines at least partly concurrently in the processing of an array of stored codes and data.

It would be desirable in the embodiment of the Connectivity to implement full all-to-all connectivity between the digital computing engines in order to offer the user-programmer total freedom of choice of interconnections between the digital computing engines. However, it is recognised in the art of concurrent computing that the freedom for such connectivity is drastically constrained in large connectivities, by the mechanical restrictions of electrical interfacing between digital computing engines in a connectivity such as 25, whether for example with electrical, optical or radio paths, particularly between those pairs of digital computing engines that are widely-separated geographically across the Connectivity. Compromise is therefore inevitable with existing technologies, even when computational time is of the essence, and the invention provides means for various topologies of interconnect, as already described, that are constructed to complement one another in order to approximate as closely as practical to fully-concurrent computing operations on a plurality of received and resident applications. This is recognised in this specification by a compromise between, on one hand, the largely logical administrative connectivity processing that accommodates signalling across decision-tree type connectivities and, on the other, the recursive connectivity connectivities that distribute and compute largely Cartesian data-structures in Cartesian interconnection patterns. The compromise enables concurrent operation of multiple user applications, simultaneously resident in the Connectivity and comprising commonly-used logical and mathematical structures, by sharing the resources of various topologies of interconnects.

Data Processing Connectivity 10 therefore includes within the recursive connectivity 12 the communication segmental connectivity 25 with a large plurality of switched signal-transmission routes, each being adapted for bidirectional communication between at least one corresponding pair of computing cells for data communication using one pair of transmitting and receiving ports in each computing cell.

At least some of the pairs of computing cells have dedicated, one-to-one, physical signalling routes and it will be understood that the embodiment of the communication routes may incorporate any of a range of serial and parallel interfaces, transmission physics and message-formats during data-transport, including wired-means, optical-means, such as fibre-optic and fibre-channel, and radio-transmissions, such as cellular-network paths, as appropriate for data-transmission ranges, equipment packaging and distribution.

Any one of a number of data-transmission standards can be employed for the unambiguous electrical transmission of signals along said signalling routes, such as Manchester Biphase encoding, and more complex standards such as multi-wire, data-parallel and USB (universal serial bus), and many such implementations are common in the state of the art.

One preferred form of serial data-transmission within the recursive connectivity thus may embody Manchester Bi-Phase encoding over single links, which advantageously economises on cabling between hardware components. The transmission-line voltage swings plus and minus about zero, is self-clocking and has a return-to-zero state that is used to demarcate data-words in the message. The interface circuits and selection circuits within the master-transmitting computing cell have means, common in the state of the art, to select the signal-length for transmission as demanded by the immediate need of the application, and are enabled to assemble the address-fields and the data-fields of each message.

Means for replacing bundles of such physical connections with compact time-shared signalling routes, embodied in multi-tapped data buses, have been earlier explained with regard to FIG. 26.

In the case of segmental connectivity 25, each computing cell 20 and 22 is therefore switchably connectable for data communication, via a multiplicity of directly- and bus-connected paths, to a like-multiplicity of signal-adjacent neighbour computing cells, directly-linked across multiple graph-dimensions.

Detailed control of the computing cells by the pivots will now be elaborated.

The broadcast connectivity 26 has data-transmission means for interfacing with and addressing all computing cells in segmental connectivity 25, and for switching said data-transmission through routes that enable scheduling, transmission, reception and synchronization, of signal-messages (called herein 'broadcasts') that typically comprise address-references, function-references and operand-data as are common in digital processing and communication systems. Each computing cell, including pivotal computing cells, is identified by a unique Gray-Code address to which each said address-reference is related. In a first mode of operation of the broadcast connectivity 26, a pivot typically transmits a broadcast instruction into the connectivity, through switch-selectable routes, to each of the computing cells in the cluster of computing cells controlled by said pivot 22. In a second mode of operation, each computing cell of the said segment returns a corresponding signal to the said pivot, annunciating completion of a commanded instruction received from the said pivot. Since a data-element of each of a multiplicity of arrays, of differing sizes, may be loaded into and processed by a single computing cell, each pivotal computing cell uniquely controls one segment of computing cells only, and no others. A preferred embodiment of broadcast connectivity 26 incorporates a hierarchy of pivots, which pivots together control a set of nested quadrantal segments of overall scope matched to its controlling pivot.

Each pivot computing cell, by virtue of its unique recursive addressing within the Connectivity, defines the position of the segment of array elements over which the user's program has access through that pivot, and the address itself (by virtue of its Gray-Code pattern) also prescribes the scope of the computing cell cluster to be so controlled. The selectable sizes of clusters and accessible geographical locations of cluster computing cells in the segmental connectivity 25 are hardware attributes, fixed at the time of construction of an embodiment of the Connectivity. When initiated by a user's task, each pivotal computing cell has means to organise the local command and control of the hardware cluster of computing cells within its regime, as will be elaborated in the description of the broadcast connectivity 26. A parameter within a user-program, related to input of arrays, declares the scope of the cluster to be processed by quoting the least-significant-end bit pattern of the address to be used as the measure of the scope. The low end of the address-pattern thus dictates only the size and not the absolute position of a desired cluster. It is the role of the administrative connectivity through its terminal connectivity and declarative connectivity to determine the location of a newly-requested array-space from the physically-possible and available options. The array-space is identified as free by means of the special processing cell associated with the pivotal computing cell of the array-space, and which the terminal connectivity 24 has means to recognise and to acquire from available free processing cells of the desired authority, as already described. The switching-means of terminal connectivity 24, in response to user demands at one end and free processing cells at the other, enable the Connectivity to designate and process simultaneously large numbers of various-sized arrays according to the needs of a multiplicity of largely-independent users.

Figure 28:
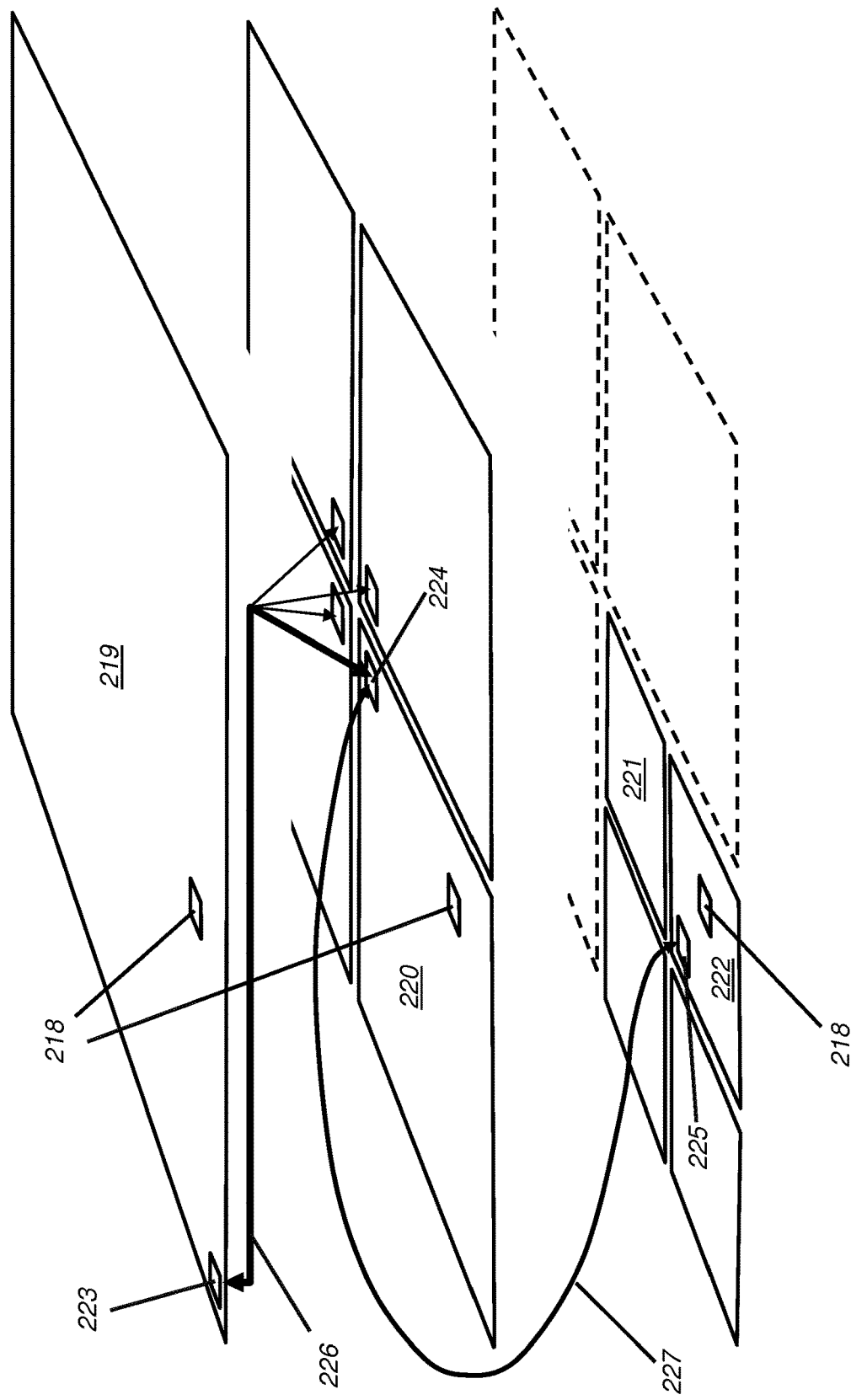
FIG. 28 is a schematic diagram of notional planes of data stored in a large planar array of digital computing engines, and communicating paths between pivots with authority over differing scoped sub-arrays.

FIG. 28 shows schematically, in one preferred embodiment of broadcast connectivity 26, a typical set of data-arrays associated with one typical computing cell 218, where computing cell 218 has responsibility for three different array-data-elements within three differing-sized users-arrays laid-out as a hierarchy of notional data-planes. Segments and sub-segments of computing cells used for regular data-arrays are thus restricted to a hierarchy of quadrants such as 219, 220 and 221, as illustrated in the figure. In this way, the components of the recursive connectivity may be shared from time to time by arrays of differing sizes, although it is to be noted that a lower-scoped pivot, in its pivotal role, may be otherwise actively owned (for a duration) by a second user-program. In this event, two or more separately-owned array-processing operations, of distinctly-different array sizes, may be demanded of a computing cell 218, the computing cell responding in conformance to a time-sharing rule by command of its multiple pivot-computing cells. This decomposition of array-responsibility was earlier introduced briefly with regard to FIG. 5.

At least the majority of computing cells, such as 218, have task-sharing means to store and manipulate a plurality of independent data-values corresponding to their set positions within a like plurality of differing-sized data-arrays, such as those illustrated conceptually by 219, 220 and 221 in FIG. 28. Each computing cell is thus resident as one element in every-sized scope of segment. Each computing cell is therefore a common member of an arrangement of hierarchical segments such that each large array 219 has a precise computing cell relationship with four symmetrical quadrants (such as 220) at the next lower hierarchical level. It is to be noted that each of the said four quadrants in a data-plane may represent, in use, a different array of data-elements both from one-another and from those in the larger array 219. The same segregated relationship exists between data-arrays such as 221 and 222 at the shown lower level. Computing Cell 218 is thus illustrated in all of the levels because its logical organization enables the different notional data-planes of operation to be applied within the same computing cell. Indeed, each computing cell, including each pivotal computing cell, has means well-known in the art of digital processing for multi-tasking by task-sharing. Typically, each such task comprises a primitive and a data-value, and a commanding pivot such as 223 passes this over broadcast connectivity 26 (of FIG. 2) to its segment of computing cells, such as 218, that hosts one of a number of associated data-arrays.

The pivotal computing cells are chosen to have no least-significant address-bit patterns in common with any pivot of different scope. The form of recursive curve then prohibits co-location of two pivots at any point across the Connectivity. However, it is beneficial that the least-significant address-bit pattern should be chosen to be identical for all pivots with the same scope (that is, within the same conceptual data-array plane of FIG. 28) in order to ensure predictability of search for a desired segmental-scope. The illustrative locations of pivots 223, 224 and 225 are suitable examples.

One preferred way to guarantee the uniqueness of the address-allocation of each pivot is to note the local hierarchical level in the quad-tree which subtends the array-block that is referenced by the pivot. The pivotal digital computing engine is then chosen with address: '* * * g g ~g g . . . g ~g', where '~g' is the ones-complement of 'g' and 'g' is the address code of the topmost quad-tree node that subtends the full array of CEs for which the selected pivot is responsible. Thus g=2 (binary 10) alternates with 1 (01) whilst g=3 (11) alternates with 0 (00), and vice-versa. The proof of uniqueness follows:—

Theorem:
Let n-digit integer-address $I_n(j)$: $a_n\ a_{n-1} \ldots a_j \ldots a_1\ a_0$, with base 4 for n, j integers, and j: 1 to n−1.
Denoting b's-complement of digit $a_j$ by $\sim a_j$,
pivot integer-address $I_n(j)$ is a unique with respect to j when digits $a_j\ a_{j-1} \ldots a_1\ a_0$ are set according to the rule: $a_j\ a_j \sim a_j\ a_j \ldots \sim a_j\ a_j$.

Proof:
Preliminary observations:
i) Under the rule, the leading digits, $a_n$ to $a_{j+1}$, for integer $I_n(j)$ with respect to j=d (say) are unspecified, and do not influence the uniqueness of this pivot address compared with an integer $I_n(j<d)$, defined similarly under the rule.
ii) The digit at position $a_j$ is duplicated at digit $a_{j-1}$. Subsequent digits alternate between and $a_j$ as far as the least significant digit, $a_0$.

Sequential digits $a_j$ and $a_{j-1}$ of the integer-coding always have the identical digital value whilst, according to the rule, no other sequential pair of pivot address digits below $a_j$ can have this relationship.
Therefore, integer $I_n(j=1)$ has sequence $a_1$ and $a_1$ for the least significant digits $a_1$ and $a_0$, so no pivot address $In(j>1)$ can equal $In(j=1)$ since the equivalent last two digits of the latter integer must comprise a digit and its complement under the rule.

Similarly, $I_n(j=2)$ has sequence $a_2$ and $a_2$ for digits $a_2$ and $a_1$, with $\sim a_2$ for $a_0$.

It therefore differs from $I_n(j>2)$ which must have alternating digits under the rule for $a_2$ and $a_1$.

By extrapolation, $I_n(j=d)$, with digit-values $a_d$ and $a_d$ for digits $a_d$ and $a_{d-1}$, and alternating complements thereafter, differs:

both from all integers $I_n(j>d)$ and from $I_n(j<d)$. #

The motivation for the theorem is the need to locate the array-pivots at computing cells that are distributed and unambiguous with respect to one another, each numerically reflecting the size and location of the array for which it is responsible; that is, by matching the size of the array with the digital position (j) in the address. Moreover, in selecting and acquiring each unique locational address, it is also advantageous that the selection-rule is uniform across the Connectivity and avoids complexity.

As hereinbefore indicated then, this addressing form may be used to identify and call an unemployed pivot by its scope, the scope being unambiguously identifiable by the bit-position 'j', and address-location by $a_j$ and $a_{j-1}$ with trailing string of alternating bits.

The implementation of the pivot 223 includes a distinguished level of authority over a fixed array of data-elements, and each task initiates a microcoded primitive (such as a data-exchange in communication with another computing cell) within each said computing cell of the array. Each such software-segregated task has a set of associated digital data-tags peculiar to, and therefore unambiguously initiated by, said each tagged task dictated by the pivot. In a typical operation on its own segment, the pivot transmits a common tagged task to each of the computing cells in its segment (including the pivot itself). Such a task may be associated with a larger segment, if demanded by a pivot of higher authority. For any demanded common task, all computing cells allocated with that common task must respond with a 'completion' signal to its controlling pivot before the pivot may distribute a new task. One preferred embodiment for ensuring unambiguous acquisition of computing cells by the hierarchy of pivots is by means of a communicating tree of pivots within broadcast connectivity 26 as to be described shortly.

Each said transmitted common task in a particular computing cell relates to manipulation of a single localized code-structure, such as one array data-element that the computing cell stores and manipulates for each task given to the computing cell in a sequence of such tasks. Each computing cell 20 and 22, such as 218, in a segment so occupied by said common task, performs in response to its pivot (in this example case 225) each task common to a particular scope of data-array in a commanded order. The several data-array elements for which the computing cell has been given responsibility belong to corresponding array-scopes. In addition, some such task in pivot 223, say, may involve manipulation of its lower-level quadrants such as 220. In that case, in one preferred embodiment, pivot 223 has means to pass the instruction for the task over path 220 to pivot 218, which pivot has means to retransmit the instruction in turn over path 226 to pivot 224 where it is stored for subsequent broadcast to the segment for computation under the command of pivot 224. By virtue of the multi-tasking organization within each individual computing cells, each pivot below the highest therefore has means, from time to time, to command a computing cell under its own authority to process a particular command-signal corresponding with the demands of a higher-scoped pivot. Pivotal computing cells that control data-elements at a lower scope (that is, at a lesser-sized quadrant), have means to respond to such a command-signal and therefore to contribute to the manipulation of a larger array by passing the command to yet lower-scoped pivots. Ultimately, the original instruction, with a scope-coding, from the demanded high-level task, flows down to the lowest accessible pivot having direct control over its own segment of computing cells, each computing cell of which responds, during an appropriate time-share, with processing operations demanded by the highest tasking pivot's command. Each computing cell stores the result of this computation according to the scope-code so that a follow-on instruction from the same higher-level pivot may continue without corrupting that task-computation. An example of use of this last feature is the loading of a large array of data-elements by means of concurrent loading of a plurality of smaller, sub-arrays via a like plurality of user input ports.

Each computing cell reports completion of said common tasking of its own operation by transmission of a completion signal, through a lower-part of broadcast connectivity 26 to the lowest-owning pivot for that segment such as 225. The collection of all such signals by that pivot provides synchronization of the common task at its level of authority, and since the said lowest-owning pivot must see completion of each demanded instruction before starting the next, which may be for a different task, there is no ambiguity in assigning the result to the correct task. If the task has been delegated from a higher-scoped pivot, the said lowest-owning pivot has means to transmit a similar completion signal, with a level designator, to its next higher pivot (for example 224 over path 227 in FIG. 28). In turn, that latter pivot thus expects completion of its other quadrant pivots (if similarly-tasked) before passing a like signal upwards to its superior pivot (if relevant) and so on. Only when all completion-signals have been received by the initiating higher-level pivot, for that overall composite user-application, can said initiating pivot transmit a follow-on instruction downwards again to its quadrant-pivots and computing cells within its over-all, own full authority. By this means a large plurality of independently-organized data-arrays of like sizes may be distributed and activated by multiple users across shared resources in a concurrent, hierarchical arrangement without logical conflict, other than by way of time delayed, time-shared operations due to the multi-tasking within the employed computing cells.

The broadcast and synchronisation broadcast-connectivity 26, in conjunction with the unique authority of each pivot connected to said connectivity, has means to route broadcast signals from an initiating pivot within its implemented scope to each of the local clusters of computing cells within that defined scope. Each pivot has means for attaching a scope-code to its broadcast signals and is thus enabled to ensure that no ambiguity might arise within each computing cell in a segment as to which array element, of the said multiplicity of arrays, is to be manipulated at a given instant.

Straight transfer of data-arrays across the segmental connectivity, without intervening operations, is an exception to the rule that a pivot's responsibilities normally restrict it to operations within its own segment-hierarchy. So in addition to a scope-code within a message, each pivot engaged in a sequence of such block-transfers across the segmental connectivity has means to attach a priority-code to its commands, due to the importance of this type of manoeuvre of data. An intermediate pivot computing cell, receiving this priority-code enroute, then allocates an ordered position in its schedule that may over-ride and delay higher-scope demands on the computing cells of its segment. However, this form of operation would often be expected to be a natural contribution to a higher-scoped computational task and would not then interfere with the logical progression of that task.

Figure 29:
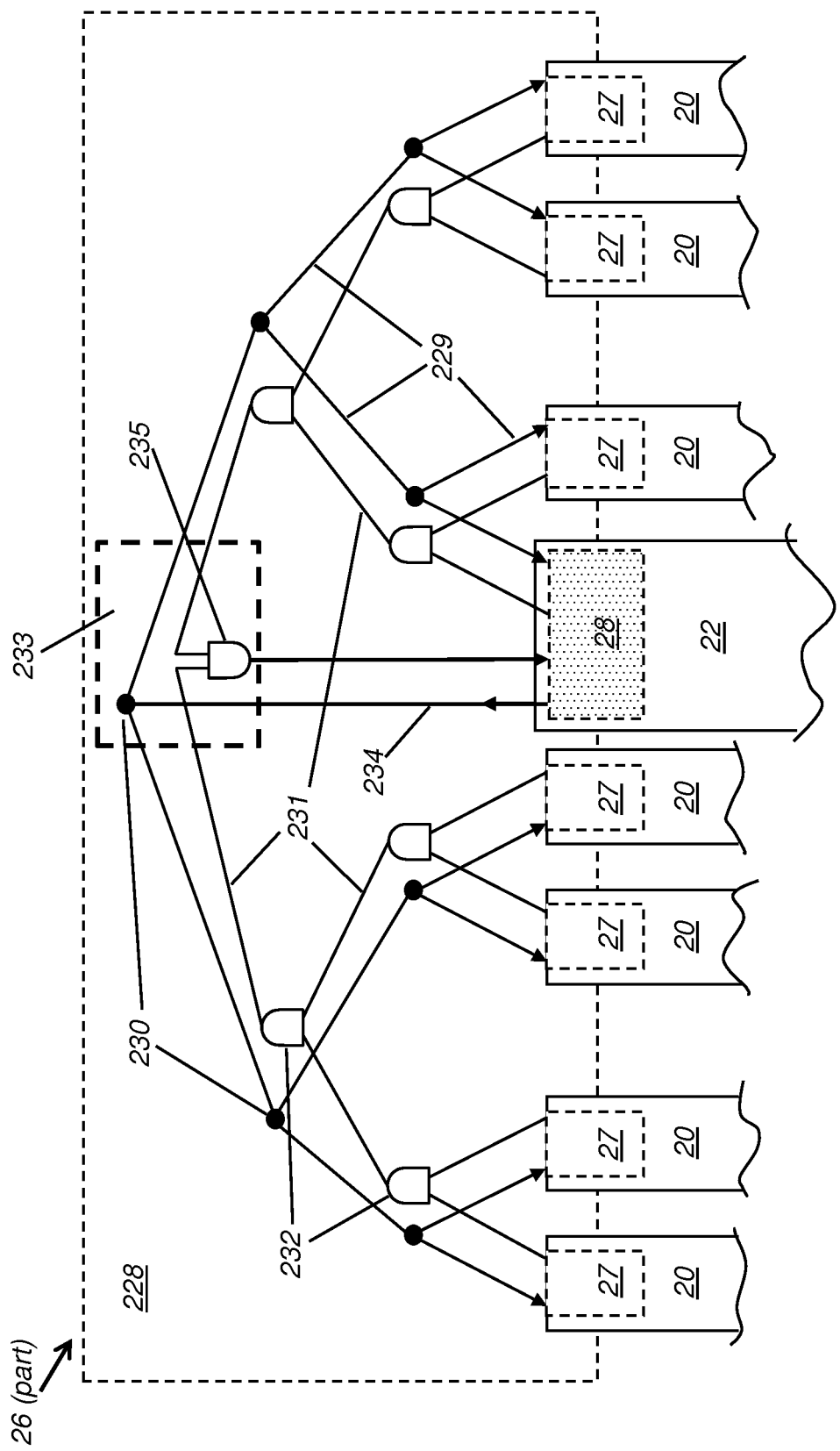
FIG. 29 is a schematic diagram of a broadcasting intercommunication network between a pivot and a group of digital computing engines of an embodiment of FIG. 2.

FIG. 29 illustrates schematically a first part of one preferred broadcast and synchronization embodiment of the broadcast connectivity 26. For the purpose of explanation, FIG. 29 shows only a small example circuit-segment of computing cells, wherein the broadcast and synchronization circuit, 228, of 26 intercommunicates through interfaces 27 and 28 between seven computing cells, 20 and one associated pivotal computing cell 22. A plurality of such connectivity circuits have means adapted together, via a selectable plurality of pivots, to respond to hierarchical instantiation signals and command signals from a corresponding selectable plurality of Administrative Connectivity special processing cells 21. By this means, a series of commands may be transmitted to switchably selectable segments of computing cells for the purpose of effecting array-processing operations at variously scoped segments that may store and process a range of user arrays from time-to-time within the recursive connectivity 12.

In this said first part of the embodiment, a binary tree includes a first set of routeing paths, such as 229, which interconnect nodes such as 230 and a second set of routeing paths, such as 231, which interconnect nodes each comprising an AND-gate such as 232. The tree has connection with interfaces 27 and 28 at the computing cell leaves of the tree and the pivot interface 28 is connected additionally to the root-node 233 of the tree, thereby enabling serial communications to be sent directly from pivot 22 to the top node and thereby broadcast to the remaining computing cells 20 in its segment. One of the sets of routeing paths is therefore configured to broadcast a common message from the pivot via path 234 and nodes 230, which has the sole purpose of distributing the message simultaneously, two ways (in this binary-tree example), downwards towards computing cells 20. Some of nodes 230 may include a signal-amplifier.

The second of the set of routes (including 231 and 232) is configured to receive at each AND-gate 'completion flags' set, not necessarily simultaneously, by corresponding computing cells in the segment. The AND nodes therefore provide means to combine and to transmit partially-collected synchronizing-signals to the pivot 28 by way of said root-node 233.

When all computing cells except the pivot have completed the operation demanded by the broadcast message, the two top-level aggregate completion-flags set AND gate 235, thereby indicating to the pivot computing cell that that message has been fully acted upon, subject to the message also being likewise satisfied by the pivot's own computation. On reception of a new broadcast instruction, the computing cells reset their completion flags.

The tree in FIG. 29 is dedicated to the signalling and control of the one shown segment of computing cells but is typical of segments and pivots of the same scope throughout the whole broadcast connectivity 26. Each such tree and its corresponding segment has a scope matching the authority of its associated pivot computing cell and special processing cell, as previously hereinbefore explained, and in the currently-described embodiment, have the minimum user-accessible scope of array-processing segment, That scope might conveniently be, say, 2^10 computing cells, depending on the overall extent of the Connectivity.

Figure 30:
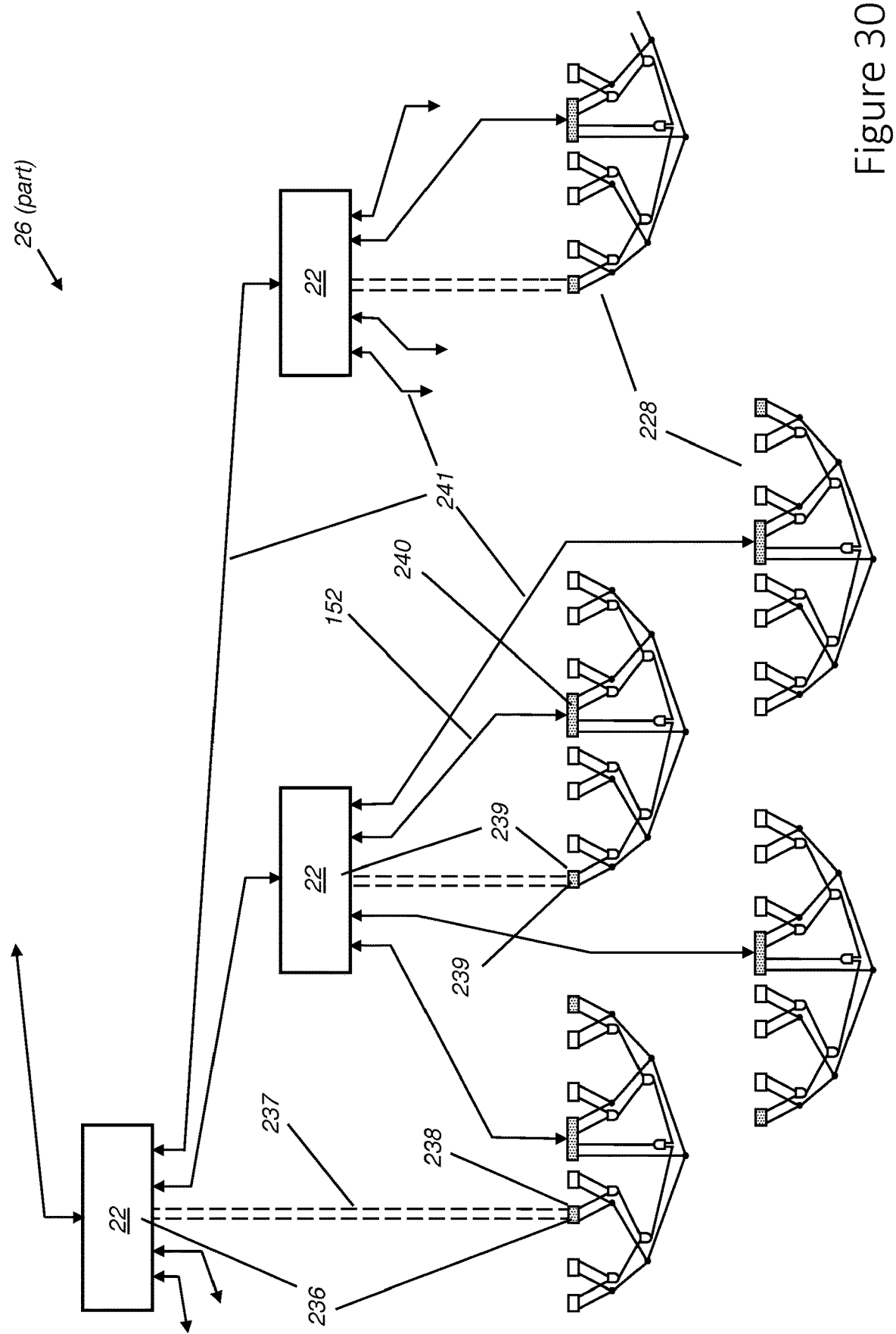
FIG. 30 is a further schematic diagram of a broadcasting intercommunication network between pivots and their associated groups of digital computing engines, and interconnections between pivots.

FIG. 30 illustrates the principle of a second part of said one preferred broadcast and synchronization embodiment of the broadcast connectivity 26 and shows a larger group of clusters of the form 228 of FIG. 29, the top-most controlling pivot in this case being illustrated as computing cell 236 in this case and this corresponds with pivot 223 of FIG. 28. Clusters 228 of FIG. 30 are shown inverted merely for convenience of drawing.

The dotted connectors such as 237 are intended to show that the pivots 22 are corresponding pivotal computing cells at designated locations in the illustrated clusters 228. Pivots with the same scope (that is, the same pivotal level in the hierarchy of pivots) have the same relative positions in the clusters; those with a different scope have a different relative position. Thus, the higher of the three levels shown is at computing cell 238, the next lower at computing cell 239 and the lowest level at computing cell 240. The illustration shows four subtended pivots under the control of higher-level pivots but this number may be extended for example to 16, depending on the set of accessible array sizes desirably made available to users. Paths such as 241 correspond with paths 226 and 227 of FIG. 28. Each computing cell has computational means to store a multiplicity of array elements, one for each data-array to be processed, and each scoped array-element carries a numerical identifier according to the scope of segment to which it is allocated for that purpose.

Figure 31:
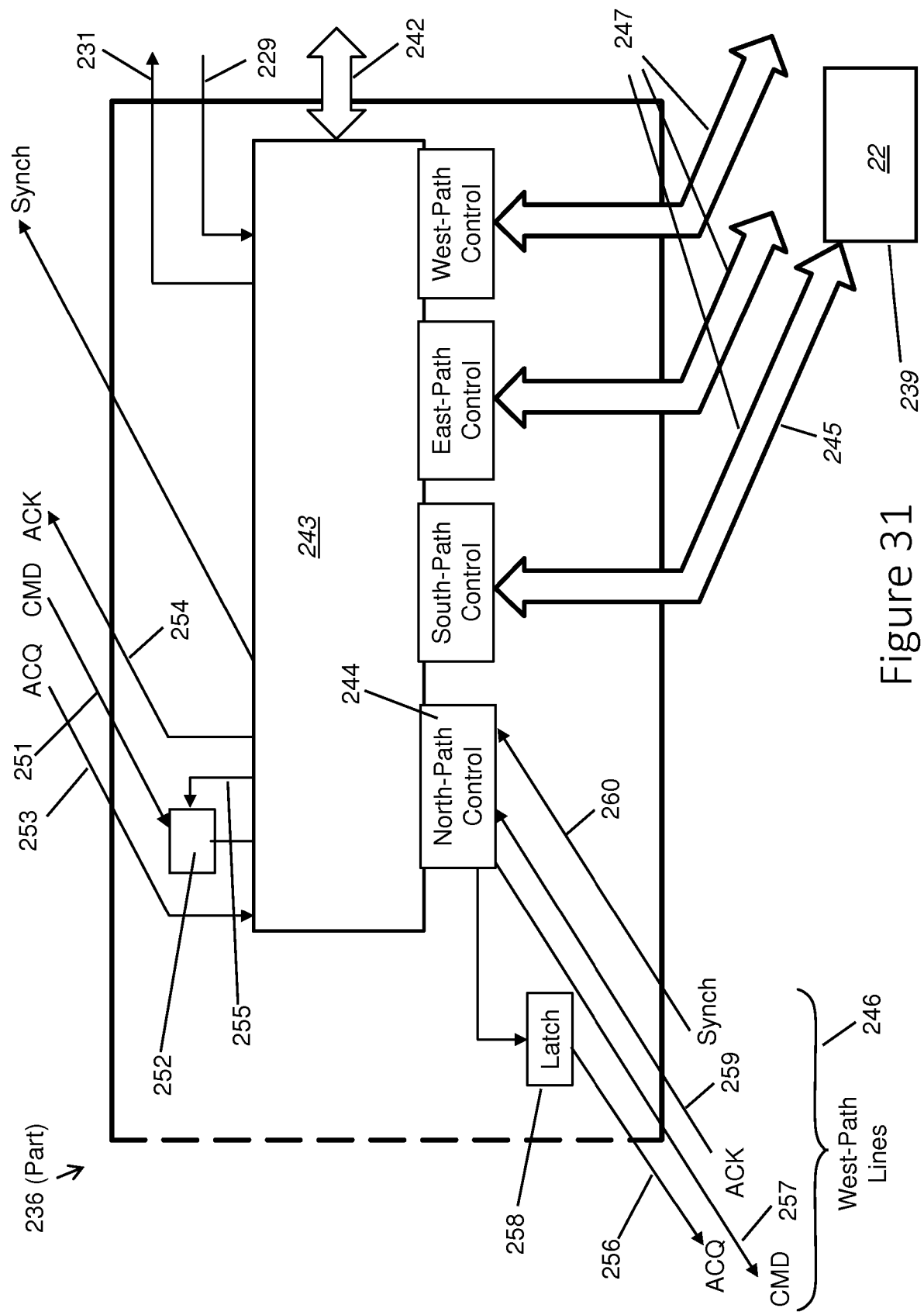
FIG. 31 is a block-diagram schematically showing some of the interfaces to part of a high-authority pivot that control constituent-arrays of digital computing engines.

FIG. 31 shows in block-schematic form an example embodiment of the pivotal computing cell part of a higher-level pivot digital computing engine 14 in its hierarchical controlling role. The group of links 242 are those associated with segmental connectivity 25 and are not considered further with respect to this diagram. There is one group of links from the next superior pivot above that includes, in the first place, acquisition and command links into the illustrated pivot. Each pivot computing cell has computational means 243 and interface-controlling means 244 to pass commands to the computing cells at the lowest level within its scope. The illustrated pivotal computing cell distributes said commands by reproducing them onto its downward interfaces towards its subtended pivots such as 239 through path 245, of which four are shown here: 'North', 'South', 'East' and 'West', for only four subtended quadrants. The North-Path links within 246 are replicated, for each of the descending ports, in paths 247.

Figure 32:
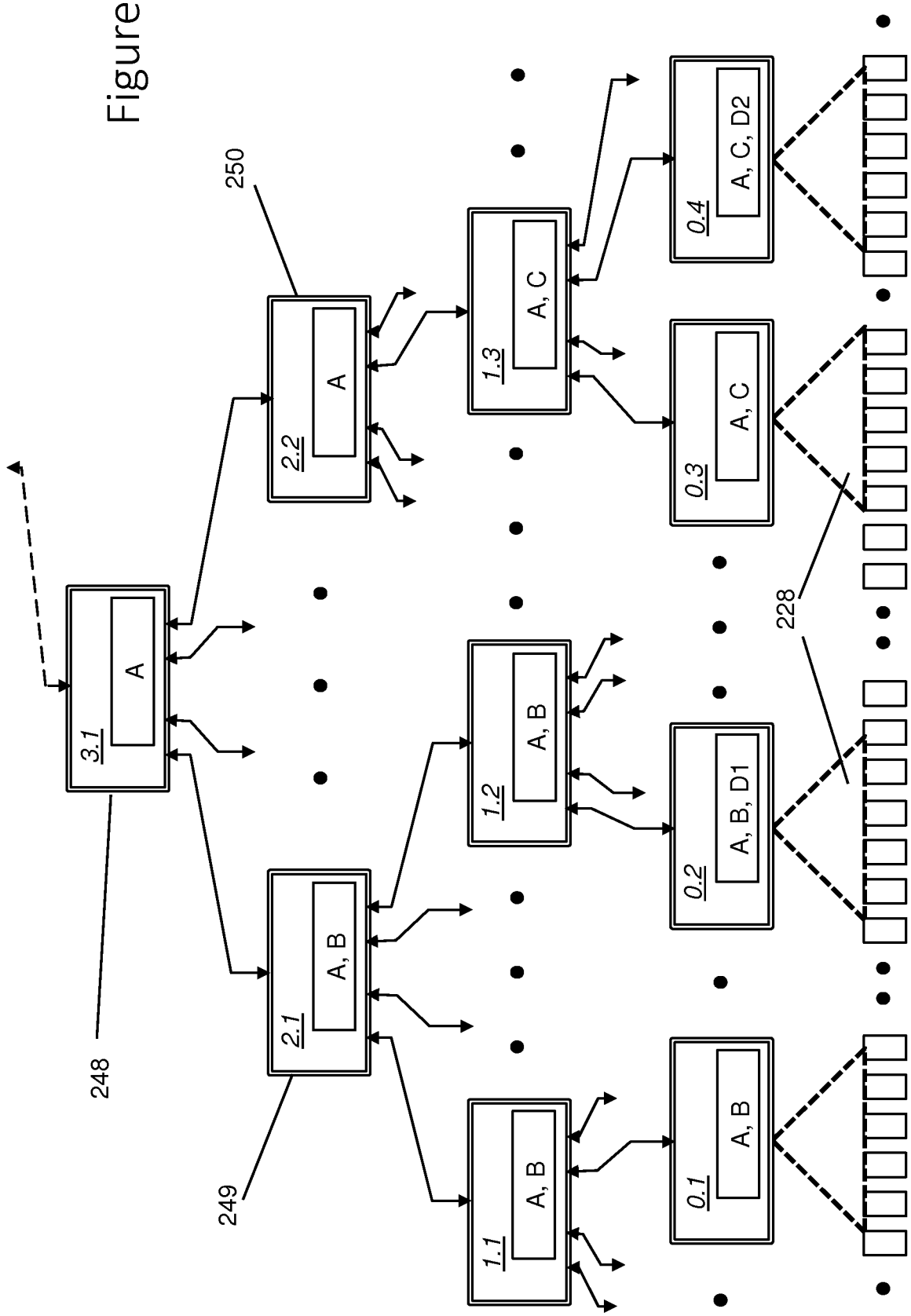
FIG. 32 is a block-diagram schematically showing some of the interfaces to part of a lowest-authority pivot that controls its own group digital computing engines.

In the said one preferred broadcast and synchronization embodiment of the broadcast connectivity 26, the rules for processing a plurality of demands on the pivots are explained with reference to FIG. 32. The double-boxes represent data and software routines within a hierarchy of pivotal computing cells. The top-most pivot 248 we will suppose is at level '3.1' though higher-scoped pivots may be above it which are not active in this example-arrangement. According to a user application, the pivot makes one demand (at a time) for an operation on a large array 'A' hosted by its subtended large segment of computing cells. If they are not currently engaged in their own single operational demands on their own segments, its subsidiary pivots, including 249 and 250, receive this demand and propagate it downwards towards level '0', where the pivots are each in charge of the smallest segments 228, directly-accessible by users. When the completion-annunciation signals for the said one demand has finally progressed upwards through the hierarchy of pivots, back to pivot '3.1', the top-most may again send its next request downwards. In the mean-time, pivot 249, at '2.1', under the scheduling rules, is permitted to initiate its own array operation on array 'B', and likewise passes down its demand for a single operation. Pivot 249 holds the requested operation by 248 in abeyance, although (in this example) '2.2' 250 continues the 'A' request downwards. '1.3' introduces a third array 'C' however, but we shall assume that has not occurred before the request for 'A' has arrived. 'C' is held in abeyance until 'A' is satisfied, whereupon '1.3' will get its own opportunity to command 'C'. In the same way, '1.1' and '1.2' acquire the lowest level for '13' except that '0.2' may itself make prior claim to its own, lowest-level segment with array 'D1'.

The lowest scheduling rule, Rule 3, of pivotal hierarchical-operation, in the said one preferred broadcast and synchronization embodiment, is then: "unless Rule 2 is already in operation, a pivot may initiate one operation and await completion of that operation before accommodating a superior command". Thus, if the currently-described state is as shown where a 'D2' operation is being performed, '0.4' must have annunciation of completion of the array 'D2' operation from its segment before '1.3' can complete its partial responsibility for 'A', and then commence its own demand related to array 'C'. Similarly, first 'D1', followed by '13' (having already commenced), must be completed before '2.1' can proceed with 'A'.

In order to prevent instability in this process, the pivotal Rule 2 becomes: "unless Rule 1 is already in operation, a pivot may acquire its subordinate pivot immediately following completion of said subordinate pivot's single current operation and initiate its own operation". For this purpose, any superior on-going command, above a pivot, is registered and retained by the subordinate pivot ready for inhibiting that pivot before a further operation can be initiated by that pivot. Rule 1 is then: "once its own single current command is complete, a pivot holds acquisition of a subordinate pivot on behalf of a higher-level superior command, if any, and in operation is itself acquired on behalf of that higher command, until released". This ensures that the higher-levels have ordered priority over lower-levels for acquisition of computing cells, and once the lower levels have completed each their own single operation, the highest active pivot has full control of its segment, apart from already-declared, unneeded sub-segments, which are then free for use by their own pivots.

It is an advantage that after 20 operations (say) a higher-level pivot temporarily relinquishes control, in order to share opportunities for processing at the lower-levels—regaining control and continuing its operations after the interlude.

Returning to FIG. 31, when commanded by acquisition and a command-message through 251 from above, the pivot retains the acquisition state and stores the message for subsequent reading in 252. The superior pivot latches the acquire signal on link 253 high, and this alerts the pivot processing 243 to the demand, which it acknowledges through link 254. When ready, the computing cell processing 243 initiates action of the demanded operation by reading the stored message, triggered by link 255.

243 operates variously according to Rule 2 and Rule 1. Under Rule 2, in accordance with a user's application, processing 243 of a pivot 22 initiates an array-processing operation intended to be performed by computing cells subtended by the quadrants associated with said pivot. Each path such as 246 downwards to a subsidiary pivot, such as 239 in FIG. 30 (except a pivot of lowest scope) has at least an acquire-link 256 and a command link 257 for messages. When an array operation is to be performed, latch 258 is set high for acquisition of the next-lower pivot and an acknowledge signal is ultimately to be expected by 243 to be returned on acknowledge-link 259 when the next lower-scope pivot is ready and has returned an acknowledge signal on its own 254 link.

243 stores the operational-message intended for its sub-segments in its quadrant interfaces 244, and 257 streams the message to store 252 of the next-lower pivot. 243 then awaits the completing synchronisation signal through 260, which is ultimately registered in the same way on all subtended paths in interfaces 244. 243 registers completion of the current operation and initiates the next, under Rule 2, unless over-ridden by its superior pivot under Rule 1.

Figure 33:
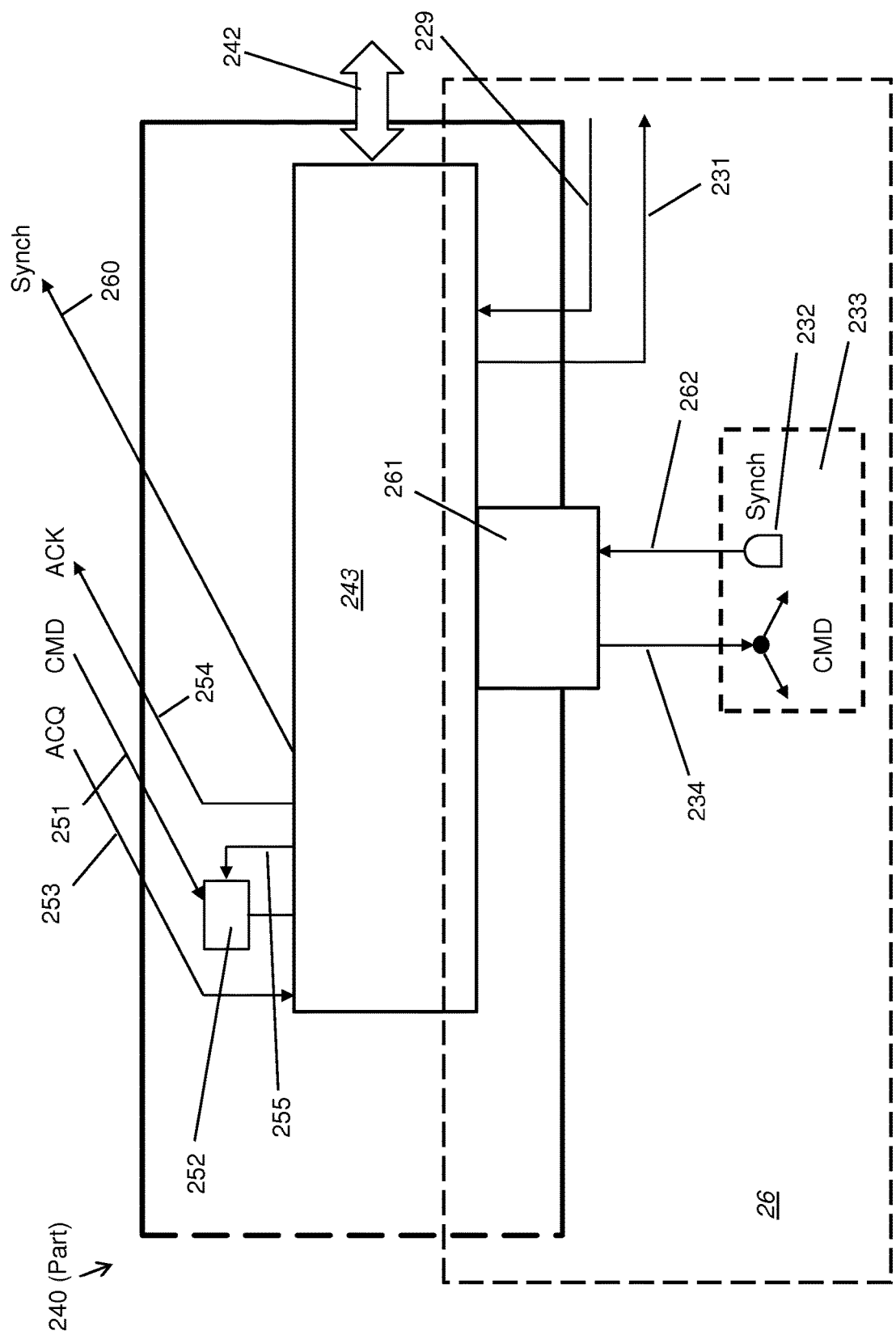
FIG. 33 is a block-diagram schematically showing an arrangement of interrelated pivots controlling a notional-selection of arrays in shared digital computing engines.

In the case of a pivot of lowest accessible scope, FIG. 33 shows that the processing 243 communicates with broadcast connectivity 26 through interfacing circuit 261 outwards from the processor 243 with the command-message link 234, and into the processor through the synchronisation link 262 from node 227 of FIG. 29.

Under Rule 2, a pivot, having completed its current operation, interrogates its acquisition-link 27 and finds a prior demand from its superior pivot, accepts a command-message and passes that message downwards to its subsidiary pivots as though it were its own message but records that it must ultimately pass a completion message upwards through synchronisation-link 260 for this current command. 243 performs no further pivot-operations until that operation is complete, but it will continue to carry out operations associated with the segmental connectivity 25 through links 242 as demanded by its connections 229 and 231 (FIG. 29). Rule 2 applies similarly to a lowest-scoped pivot (FIG. 33), except that it interfaces with its segment directly through broadcast connectivity 26.

Accordingly, the Connectivity has a broadcast connectivity in which each pivot along a recursive space-curve has switchable connection through said broadcast connectivity to the digital computing engines residing along a correspondingly-prescribed segment of the space-curve of which a pivot, inter alia, is a controlling pivot in a processing instruction for transactions to be performed by each of at least some of the digital computing engines within said correspondingly-prescribed segment. Each pivot in operation, is enabled concurrently to distribute an instruction in common to each of said digital computing engines within prescribed segment, and each digital computing engine within the corresponding segment has signalling means into the broadcast connectivity to annunciate to said controlling pivot completion of a said transaction. Each pivot also has means to hold a stored parameter defining the scope of its associated said correspondingly-prescribed segment, and the scopes together form an ordered hierarchy in accordance with the recursive form of the space-curve. In addition, the Connectivity has pivots controlling superior segments with scope encompassing the scopes of subordinate segments, and has means operable to inhibit access by certain lower-scoped pivots to their own associated subordinate segments, and inter alia to take control of the digital computing engines in the subordinate segments.

The pivots therefore have, interconnecting between themselves, a network of circuits hierarchically-ordered according to the hierarchically-nested scopes of the pivots; and several pivots, in accordance with the hierarchically-nested arrangement of the said chain of segments and pivot-scopes, have means thereby to switchably-select and to programmatically-code subordinately-scoped pivots. Further, a higher pivot that controls a superior segment, with scope greater than and encompassing a subordinate segment with an associated lesser-scoped pivot, has discretionary means operable to inhibit access by the latter pivot to its own said subordinate segment, and inter alia to take control of the cells in the subordinate segment.

The distribution-means for variously-dimensioned user-arrays comprises in operation, in the embodiment of its first-stage of logical switching, search for a free special processing cell 21, which while in a free-state corresponds to a regular segment of computing cells themselves likewise free and available for access by a new user-program. As just explained, this segment may already have responsibilities as part of a larger segment controlled by a higher-scoped pivot but task-sharing means within each computing cell resolve the logical isolation between the differing scope tasks. Port 17 has a search and selection means that initiates the input to the Connectivity of an application received from a user terminal 16 and directs routeing through accompanying interconnections in terminal connectivity 24 as described above, and this offers acquisition and access by the user to an appropriate said free special processing cell 21, if any are indeed currently free. The pivotal computing cell that is coordinated in its location with said selected, and claimed, special processing cell may also itself be tasked, in one mode of operation, by instructions and data forming part of the same-user's application program. When the special processing cell is finally set to free-state by completion of this application, its associated pivot likewise passes a return to nil-state to its array elements as its final operation.

A set of primitive array-processing instructions, at least including some common in the state of the art, is micro-coded into each computing cell. The set includes an instruction enabling means for loading a large array of data elements into an adequately-sized segment of computing cells, 'LOAD' (say). In an example of the LOAD instruction, a pivot at a high level of authority has means to form a broadcast-message stream to all subordinate pivots within its segment. In said embodiment of broadcast connectivity 26 first mentioned with regard to FIG. 28, the said array-loading instruction, when passed to the said pivot at the high level of authority, tasks each of its subtended pivots in parallel, each of subtended pivots in sequence tasking their subordinated pivots down to the equal-sized sub-segment at the lowest pivotal authority that contribute to the make-up of the input content of the larger array. In this LOAD operation, it is assumed that the elements of the large array required for loading have themselves previously been arranged appropriately in a full complement of such equal-sized sub-data-arrays, each scoped at the lowest level, and that these equal-sized sub-arrays have been distributed and stored (by a multiplicity of external means) into a corresponding number of user interfaces 17 such as 82, each being selected according to its address in order to match the address of one of the said selected lowest-scoped special processing cell such as 83, as explained at length above in conjunction with FIG. 8 et seq.

By means of its associated special processing cell and terminal connectivity 24, a selected lowest-scoped pivot is thus enabled to communicate with one local interface 17 in order to load its contributing segment of computing cells concurrently with other lowest-level pivots, on command from a higher-authority controlling-pivot when ready. Each message stream from processing and storage means in 17, comprising (say) 32×32 data-elements, is passed as a serial stream to its corresponding lowest-level pivot, which then forms a serial stream of addressed data-items to be sent over the broadcast connectivity to its own segment of computing cells. As just indicated, this operation is under the exclusive control of the higher-level pivot, which in turn is commanded by the owning-user's code. Each recipient computing cell matches the stream with its own position along its segment in order to load and store its own appropriate array data-element. The computing cells annunciate completion of reception to the lowest-authority pivots, and all completion signals in the large segment are ultimately annunciated by these pivots to the said higher-authority pivot, permitting further operations to be carried out on the large array now finally in residence in the larger segment of computing cells and under the control of that pivot. The contrary operation to 'LOAD' is the output of arrays, which follows the opposite sequence, in which the higher-level pivot delegates responsibility downwards to its lowest-level pivots. In said one preferred embodied circuit for the broadcast and synchronization network, each of said lowest-level pivots broadcasts a READ'-command (say) to its segment. The pivot processor 243 follows this with a countable sequence of trigger-codes that call for each computing cell in a segment, in 'bucket-brigade' order, to pass its contributing data-element back to the pivot along the locus of the space-curve of the broadcast connectivity, and thence to one of the user ports as a sequenced serial stream of elements. In a second preferred embodiment, the tree-network links 229 and 234, and nodes 230 are configured for bidirectional data-transmission and the pivot sequences the computing cells to pass their data-elements to the pivot, in turn for serial output. In a third preferred embodiment, the Connectivity has an additional mesh of read-write lines for certain pre-ordained large segments of computing cells that are each controlled in row-major order of data-only transfer and interrogated by a corresponding dedicated input/output port, in the same logical manner as commonly adopted for arrays of computer memory cells.

Thus, when the said search and selection means acquires a large segment of computing cells, within said large segment further sub-segments of the same said large segment of computing cells exist with similar pivotal-control means at their own respective pivots. In a hierarchical sense, these sub-segments may therefore be regarded as subordinate to the larger segment.

The square-array dimension, m, in one preferred embodiment of the Connectivity is a power-of-two integer such that user-loaded arrays, in that case, must be constrained to comprise no more than $2^{(2m)}$ data items along corresponding segments of the recursive curve, where 'm' is one of a range of integers fixed during the construction of the Connectivity. More general arrays, such as rectangular matrices, having a scope less than $2^{(2m)}$, are augmented by 'Nil' elements that pack out the rest of the segment. Subsequent tasking and transmission protocols operate as though the dimensions were those of the full segment but the 'Nil' designation of an element then means that no transmission and processing associated with that element need take place.

The recursive curves have particular advantage in embodying n-dimensional congruency of arrays of this type, and at least one arrangement supports the uniformity of m-dimensional direct isometry in translation (m<n) in transmitting data-elements concurrently across the array-processing interconnections as to be discussed shortly.

The apparatus forming the segmental connectivity advantageously arranges the recursive manipulation of the elements of the matrices amongst themselves in accordance both with simple prescribed routines and with hierarchical regularity of data-routeing through the connectivity. As an example, matrix multiplication in conventional mathematics requires multiplication of selected pairs of data elements and then a summation of groups of the multiplied values. The standard routine corresponds closely with the row-major mathematical arrangement of the matrix elements and is used universally in serial computing. However, at least the transpose of the second matrix in this operation requires interchange of data-elements diagonally across the said second matrix before the product can be computed, and that form is not convenient for large matrices distributed over regular Cartesian arrays of processors because the concurrent cross-linking of operations, between the matrix-elements in their conventional row-major ordering, would need numerous diagonal paths incompatible with the ordering of Cartesian paths. It is therefore advantageous to partition the matrices as recursively-devolved structures in order to match the arrangement of Cartesian linkages such as those described in this specification and fortuitously, in a manner to be described shortly, that removes the need for cross-linkages for the most common operations on matrices. Firstly therefore, it is desirable that the matrix-element arrangement be recursive, in order to match the interconnection form of the recursive connectivity, as indeed is the purpose of the recursive design of this connectivity; secondly, it is desirable that interchange registration of corresponding elements be as logically trivial as possible to permit simultaneous one-step transmission of a large multiplicity of elements without contention. The hypertorus structure of bi-directional interconnects supports such elemental routeing-operations, and the numerical ordering of the locus of the recursive curve generally enables recursive elemental operations to be strictly arranged in a order-Log(n) series of time-steps.

Figure 34:
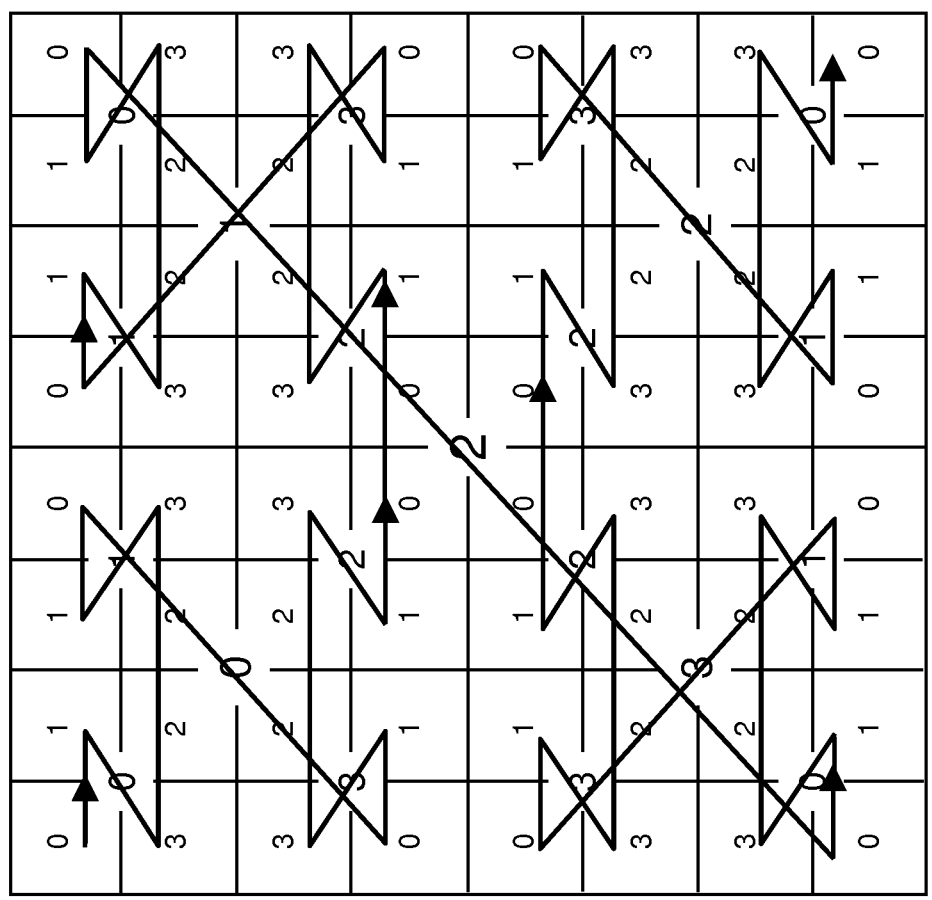
FIG. 34 is a diagram showing a 'Reflected-Z' recursive curve.

It is firstly advantageous, therefore, to re-order the conventional, 'human-oriented' row-major form of matrices into a hierarchical ordering for each of the matrices being transported and manipulated within the Connectivity, and to be compatible with the recursive-curve organisation of the Connectivity, using a hierarchical organisation called herein a 'Reflected Z-Curve', illustrated in FIG. 34. This transformational curve is selected in order to re-index the locations of the elements of each 'human' array into a nested, 'computer' hierarchy, without changing the elemental values. It then permits ordered relocation of the elements along the single-dimensional locus of the selected recursive space-curve, of which an example is the H-Curve as illustrated for comparison in FIG. 35. FIG. 35 illustrates the serial sequence of steps that converts an example 4×4 row-major 'human' matrix of integers through a Reflected Z-Curve order to H-Curve order for computing operations, which favour the H-Curve for some forms of matrix arithmetic within the recursive connectivity 12 of the Connectivity. The components of the array have been given simple arbitrary values so that the progression through the two curves can be followed. Here, the conventional [0, 0] component of the left-side matrix has the value '8' and this is also required to be the start-point for the H-Curve at location [5, 5] of the right-side matrix. Similarly, the end points of the curves are at [7, 7] and [2, 5] respectively for the two matrices. The Z-Space Curve must then be decomposed recursively, and the method of recursively reflecting the Z-Pattern across the original array generates a sequence of components along the H-Curve that enables a simple scheme of row and column swapping for parallel matrix arithmetic. The Z-Curve transposition procedure will be elaborated by way of example in due course.

As indicated hereinbefore with regard to the H-Curve, for applications such as matrix-comparisons and matrix-arithmetic, one feature of the embodiment in use comprises computer-direction of arrays of data coherently across the machine, as already discussed with regard to FIG. 14 which shows that the cube of data held in computing cells 0110g, 0111g, 0101g, 0100g, 1100g, 1101g, 1111g, and 1110g can be readily transferred in a single master-clock cycle to computing cells 0010g, 0011g, 0001g, 0000g, 1000g, 1001g, 1011g, and 1010g. In this example, the data-stores in the first segment of computing cells may conveniently hold a matrix of elements that is to be moved to the congruently shaped second segment.

In the case of matrix transposition and matrix multiplication, the H-Curve, as described hereinbefore, is appropriate since this arrangement enables matrices to be combined, element-to-element, through single-step Cartesian swapping of the matrix elements, rather than by awkward diagonal exchange of elements and long sequences of lateral movements. The form of the H-curve enables systematic sequences of folding-patterns whereby large numbers of switch-selectable pairs of data-elements may be exchanged concurrently in a single major-clock cycle, as to be explained hereinafter.

In a matrix 'COPY' operation, the pivot for a first matrix, stored in a first segment of computing cells, commands each of its computing cells (including itself) to pass a copy of its data-element to its signal-adjacent neighbour in a second, congruent segment of computing cells, through their common next-higher dimensional axis. For the complete array of copied elements, this means that the like-segment of computing cells receiving the copy of the matrix holds it in the same order as the original and in like-ordered computing cell addresses. In this operation, on each half-cycle, each of half of all computing cells in the first segment pass an element-value concurrently to the alternately-corresponding computing cells in the second segment. In the second half-cycle, the second half of the first segment transmit their values. During the major clock cycle, it also may be arranged that each pair of computing cells exchange their elemental values—that is, a SWAP operation.

Due to their close functional relationship, the processing cells of the declarative connectivity are arranged in the computer circuitry layout of the Connectivity 10 such that each processing cell is collocated with a corresponding computing cell within a digital computing engine. This provides a common address format for the administrative connectivity processing cells and the recursive connectivity computing cells. Indeed, the collocation of the circuitry of each processing cell with a computing cell then permits, if desired for packaging efficiency, each pair to share and minimize some of the combined functionality within the digital computing engine, although for this specification, it has been convenient for simplicity of description always to treat them as separate entities with distinct processing embodiments of their logic. The said collocation permits dedicated bi-directional signal connection to be made between the two elements without conflict from other operations within the machine.

As hereinbefore explained, the multi-dimensional, Cartesian paths of the hypercube segmental connectivity embodiment then provide vital communication paths for transporting, across the connectivity, the data structures held by variously-sized data-strings, matrices and n-dimensional blocks within segments of computing cells.

It will be understood that under the direction of a controlling pivot, the first and second congruent segments together, in effect, constitute a direct isometry in translation, the data contents of said first segment of computing cells being thereby enabled to transfer concurrently as an array by one direct lateral message-transmission, from said first to said second segment of computing cells. In this way, it is an efficient operation for a pivot and its computing cells to cause a large sub-array of an encompassing array to be transferred and to overlie the correspondingly-positioned data contents of a second large sub-array within the encompassing array in a single clock-cycle. When the segmental connectivity is viewed as a two-dimensional distribution of computing cells, as in FIG. 15, this transfer-movement may be viewed as a 'folding' motion of the translational movement of multi-dimensional data-blocks and is important, for example, in subsequent descriptions of the manipulation of matrices in the SWAP operation. In some applications, it is an advantage that the data-swapping action is enantiomorphic. FIG. 15 illustrates a small-sized example of this operation but, by virtue of the recursive H-Curve in a hypercube embodiment, the same principle applies at every dimension of sub-hypercube with dimensions up to one-less than the maximum dimension of the segmental connectivity.

The total number of paths between the full complement of an array of 1024 computing cells forms at least a 10-dimensional binary hypercube, five dimensions being formed by East-West paths and five alternating dimensions being formed by North-South paths, as noted in the alternating levels illustrated in FIG. 23:—that is, where 'x' and 'y' coordinates of computing cells each have values between 0d and 31d. In the case of the H-Curve, the n-dimensional spatial Gray-Code address of each computing cell, with trivial re-juxtaposing of digits, is also its Gray-Code position along the curve.

As hereinbefore noted, one feature of the digital computing engine embodiment is the major-clock implementation that provides an arrangement for reciprocal message-transaction between two computing cells within the recursive connectivity 12, ordered in two half-clock steps, which operate by virtue of an even-odd designation of signal-adjacent neighbours in a Cartesian hypercube. By choosing the indexing of the addresses of the computing cells to follow the said Grey-Code system of numbering, the signal-adjacent neighbours of every 'even'-parity addressed computing cell fortuitously has 'odd'-addressed signal-adjacent neighbours and every 'odd'-parity addressed computing cell has 'even' signal-adjacent neighbours. The major clock is operable on alternate half-cycles first such as to activate all odd-addressed digital computing engines to initiate communication by their computing cells on one half-clock-cycle and then to activate all even-addressed digital computing engines to initiate communication by their computing cells on the other half-clock-cycle. A multiplicity of said computing cells are thus each selectively operable exclusively by one half-cycle of said system clock such as, when so operated, to communicate with selected ones of its signal-adjacent neighbour digital computing engines over at least one data transmission route.

One preferred method of such designation is to wire the system-wide 'major' clock to every computing cell, as hereinbefore noted, such that the rising edge of the clock pulse switches all 'even' computing cells (for example) for data-transmission, while the 'odd' computing cells listen, and the falling edge of the clock pulse switches all 'odd' computing cells for data-transmission, while the 'even' computing cells listen. It is to be noted that this clock is distinct from the ubiquitous higher-speed 'minor' clocking of the elemental logic of the computing cells, as commonly used in digital computing and data-transmission, the major clock-pulse itself being clocked by perhaps 32 cycles of the minor clock. At each half-cycle, transmission is initiated by the 'Master' computing cell of the pair for that half-cycle for communication with its appropriately-receiving computing cells in 'Slave' mode. On the second half-cycle, the roles reverse for the required transmission in the opposite direction. This resolves any possible conflict between computing cells because, at any one time, only one computing cell of any pair will be transmitting.

Thus, all Master transmissions operate in one group, the Slaves awaiting reception; then the roles are reversed for the next transmission sequence. Multi-dimensional sorting, to be described in due course, is a simple example of the use of this feature of synchronisation where sorting-sequence comparison and swaps are made on alternating cycles. A further example application of the even-odd switching of the Connectivity is digital differential analysis. In that case, data resident in a coherent block of computing cells represents a multi-variable dynamic system, quantized as state-variables, and defines a discrete form of dynamic function in the form of a matrix of computing cells that models the interaction between the variables. Blocks of computing cells alternate with their interlaced signal-adjacent neighbour computing cells to transmit, from one to another, updated own-values pertinent to the problem being executed. This matches the 'leap-frog' method of computational integration.

In one mode of a preferred embodiment in operation, the recursive connectivity has a multiplicity of individually-commanded clusters of processor-arrays, and the computing cell part of each digital computing engine inter-communicates only with its signal-adjacent neighbours. The transmission message-format is advantageously then restricted to a single adaptable-length data-field, assembled according only to the required resolution of each transmitted parameter. Where transmission is directed indirectly through intermediate digital computing engines to a target digital computing engine, each computing cell has means to form a more complex message format including at least an instruction and the relative-address between sending and receiving digital computing engines.

The following is an example-message stream of serially transmitted data-fields shown as a bit-pattern for a typical array-processing transaction:

Message:-_b _ad x x ad _as x x as _x x x x x x x x x x x c __

Fields:—1 2 3 ------4------- 5 ------6------ 7------------- Data Field------------ 8 9 10 '1', '3', '5', '7' and '9' are demarcating delimiters formed here advantageously by the return-to-zero feature of the Bi-Phase encoding. Multiple messages of this form may be concatenated in one signal-transmission by registering a double delimiter ('9' and '10') between messages.

In this example, bit 'b' is a blocking signal to the slave computing cell which, when set, prohibits returned data-transmission from that said slave computing cell, on its half-cycle, back to the master computing cell—apart from a single reply-bit message, 'b', which permits the said slave computing cell also to prohibit communications into itself, if it becomes engaged in a further, independent task. If no 'b'-bit is received back from the slave (during its 'master' half-cycle), the master computing cell is free to send follow-on messages on its own subsequent half-cycles, any of which may reset bit 'b', thereby freeing its own, incoming connection from the slave computing cell.

The variable fields '4' and '6' compose the address fields in which '4' defines the ultimate destination-address relative to the current computing cell and '6' is the address of the original source computing cell relative to the current computing cell. The latter address has value to the destination computing cell for certain subsequent applications. It is of value to the implementation that the total number of bits in the fields '4' and '6' varies with the signalling-distance between source computing cell and destination computing cell, short distances advantageously requiring fewer bits. The source relative-address increases in length in step with the decreasing destination relative-address (the source and destination relative addresses are complements of one-another). A 'relative' address between two computing cells, in Gray-Coding, is derived as the Exclusive-OR of the two addresses.

In this way, the network of the segmental connectivity enables a signal-initiating computing cell to transfer a message to a target cell by way of a sequence of address-selected signalling-paths, each cell in the sequence along the route to the target cell being switchably-ordered by a cell-selecting address-code transmitted along with the message.

The 'Data Field' itself comprises further subsidiary bit-fields for array dimension, function-name and argument values that accord with the particular primitive operation currently tasking the master computing cell. Such data are readily decodable and interpretable by micro-coding within the computing cells, as is routine in the state of the art. The transportation and processing of arrays receive particular attention in this specification and it is advantageous that each data-item in a data-segment identify its own position in the said data-segment (that is, along the locus) at every stage in its transmission and processing tasks. This feature, by virtue of the Gray bit-pattern form of addressing, the choice of recursive curve and the said data-segment's scope enables the recursive connectivity to be acquired from time-to-time as clusters adaptable to the user's needs in terms of authority and relative position. Furthermore, each computing cell is enabled to take responsibility from time-to-time for storing and processing one of a plurality of data-elements associated with respective ones of a like plurality of data-arrays. A distinguishing feature of each data-element, and its attached immediate primitive operator, is the scope-integer 'm' of the data-array of which the data-element is part. As hereinbefore explained, it is a feature of the invention that plurality of data-elements and attached primitive operations associated with the said plurality of data-arrays be stored in each computing cell and then accessed and processed according to time-sharing schedules and the hierarchy of data-array-scopes.

It will be recognized that many other formats are also available in multi-wire transmission standards that provide at least equivalent information-utility to that described for a serial-channel Manchester Bi-Phase encoding.

Each computing cell has an instruction set that permits user software codes to select logical, arithmetic and port-addressing operations appropriate for comparing, exchanging and manipulating the elements of regular arrays of data. Binary formats for the said example of serially transmitted data-fields therefore include function designations and argument designations that conform to the formatting of the instruction-sets resident within each computing cell, as is common in data-processing central processing units. In the present invention, the choice of coded instruction-set in each computing cell has micro-coding especially related to array-processing operations. In addition to means for matching the equivalent microcoded hardware instructions with the function designations contained within a user's coded message, the instruction-set logic provides at least: logical comparison of each transmitted argument with numerical values, symbol-values and addresses stored in the computing cell; basic arithmetic operations on numerical arguments comprising numerical- and address-values as appropriate to the instruction; port-selection corresponding with an address-value; a directive that requests a report of computing cell occupational-status for transmission to another computing cell (e.g., a reply-bit message 'b'); and an 'execute' instruction that triggers a string of macro-coded functions from the computing cell's local memory. Storage and manipulation of the said instruction-set within the logic of each central processor unit follows design-rules that are common in the art of digital computing.

In the said example-message stream of serially transmitted data-fields, the major half-cycle pulse-timing permits only a fixed, maximum-length bit-stream to pass between computing cells, as determined by the ratio of major to minor clock periods. For this reason, in the example, if the maximum length has been utilised but the message remains incomplete, the last flag-bit 'c' (the eighth) in the data-field signals that a follow-on, concatenated stream is to be expected at the next major clock in order to continue the same data-field. For example, 'c' may be '0' for completion at the first transaction but set to '1' if the first bit of the next half-cycle, whether '0' or '1', will be the immediate continuation of the original stream. This said first bit is distinguishable from a 'b'-bit because the 'c'-bit, previously set to '1', has been memorised by the receiving computing cell and, for that message, cancels the relevance of the 'b' bit. Ultimately, the 'c' bit is set to '0' to indicate final completion of the data-field. Transmitter and receiver cells memorise the status of the 'c' flag setting at their appropriate message-ports until completion of the final follow-on message. Once, the message-stream is complete, perhaps after multiple, half-cycle, transmission-words, the next double-length 'return-to-zero' (in mid-half-cycle, say) is enabled to initiate a new message comprising address sequence and data-field (if required), as before described. By contrast, a continuous terminating Manchester 'return-to-zero' simply means that no further data is to be expected in that half-cycle.

As hereinbefore explained it is an advantage to some embodiments that a data-bus signal linkage be time-shared amongst a plurality of pairs of computing cells. The data-bus has means to identify pairwise ports and hence distinguish each message-transmission between each corresponding transmitting and receiving pair of computing cell ports. In that case, the data-bus port-connections dictate the specific ports that interconnect the transmitter computing cell and receiver computing cell used for a particular extended message. The receiver computing cell's port is then uniquely attached, through the data-bus, to the originating source computing cell and thus unambiguously tracks each received message-package for reassembling a plurality of such total messages at a like plurality of its own ports. By this means, each computing cell may receive a plurality of long, inter-leaved messages from multiple sources yet the scheduling circuits are still be able to sequence the related parts of each message, although this time-sharing operation of the computing cells necessarily affects their speed of response to multiple combinations of messages and sub-messages.

Various illustrative examples of operation of the Connectivity will now be described.

Figure 36:
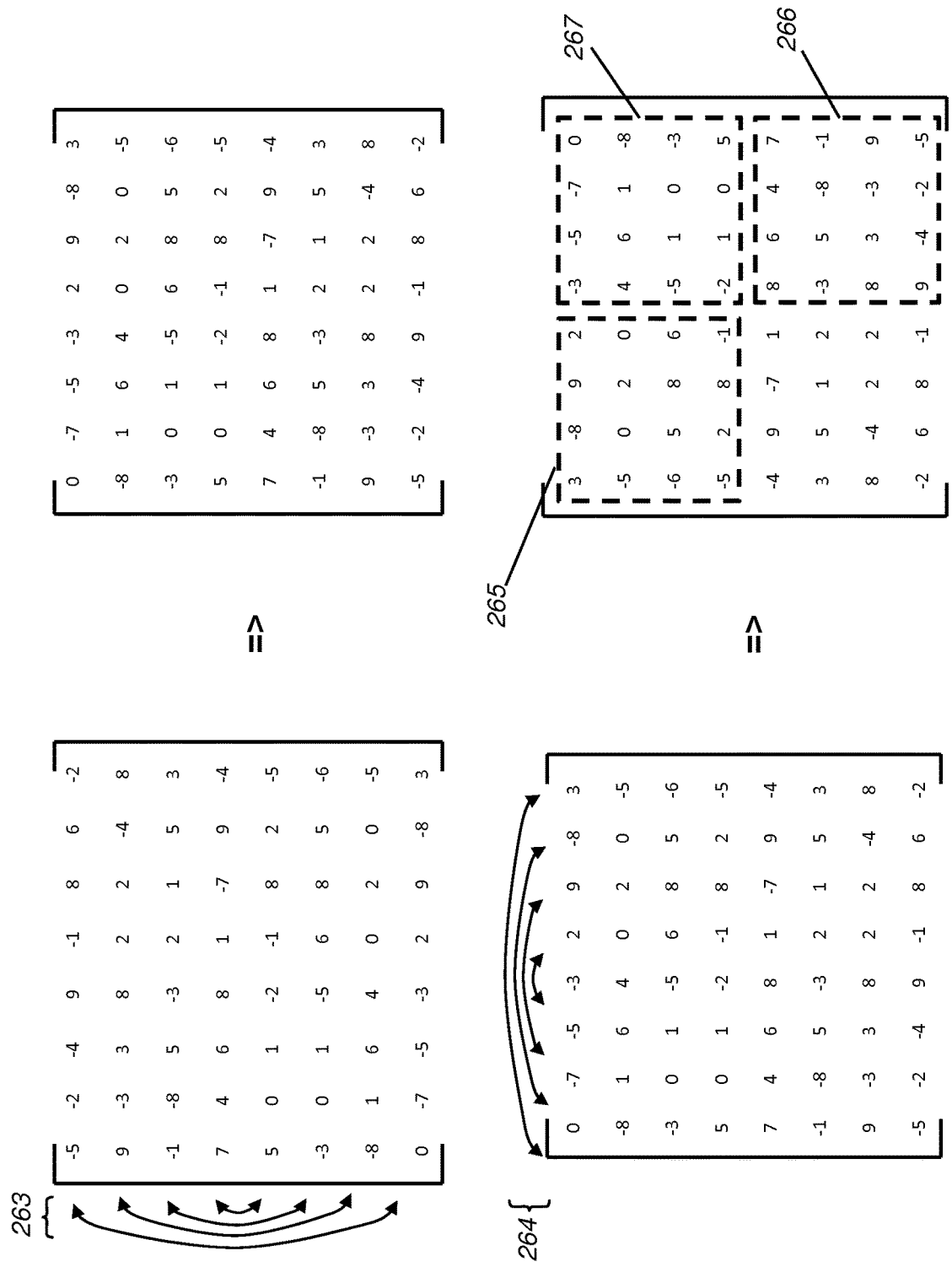
FIG. 36 is a diagram showing an example of a SWAP operation on the elements of a matrix through hypercube links in the vertical axis and then in the horizontal axis.

Example 1, The 'SWAP' Operation: As implied by reference to the paths of FIG. 23, each computing cell along a row of recursive connectivity 25 is enabled pair-wise by means of microcoded instructions to swap their data-elements, an odd-addressed computing cell communicating with an even-addressed computing cell that differs in address-value by only one bit-position. Selective-selection of the addressing bit-position by a computing cell micro-coded sub-routine achieves a systematic progression of element-swaps. For example, in regard to level '10' of FIG. 23, the acquisition of those computing cells with only the most significant bit of the array-defining address-length differing from the target address, enables simultaneous pairwise swapping of all of the computing cell data across all the rows of the matrix between the two 16-computing cell halves of the row, individual pairs exchanging data in one direction on one-half major clock cycle and in the other direction on the second half-cycle. By that operation, the computing cells in the row interchange their data-elements. If the addresses are matched pair-wise at the second to most significant bit, at level '8' of FIG. 23, the computing cells in quarters of rows swap their data-elements, in which case, each half of each row is reversed, and so on down to level '2', if required, where immediately-neighbouring pairs of data are swapped. At any level, all swap transactions complete concurrently within one major clock-cycle. To swap the elements of a matrix (and parts of a matrix), in-situ horizontally (or vertically) requires only one pass over two half-cycles across paths, as shown symbolically by the routeings such as 263 and 264 in FIG. 36. Each computing cell in a segment, such as 265 shown in FIG. 36, holds an array data-element, and the SWAP operation exchanges pairs of elements horizontally through the signal-adjacent neighbour Cartesian paths such as 264, as typically demanded by a SWAP instruction. The pivot controlling a selected segment of computing cells thus commands the exchange of data-element pairs, with local control by the 'odd' group of computing cells during the 'odd' half-cycle of the major clock, and, alternately, by the 'even' group of computing cells during the 'even' half-cycle. During this activity, as hereinbefore explained, the pivot itself has means: to ensure through broadcast connectivity 26 that every computing cell in its group has completed its previously appointed task; to satisfy its own responsibilities as a data-element in the array operation; and to initiate the next recursive level in the operation. By virtue of an address-field associated with the instruction in the pivot at each cycle, the pivot has means enabled to selectively-inhibit the response of certain sub-arrays and computing cells under its command, and by means of an orientation field, the pivot is enabled to command the axial-direction of the SWAP operation between any pair of quadrants of the segmental connectivity.

Thus, for example, in order to overlay two remotely-sited data-arrays and to pair-up their data-elements for summation and multiplication operations (say), micro-coding of a typical 'MOVETO' operation employs a COPY exchange-scheme, restricted to one-way only transmission of data-elements. This restricted COPY operation causes an array of data-elements from a segment of computing cells such as 265 to be overlaid onto 266 via a neighbouring intermediary segment, such as 267, that provides temporary storage of elements until the elements are passed on, in a further cycle, to segment 266. The operation in this case is the responsibility of a pivot with scope that encompasses at least all three composing segments of computing cells.

Figure 37:
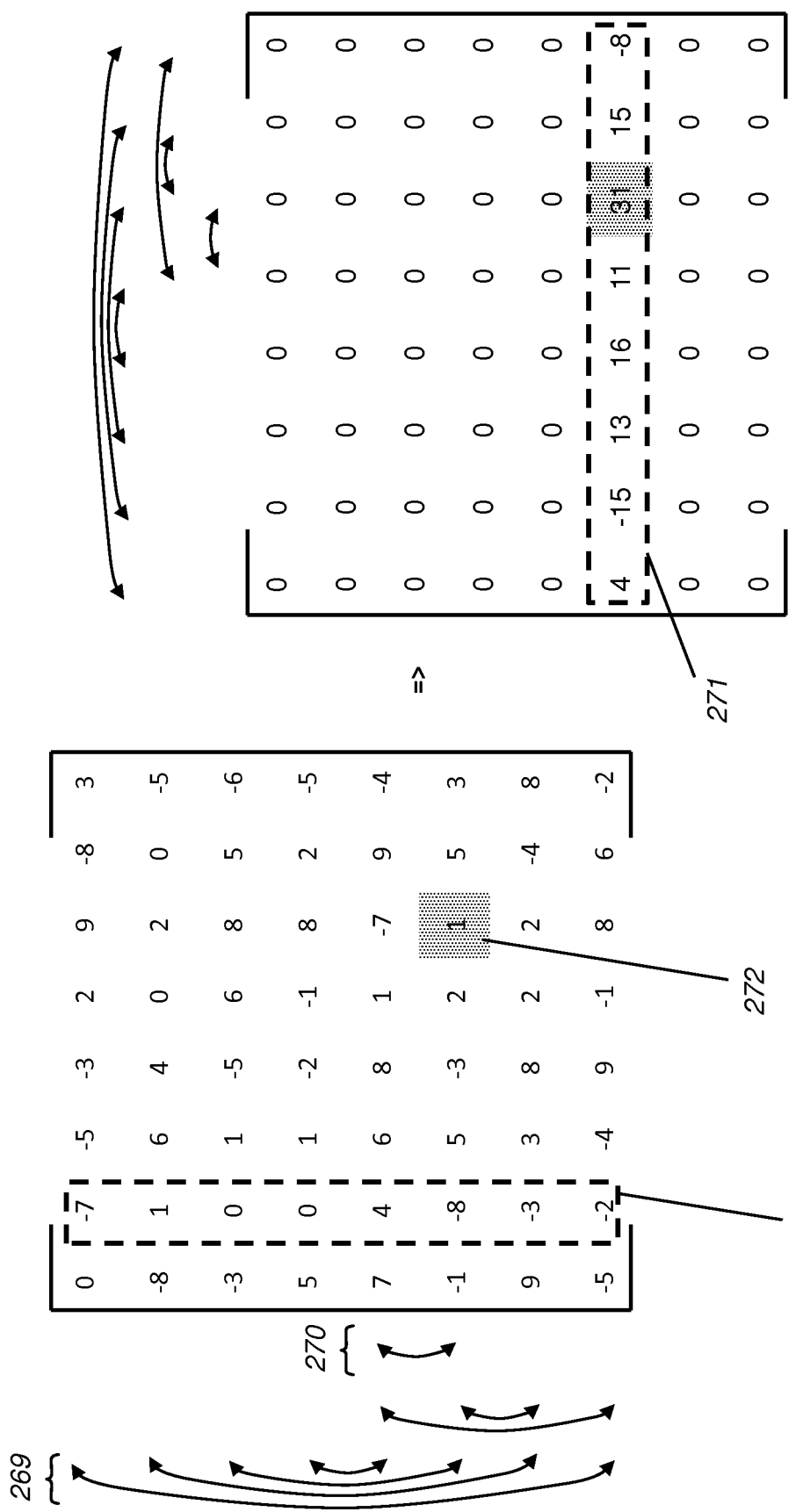
FIG. 37 is a diagram showing an example of matrix addition operations on the elements of a matrix through hypercube links of all processors in the vertical axis and then all processors in the horizontal axis.

Extending this one-way COPY mechanism to matrix addition, as in FIG. 37, a full column of elements, such as 268, may be recursively summed by progressive application of the same one-way COPY action for adding-together the elements, in a recursive sequence from higher dimension paths 269 down to the lowest dimension 270—that is, by folding and adding pairs of elements, then adding those results by pairs and so on until the results for each column terminates, in concert, at row 271 (say). Starting with the value '1' at 272, repeating the process leads to a value 31 for this element by adding column-wise and finally to '67' at this position for the summation row-wise of the total array in $2 \times Log(n)+2$ major-clock cycles. As hereinbefore explained in the description of the broadcast operation, which sends a common command to a segment of computing cells, in this example, the pivotal computing cell sends its command to each computing cell in the group affected by the intended swap-and-add operation. Once so instructed, each 'odd' computing cell (say) in the segment makes connection with its relevant signal-adjacent neighbour to exchange data-elements and, being entirely uncoupled in this operation, can perform the operation independently and simultaneously with all other 'odd' computing cells in the segment.

Figure 38:
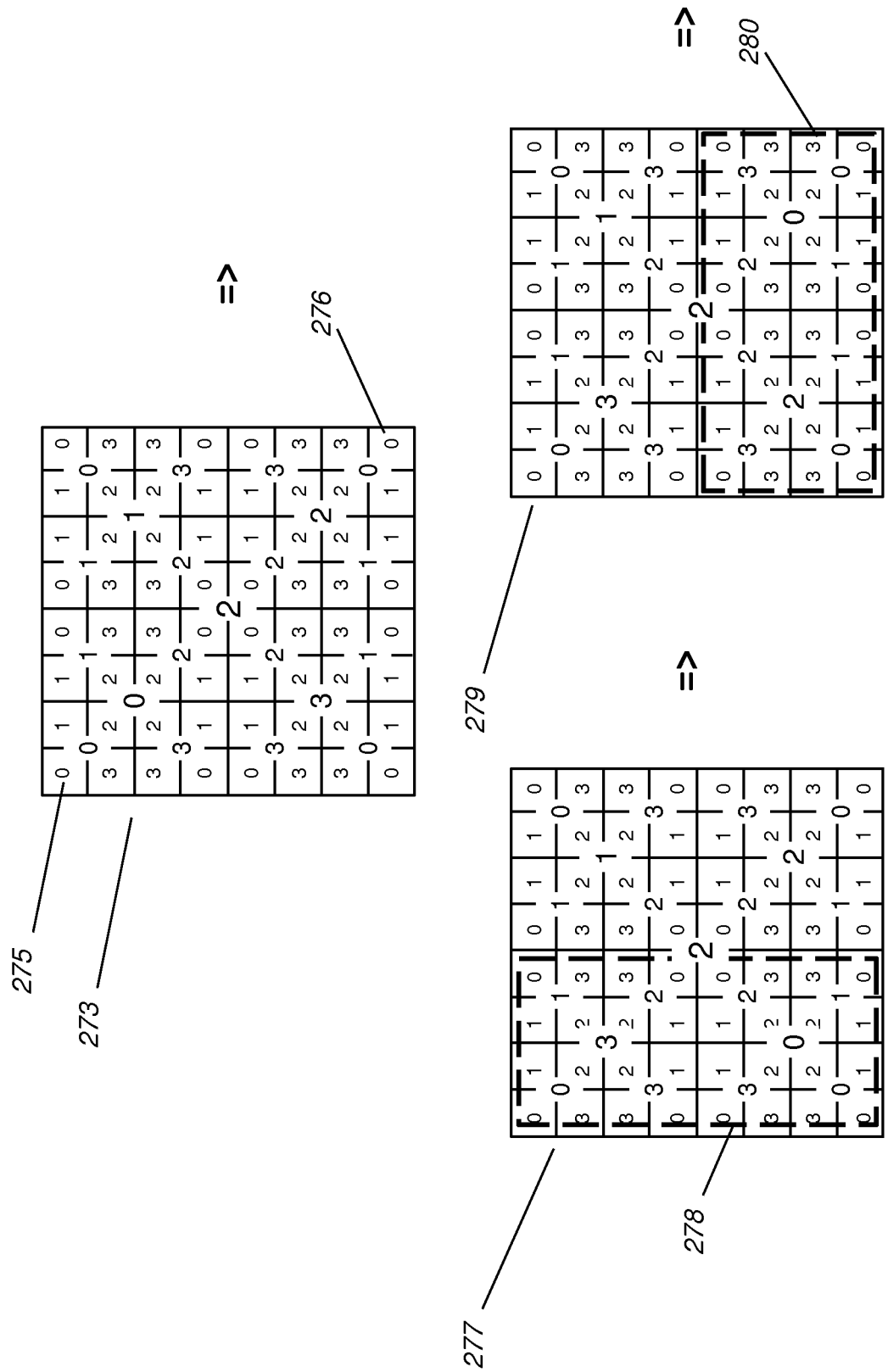
FIG. 38 is a diagram showing the first level of element-swapping transformations between a row major matrix, represented in a nested Reflected-Z form, and the equivalent 'H' form.
Figure 39:
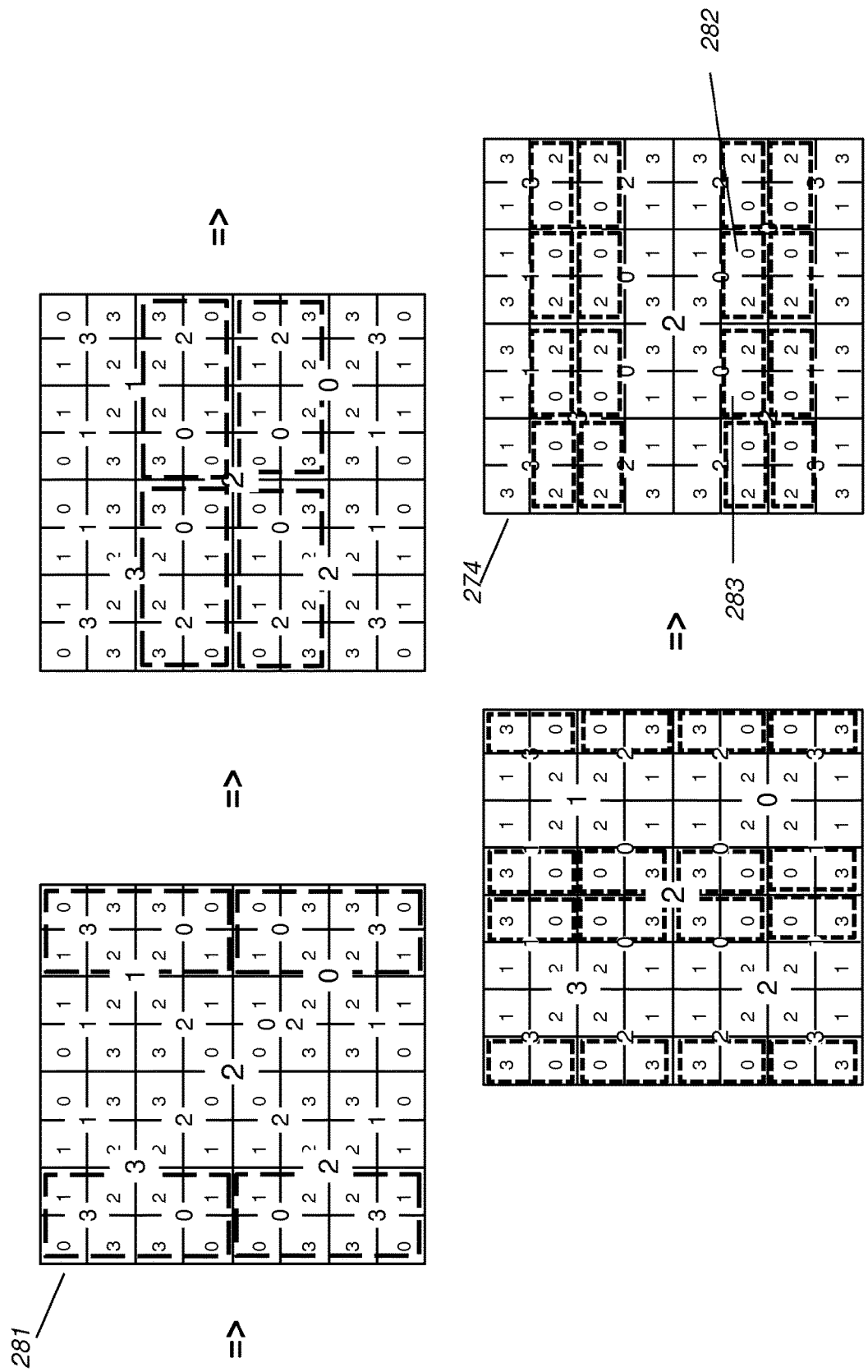
FIG. 39 is a diagram showing the second and third levels of element-swapping transformations between a row major matrix and the equivalent 'H' form.

Example 2, the Reflected-Z transformation: The Z- to H-transformation may be carried out externally for inputting the H-Curve order form of matrix. However, as an example of an internal computational sequence implemented using a particular recursive sequence of row- and column-swapping, FIGS. 38 and 39 illustrate transformation of a conventional 8×8 row-major matrix 273 in FIG. 38 into the equivalent H-Order arrangement 274 in FIG. 39. In the illustrated sequence culminating in H-Curve matrix 274, the ultimate Gray-Coding scheme for the digital computing engines in H-Order follows the same hierarchical principle shown in FIG. 22 but starts the inputted row-major matrix with component [0, 0] and designation (2)000g at 275 and ends the Z-Curve matrix at [7, 7] with designation (2)200g at 276. In the first stage of the transform at 277, all digital computing engines with Gray bit-pattern (2) 0 i j SWAP components congruently with their signal-adjacent neighbour at (2) 3 i j, column-wise through the 'y-axis', 'i j' typifying the specific low-end Gray-Code integers of each digital computing engine in sub-array 278. In the second stage, matrix 279, the DECs (2) 0 i j in the lower-left square segment of sub-array 280 SWAP row-wise along the x-axis with digital computing engines (2) 2 i j in the lower-right square segment. This same SWAP procedure continues to the next lower hierarchical stages at 281 and finally at 274, producing the H-Curve order at 274 with start-point at cell 282 and end-point at cell 283.

Example 3: Matrix-Transpose by 'SWAP' Operation

Figure 40:
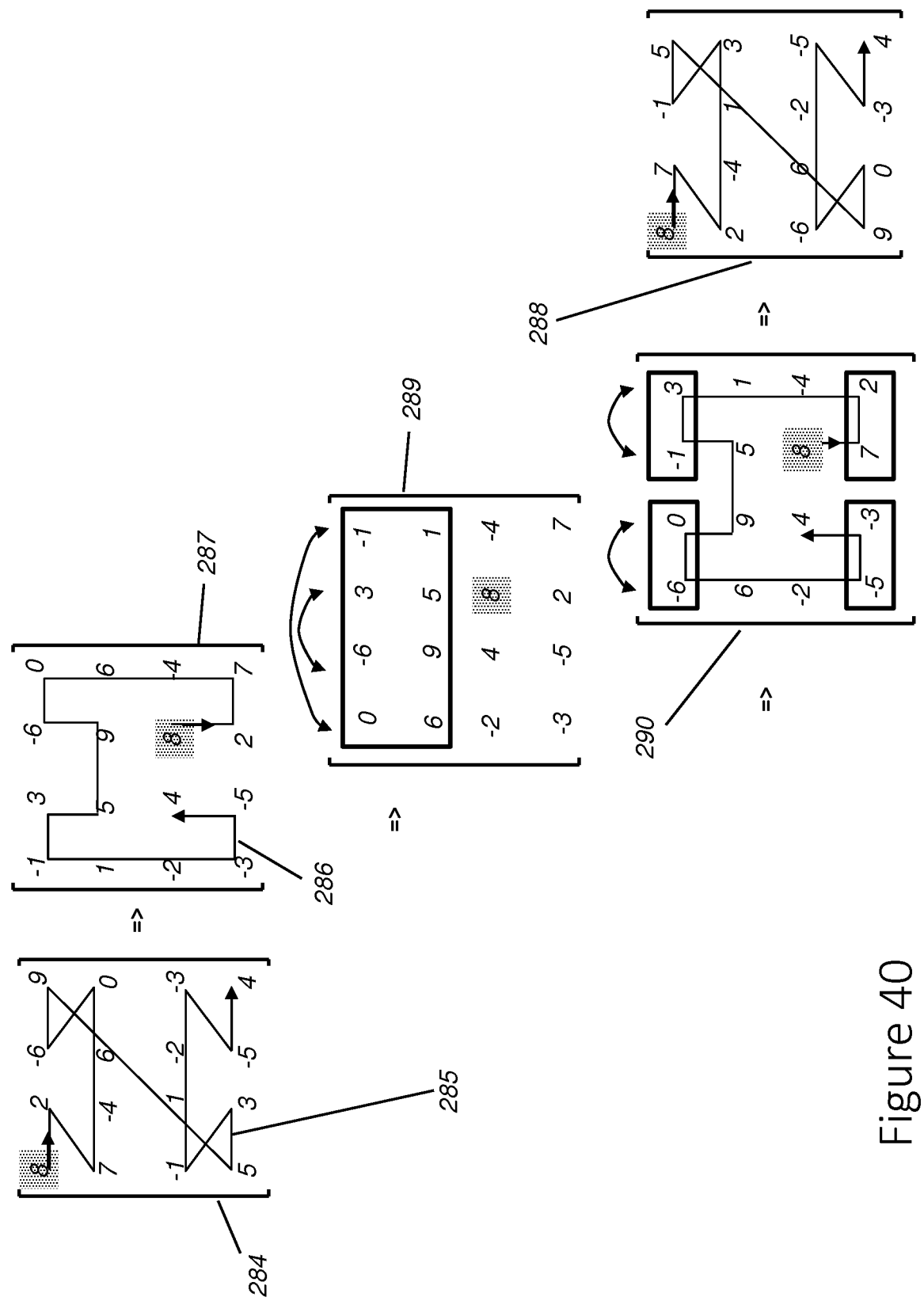
FIG. 40 is a diagram showing an example of the transpose of a matrix in H-Order by element-swapping transformations.

FIG. 40 illustrates the array operations for in-situ transpose of a 4×4 matrix 284 using the swap operations in a recursive manner that cross-relates selections of widely-separated matrix elements in an array of computing cells. The matrix 284 is an example 4×4 array of numbers laid out externally to the Connectivity in a conventional row-major form as would be familiar to a human analyst. For the purpose of the illustration, a reflected Z-Curve scheduling graph 285 is overlaid on the matrix as discussed with reference to FIG. 34 et seq. This permits transformation into the 'H'-Curve form 286 of matrix 287 which is more convenient for the segmental connectivity arrangement. Performing a conventional transpose into matrix 288 would require all upper-right triangular elements of 284 to be transposed with the corresponding lower-left triangular elements. If the transpose were to be carried out in a concurrent computation directly on this matrix-form, it would necessitate long diagonal linkages between computing cells in order efficiently to match the necessary diagonal passage of data-elements across the segmental connectivity. Although possible for a small transpose-manipulation case, it is more convenient for large matrix manipulations that the interconnections be Cartesian in layout. The pattern chosen for the enablement of matrix operations is therefore preferably the H-Curve 285, as hereinbefore described that maintains hierarchical formatting of the square matrix with Cartesian paths. The hierarchical form keeps together quadrants and sub-quadrants of data-elements for block-transfer across the segmental connectivity, using the appropriate dimensional axis of connection for each level of transference. For this purpose, it is convenient in these examples to assume that all matrices manipulated within the segmental connectivity itself are H-Curve order. For simplicity of explanation, the user is assumed first to have rearranged the matrix 284 externally through the Reflected Z-Curve transformation into the H-Curve matrix arrangement of 287. Then, the segment pivot for the matrix elements nominates the rectangular sub-segment of the H-Curve form, shown boxed in matrix 289, for swapping horizontally as hereinbefore described. This is the first iteration of the operation. The second iteration swaps those elements likewise that are identified by the boxes in matrix 290. Generally, the transposed H-Curve matrix is required for further matrix operations, so no transformation back into the conventional row-major form would be needed. An inverse Reflected Z-Curve transforms back to the conventional row-major form for output to the user if required.

Figure 41:
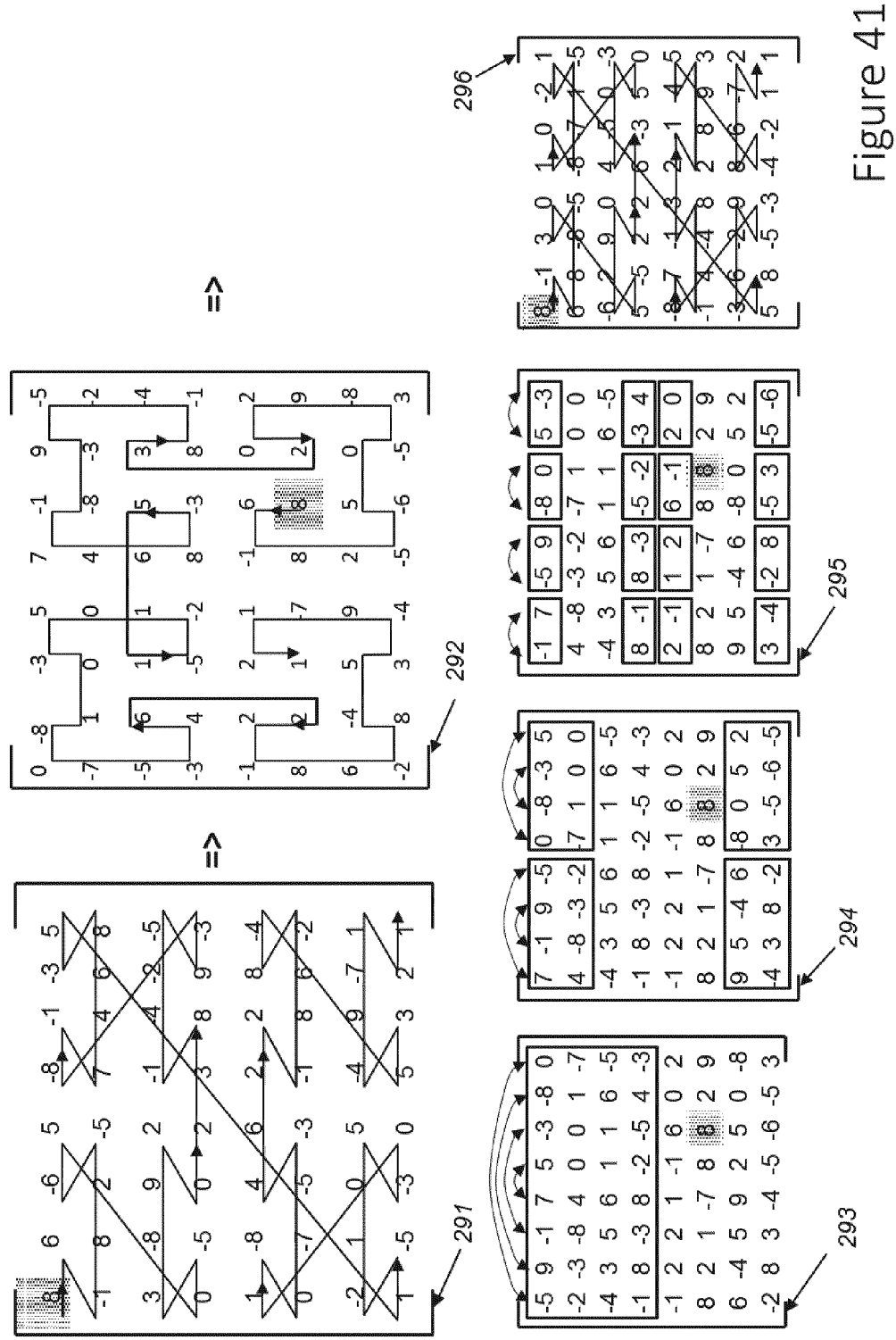
FIG. 41 is a diagram showing a second example of the transpose of a matrix in H-Order by element-swapping transformations.

FIG. 41 illustrates the same transposition process applied to an 8×8 matrix 291 in order to show the system of selections triggered at each hierarchical stage by the controlling pivot. Once matrix 291 is transformed (externally to the Connectivity) and loaded into the array-processing segmental connectivity as matrix 292, the first swap results in matrix 293, the second in 294 and the final in 295. This process is therefore an O Log(n) operation that applies to an n×n group of computing cells, in-situ. A Reflected Z-Curve sequence transforms 295 back to the conventional form of matrix 296. The grey-shading in the matrix illustrations shows the same data-element for the matrix in each transformation; it does not represent the same computing cell.

Figure 42:
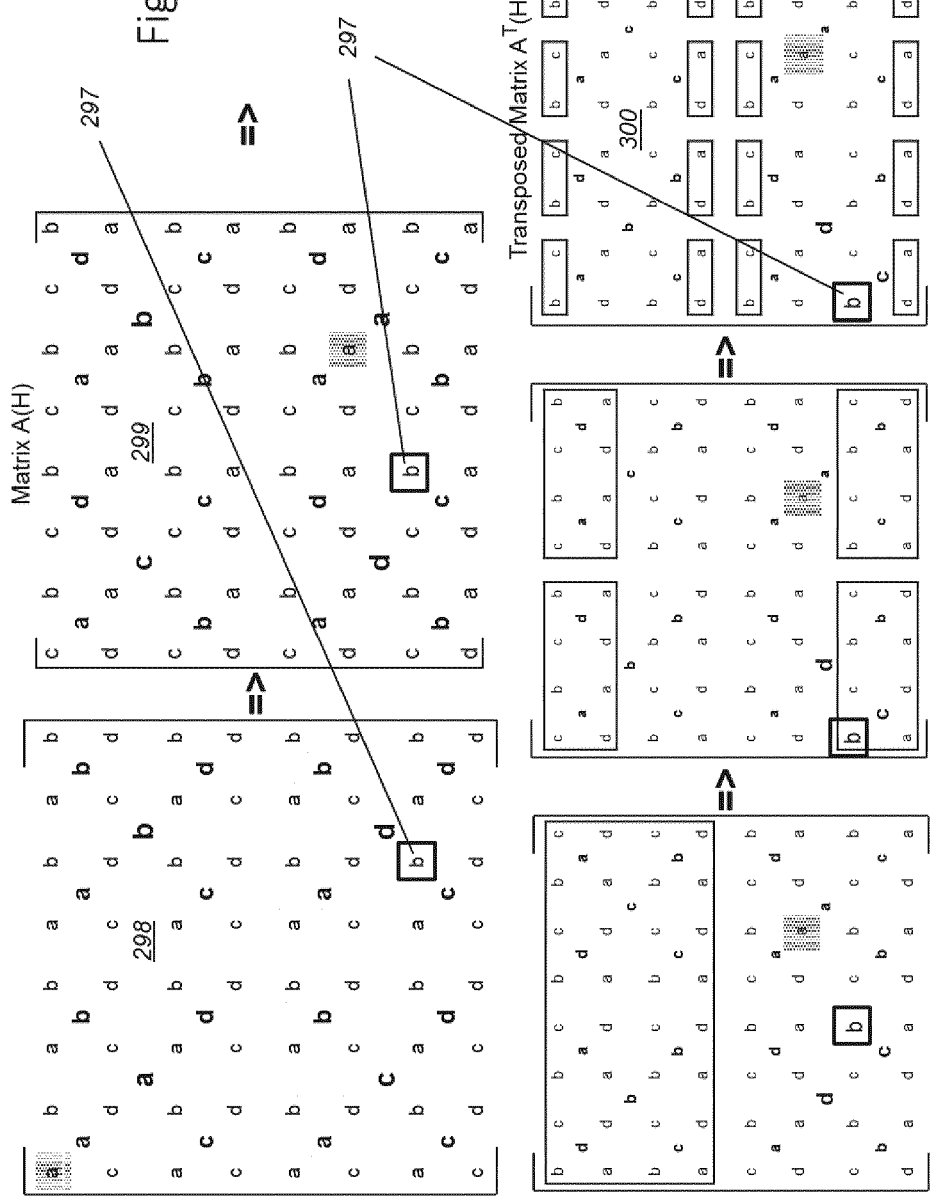
FIG. 42 is a diagram showing a third example of the transpose of a matrix in H-Order, where indexing of the processors is given in the compact, hierarchical addressing scheme.

In FIG. 42, in order to generalise the hierarchical matrix notation for illustrating matrix-multiplication, the transpose operations are illustrated systematically with hierarchical symbolic elements rather than example integers. The element 297 has the identifier 'dcb' in the un-transformed 8×8 matrix 298 where each letter of the identifier designates one of four quadrants: 'a', 'b', 'c' and 'd' in each of the three hierarchical-quadrant levels for this 64-element case. So for element 297, 'd' is the highest-level quadrant of the element, 'c' is the next sub-quadrant position, and 'b', in the identity of this element is then the lowest-level quadrant In the conventional, row-major matrix. In matrix 298, data-item 'aaa' is at matrix coordinate [0, 0]. After Z-transforming to matrix A(H), 299, the data-element 'aaa' is at Cartesian coordinate [5, 5], forming the H-Curve origin, and data-element 'dcb' is at [3, 6] in the H-Curve matrix. On completion of the 'H'-transpose $A^T(H)$ in 300, the data-element 297, 'dcb', now resides at coordinate [0, 6]. Since the element 'dcb' is to be transposed with element 'dbc' in the original row-major matrix 298, 'dcb' of the final $A^T(H)$ form 300 corresponds, through an H- to Z-transform, with the coordinate [6, 5] of matrix 298. An exactly matching notation elsewhere in this document uses integer-symbols: '1', '2', '3' and '4' for the same purpose. This allows elements from two different matrices to be distinguished in later illustrations such as FIG. 45.

One example m x m H-Curve transpose algorithm that the pivot may use in order to command the nested quadrants of its computing cell group to perform 'TRANSPOSE' is as follows:

The controlling pivot broadcasts to all computing cells within its scope a SWAP command for action only by computing cells with y-coordinate having most-significant bit (msb)=1;

computing cells check for msb and all selected computing cells respond in pairs by swapping their data-values;

Pivot synchronises operation by awaiting a completion-response from all computing cells under its authority (including those not acting on that command) and addresses computing cells in its segment with y-coordinate having 2nd-bit=1, and again triggers a SWAP operation;

The pivot repeats command through each y-bit in turn down to the least-significant y-bit;

following this final-bit command, the pivot awaits completion-response and terminates the algorithmic procedure.

This algorithm transposes a p×q rectangular matrix, covered by an m×m encompassing pivotal scope, to a q×p rectangular matrix where nil padding-elements (outside the rectangular matrix) are also swapped across the pivot's full complement of computing cells.

Figure 43:
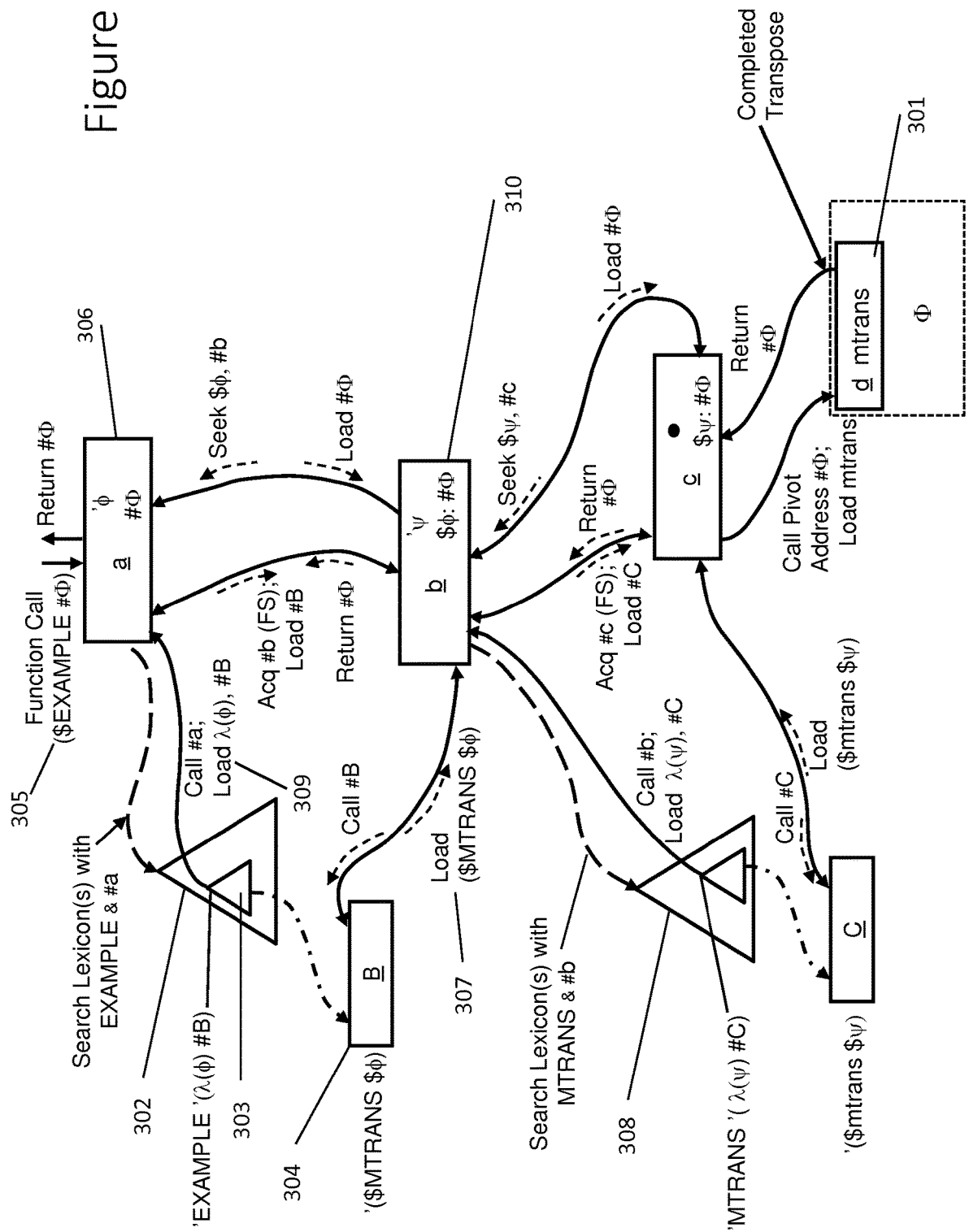
FIG. 43 is a diagram showing the computation procedure for transpose of a matrix in situ in a community of cells.

Example 4, Coding Structure for Matrix Transposition (In-Situ): FIG. 43 shows an example evaluation of the code for Administrative Connectivity control of Matrix Transposition in-situ. This is provided as a first illustration of the employment of the Administrative Connectivity 15 for the control of arrays. The schematic, and the logical operations involved in this example, assumes an Administrative Connectivity as described in Hamlin along with the associated example FIG. H25 of that patent.

It is assumed for the example illustrated in FIG. 43 that the matrix of elements of interest to the user, named herein as 'Φ', has already been loaded into a segment of computing cells, associated with special processing cell 'd' and pivot 301, by previous operations (hereinbefore described by way of FIG. 8 et seq.). The relevant segment of computing cells, as earlier explained, is identifiable as a group by the single address of their pivot-computing cell which, it is supposed, corresponds with the previously-loaded group of matrix elements, loaded into the segment, comprising matrix Φ, and known by address #Φ to the user. In FIG. 43, processing cell addresses are distinguished by hash-marks, such as #Φ and #a, and these are used as communication-pointers in various function-calls. Thus, #Φ refers to the (single) pivot-address of the segment of interest at 301 that contains the data-elements of Φ. The purpose of the user's $EXAMPLE function, with argument $Φ, is thus supposedly to transpose the matrix Φ in-situ into matrix $Φ^T$.

On completion, the user receives back the returned pivot's address, which then represents to the user both that the operation is complete and that the subject-matrix (now transposed in this example) is resident in the group of computing cells that is distinguished by the address of the said pivot. The notation '$' associated with a name in an expression represents a primitive identifier declaring that the said name itself is not a data-string nor integer but represents a lexical-identifier and instructs processing cells to treat the associated name (such as 'EXAMPLE') as a complex expression-structure ultimately to be expanded into a meaningful, computable expression by means of a functional definition stored in a digitized lexicon of definitions—in this case, 302. The 'meaning' of the name is found and copied from the lexical entry stored in an interrelated group of processing cells 303, interrelated amongst themselves by address-pointers, of which processing cell 304 (B) is the sought definition in this case.

The symbolic form of the user operation, which closely resembles functional programming usage, is:

ΦT<=($EXAMPLE $Φ) which becomes, as a result of the lexical definition of 'EXAMPLE':

ΦT<=($MTRANS #Φ), once the first level of substitutions has been carried out through the Declarative Connectivity, as now to be described.

At the user's access 305 to the routine, a free-state special processing cell 306, called herein for convenience of description 'a' with address #a, is found by a free-state search signal passed into the Declarative Connectivity network-nodes (as described in Hamlin). On acquisition of free-state processing cell a, a user interface via terminal connectivity 24 (not shown) loads a binary stream representing the user's calling-function into a, along with the return address of the caller, as described hereinbefore with regard to FIG. 8 et seq. Once the said binary stream representing the user expression ($EXAMPLE $Φ) is resident in a, processing cell a has microcoded instructions that initiate a search for the 'meaning' of symbol $EXAMPLE by searching a hierarchy of lexicons that define possibly-matching symbol-names. The dotted arrow implies that access to the appropriate lexicon is generally indirect and requires a plurality of similar intermediate addressing operations by a corresponding sequence of intermediate processing cells in order to match the searching-symbol. Each lexicon-entry is associated with a single symbol, typically such as $EXAMPLE, resident within a processing cell similar to a, although in this example it is presumed for the sake of generality that the relevant lexicons are stored elsewhere as 302. The entry-point to a lexicon, from which each lexicon-searching operation commences through that lexicon, is a processing cell that is ultimately pointed to on behalf of a calling processing cell such as a in this case.

Generally, the functional, calling processing cell uses the tree-networks of declarative connectivity 23—and, if ultimately needed, an associated terminal connectivity port to user equipment—for accessing the lexicon that contains the successfully-located lexical-entry in expanding the functional name. An address register is maintained in each processing cell for storing the lexical address of the initiating first entry-point to the hierarchy of lexicons, and that address varies according to the latest functional scope as the lexical-calls evolve through a functional evaluation.

In the operation of the declarative connectivity, numerous lexicons will in general be scattered as functional structures amongst many communities of processing cells throughout various locations, both in the declarative connectivity and in the addressable user-ports 17. In the present case, it is presumed that the relevant target lexicon is represented by an ordered tree of definitions 302 in which there is a pre-ordained definition of $EXAMPLE, '(EXAMPLE'(λ(φ) #B)) with the dummy argument-name 'φ' that must correspond in position with the single necessary argument of function $EXAMPLE at 305. The Processing Cell, that heads the lexical definition of $EXAMPLE, contains, by pre-arranged construction of the lexicon in response to a 'λ'-primitive, an address pointer to the top-level of its definition which is resident in processing cell B 304. The cells making up the lexicon, such as 304, are 'QUOTED' expressions represented by '", which means that they are not computationally evaluated but only, in the case of lexicon-definitions, copied into other evaluating cells, like processing cell a. Once located in the lexical-entry 303, the lexicon symbol-cell, containing '(EXAMPLE and'φ), re-calls a and sends the address of its function-address #B to a with the argument-symbol 'φ, which a records as a new, local lexical entry awaiting definition. In this simple case, the user has already supplied the full meaning, #Φ, of the argument and this is stored in a's lexical entry for 'φ a acquires a free-cell b and loads the address of B, 304. b now records its parent address #a and calls B which responds with its contents 307 that comprises $MTRANS and its argument-reference, the symbol $φ which, in this simple case, is accessible in b's first lexical search entry-point at cell a, allocated the value #Φ for the dummy variable 'φ.

The required expression representing the meaning of $EXAMPLE is ($MTRANS $φ) with the quote-mark now deleted because processing cell b is required to evaluate this expression. b must seek the meanings of both $MTRANS and $φ and this proceeds through head-cell a in the first place, where the symbol φ is found but not the symbol $MTRANS. The search is thus directed further into the user's lexical space, finally finding its lexical-entry in 308.

A typical symbol-search proceeds as follows: during the search for a symbolic-name such as by cell a the cell passes a message containing the digital code for the symbol of interest with its own address (#a), and with a numerical designation of the declarative connectivity communicating tree-network related to the symbol, such as #3, that is the starting tree for that search-stage. The said message is passed as a demand from cell to cell through the first relevant lexicon, matching the symbol with entries in the lexicon-structure. Each lexicon structure is composed, in response to the λ-primitive, in an alphanumeric ordering of symbol-names so that the matching sequence can fall out of the bottom of the lexicon and receive a further pointer-address to the next higher lexicon, in order to continue the search upwards. For this purpose, the last lexicon cell in alphanumeric sequence has the address of the next-lexicon header-cell, instead of further searchable cells in its own lexicon. If the search reaches the last entry in the user's lexical structure without a match, the last highest-level searchable cell returns a 'false-symbol' error-message to the user interface.

The order of search in the original coding of the lexicon is therefore assumed to have been arranged according to a monotonic sequence of lexicon symbol-names in order to select the route of closest symbol-match before unambiguous passage of the sequence to the next higher lexicon in the event of lack of match. Once the symbol-search is satisfied, the lexical cell with that symbol (such as the head of 303) re-calls the requesting cell a using the address that accompanies the search, address #a in this case, and transmits over the original search-network #3 the symbol-definition message 309, comprising the address of the head-cell of the definition along with the symbol-names of the arguments—in this case the processing cell with address #B and the single associated argument with lambda-name 'φ.

While processing cell a is awaiting the return of the pointer to the ultimate lexical-entry for $EXAMPLE, it is free to locate the definition of its first (in this case, the only) argument #1. In the present example case, this search is not required because the user has already nominated the meaning of 'φ as #Φ which is the address of the pivot of the Φ-segment of computing cells to be transposed; if $Φ were unknown, an acquired free-state processing cell would be needed and that address would be downloaded to 310 as the value of 'φ. It is assumed in this simple example that the user would have received notification of the matrix address, perhaps through his preceding application-code. Once the symbol-name for argument 'φ is available to processing cell a, it is stored as the lexical-name for the argument-pointer address-register associated with processing cell-address #Φ.

In the case of that form of embodiment of the declarative connectivity described in Hamlin, where the expression to be evaluated involves more than one argument, these argument-references cause acquisition of a corresponding number of free-state processing cells each via a different declarative connectivity tree:—#4, #1 and #2 perhaps.

As explained in Hamlin, it is to be observed that each processing cell supports the function and argument address-pointers in registers, each said register being capable of storing the address of a child-processing cell with respect to one of a multiplicity of tree-networks, each of the tree-networks being shifted and rotated with respect to the others (see FIG. H23 and its associated text, and FIG. 7 herein). Each cell therefore has an equal multiplicity of unique own-addresses corresponding to its multiple electrical locations within those trees. The well-known Cartesian rotation and translation transformation provides a fixed algorithmic relationship between the multiplicity of trees such that the address of a processing cell at its position on one tree can be determined from its address at its position on a second tree. Thus, two routes between one pair of processing cells will comprise two different pairs of addresses, determined by the processing cell locations on the two different declarative connectivity tree-networks. As a Symbol-Search progresses through a sequence of hierarchical lexicons, the search-transaction switches, in general, between the various networks but the processing cell providing the match for a search-symbol, nevertheless returns the resulting symbol-definition back to the search-initiating processing cell, such as 306, and into the originating port in said initiating processing cell. By this means, each respective network-port in a lexical processing cell recognises, on behalf of the searching processing cell, the appropriate returning network for the termination of each symbol-searching transaction. For instance, $EXAMPLE might correspond with processing cell port #3 (say) on network #3 and, for $ϕ, at processing cell port #4, on network #4. In the case where the number of arguments exceeds the number of networks, less one for the function itself, the last available network-port of the processing cell is used to point to a further free-state processing cell in order to provide more accessible ports to be used for overflowing of the function's arguments into further Child-processing cells. It will be appreciated that this latter arrangement, like our current single-argument example, will accord, in its pattern of branches, with the lexical-definition which is copied from the pattern of relevant lexicon entries into the equivalent active cells.

As just explained, each processing cell includes an algorithmic means for converting any processing cell address with respect to one tree-network in declarative connectivity 23 into its equivalent address with respect to a second tree-network the declarative connectivity. Each axis transformation comprises a signed binary multiplier that defines the relative orthogonal rotation and shift of the two trees, in each of two planar dimensions, between each of the pairs of networks in FIG. 7.

Each received address-stream from a remote location with respect to the receiving network is converted by this means to the address of the same processing cell-location with respect to the network being accessed for any onward transaction, in this case across the said relevant lexicon. Ultimately, in the present phase of the example's description, the head-cell for the lexical definition of $Φ, if needed would adopt a free-state child-address with the associated identifier for network #4 (for transmitting the meaning of $Φ), and this would enables the loading of the definition of Φ from the matching part of the lexicon into the child-processing cell.

The mitigating multiprocessing advantage of this addressing complexity obtains from the fact that the 'directed-search' function for free cells (Hamlin) may be used to force wide geographical distribution of complex software structures across the declarative connectivity through the shifted and rotated networks. As a result of the evolving acquisition of free-state processing cells through pre-existing applications, the acquisition of the processing cells for a given application becomes, to some extent, a random process within the processing-space. However, the said 'directed-search' function also preferentially constrains the spreading of tasks amongst the constituting processing cells. The constraint tends to form a cluster of intercommunicating processing cells that approximates to a loose pyramidal-like structure, roughly mirroring the copied hierarchical structure of the relevant lexical definition. Multiple applications, laid out from time-to-time in this way across the declarative connectivity, freely interlace with one-another without risk of cross-talk between independent tasks, while each individually retains its own hierarchical, administrative structure.

Each symbol-search begins at the head-cell of each copied definition, such as a and b in FIG. 43, but not c. The address of the patriarchally-local cell is passed, as the search starting-point, downwards through its copied composing child-cells until a further said head-cell is encountered. At that point, the start-address is replaced by the latest head-address in the descending chain.

This ends the description of a typical Symbol-Search process.

Processing cell a now contains the address #B, so acquisition of processing cell b permits loading of #B into processing cell b and that processing cell then proceeds to call B in order to retrieve the definition for $EXAMPLE in the local lexical cell B, which is returned as 307, ($MTRANS $ϕ). Proceeding further through the processing structure for the example of FIG. 43, this functional expansion of the original $EXAMPLE includes the argument-name $ϕ which, due to the nature of this current example, happens to corresponds with the argument-name associated with $EXAMPLE. That triggers a second Symbol-Search Process within processing cell b in order firstly to locate the definition of $MTRANS, perhaps in a different lexicon 308. The Symbol-Search process for $MTRANS is as just described and now returns address #C along with a different local lambda-argument 'ψ. There is no conflict of variables if the lambda-argument were again'ϕ because b ensures that the new search starts at that dummy variable which is merely a local pointer to its definition which has already become, in this case as it happens, '$ϕ' which is to be searched starting at a, not b. There is therefore no consequential significance in the choice of dummy-variable symbol at b.

processing cell b locates free-cell c and passes on #C along with its own address for symbol-lookup and ultimately for the return of subsequently-computed results back up the chain of processing cells—eventually to the user-equipment.

The definition of $ϕ in a is #Φ; initially, $ϕ is a symbol in b to be searched, as indeed $EXAMPLE was in a. The elaboration of the argument $ϕ, in b, also requires a lexical search and this starts at b's local lexicon, which in this case is its own parent cell a, and the search immediately ends with return of the value #Φ. Otherwise, b would be re-directed to seek the meaning of $ϕ, in the second place at a higher lexicon. Provided that a has completed its immediate set-up processes, it passes #Φ back to b because no further search-steps are needed in this particular case. (If a is not yet ready because its argument and lexicon pointers, if any, have not yet been established, it stores a call-reference and temporarily terminates b's communication, reconnecting the path later, when ready, by calling b.) So b calls a by which it accesses #Φ for itself as the definition of $φ, loading it as the definition of the local dummy variable 'ψ. Again, nothing is done with #Φ except to associate it with $φ (that version now belonging to $MTRANS), which in turn is the definition of 'ψ.

Free-cell c is acquired by b and receives the location #C of the meaning of $MTRANS and transmits it to c. This time, the example gives the definition of $MTRANS as a machine-code routine with identification-code represented here by $mtrans, and its argument-symbol $ψ. When interpreted as a processor primitive in c, $trans is a coding that permits a machine-code fragment to be run that will acquire pivot #Φ, once this has been derived by c. Having acquired the meaningful address-reference #Φ, c acquires d 301 and passes the pivot-primitive 'mtrans' to pivot digital computing engine 301, which interprets it for the purpose of matrix-transpose as described hereinbefore. It is to be noted that primitive functions, such as would be the case for this example, are to be built into processing cells so that they are available wherever applications become resident in their associated computing space. The exact choice of the desirable machine-code, instruction-set primitives is a common commercial challenge for production computers, but beyond the scope of this specification.

The pivot computing cell receives directly its mtrans command and commands its segment of computing cells to perform the matrix-transposition on their elements. The whole operation is terminated when the pivot address of the transposed-matrix #Φ, formed as hereinbefore described by reference to FIG. 41, is transmitted successively up the chain of processing cells to the user equipment. In this case, the pivotal address #Φ is necessarily identical to that of the original matrix because, in this example, the transposition has been carried out in-situ in the array-connected computing cells. This completes the description of the first example of administrative organization of Matrix Transposition In-Situ.

Figure 44:
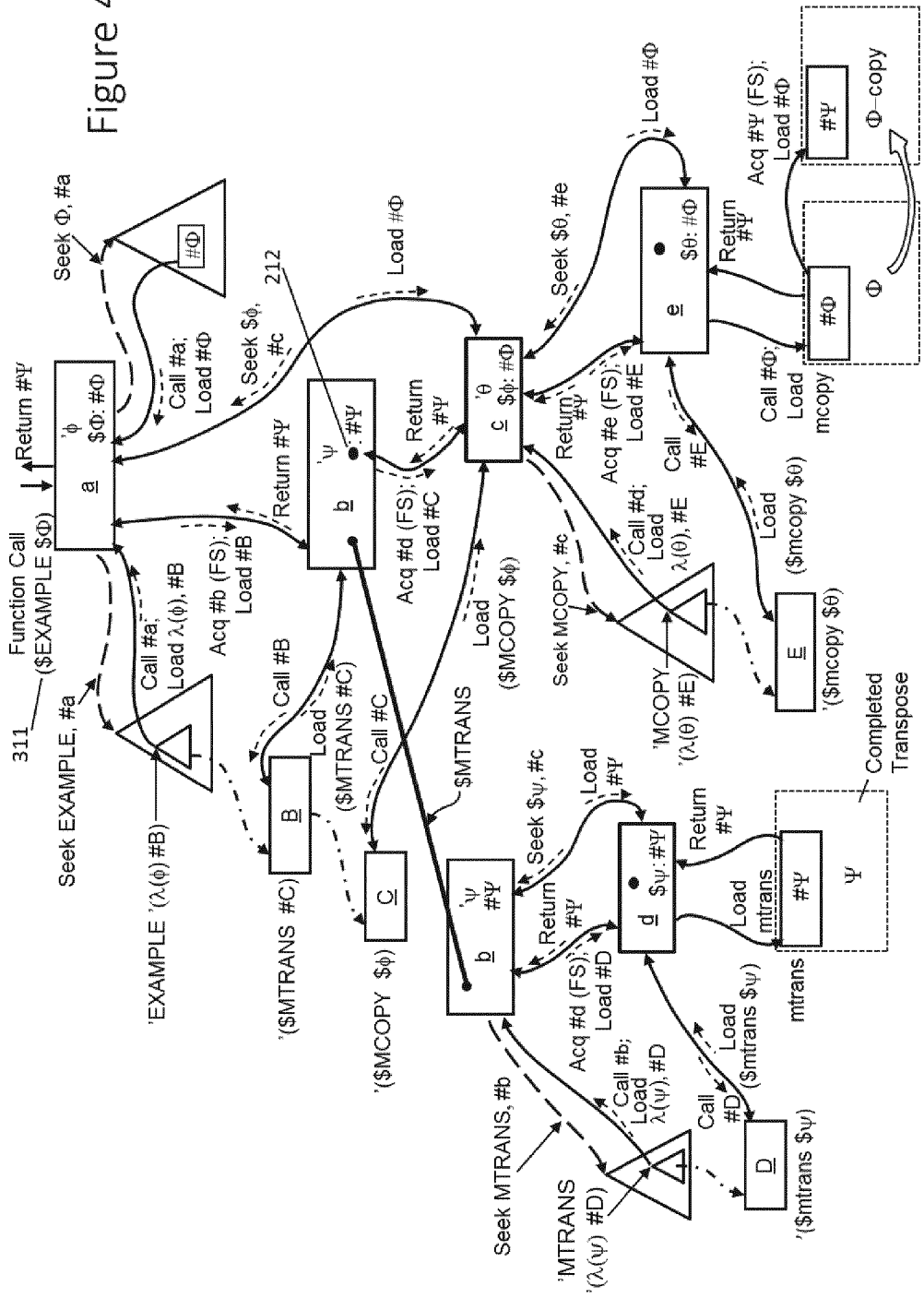
FIG. 44 is a diagram showing the computation procedure for transpose of a copy of a saved matrix in a community of cells.

Example 4, Matrix Transposition (Copied Matrix): FIG. 44 shows a second administrative organisation of Matrix Transposition. This is provided as an illustration of the employment of the declarative connectivity for the command of the array-processing connectivity where the original array, for which the transpose is being computed, remains intact, usually for further computations. The transposed version is then retained in a separate group of computing cells with their associated pivotal address. As before, the logical operations involved in this example assume the implementation of the declarative connectivity as described in Hamlin and most of the processes described in the example above apply here also.

As described in the first transpose example, it is assumed for the example illustrated in FIG. 44 that the matrix of elements of interest to the user, named herein as 'a1' has already been loaded into an array of computing cells by previous operations. The purpose of the user's $EXAMPLE function, with argument $Φ, is now intended to transpose a copy of the matrix Φ. On completion, the user receives back the returned pivot's address of the transposed form of the copy of the original matrix, which then represents to the user both that the operation is complete and that the new matrix is resident in the group of computing cells distinguished by the address of its newly-acquired pivot.

The symbolic form of the user operation is now:
ΦT<=($EXAMPLE $Φ) which becomes
ΦT<=($TRANSPOSE ($COPY #Φ))
once the first level of substitutions has been carried out by the declarative connectivity as now to be described.

At the user's access 311 to the connectivity, processing cell a searches for the 'meaning' of $EXAMPLE as hereinbefore described.

Proceeding further through the processing structure for the example of FIG. 44, processing cell B contains the meaning of $EXAMPLE, that is: '($MTRANS ($MCOPY $φ)) where the extra expression'($MCOPY $φ) is, in this example, the argument for $MTRANS. processing cell a thus receives the address #B so acquisition of processing cell b permits loading of #B into processing cell b and that processing cell then proceeds to call B in order to retrieve the definition for $EXAMPLE in B, which is,
'($MTRANS.)
where the argument of $MTRANS will now be the further expression'($MCOPY $φ) stored in lexical cell C. As in the first transpose example, $ triggers a Symbol-Search process within processing cell b that locates the definition of $MTRANS in B, whereupon, address #C is returned as the address for function-argument '($MCOPY $φ). processing cell b locates free-cell c and passes on #C. Meanwhile, a seeks $φ and receives the numerical address #Φ, which remains as a numerical-code that is not further elaborated.

The expansion of the argument in b, takes place in a different manner. Initially (moving to the lower left in the diagram of FIG. 44), b seeks the expansion of $MTRANS as before and initiates the full transaction through d by means of D as in the first transpose example, but now the definition for $MTRANS includes the dummy lambda-variable 'ψ, which will need itself to be defined by b. (It is to be observed that the same cell b itself is shown twice for the sake of clarity in the diagram, the first stage of b-processing in the lower left with the copied lambda argument-name attached.) Now, an attempt by d to acquire the value of $ψ will be temporarily blocked by b until the equivalent argument-location in b, indicated by 311, is completed by the process for $MCOPY, which is shown expanding downwards to the right through c. In this type of argument-evaluation, b acquires free-state c as usual but b gives a's address to c as its lexical pointer.

c calls a lexical search for $MCOPY, starting at a, which ultimately points to cell E. c acquires the single lambda-allocated argument 'θ and gives the definition from C as $φ, whose definition itself must then be sought.

c locates free-state cell e which is to receive the definition from E, and also establishes its argument-name 'θ for the purpose of lexical-definition. The COPY process evaluates ($MCOPY $φ), which is required to create a copy of #Φ. We choose to call $Φ^T$: 'ψ' for the sake of the description of this example. In order to find the value of 'θ in cell c, which is now $φ, cell c calls a with a request for the definition of $φ thereby avoiding a clash of symbol-scoping. a now acting as the head of a new lexicon, and finding 'φ amongst its lexicon symbols, recalls c in order to return the relevant value of lexical symbol 'θ, which becomes the pivot-address that controls the segment containing the elements of matrix Φ.

Cell e, in turn, calls E, which hosts the primitive-function expression '($mcopy $θ), and computes its own executable form of the primitive expression (mcopy $θ), which becomes on substitution, instruction mcopy for application to pivot #Φ. Pivot #Φ, as a result of evaluating the primitive, acquires the free-state pivot digital computing engine #Ψ by means of free-space search through terminal connectivity 24 and thereby instructs pivot #Φ to pass a copy of itself to the segment of computing cells at #Ψ. Since this is the intended result of the copy procedure, #Ψ is returned up the chain e and c to b, where its value becomes the value of lexical symbol 'ψ in cell b. At that point, d can be recalled by b in order to pass down the newly-computed value for the definition of its argument, that is #Ψ, as previously requested by d.

The evaluation of the MTRANS routine proceeds exactly as in the first example of Matrix Transposition. As before, #Ψ is passed back up the chain to the user-interface as the retained definition of ΦT, and to indicate completion of the matrix-transpose. The contributing processing cells, apart from the two pivotal special processing cells, would generally be directed to return to free-state.

This completes the description of the second example of administrative organization of concurrent Matrix Transposition.

Figure 45:
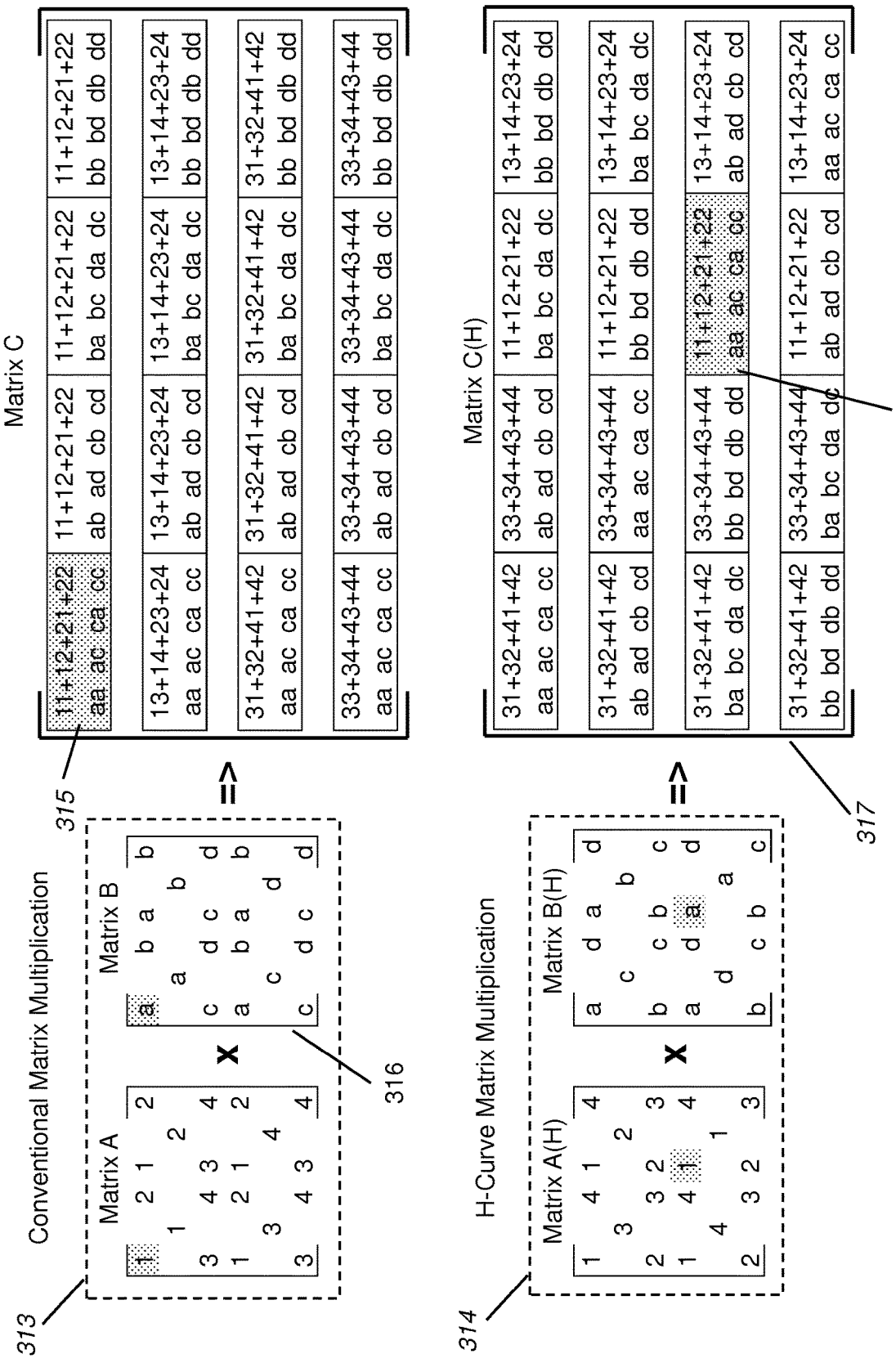
FIG. 45 is a diagram showing the relationship between the multiplication of two matrices in conventional row-major form and the multiplication of two matrices in H-Curve form with the result also in H-Curve form.

Example 5, Array Connectivity Operations for Matrix Multiplication: FIG. 45 illustrates the convolutions through the H-Curve required for 4×4 matrix multiplication where the elements of the matrices 'A' and 'B' are firstly laid out in conventional row-major order 313 and secondly in the transformed H-Curve order 314. FIG. 45 illustrates in full the computed elements of a conventional row-major matrix multiplication and, for direct comparison, the H-Curve order manipulations that compute the same result expressed as a 'H-Curve' matrix. As for elemental manipulation of conventional matrix transpose operations, conventional matrix multiplication also suggests the need to transmit data-elements diagonally between connected computing cells. So, the top-left element 315 of Matrix C 316, in conventional row-major order, is [11*aa+12*ac+21*ca+22*cc]. The rows of Matrix A are combined with the columns of Matrix B for this purpose, Matrix B being in effect transposed for this combination of elements. The same first element in H-Curve order if matrix 397 is located at 318 and the elements such as 318 are derived and located according to the combinations illustrated in FIG. 46. The H-Curve transformation avoids the need for non-orthogonal paths and uses only Cartesian paths for recursive distribution of the data elements between Cartesian clusters of computing cells.

Figure 46:
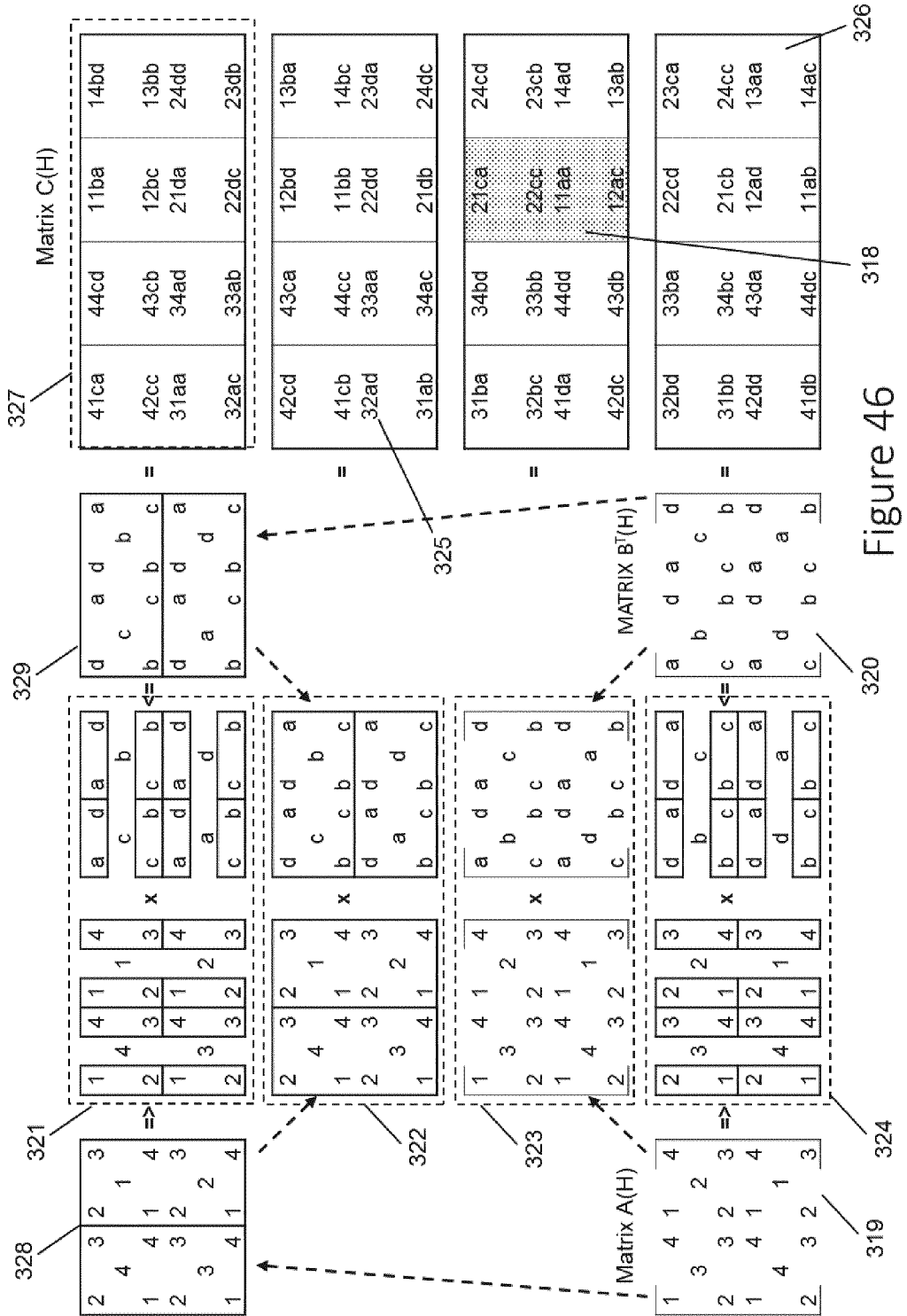
FIG. 46 is a diagram showing the swapping order of each of two H-order matrices for their multiplication result to be also in H-Curve form.

For clarity of description, matrix B employs alphabetic indexing 'a, b, c, d' but the structural principle is the same as described for matrix A that uses '1, 2, 3, 4' for the same purpose. (This differs in symbology from the earlier '0, 1, 2, 3' usage of FIG. 19 merely for convenience of visually associating '1' with 'a', '2' with 'b' . . . ) FIG. 46 shows the start-points 319 and 320 for A(H) and $B^T(H)$ in generating the result of the multiplication in H-Curve format. The first stage of manipulation in FIG. 46 is the transpose of Matrix B (in H-Order), as described for example with regard to FIG. 41. It will be appreciated that the ordering of the product Matrix C(H), in H-Order, must correspond in its ultimate computation with the Z-Transpositional ordering of the conventional result. In representing the elements, the coding '21ca' for example means the product of element '2.1' of 'A' with element 'c.a' of 'B'.

For the computation of 4×4 matrix-multiplication, each of the two matrices A and BT is unfolded into four pairs of matrices, 321, 322, 323 and 324 some of which are themselves systematically manipulated by folding in a manner analogous to, but not the same as, that of the progression through matrices 292 to 295 in FIG. 41. As illustrated in FIG. 46, the 'A' matrix is always swapped vertically and the '$B^T$' matrix always horizontally for this procedure. Four combinations of folding are arranged in this mechanisation in order to produce the 16 elements of each resulting matrix in the said pairs of matrices. Each pair is computed within its own segment of computing cells so that each pair of elements such as 325 ('32' and 'ad') may be brought together in the same computing cell by COPYing, and multiplied together in situ. Element 318 is the summation of the four products 11aa, 12ac, 21ca and 22cc and assembled from the third column of the pair 323; Element 326 is the summation of the four products 14ac, 13aa, 24cc and 23ca each derived from the fourth column of pair 324.

The longest sequence of operation is in production of the top row 327 of Matrix C(H) where Matrix A(H) and Matrix $B^T(H)$ must first be copied into a free-state segment of computing cells. The top-level SWAP operation is performed in sequence within the segment to form matrices 328 and 329. This is repeated at the lower swapping level to form the pair 321 and the elemental multiplication carried out. Finally, the addition of the products, by column, produces the final four elements of the desired Matrix C(H) in row 327.

If the order of swap operations that generates each consecutive row in the product H-Matrix 'C(H)' is represented by a binary index, the 4×4 multiplication rows are represented in sequence by the Gray-Code integers '11g', '10g', '00g' and '01g'. These bit-sequences mean that the first row is obtained first by transformations 328 and 329 if the first digit is a '1', and then by transformations 321 if the second digit is a '1'. The second row is determined by '10' so only the first type of transformation 328 and 329 is required and the second level stage is ignored. This rule of Gray-Code ordering, continues with '111g', '110g', '100g', '101g', '001g', '000g', '010g' and '011g' for 8×8 multiplication, and so on for higher degree matrices.

For O3 Log n processing-time, ignoring matrix-input delay, this concurrent matrix-multiplication operation demands n copies of the original 'n×n' matrices, so n×n² computing cells are required for the full operation. The time comprises O log n for unfolding n matrix-copies followed by O log n SWAPs followed by O log n steps of column-summation. Further reduction is possible by starting the longest sequences at the beginning of the COPY process.

Example 6, Digital Differential Analyser: A further example of use is the concurrent iteration of a digital differential analysis computation, such as applicable for example to the solution of partial-differential equations. Typically, these relate to time-dependent physical processes such as temperature distribution through a solid, using a three-dimensional diffusion equation. In this example, the user-application selects a special processing cell, with large-scope authority within the Connectivity, and each computing cell within the scope computes the temperature of a corresponding 3-dimensional point in a regular array of reference-points of the simulated material. For example, in one preferred embodiment, a segment with scope 2^20 is embedded in a 20-dimensional binary sub-hypercube, but only six interconnections (and six ports) from each computing cell are used for a 3-dimensional digital differential analyser application. The special processing cell receives a spatially-referenced stream of indexing-bits from a user that define a sub-routine of functional expressions, and the object-shape, for handing on to its associated pivot for distribution to its segment of computing cells over which it has control. For this simple example of differential analysis, the thermal diffusion coefficient is assumed to be constant throughout the material. Moreover, the equations for the example only apply to interior and boundary points, the ambient temperature being assumed here to be constant at the boundary. The user interfacing mechanisms in port 17 and terminal connectivity 24 have means for receiving a plurality of user-application sub-messages defining the shape characteristics and three-dimensional material, such as the thermal diffusion coefficient, the initial temperature for each computing cell, and the functional expression to be evaluated at each computing cell. In this case, one of the 'Leap-Frog' iterative methods, such as Dufort-Frankel, is appropriate between elements, which is aided by the ability of the Connectivity to direct even-odd iterations between the computing cells, typically including a small 'artificial' viscous coefficient for computational stability.

The functional-expression passed in common to each of the internally-indexed computing cells by the pivot for computing the local point-temperature, with initial point-temperature t=to and without heat-sources might comprise, for example the simple Euler approximation:

$c*(t1+t2+t3+t4+t5+t6)+(1-6*c)*t$, where ti is the temperature value conducted to any one such computing cell by each of the six immediately adjacent neighbour computing cells and the said such computing cell updates its own value of temperature 't' by this expression. 'c' is a function of the grid-spacing of the points, the thermal diffusion coefficient and the time step increment. Only those computing cells being declared by a shape-index load and employ this first expression. This algorithm is an approximation to the physical partial differential equation and works in the general case only for small time-steps and low thermal capacity but it illustrates the principle for more capable finite differencing schemes.

The second slightly more complex functional-expression represents the boundary points and might comprise, for example:

$c*(t1+2*t2+t3+3*Cb*ta)+[1 -3*c*(Cb+49)]*t$, where 'Cb' is a convection factor and 'ta' is the ambient temperature. Only those computing cells having the said shape-index accept and evaluate this expression.

When the pivot broadcasts an instruction to iterate at a major clock-cycle, each computing cell computes its expression and returns a completion signal. A count of the aggregate number of major-clock cycles may be used to approximate the progression of simulated time. Each computing cell compares its own state with the neighbouring temperature supplied by of each of six of its signal-adjacent neighbours that, in contrast with its own value, represent its immediate three-dimensional dynamic environment. If the computing cell is an 'odd' master on each 'odd' clock-cycle, it passes its own value to its six neighbours, waiting for their values on the next 'even' pulse. On the next 'odd' pulse at which the pivot sends its instruction to iterate, the computing cell again sends its value to its six neighbours, now updated in a Leap-Frog sequence by the said expressions.

Occasionally, typically as directed by their associated pivot, at least some of the computing cells send their values to their pivot computing cell for output from the Connectivity to the user via the administrative connectivity. In this application, the pivot itself determines a 'PAUSE' criterion, such as elapsed-time, and broadcasts the command to its segment such that a certain interim operation can take place, such as recovering a chosen data value representing perhaps a limited set of averaged data within simulated domains. For regularly outputting of data sets from all digital computing engines within the simulation application, it is advantageous to use the previously-described commanding of subtended-pivots by the controlling top-most pivot.

Example 7, In-Situ Sorting: As an example of sorting an array of q symbols distributed across a large segment of computing cells in the recursive connectivity, the administrative connectivity passes a directive, such as ($SORT #A), to a pivot with address #A with scope greater than q. For this example, address #A is assumed to be known to the user software application from previous operations of the user's application and the SORT function-name can be passed directly to that special processing cell without further elaboration. The example applies to a binary hypercube form of segmental connectivity 25 with pivot-controlled dimension-'d' greater than Log 2(q). The processing cell directs its associated pivot to decode the instruction into the coded macro named SORT, accessible by the pivot, and to broadcast in-turn each of the computing cell primitives contained in that macro to the computing cells in the segment controlled by the pivot that has an authority over a segment of dimension 'd'. In this simple case, only one microcoded primitive instruction need be applied by each of the computing cells (and the pivot) in order to perform the desired operation—symbolised by a primitive 'compare_and_swap' (say).

Figure 47:
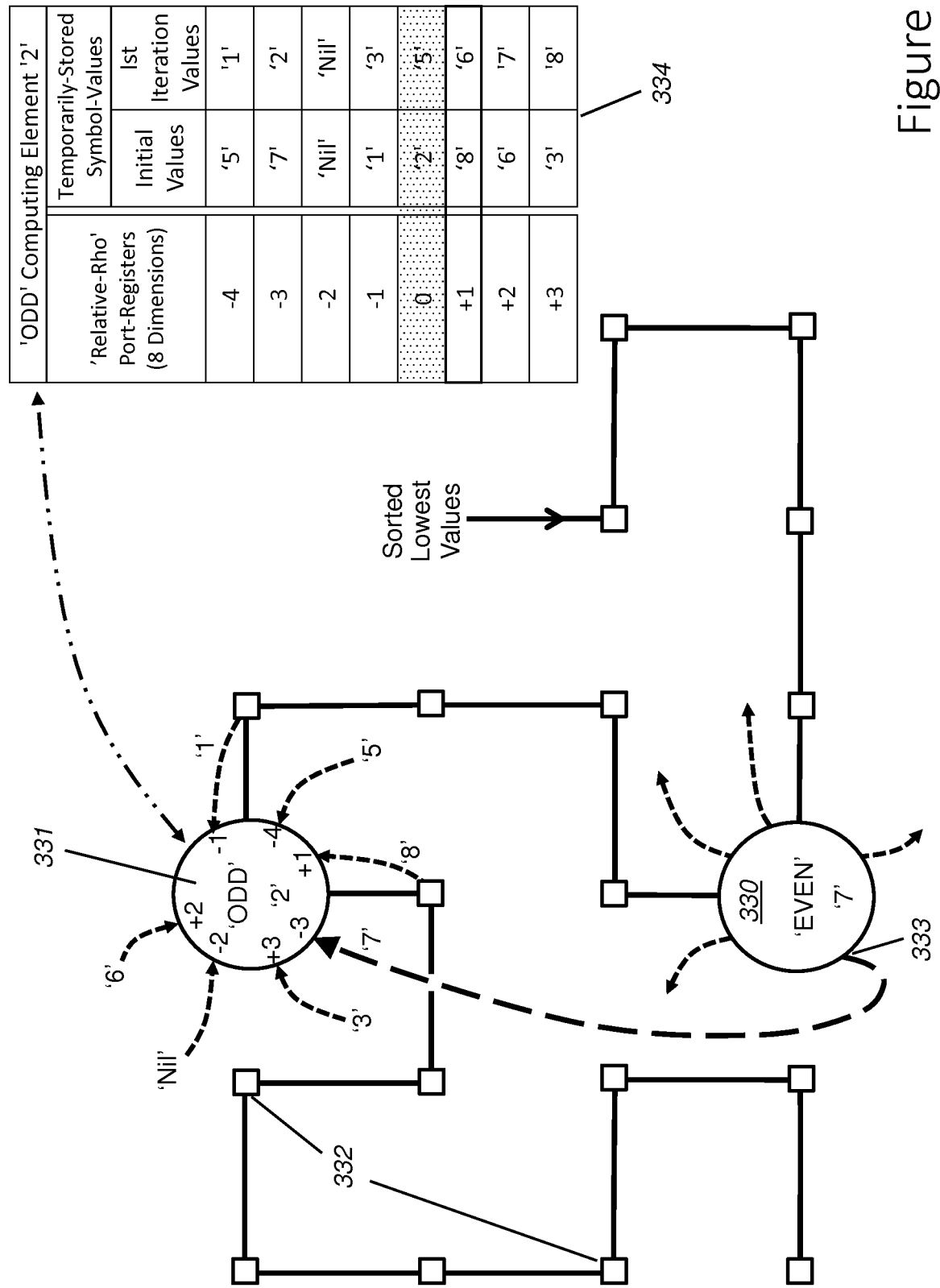
FIG. 47 is a diagram showing an example of element manipulation for a SORT operation on a string array.

FIG. 47 shows computing cells such as 330, 331 and 332 along a segment of a recursive curve. Since the elements of the initial segment #A are still in place in the said segment, including padding 'nil'—elements, each 'even' computing cell such as 330, in response to the said 'compare_and_swap' instruction on its half-cycle, first of all opens one port, such as 333, to one of its signal-adjacent neighbours such as 331 connected to that port, and transmits its own symbol-value. The receiving computing cell is 'odd' and therefore not attempting to transmit at that same time. This latter computing cell is set, on said half-cycle, to receive said symbol-value and to carry out internal processing of the received values. Half of the computing cells in the said segment are similarly receiving from at least one of their transmitting neighbours on that half-cycle and may receive and compare a number of values similar to that transmitted from 'even' computing cell 330. Of the (d+1)-values now in each 'odd' computing cell in the 'd'-dimensional segment, each computing cell sorts them into monotonic order and stores them in the corresponding port registers that are listed for this example in the table 334. By the organisation of each computing cell, the indexing sequence of its ports, and the relative span of its interconnections to signal-adjacent computing cells along the recursive curve, local sorting is favourably embodied to match the throw-distance available for transmissions across the curve with the degree of disparity between pairs of data-elements.

In the example, it is assumed for illustration that computing cell 331 has no communication in said half-cycle into its port '+2' but receives six other symbol-values for comparison with its own initial value, that is currently represented by the initial value '2'. During this activity, computing cell 330 has only 'nil' values in all but one port, port 333. After transmitting its own initial value, '7', to computing cell 331 it awaits the next half-cycle when it will receive a number of values from its own d-neighbours for carrying out the same form of internal sorting operation. In each case, all ports excepting those with 'nil' entries transmit the updated symbol-values (for example, the third column of table 334) to their respective neighbours. Following at least two cycles of the major-clock, if no change of values has occurred in a computing cell's registers, the computing cell sets its completion flag in the broadcast and synchronisation broadcast connectivity 26 in order to register temporary completion of its part in the overall sorting of array #A. If, however, the computing cell must make a subsequent change to any port register due to reception of new values from a neighbour, it immediately resets its completion-flag.

Only when the pivot has completed in the same way does it react to its portion of broadcast connectivity 26 and only then once all computing cells have set their completion flags. When all computing cells in said segment are in an unchanging, locally-sorted state, the symbol values in the array #A are organised in a monotonically ordered sequence, by definition. The completed in-situ ($SORT #A) function in the special processing cell returns address #A as notification that the new array is in place, ready for further functional calls, if any. It is enabled to relinquish its responsibility when garbage-collected, in which case all computing cells in its associated segment may then set their array elements for that application to a 'nil' value.

Briefly, then, in the elemental operation, each computing cell communicates with each of its 'd' signal-adjacent neighbours in order to compare and exchange data-elements until it satisfies the criterion that its data-content is numerically larger than its predecessor-neighbour along the locus and less than its successor-neighbour. Each computing cell sets its completion flag through the broadcast connectivity 26. When all computing cells within the domain of the pivot have set and held their flags, the pivot is alerted and, in turn, responds back through its associated special processing cell and thence to the administrative connectivity software expression that called ($SORT #A). Although this is analogous to the serial sort operation called 'bubble-sort', the one-step accessibility by each computing cell to multiple-dimensionally remote, but signal-neighbouring computing cells permits sorting to be carried out in O Log(q) time, with only immediately-local knowledge required at each elemental computing cell.

Figure 48:
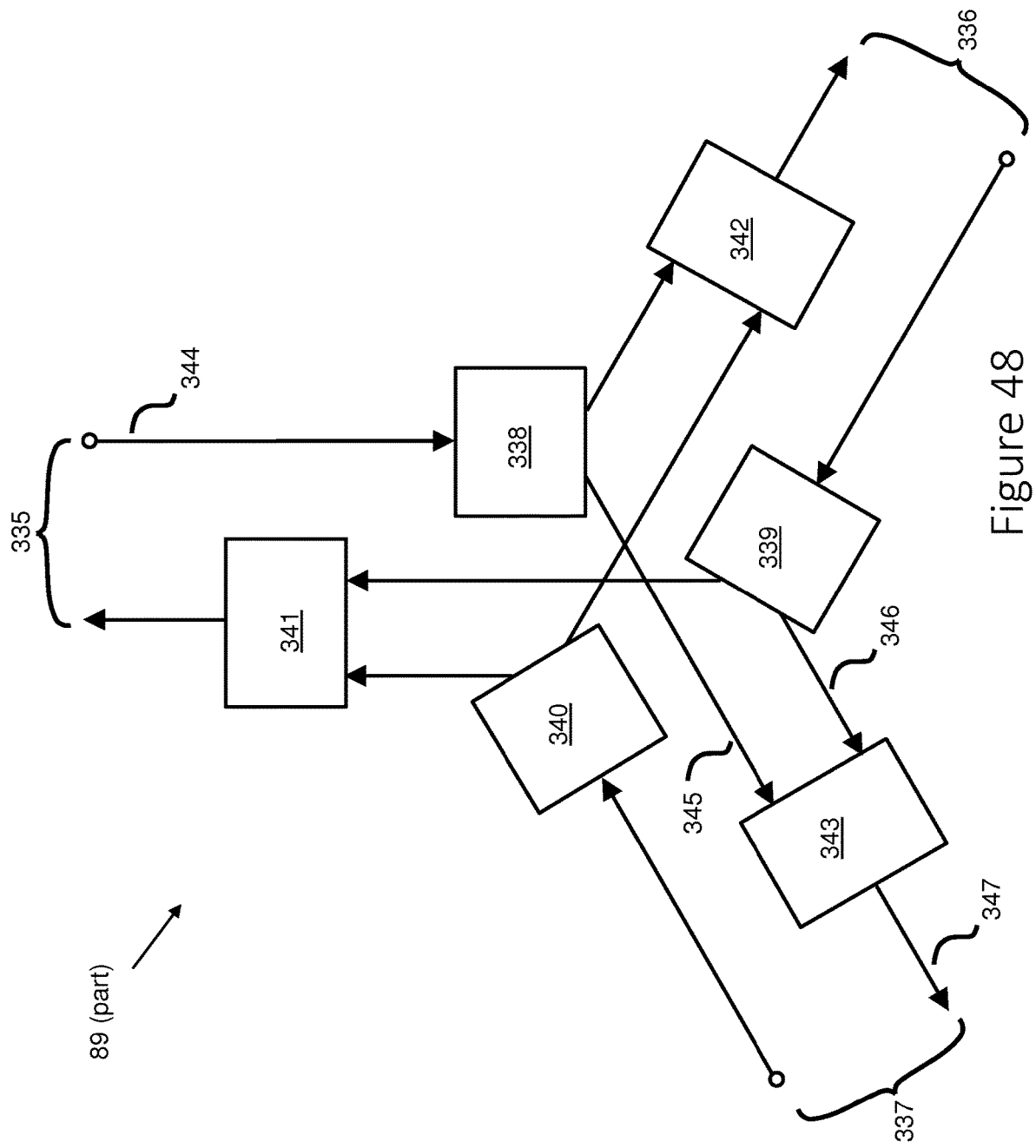
FIG. 48 is a second block-diagram schematic of a rotationally-symmetric form of elemental tri-switching node with arbitrator and selector components.

Here follows a detailed description of one preferred implementation of the tri-splitting switching-node that forms the tree-nodal circuit of FIG. 65 of Hamlin and FIGS. 10 and 11 of this current specification, and as employed in the network illustrated in FIG. 7, such as at node 61. The switch is also here shown in a second schematic form in FIG. 48 which shows three sets of input and output paths 335, 336 and 337. This is a development of FIG. 10 (without free-space lines) that offers a circuit simplification due to symmetry in rotation. Each input path and each output path comprises at least three digital signalling-lines, to be described shortly and as described earlier. Circuits 338, 339 and 340 are called herein 'selectors' and each has means to switch an input path to one of two output paths. Circuits 341, 342 and 343 are called herein 'arbiters' and have means to select one of two paths for outputting to a single output path. Thus, for example, path-selector 338 may direct an input digital message at path 344, through path 345 to arbiter 343. When the arbiter receives the message and there is no remaining prior message on path 346, arbiter 343 opens a message-path to output-path 347 and holds the path open for subsequent bidirectional signalling transactions between 344 and 347. Selector circuits and arbiter circuits have switch-means to cancel the route along paths such as 345 when an originating device removes its signals from inputs such as 344. In this said one preferred implementation, path-selectors 338, 339 and 340 are identical circuits, and arbiters 341, 342 and 343 are identical circuits.

It will be observed that the circuit is symmetrical in rotation and that six routes through the circuit are possible. Having gained access to the circuit, up to three independent bi-directional signalling transactions may operate simultaneously through the circuit.

Figure 49:
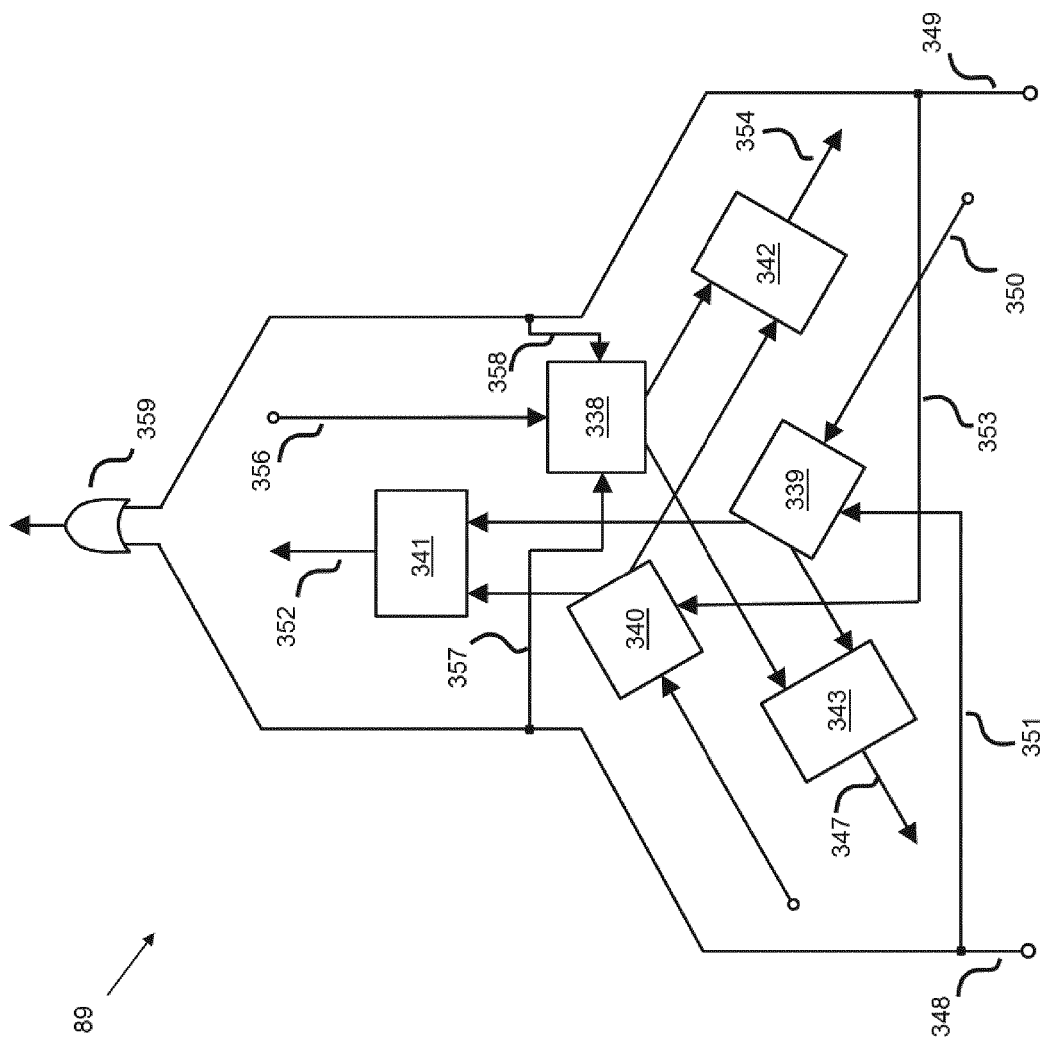
FIG. 49 is the second block-diagram schematic of the tri-switching node with additional free-space links.

FIG. 49 shows that, when operating as an aforesaid 'type-A' tri-switch node (as illustrated in FIG. 10), extra 'free-space' input lines feed the path-selectors, one (348) from a left-hand route upwards through the network of nodes, and one (349) from the right-hand route, each line able to signal the availability of processing cells in a free-state. In FIG. 49, according to signals from upward right-hand path 350, for example, and according to setting of free-space line 351, path-selector 339 enables routeing of a transaction from right-path 350 either to downward left-path 347 or towards upward path 352, assuming that the respective one of 343 and 341 is not (temporarily) set against that acquisition. Similarly, path-selector 340, directed by free-space line 353, enables routeing of a searching signal towards right-path 354 or towards upward path 352, if no free-space is present on 353. For the downward path 356, according to setting of free-space lines 357 and 358 and in response to the downward signals on 356, 338 may similarly switch a downward message to either arbiter 342 or 343 for routeing of a transaction to the right-path 354 or to the left-path 347, assuming that the respective one of arbiters 343 and 342 is not set against that acquisition.

OR-gate 359 receives the free-space lines 348 and 349 and transmits, upwards, notification of any subtended free cells below. The logical selection of nodal switching modes will be described shortly.

Figure 50:
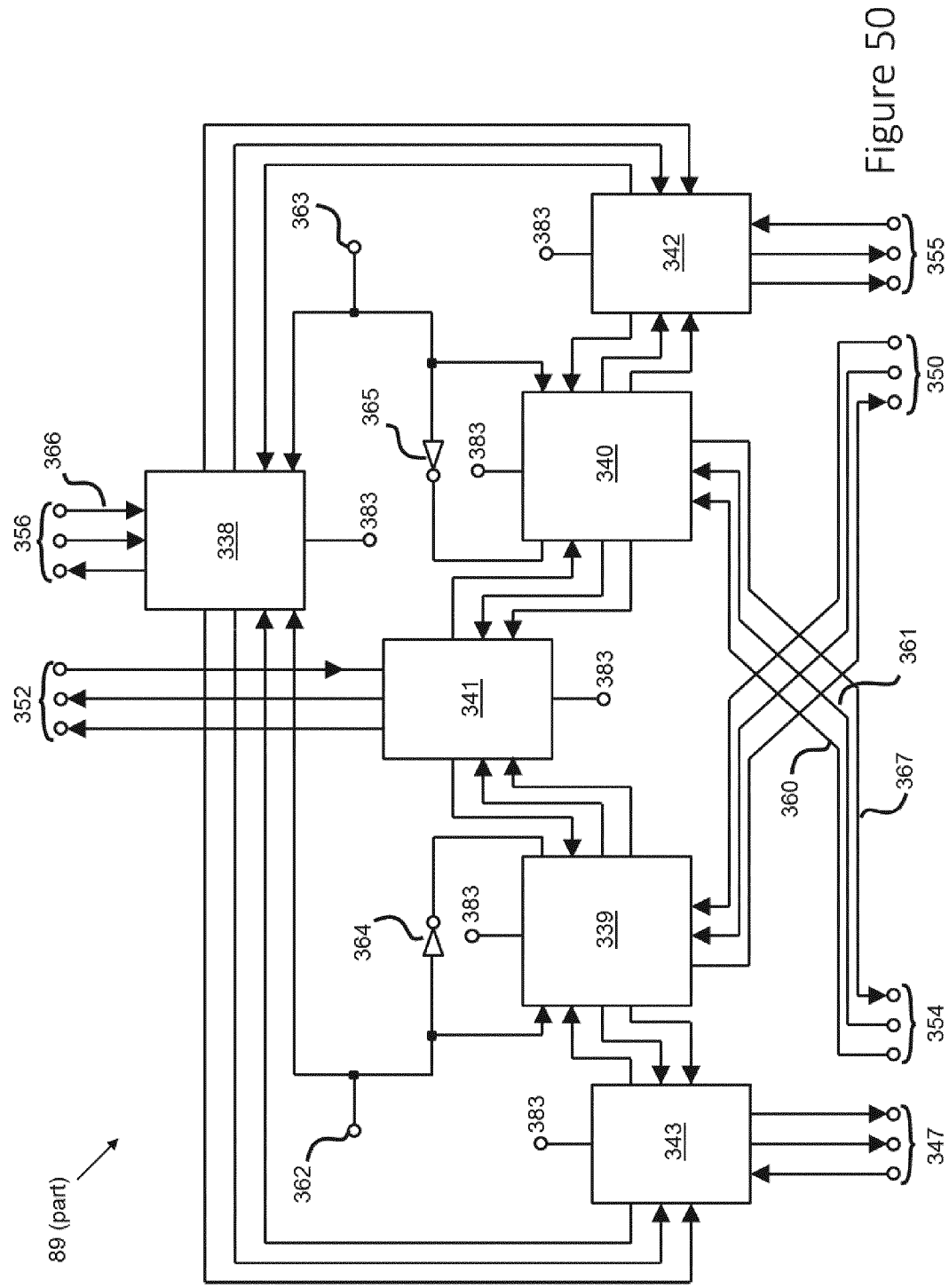
FIG. 50 is a third block-diagram schematic of the elemental tri-switching node showing acquire, address, acknowledge and free-space line connections.
Figure 51:
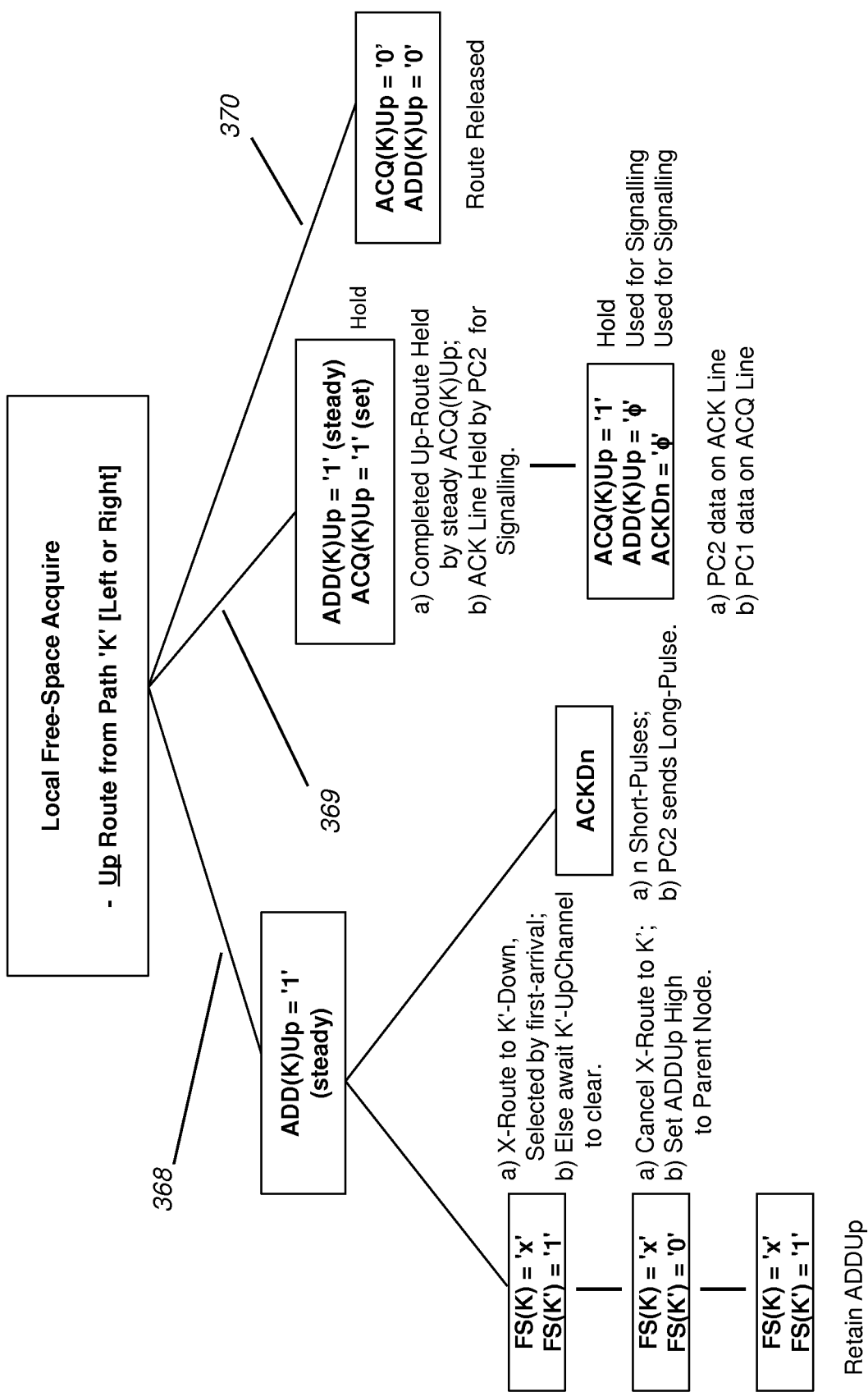
FIG. 51 is a diagram showing the logical switching scheme for the nodal Local Free-Space Acquire mode, in the Upgoing Route.
Figure 52:
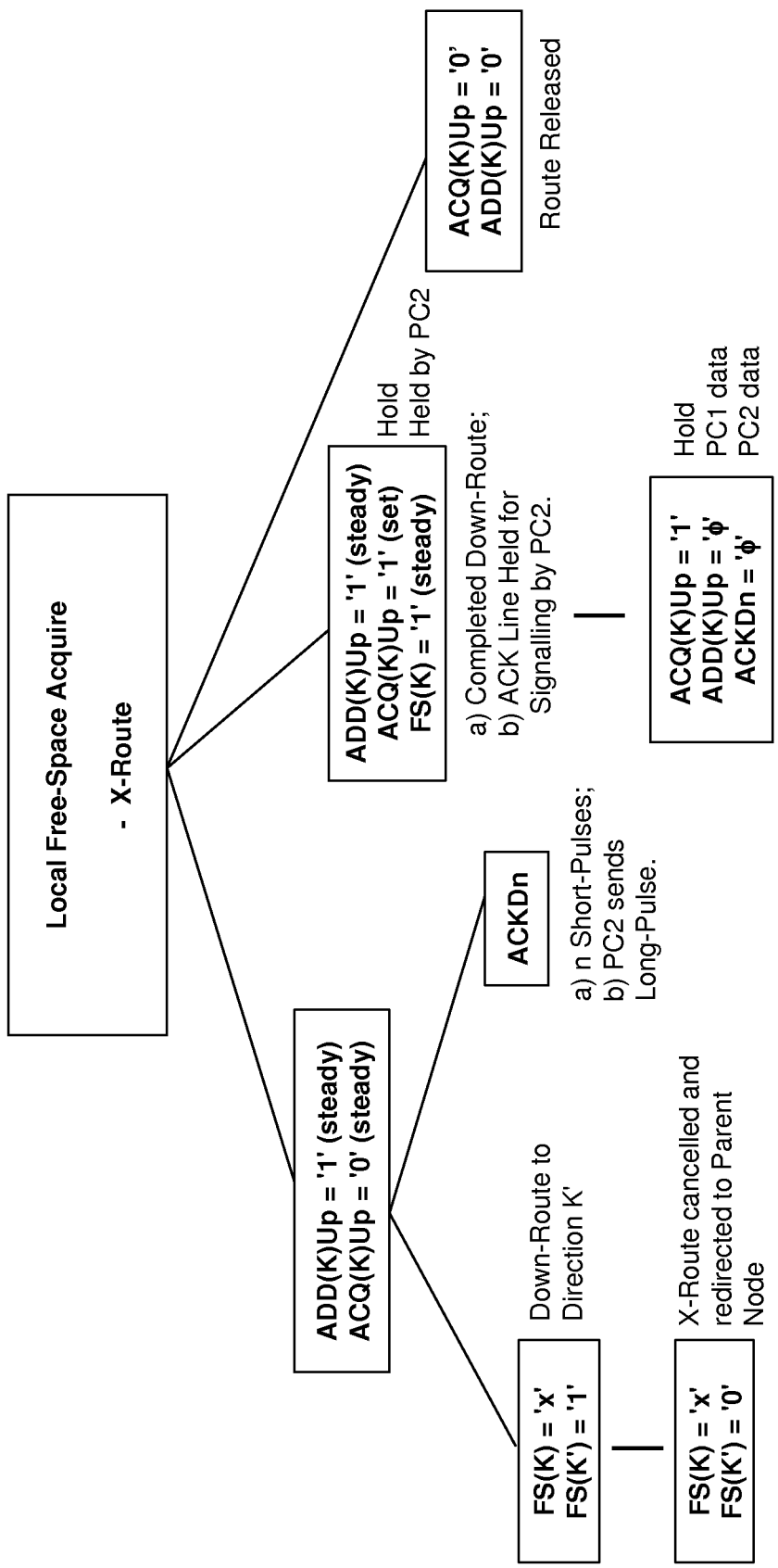
FIG. 52 is a diagram showing the logical switching scheme for the nodal Local Free-Space Acquire mode, at the Branch-Crossing node.
Figure 53:
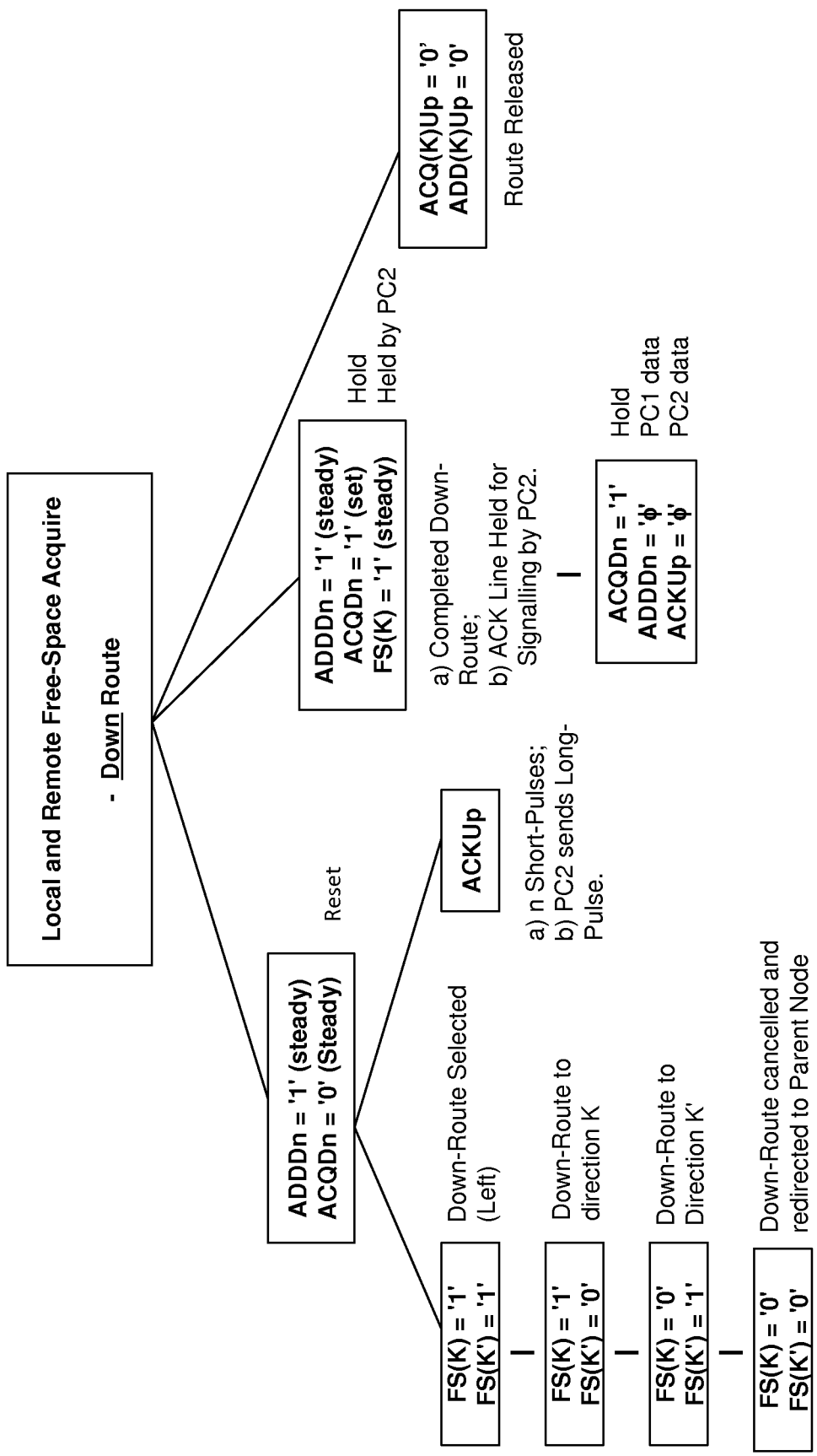
FIG. 53 is a diagram showing the logical switching scheme for the nodal Local and Remote Free-Space Acquire mode, in the Down-going Route.
Figure 54:
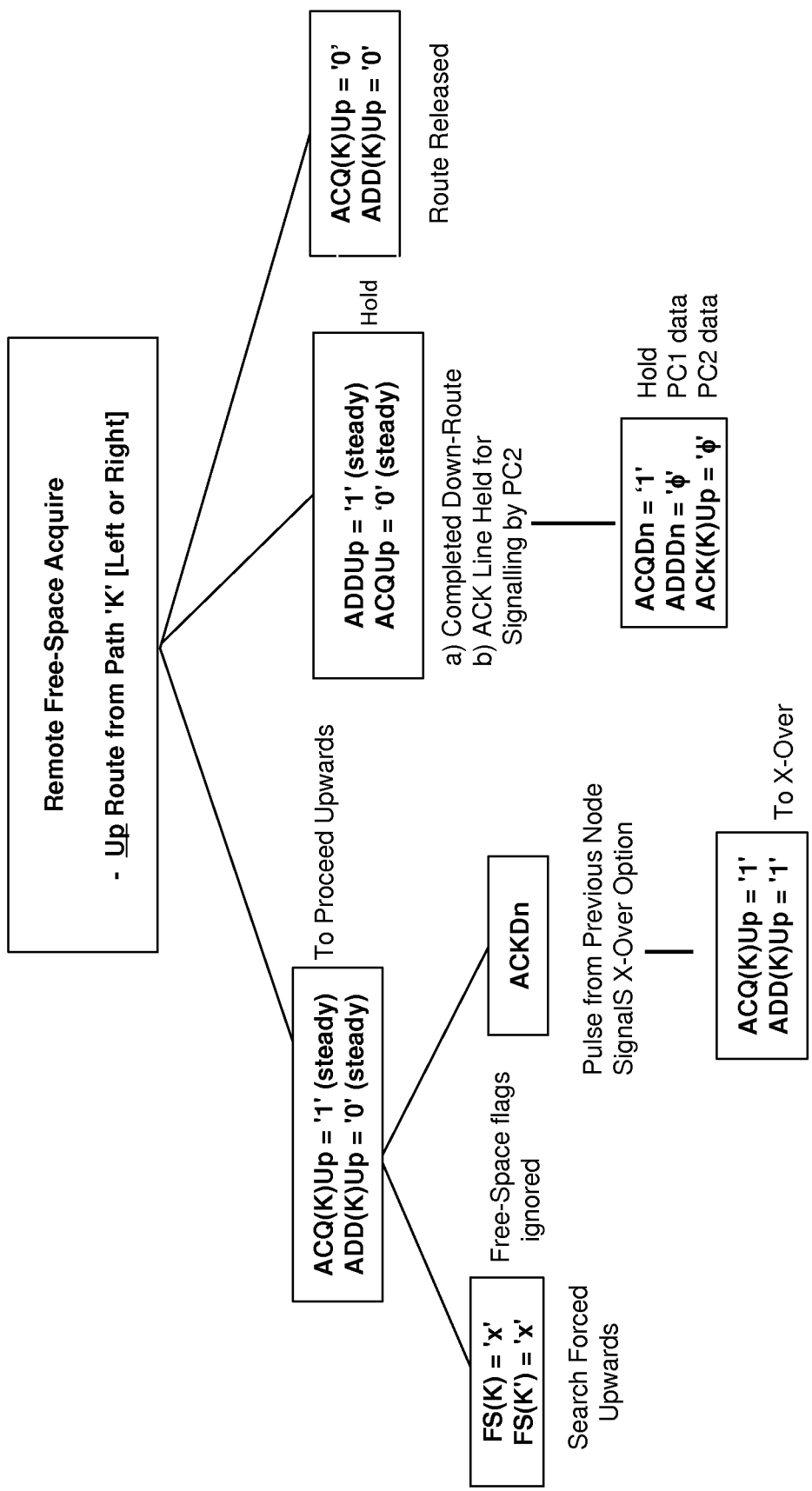
FIG. 54 is a diagram showing the logical switching scheme for the nodal Remote Free-Space Acquire mode, in the Upgoing Route.
Figure 55:
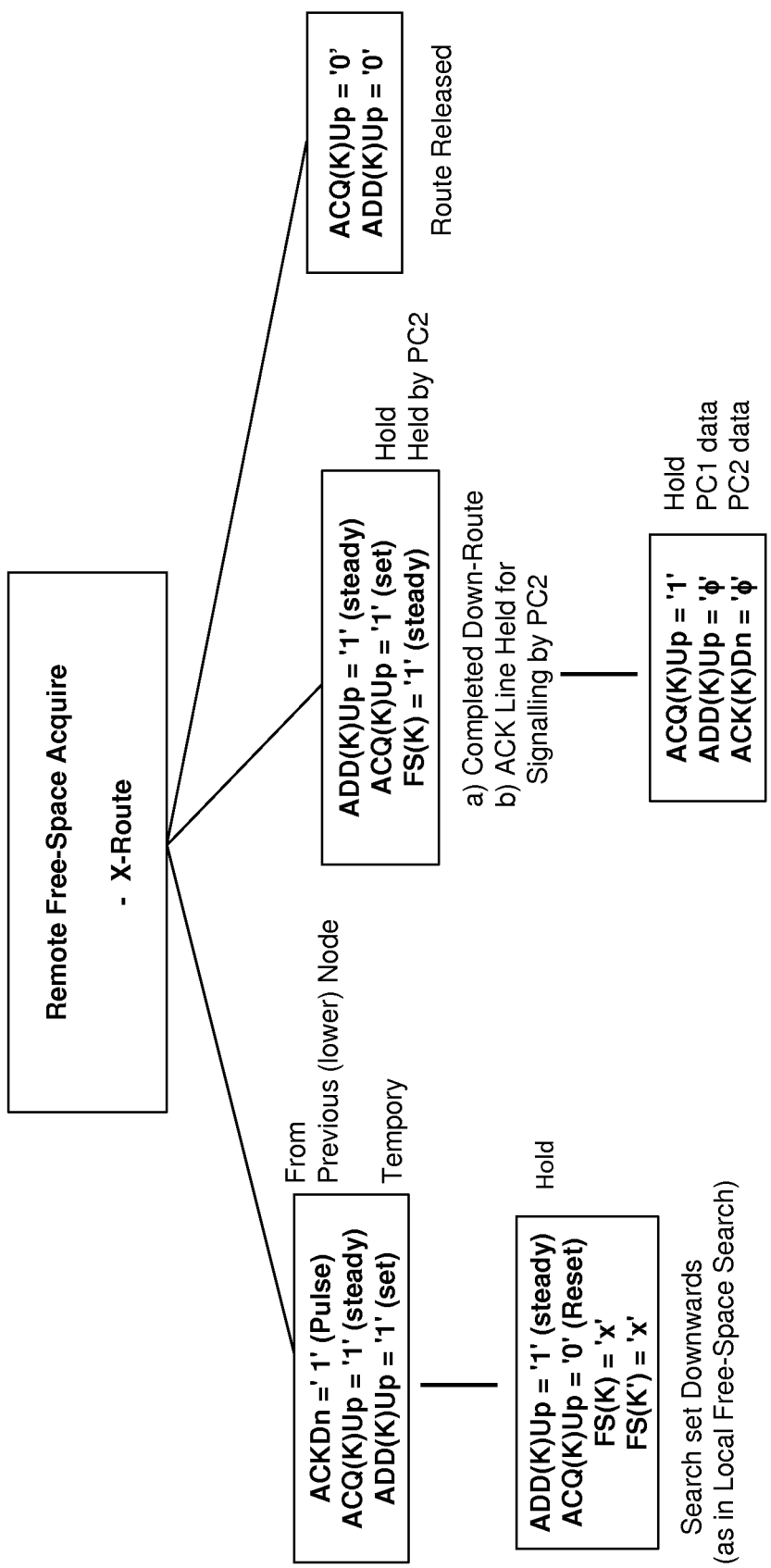
FIG. 55 is a diagram showing the logical switching scheme for the nodal Remote Free-Space Acquire mode, at the Branch-Crossing node.
Figure 56:
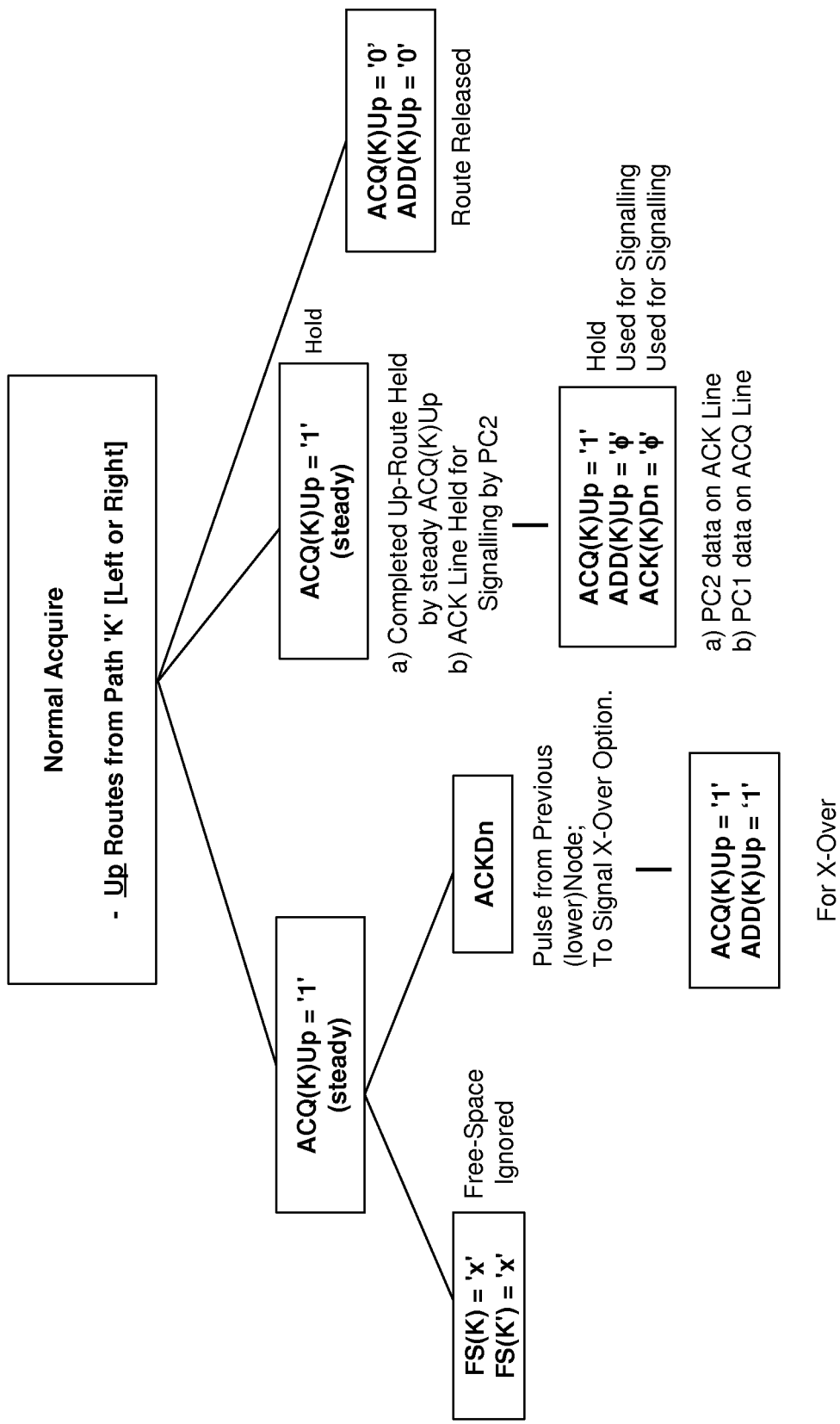
FIG. 56 is a diagram showing the logical switching scheme for the nodal Normal Acquire mode, in the Upgoing Route.
Figure 57:
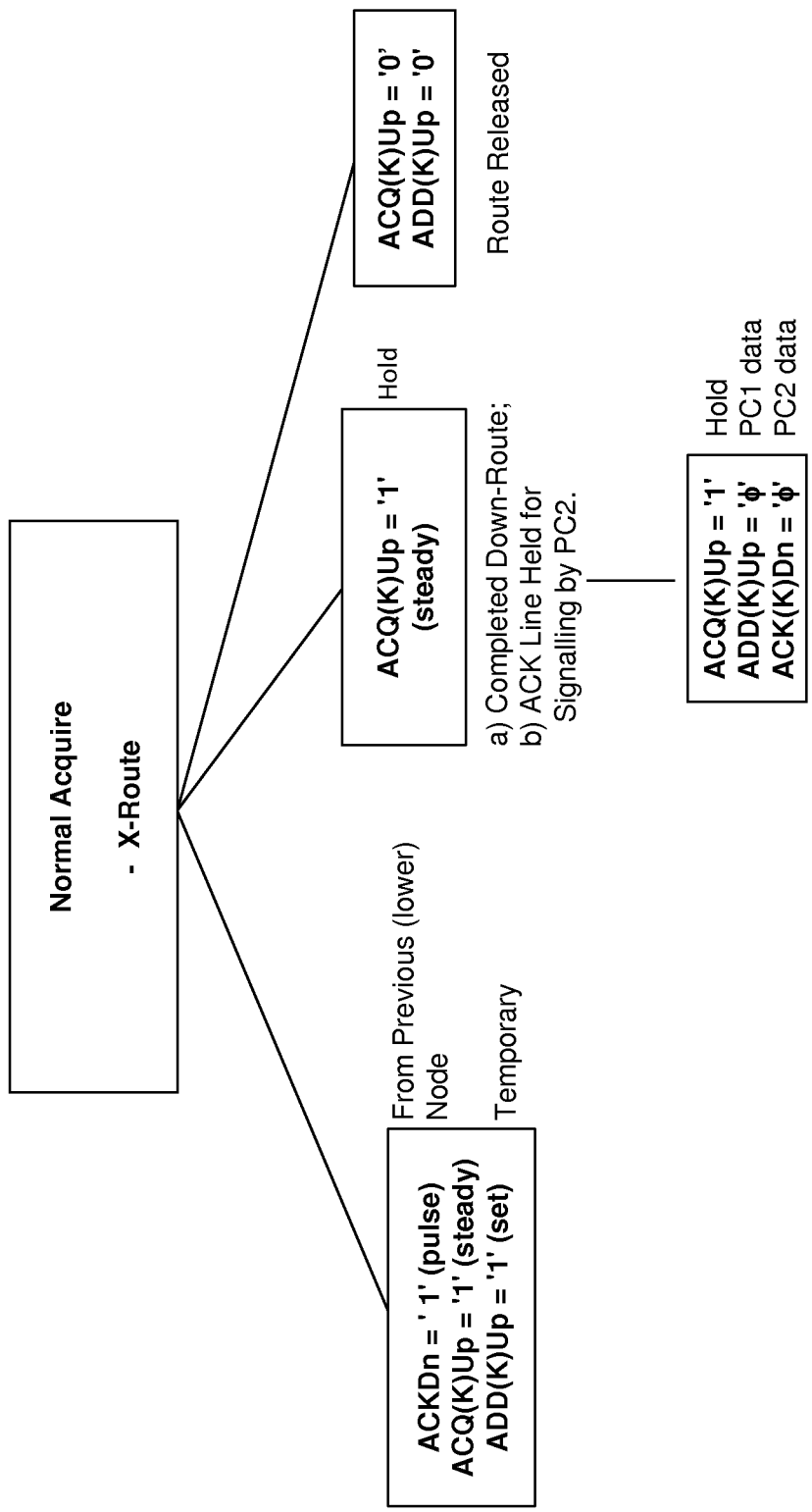
FIG. 57 is a diagram showing the logical switching scheme for the nodal Normal Acquire mode, at the Branch-Crossing node.
Figure 58:
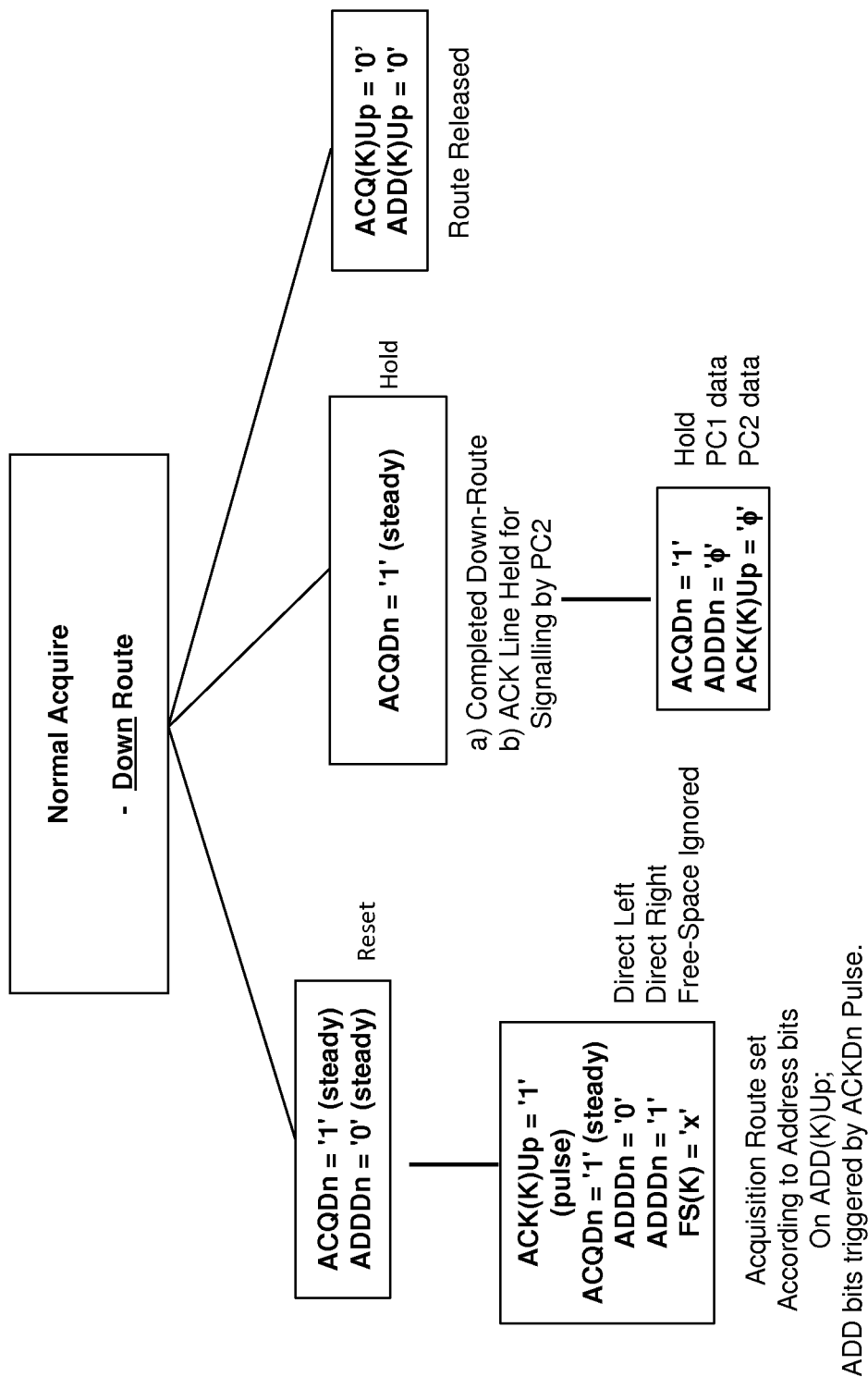
FIG. 58 is a diagram showing the logical switching scheme for the nodal Normal Acquire mode, in the Down-going Route.

FIG. 50 illustrates a third schematic of the tri-switch that includes each signal line to the selectors and arbiters. The connection arrangement of this schematic is topologically identical to that of FIG. 48 and accords with the arrangement of FIG. 10, other than the omission here of the node's associated free-space lines. A first one of the lines, such as 360, is an 'acquire' line that, when 'high' in logic-state '1' sets switching through the circuits that permit a processing cell progressively to acquire an addressed cell, in conjunction with a second, 'address', line such as 361. This mode of operation is called herein a 'normal' acquire. The acquire line has a second function of holding its associated route open for signalling once the acquisition of a called cell is complete.

The second line, the 'address' line 361 also has two functions. The first is to seek a cell in free-state by acting on the nodal circuitry in conjunction with the free-space lines 362, entering from the left side of the node, and 363 from the right side. If, and only if, the free-space line 363 is set low ('0'), when the acquire line is low (0'), a set-high signal on the address line 361 enables selector 340 to direct the address-line signal upwards towards arbiter 341 and onwards to output 352 where it passes to the next network node above. If line 363 is high, selector 340 is arranged to switch the address signal to the right, to arbiter 342 which passes the address-line signal downwards to the next node below. Inverters 364 and 365 are connected to the appropriate free-space signal inputs of selectors 339 and 340 respectively and ensure that these selectors revert the address-path to 341 when their respective free-state signal resets to low. For example, if the free-space line 363 is high, indicating at least one free cell below this node, 340 has means to switch right to arbiter 342 and hence downwards if 342 is not already acquired (temporarily) by selector 338. If, in this mode, selector 340 has selected its right-hand path for downward transmission but the free-space signal at 363 is lost due to absence of free subtended cells, selector 340 has switch means to re-direct the searching address signal to its upward path through 341 (if permitting) to the address-line of the group 352. This forms part of the 'free-space acquire' mode.

The free space acquire mode maintains the address line high in order to continue the switching sequence down to the next lower node, through the equivalent address-line 366 of the next lower node and into its selector 338. That node's selector (338) also has free-space line inputs from its equivalent 362 and 363. 362 switchably enables an address-route to the left branch and down to arbiter 343 when free-space is available on both sides, and also when free space is available only on the left side.

If free-space is only available on the right side, 338 directs the address-route to the right and down to arbiter 342, as before. If neither 362 nor 363 are high, the node above must also have lost its free-space signal on at least one side so that the upper node re-switches the address-signal to the alternative side, that is, if a free-cell is available there, or upwards otherwise when the search continues from further up the tree.

The second function of the address-line is to steer acquisition of the acquire line towards a binary-addressed target cell.

The third switched line, that lies along the whole directed route is the 'acknowledge' line, such as 367. This is enabled by the node switches and latches along the route, and forms a return route for short acknowledge pulses from each node in the acquisition sequence and supports messages in the return direction back to the calling cell (connected in that case through port 354). While a subtended free cell remains in free-state during the free-space acquire mode, the lowest node, connected to that cell at the end of the acquire sequence, transmits the address-line signal to that cell, which immediately transmits a long response-pulse back along the route to the calling cell via acknowledge line 367, for example. The calling cell in turn responds with an acquire signal held high in order to hold the completed route for further data transactions between the two processor cells. The calling cell has means for detecting the individual node acquisitions along the route because of the sequence of short pulses from the node circuits, and for detecting the final, longer pulse from the acquired cell itself. The acquired cell then resets its free-space signal to low and transmits its own-address coding over the now-latched acknowledge line back to the calling, 'parent' cell for re-acquisition at a later time as part of an on-going software application. Similarly, the parent transmits its address, usually along with other messages, to the acquired cell via the now-latched address line. On completion of that stage of transactions, the parent (calling) cell resets the acquire and address lines to low so that the acquired sequence of nodes is released for other transactions, possibly unrelated to the one just described.

Once the cells have reciprocated their addresses, each may subsequently engage the 'normal acquire' mode which employs a combination of acquire-line and address-line settings. The acquire-line, in this case, is the acquiring-signal path and the address-line is used to direct the route of the acquire signal according to the target-cell's address.

Firstly, the calling cell sets the acquire line 360 high, and return pulses on the returning acknowledge line 367 enable counting of the upward hierarchical node sequence until the node before lateral switch-over is reached. The number of pulses from the upward routeing corresponds with the binary-sequence length of the relative address between the two cells in the desired transaction.

On receipt of the pulse from the penultimate node-circuit in the upward path, the calling cell sets its address-line high through 361. Synchronised reception of acquire and address signals by the penultimate node is by means of a delay circuit and ensures simultaneous transmission of the acquire signal and the address signal to the cross-path selector in the topmost node for the transaction.

Secondly, direction of the two signals from the topmost node downwards, through each node in the downward sequence, is followed each by a further delay circuit. As before said, this synchronises the acquire and address signals ready for transmission to the succeeding selector in line, after a short delay. Receipt of an acquire signal by selector 338, for example, along with an address-high signal, forces the route to the left to 343, whilst acquire high and address-low forces the route to the right to 342. In this way, each node-acquisition on the way to the addressed target cell is determined by a sequence of address pulses each being triggered at the calling cell by an acknowledge pulse from the currently acquired arbiter circuit. At various points along the forged signalling route, the acquire process may be blocked by preceding node activity, in which case the calling cell maintains its acquire signal-line high until each node in turn becomes released for its use. The resulting acquisition delay is dependent then on the concurrent activity at that locality of the network.

In effect, each node acts as a 'telephone' exchange for subscriber dialing, the string of exchanges being controlled autonomously by the caller cell, without control by a central executive, and avoiding programmer responsibility at the processor-to-processor level. It therefore provides a simple 'any-to-any' communication interconnection scheme between processor cells similar to the global telecommunication network and many calls can take place concurrently across the resource-shared network.

A further mode of nodal operation is called 'remote free-space acquire' and permits the searching cell to control the communication distance to an available, free-state child cell. The child cell itself then has means to count down one level of searching distance and seek a further free cell for itself over a shorter distance, thereby permitting loose-organisation of the automatic hierarchical structuring of application transactions, and thus engineering modular locality of processing, again without programmer responsibility at the cellular level. In the remote free-space acquire mode then, the ascending acquisition of nodes proceeds as for normal acquisition mode, the acquire signal continuing node-by-node upwards until the penultimate node before the intended cross-over node. As for normal acquisition, the acquire signal is there joined by an address-line signal and the subsequent selector switches the acquisition across towards the opposite (down-going) branch, as before. In this free-space search case though, the processing cell maintains its address-line high and resets its acquire line for the remainder of the search, thereby entering the local free-space acquire mode as before described. During this search sequence, free space may be lost and the search then reverts, as usual, to an even higher nodal-level in the tree. On ultimate receipt of the long pulse from the target cell, the searching cell sets its acquire line high once more in order to latch the route for data signalling.

The three principal nodal operating modes are summarised in FIGS. 51 to 58. Between two processing cells, PC1 (the calling, parent cell) and PC2 (the child cell), the procedure for transactions relevant to operation of the tri-splitting nodes is as follows:

Initial, free-space acquisition (Local and Remote)—
1) PC1 signals the nodal network for a new child in a free state (PC2);
2) PC1, with its address-line, acquires and holds the evolving route through the network;

3) PC2 transmits a Long-Pulse at the instance of acquisition and follows this with own-address;
4) On receipt of the long-pulse and address, PC1 forwards its own-address and message data;
5) PC1 releases route.

Subsequent re-acquisition by means of target-cell address (Normal Acquisition)—
1) PC1 acquires the sequence of nodes by means of the binary address of PC2 and its count of short pulses;
2) PC1, with its acquire-line, progressively holds the evolving route through the network;
3) PC2 transmits a Long-Pulse at the instance of acquisition and awaits message data;
4) On receipt of the long-pulse, PC1 forwards its message data and awaits response message;
5) PC1 releases route.

In this normal acquire mode, the target cell may be engaged in further processing activities that temporarily inhibit its response to the caller, so the caller must then wait for the long acknowledge pulse even though the caller has effected a completed route to the target cell.

As just described in the foregoing, Remote Free-Space Acquisition starts as for Normal Acquisition and continues, following cross-over, as for Local Free-Space Acquisition.

In the illustrations of FIGS. 51 to 58, ACQUp and ADDUp refer to the acquire and address lines in the direction to the root of the tree-network of nodes in FIG. 7 (such as path 59 upwards from of node 61); ACQDn and ADDDn refer to the direction of acquisition on the way down to the target processing-cell level of the tree. ACKDn refers to the acknowledge line returning back down to the calling cell while ACKUp refers to the later upward acknowledgements from the route down to the target cell. 'x' ('don't care') indicates that the signal level on the associated line is irrelevant for the logical control of that illustrated stage. '□' indicates that the signal level switches between '0' and '1' according to the message content during a communication transaction between cells such as 57 and 62 of FIG. 7 through the 'heavy, solid-lined' network.

The FIGS. 51 to 58 show three positions of nodes in the acquisition route—in the upward path, at the cross-switching, and in the downward path—and three stages of mode-logic for a node in each position. The left branch (such as 368 of FIG. 51) lists the logical settings for initial acquisition of the node, the central branch (such as 369) shows the holding logic while the messaging signals are permitted to pass through the node, and the right branch 370 shows the logic for withdrawal of the node's acquisition.

Figure 59:
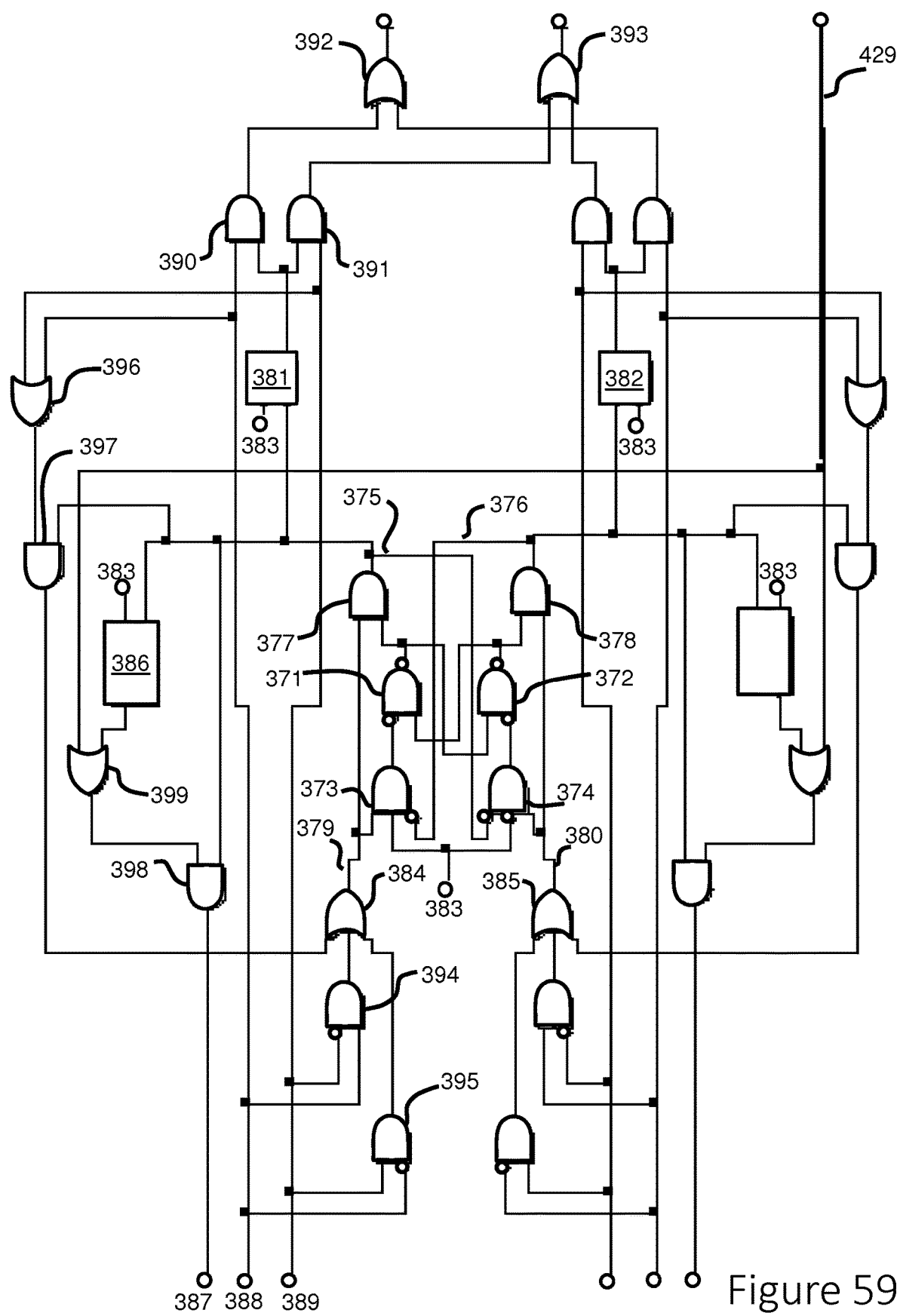
FIG. 59 is a circuit diagram of the nodal arbiters.

FIG. 59 shows the detailed logic for the arbiter circuit and is centred on the flip-flop arrangement of NAND gates 371 and 372 that have control inputs from compound AND gates 373 and 374 respectively which themselves have latching lines 375 and 376 from AND gates 377 and 378. The unambiguous switching of the flip-flop to only one upward route at any given instant means that only one of gates 377 or 378 can pass a signal (379 from the left or 380 from the right) upwards towards its corresponding delay circuit 381 or 382.

Each of the arbiters has clock-input 383 to manage timing of the latch, delay and acknowledge pulse-generator circuits (as also shown in FIG. 50). While no acquisition is being made of the arbiter (through either lines 379 or 380) AND gates 377 and 378 are low and lines 375 and 376 are both low. Compound AND gates 373 and 374 are therefore primed to pass high signals from OR gates 384 and 385 if one or both of these is set high. The clock 383 half-cycles arbitrate alternately between left and right routes such that, if OR gates 384 and 385 are active-high simultaneously, only one will gain authority over the flip-flop during its half-cycle. The system clock period is chosen to be long enough to permit settling of the flip-flop gates during the half-cycle so that the flip-flop has time to trip to the active half-clock side, such as to AND gate 377 which sets high because, in that case, OR gate 384 is already set high and latching-line 375 now inhibits any further attempt by acquisition from the right at 374. In general, such a competing attempt at acquisition will continue until the flip-flop is released again at some later time.

Once acquired to the left (say), the high switching-level at OR gate 384 passes through AND gate 377 both to an acknowledge pulse generator 386 and to the delay element 381. The latter (381) holds off for a duration chosen to be sufficient for an acknowledge-pulse to pass down to the calling cell through acknowledge line 387 and for the calling cell to set its address line high, if that is needed for controlling the next nodal stage in the acquisition sequence.

The left-side acquire-line switch-level at 388 and the address-line switch-level at 389 may then pass through AND gates 390 and 391 respectively. This permits simultaneous output to the next stage via OR gates 392 and 393 respectively, if both acquire and address are required to be set high together. OR gates 392 and 393 act effectively as exclusive-OR gates since only one side of the arbiter operates at a time.

For acquiring its side of the arbiter, OR gate 384 may be set by either the acquire line without the address line (AND gate 394) or (AND gate 395) the address line without the acquire line (that is, overall an exclusive OR operation). Initially, simultaneous receipt of signals on the acquire and address lines is inhibited because that combination is pre-empted by the selector circuit to drive the acquisition signals across to the downwards path. However, subsequently to the acquisition of the arbiter, further operation with simultaneous signals must be permitted, for example for message-passing, in which case, the circuit through OR gate 396 and now-enabled AND gate 397 maintains the latch operation through OR gate 384. Thus, once the left side has been acquired through setting AND gate 377 high, AND gate 397 is enabled so one or both of the acquiring signals 388 or 389 is fed back to OR gate 384 in order to keep the latch on, even when both address and acquire lines are set high.

As soon as the AND gate 377 is latched on, the acknowledge short-pulse circuit 386 generates its signal which passes through the AND gate 398 which is also enabled by the latched state of line 375. The acknowledge-pulse passes downwards to the previously-acquired node in the route, via acknowledge line 387 as required, but also, via OR gate 399, the subsequent pulses generated by nodes further along the evolving route to the destination cell from 4.

For de-acquisition of the node, removal of both acquire (388) and address (389) signals results in loss of the 396/397 route to OR gate 384, and since the signals from 394 and 395 are similarly lost, the left-side latch at AND gate 377 is disabled and the arbitrator returns to its arbitrating function again.

Figure 60:
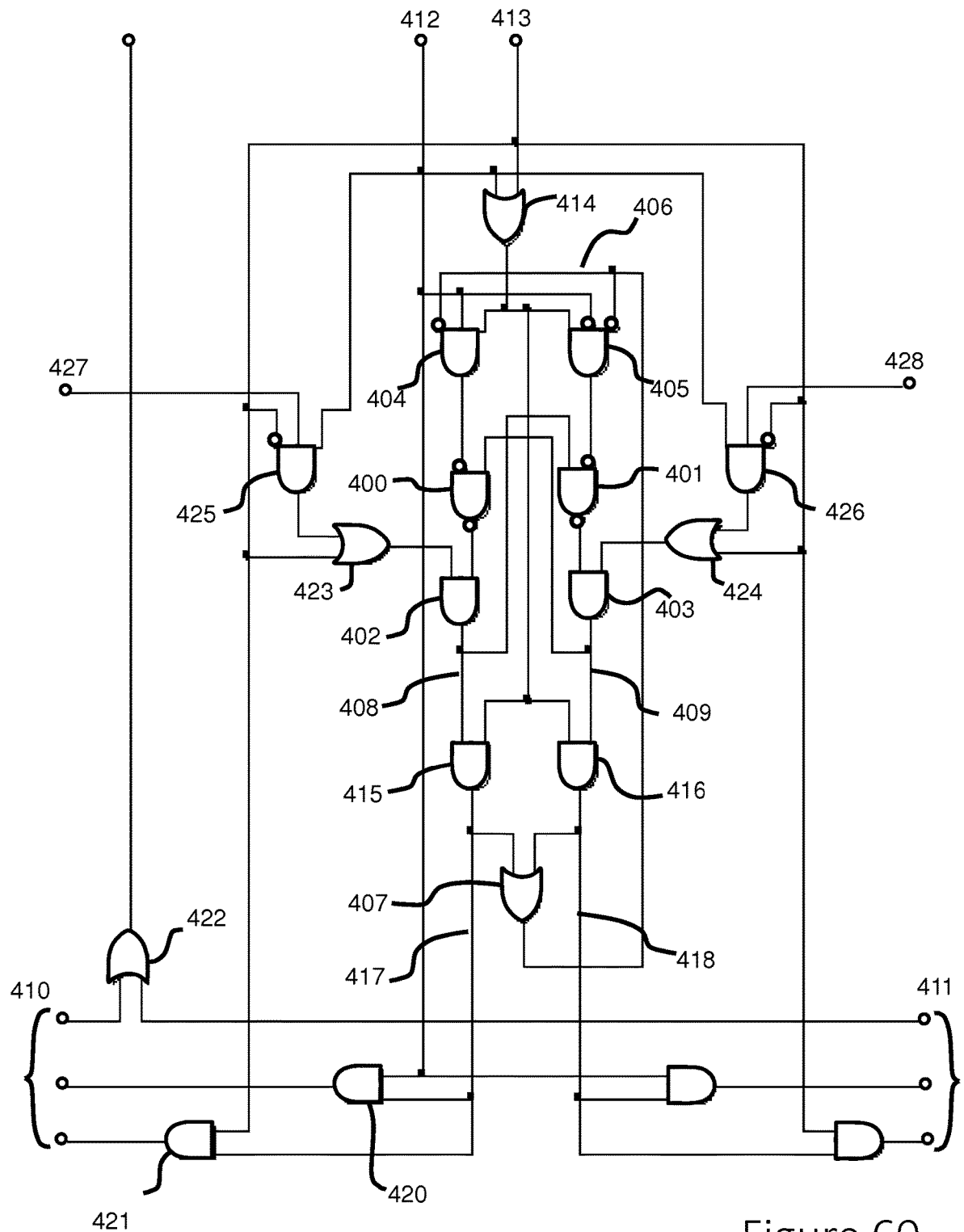
FIG. 60 is a circuit diagram of the nodal selectors.

FIG. 60 shows the detailed logic for the selector circuit and is centred on the flip-flop arrangement of NAND gates 400 and 401 and control AND gates 402 and 403 that have acquisition inputs from compound AND gates 404 and 405 respectively, which themselves have latching line 406 from OR gate 407. The unambiguous switching of the flip-flop to only one downward route at any given instant means that only one of gates 402 or 403, when enabled, can pass a signal (408 to the left or 409 to the right) downwards towards their left or right selected output ports 410 and 411 respectively. The gating control of the selected path results from the logical state of the address line 412 which contributes to enabling the left-side route through 404 when high and the right-side route through 405 when low. Since this is an unambiguous selection, no clock arbitration is required by the flip-flop switch states.

The acquire signal enters at 413. Either the address or the acquire signals can prime the arbiter through OR gate 414, which enables AND gates 415 and 416 in order to pass an acquire signal either to the left (417) or to the right (418) according to the flip-flop state. The selected acquire line, such as 417, in turn, enables AND gates 420 and 421 for passing address signals (412) and acquire signals (413) to the respective arbiter at the next stage of route evolution. At that arbiter, its delay element permits synchronisation of the next acquire and address signals for the next node in line while the generated acknowledge pulse returns through port 410 (if the acquisition is to the left) and then to the previously-acquired node through OR gate 422.

During the normal acquire mode and for the remote free-space acquire mode, the acquire signal from 413 primes AND gates 402 and 403 (through OR gates 423 and 424 respectively) while the side selected by the flip-flop is determined by the address line 412. As previously explained, in order to ensure an unambiguous switching event by the selector, it is necessary to ensure that the combination of the two signals occurs in unison at 412 and 413, otherwise the selection routeing would be biased against the 'addressed-left' normal acquire case and the 'controlled cross-over' case which require simultaneous presence of acquire-high and address-high signals. The preceding delay-stage ensures that they arrive together at 412 and 413, and this is also necessary at the first node, where it must be driven similarly by the calling processing cell.

When the acquire line 413 is low during free-space searches, AND gates 425 and 426 are enabled by the address line to both sides, and the presence of a free-space high signal at input 427 or at input 428 biases the routeing of the address signal in that direction for downward searches. If both sides have a free-space high signal, there is no preference for search direction and the current flip-flop state will dictate the direction of search.

The invention claimed is:
1. A data processing connectivity, comprising:
a plurality of concurrently-operable computing cells each being operable to store, distribute and manipulate digital-codes and each having stored in memory an address uniquely prescribing its location in the connectivity;
a first network of switchably-selectable, bi-directional, signalling-paths, each respectively linking a pair of said cells, into which network each cell has a multiplicity of interfacing circuits enabling the interchange of digital-codes with a like multiplicity of said cells through a like multiplicity of said paths, the said multiplicity of cells being hereinafter referred to as 'neighbours' of said each cell;
at least one set of path-selecting codes of said plurality, prescribed according to a recursive algorithm and mapped bijectively into the said plurality of cells, each code, possibly excepting a terminal one, being adapted to directing its corresponding cell to select a said path to its succeeding neighbour-cell along a chain of code-selected paths for uni-directional signal-transmission, which chain passes once only through each of said cells, recursively delimiting hierarchically-nested segments along its length and describing a correspondingly-delimited sub-connectivity clustered along each of its said nested segments; and
each of several said sub-connectivities has autonomously-operating communication and processing means operable to perform concurrent array-processing on an array of digital-codes from a corresponding user.

2. A connectivity as claimed in claim 1 in which each of several said sub-connectivities has a controlling digital processing cell, hereinafter referred to as a 'pivot' with a scope of control corresponding with the location and size of its prescribed sub-connectivity, each pivot having a bi-directional signal communication route to a user interface circuit and, in accordance with the form of said signalling-chain, the pivot and its corresponding segment of cells together have means to transfer digital-codes in sequential-order along said chain from the said user interface to the cells of the correspondingly-prescribed sub-connectivity.

3. A connectivity as claimed in claim 2 in which each pivot is a prescribed member-cell of said segment of cells with additional circuitry adapted for user interfacing and for controlling its corresponding sub-connectivity.

4. A connectivity as claimed in claim 2 in which each pivot and its corresponding sub-connectivity together have broadcast-means to distribute a signal concurrently and in common from the pivot to all cells along its correspondingly-prescribed segment.

5. A connectivity as claimed in claim 4 in which each cell of said sub-connectivity has means to transmit at least a synchronizing signal to its controlling pivot, each cell annunciating thereby completion of its own operation in response to said common signal.

6. A connectivity as claimed in claim 4 in which each pivot connects to a root-node switching-circuit of a tree of signal-directing, hierarchically-ordered signaling-paths and subtended node-circuits, each of the leaf-level subtended signaling-paths of the tree being connected for signal-transmission to a corresponding cell belonging to said each pivot's correspondingly-prescribed segment.

7. A connectivity as claimed in claim 6 in which said node circuits have means to combine and to transmit partially-collected said synchronizing-signals to said pivot by way of said root-node.

8. Connectivity as claimed in claim 2 in which:
each pivot holds in store a parameter representing the scope of its corresponding segment; the pivots have, interconnecting between themselves, a network of circuits hierarchically-ordered according to the hierarchically-nested scopes of the pivots; and several pivots, in accordance with the hierarchically-nested arrangement of the said chain of segments and pivot-scopes, have means thereby to switchably-select and to programmatically-code subordinately-scoped pivots.

9. Connectivity as claimed in claim 8 in which a first pivot that controls a superior segment, with scope greater than and encompassing a subordinate segment with an associated second pivot, has discretionary means operable to inhibit access by the said second pivot to its own said subordinate segment, and inter alia to take control of the cells in the subordinate segment.

10. Connectivity as claimed in claim 8 in which the address of each pivot encodes said scope-representing parameter.

11. Connectivity as claimed in claim 1 in which time-sharing data-bus circuitry replaces several said signalling-paths of said first network, said circuitry being adapted to route in sequential order through a data-bus, a sequence of said digital-codes of said first network, the digital-codes being switchably-ordered between respective pairs of cells, and said data-bus circuitry being responsible, inter alia, for respective paths in the aforesaid monotonically sequenced signalling-chain.

12. Connectivity as claimed in claim 1 in which each cell has a switchable sequence of operating states including means to annul user digital-codes within its memory and to enter an unemployed operating state, called hereinafter a 'free-state' and, when not in a free-state, enabled at least to enter an operating state, called hereinafter a 'calling-state', adapted to acquire a signalling-route to, and to exchange digital-codes with, a further cell.

13. Connectivity as claimed in claim 12 in which a free-state signal is transmitted into the connectivity by a cell while the cell is in a free-state.

14. Connectivity as claimed in claim 13 in which said cell has means to revert to a free-state in response to a prescribed code, and means to cancel transmission of its free-state signal into the connectivity.

15. A connectivity as claimed in claim 1 in which said first network enables a signal-initiating cell to transfer a data-code to any other one of the said plurality of cells, called hereinafter a 'target-cell', by way of a sequence of address-selected ones of said cells and signalling-paths, each cell in the sequence along the route to the target-cell being switchably-ordered by a cell-selecting address-code transmitted together with the said data-code.

16. A connectivity, as claimed in claim 1, in which the locus of paths of said signalling-chain has the form of a curve called hereinbefore a 'space-filling curve'.

17. A connectivity, as claimed in claim 1, in which the locus of paths of said signalling-chain has the form of a H-curve recursive sequence conforming to a characteristic algorithm as before herein stated.

18. A connectivity, as claimed in claim 1, in which said cell addresses are cyclic-coded addresses.

19. A connectivity, as claimed in claim 18, in which said cyclic-code addresses are Gray-coded addresses.

20. A connectivity, as claimed in claim 1, in which the said first network is a k-ary, n-torus, and each cell is connected for data communication to each of its $2n$ neighbours.

21. A connectivity, as claimed in claim 20 where k is 2 and each cell is connected for data communication to each of its n neighbours.

22. A connectivity, as claimed in claim 2 in which, under the direction of a controlling pivot in common, a first sub-connectivity is enabled by way of said signalling-paths of first network to move its array of said digital-codes in a direct isometry in translation, the digital-codes being thereby transferred step-wise in synchronism through sequences of said paths, each of said digital-codes respectively to be stored as a like array in a said second sub-connectivity of cells.

23. A connectivity as claimed in claim 2 in which, several cells of a first sub-connectivity are concurrently enabled to acquire data transmission routes to several cells of a second corresponding sub-connectivity at respective ones of address-designated positions congruent with the several cells of the first said sub-connectivity.

24. A connectivity, as claimed in claim 23, in which said first and second sub-connectivities are arranged and connected for concurrent data-transmission in an enantiomorphic relationship.

25. A connectivity, as claimed in claim 1, in which a system clock is operable on alternate half-cycles, first to activate half of said plurality of cells on one half-clock-cycle for communication with neighbours belonging to the remaining half of the said plurality of cells and then, on the other half-clock-cycle, to activate said remaining half of cells for communication.

26. A connectivity, as claimed in claim 25, in which said system-clock, on one half-clock-cycle, activates all odd-addressed cells for communication with neighbours with even addresses and then, on the other half-clock-cycle, activates said neighbours with even addresses for communication with neighbours with odd addresses.

27. Connectivity as claimed in claim 25 in which, in response to an instruction in common, each cell active on one half-clock-cycle in a sub-connectivity has means for selecting and signalling each of their said multiplicity of neighbours in a prescribed sequential order.

28. Connectivity as claimed in claim 2, in which comprises several said user interface circuits and a multiplexing network of switchably-selectable switching-nodes and signalling-paths, each multiplexer-node hereinafter referred to as a 'diverter', by way of which some of the several said user interface circuits are concurrently each enabled to select a signalling-route, for bi-directional signal-transmission, to a corresponding, user-designated one of said pivots.

29. Connectivity as claimed in claim 28 in which each user interface circuit has means operable to switchably-select each diverter in a sequence, each diverter being adapted to select a partial-route of the said signalling-route, the signalling-route being formed progressively thereby through at least one diverter and latched-open for signalling.

30. Connectivity as claimed in claim 29 in which user interface circuit has a multiplicity of operating states comprising at least a searching-state and when in a searching-state, the user interface circuit transmits a searching signal into the said multiplexing network, each said diverter being adapted to select a bidirectional partial-route in response both to the searching signal and to the presence of a free-state signal from a pivot in a free-state.

31. Connectivity as claimed in claim 30 in which diverter has means for selecting a partial-route, towards a pivot of prescribed scope in free-state, in accordance with both a searching-signal from the user interface circuit representing the user-designated scope, and a free-state signal from said pivot.

32. Connectivity as claimed in claim 31 in which said user interface circuit together with said multiplexing-network has redirection-means operable such that, in the event that said free-state pivot becomes otherwise acquired during the search, and switches out of its free-state, to redirect the search-signalling route to a free-state pivot of like scope.

33. Connectivity as claimed in claim 32 in which, in the event that no such free-state pivot is available, user interface has switch-means to hold said searching-state in abeyance.

34. Connectivity as claimed in claim 30 in which user interface circuit includes a calling-state and the address of a previously-acquired pivot and, when in a calling-state has means for transmitting a calling-signal into the multiplexing network, the calling-signal progressing through said partial-routes by setting direction-switches through a sequence of diverters according to the address of the user-designated pivot.

35. A connectivity as claimed in claim 1 in which a second network of bi-directional signalling-paths, switchably-selectable through further cell interface circuits, and signal-directing nodal switch-circuits that enable interconnection between pairs of said plurality of cells such that a first cell in a calling-state has means to communicate with a second cell by way of a sequence of selectable ones of said nodal-circuits and following a route that corresponds in order with the destination-address of the said second cell, the resulting sequence of said paths being progressively ordered from said first cell through adjoining nodes, and each node has means to latch itself and its adjoined signal-path open for bi-directional transmission of data between cells, the network being configured to enable a plurality of such routes therethrough to co-exist.

36. A connectivity as claimed in claim 35 in which:
the second network comprises at least one labelled-tree of bi-directional signalling-paths and hierarchically-arranged, labelled signal-directing nodal-circuits; each said tree connects, bijectively at its leaf-level, a like plurality of subtended leaf-paths to the said plurality of cells; the first said cell has means thereby to switchably connect for communication, through a sequence of said labelled nodes and a subtended leaf-path, to the said second cell in accordance with a destination-address coding matching the hierarchically-ordered label-codes of the second cell's subtending tree-nodes; and, by virtue of the said monotonic sequence of cell addresses along said signalling-chain, each said leaf-path of at least one said tree connects to a corresponding cell bearing a correspondingly-coded address.

37. Connectivity as claimed in claim 35 in which each of the plurality of cells has a tree-searching state, and when in a tree-searching state has communication-initiating means operable to transmit into said second network a searching-signal switchable to select a sequence of said signal-directing nodes each with switch-means to select a path in response both to the searching-signal and to the presence of a free-state signal supplied through said second network from an unemployed cell, and to latch paths open for signalling through said second network, the said nodes and signals together being adapted to form a completed route from cell in a tree-searching state to unemployed cell, each such completed route interconnecting a respective pair of the cells and enabling exchange of digital-codes between the pair of cells.

38. Connectivity as claimed in claim 36 in which, each said signal-directing node is a tri-splitting switch forming a junction between three of said bi-directional signalling-paths, thereby offering six uni-directional paths through the node, an upper path being directed towards the root of the tree and left and right lateral paths each directed towards the subtended leaf-paths, free-state signals from the cells flowing through the two lateral paths towards the upper path and permitting a search signal to meet a free-state signal thereby switchably-directing said search-signal towards an unemployed cell, and further permitting two calling signals concurrently to pass through the node.

39. Connectivity as claimed in claim 35 in which a cell in a calling-state has means to acquire for signalling, through said signal-directing nodes, a pivot of designated scope with address composed from the ordering of the nodes in accordance with location of pivot along the said signalling chain.

40. A connectivity as claimed in claim 35 in which second network comprises several said labelled-trees, each connecting, bijectively at its leaf-level, a said plurality of subtended leaf-paths to the like-plurality of cells, any subtended calling-cell being thereby switchably connectable, for concurrent signalling, to several target-cells.

41. A connectivity as claimed in claim 40 in which some of several such labelled-trees are connected, each to respective cells, in a laterally-displaced fashion with respect to one another and each cell occupies a different leaf position in each of the displaced binary tree arrangements.

42. A connectivity as claimed in claim 40 in which some of several such labelled-trees are connected, each to respective cells, in a rotationally-displaced fashion with respect to one another and each cell occupies a different leaf position in each of the displaced binary tree arrangements.

43. A connectivity as claimed in claim 35 in which:
several cells, with means for intercommunicating as a computing-community, enable storage and computation of a digitally-coded functional-expression from a user, each cell having logical and arithmetic processing circuitry at least for computing a sequence of instructions according to rules for reducing functional-expressions; the said sequence enables evaluation both of the computable function of the said functional-expression and of the calling-addresses of further ones of cells within said computing-community; and each of said further ones similarly computes a further functional-expression, returning a result in the form of a function-argument to be applied in the reduction of said digitally-coded functional-expression.

* * * * *